(12) United States Patent
Jones et al.

(10) Patent No.: US 9,141,876 B1
(45) Date of Patent: Sep. 22, 2015

(54) APPARATUS AND SYSTEM FOR PROCESSING CURRENCY BILLS AND FINANCIAL DOCUMENTS AND METHOD FOR USING THE SAME

(71) Applicant: Cummins-Allison Corp., Mt. Prospect, IL (US)

(72) Inventors: William J. Jones, Barrington, IL (US); Paul A. Jones, Glenview, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 127 days.

(21) Appl. No.: 13/774,974

(22) Filed: Feb. 22, 2013

(51) Int. Cl.
*G06K 9/00* (2006.01)
*G06K 9/60* (2006.01)

(52) U.S. Cl.
CPC ....................................... *G06K 9/60* (2013.01)

(58) Field of Classification Search
None
See application file for complete search history.

(56) References Cited

U.S. PATENT DOCUMENTS

| | | | |
|---|---|---|---|
| 2,669,998 A | 2/1954 | Buchholz | 133/8 |
| 2,750,949 A | 6/1956 | Kulo et al. | 133/8 |
| 2,835,260 A | 5/1958 | Buchholz | 133/8 |
| 2,936,684 A | 5/1960 | Simjian | 95/1.1 |
| 3,104,314 A | 9/1963 | Simjian | 235/61.9 |
| 3,148,932 A | 9/1964 | Simjian | 346/22 |
| 3,150,912 A | 9/1964 | Simjian | 346/22 |
| 3,246,295 A | 4/1966 | DeClaris et al. | 340/146.3 |
| 3,280,974 A | 10/1966 | Riddle et al. | 209/111.8 |
| 3,443,107 A | 5/1969 | Modglin | 250/219 |
| 3,480,785 A | 11/1969 | Aufderheide | 250/219 |
| 3,496,370 A | 2/1970 | Haville et al. | 250/219 |
| 3,509,535 A | 4/1970 | Berube | 340/149 |
| 3,612,835 A | 10/1971 | Andrews et al. | 235/61.11 D |
| 3,618,765 A | 11/1971 | Cooper et al. | 209/122 |
| 3,656,615 A | 4/1972 | Ptacek | 209/73 |
| 3,679,314 A | 7/1972 | Mustert | 356/71 |
| 3,715,031 A | 2/1973 | Okkonen | 209/75 |
| 3,725,667 A | 4/1973 | Schwartz | 250/219 |
| 3,764,899 A | 10/1973 | Peterson | 324/61 |

(Continued)

FOREIGN PATENT DOCUMENTS

| | | | | |
|---|---|---|---|---|
| CA | 2 624 638 A1 | 12/2007 | | B65H 29/12 |
| CA | 2 684 159 A1 | 4/2010 | | G07D 11/00 |

(Continued)

OTHER PUBLICATIONS

ATM Network, Owners manual Hyosung 1500; ATM network service department.*

(Continued)

*Primary Examiner* — Bernard Krasnic
*Assistant Examiner* — Pinalben Patel
(74) *Attorney, Agent, or Firm* — Nixon Peabody LLP

(57) ABSTRACT

A document processing device convertible between a first configuration and a second configuration includes an input receptacle, a transport mechanism, a scanner, and a convertible output area. The input receptacle is configured to receive documents including currency bills therein. The transport mechanism is configured to transport the documents along a transport path from the input receptacle. The scanner is positioned along the transport path and is configured to scan at least a portion of each of the documents transported to generate data associated therewith. The convertible output area is configured to be selectively coupled with a first output assembly and a second output assembly.

49 Claims, 39 Drawing Sheets

(56) References Cited

U.S. PATENT DOCUMENTS

| | | | |
|---|---|---|---|
| 3,778,628 A | 12/1973 | Novak et al. ................. 250/556 |
| 3,782,543 A | 1/1974 | Martelli et al. ................ 209/75 |
| 3,798,603 A | 3/1974 | Wahlberg ..................... 340/149 |
| 3,800,078 A | 3/1974 | Cochran et al. ................ 178/7.1 |
| 3,806,710 A | 4/1974 | Shigemori et al. ............. 235/92 |
| 3,815,021 A | 6/1974 | Kerr ........................... 324/61 R |
| 3,842,281 A | 10/1974 | Goodrich ..................... 250/461 |
| 3,870,629 A | 3/1975 | Carter et al. ................ 209/111.8 |
| 3,906,449 A | 9/1975 | Marchak ..................... 340/149 |
| 3,930,582 A | 1/1976 | Gartner et al. ................ 209/88 |
| 3,949,363 A | 4/1976 | Holm ...................... 340/146.3 D |
| 3,966,047 A | 6/1976 | Steiner ......................... 209/75 |
| 3,976,198 A | 8/1976 | Carnes, Jr. et al. ...... 209/111.7 T |
| 4,023,011 A | 5/1977 | Nakajima et al. ....... 235/61.11 R |
| 4,027,142 A | 5/1977 | Paup et al. ................ 235/61.9 R |
| 4,040,010 A | 8/1977 | Crane .................. 340/146.3 SY |
| 4,041,456 A | 8/1977 | Ott et al. ................ 340/146.3 R |
| 4,096,991 A | 6/1978 | Iguchi ......................... 235/419 |
| 4,109,238 A | 8/1978 | Creekmore ............... 340/149 A |
| 4,114,027 A | 9/1978 | Slater ......................... 235/419 |
| 4,114,804 A | 9/1978 | Jones et al. .................. 235/476 |
| 4,147,430 A | 4/1979 | Gorgone et al. ............... 356/51 |
| 4,166,945 A | 9/1979 | Inoyama et al. .............. 235/379 |
| 4,179,685 A | 12/1979 | O'Maley ............... 340/146.3 H |
| 4,180,798 A | 12/1979 | Komori et al. ......... 340/146.3 H |
| 4,187,463 A | 2/1980 | Kivenson .................... 324/228 |
| 4,187,498 A | 2/1980 | Creekmore ............... 340/149 A |
| 4,197,986 A | 4/1980 | Nagata ........................ 235/379 |
| 4,201,978 A | 5/1980 | Nally .................. 340/146.3 C |
| 4,205,780 A | 6/1980 | Burns et al. .................. 235/454 |
| 4,231,014 A | 10/1980 | Ponzio .................. 340/146.3 Y |
| 4,231,561 A | 11/1980 | Kaneko et al. ............... 271/3.1 |
| 4,237,378 A | 12/1980 | Jones ...................... 250/223 R |
| 4,250,806 A | 2/1981 | Boyson et al. .................. 101/2 |
| 4,255,651 A | 3/1981 | Phillips .................... 235/92 SB |
| 4,264,808 A | 4/1981 | Owens et al. ................ 235/379 |
| 4,275,874 A | 6/1981 | DiBlasio .......................... 271/4 |
| 4,277,774 A | 7/1981 | Fujii et al. ............. 340/146.3 Q |
| 4,283,708 A | 8/1981 | Lee ........................ 340/146.3 Z |
| 4,288,781 A | 9/1981 | Sellner et al. .......... 340/146.3 Q |
| 4,302,781 A | 11/1981 | Ikeda et al. .................. 358/288 |
| 4,310,885 A | 1/1982 | Azcua et al. ................. 364/405 |
| 4,311,914 A | 1/1982 | Huber ......................... 250/556 |
| 4,313,598 A | 2/1982 | DiBlasio ...................... 271/124 |
| 4,321,672 A | 3/1982 | Braun et al. .................. 705/42 |
| 4,326,636 A | 4/1982 | Kawakami ................... 209/534 |
| 4,334,619 A | 6/1982 | Horino et al. ................ 209/551 |
| 4,337,864 A | 7/1982 | McLean ....................... 209/534 |
| 4,348,656 A | 9/1982 | Gorgone et al. ....... 340/146.3 R |
| 4,349,111 A | 9/1982 | Shah et al. .................... 209/534 |
| 4,352,988 A | 10/1982 | Ishida .......................... 250/559 |
| 4,355,300 A | 10/1982 | Weber .................. 340/146.3 C |
| 4,355,369 A | 10/1982 | Garvin ......................... 364/900 |
| 4,356,473 A | 10/1982 | Freudenthal .......... 340/146.3 H |
| 4,360,034 A | 11/1982 | Davila et al. .................. 133/3 D |
| 4,381,447 A | 4/1983 | Horvath et al. ........... 250/223 R |
| 4,383,540 A | 5/1983 | De Meyer et al. ............. 133/3 H |
| 4,386,432 A | 5/1983 | Nakamura et al. ............... 382/7 |
| 4,396,902 A | 8/1983 | Warthan et al. ............... 382/64 |
| 4,416,299 A | 11/1983 | Bergman ..................... 133/1 R |
| 4,420,153 A | 12/1983 | Winkler et al. .............. 271/304 |
| 4,435,834 A | 3/1984 | Pauli et al. ....................... 382/7 |
| 4,441,205 A | 4/1984 | Berkin et al. ..................... 382/8 |
| 4,442,541 A | 4/1984 | Finkel et al. ...................... 382/7 |
| 4,449,240 A | 5/1984 | Yoshida ......................... 382/15 |
| 4,461,028 A | 7/1984 | Okubo ......................... 382/15 |
| 4,464,786 A | 8/1984 | Nishito et al. ................... 382/7 |
| 4,464,787 A | 8/1984 | Fish et al. ........................ 382/7 |
| RE31,692 E | 10/1984 | Tyburski et al. ................. 382/7 |
| 4,479,049 A | 10/1984 | Hirose ......................... 235/379 |
| 4,480,177 A | 10/1984 | Allen ........................... 235/379 |
| 4,482,058 A | 11/1984 | Steiner ........................ 209/534 |
| 4,487,306 A | 12/1984 | Nao et al. .................... 194/4 C |
| 4,490,846 A | 12/1984 | Ishida et al. ..................... 382/7 |
| 4,513,439 A | 4/1985 | Gorgone et al. .................. 382/7 |
| 4,521,008 A | 6/1985 | Granzow et al. ................. 271/3 |
| 4,523,330 A | 6/1985 | Cain ................................. 382/7 |
| 4,530,067 A | 7/1985 | Dorr ............................ 364/900 |
| 4,538,719 A | 9/1985 | Gray et al. ................ 194/100 A |
| 4,539,702 A | 9/1985 | Oka ................................. 382/7 |
| 4,542,829 A | 9/1985 | Emery et al. ................. 209/534 |
| 4,543,969 A | 10/1985 | Rasmussen ................... 133/3 A |
| 4,544,266 A | 10/1985 | Antes ............................ 356/71 |
| 4,547,896 A | 10/1985 | Ohtombe et al. ................. 382/7 |
| 4,553,222 A | 11/1985 | Kurland et al. ............... 364/900 |
| 4,553,846 A | 11/1985 | Hilton et al. ................. 356/429 |
| 4,556,140 A | 12/1985 | Okada .......................... 194/4 C |
| 4,558,224 A | 12/1985 | Gober ....................... 250/461.1 |
| 4,559,451 A | 12/1985 | Curl ............................. 250/560 |
| 4,563,771 A | 1/1986 | Gorgone et al. .................. 382/7 |
| 4,567,370 A | 1/1986 | Falls ......................... 250/461.1 |
| 4,569,421 A | 2/1986 | Sandstedt ...................... 186/39 |
| 4,582,172 A | 4/1986 | Takeuchi et al. ............... 186/38 |
| 4,584,529 A | 4/1986 | Aoyama ...................... 324/261 |
| 4,587,412 A | 5/1986 | Apisdorf ...................... 235/449 |
| 4,587,434 A | 5/1986 | Roes et al. ................... 250/556 |
| 4,590,606 A | 5/1986 | Rohrer ............................ 382/7 |
| 4,592,090 A | 5/1986 | Curl et al. ........................ 382/7 |
| 4,593,184 A | 6/1986 | Bryce .......................... 235/449 |
| 4,594,664 A | 6/1986 | Hashimoto ................... 364/405 |
| 4,602,332 A * | 7/1986 | Hirose et al. .................... 705/43 |
| 4,605,926 A | 8/1986 | Onishi et al. .............. 340/825.3 |
| 4,611,345 A | 9/1986 | Ohnishi et al. ................... 382/7 |
| 4,617,457 A | 10/1986 | Granzow et al. ............. 235/379 |
| 4,617,458 A | 10/1986 | Bryce .......................... 235/449 |
| 4,628,194 A | 12/1986 | Dobbins et al. .............. 235/379 |
| 4,630,813 A | 12/1986 | Watanabe et al. ............. 271/227 |
| 4,645,936 A | 2/1987 | Gorgone ...................... 250/556 |
| 4,653,647 A | 3/1987 | Hashimoto ................... 209/534 |
| 4,658,289 A | 4/1987 | Nagano et al. ................. 358/75 |
| 4,676,343 A | 6/1987 | Humble et al. ................. 186/61 |
| 4,677,682 A | 6/1987 | Miyagawa et al. ............... 382/7 |
| 4,678,072 A | 7/1987 | Kobayashi et al. ........... 194/206 |
| 4,680,803 A | 7/1987 | Dilella ............................. 382/9 |
| 4,685,141 A | 8/1987 | Hoque et al. ..................... 382/7 |
| 4,686,357 A | 8/1987 | Douno et al. ................. 235/379 |
| 4,694,963 A | 9/1987 | Takesako ...................... 209/534 |
| 4,697,071 A | 9/1987 | Hiraoka et al. ................ 235/379 |
| 4,700,368 A | 10/1987 | Munn et al. ...................... 377/8 |
| 4,716,456 A | 12/1987 | Hosaka ........................... 358/75 |
| 4,733,308 A | 3/1988 | Nakamura et al. ............ 358/288 |
| 4,735,289 A | 4/1988 | Kenyon ........................ 186/37 |
| 4,743,743 A | 5/1988 | Fukatsu ........................ 235/379 |
| 4,743,974 A | 5/1988 | Lockwood .................... 358/285 |
| 4,748,679 A | 5/1988 | Gold et al. ..................... 382/61 |
| 4,749,087 A | 6/1988 | Buttifant ...................... 209/534 |
| 4,753,625 A | 6/1988 | Okada ........................... 453/32 |
| 4,764,725 A | 8/1988 | Bryce .......................... 324/234 |
| 4,764,976 A | 8/1988 | Kallin et al. .................... 382/65 |
| 4,768,100 A | 8/1988 | Kunishima et al. ........... 358/285 |
| 4,774,663 A | 9/1988 | Musmanno et al. .......... 364/408 |
| 4,782,328 A | 11/1988 | Denlinger .................. 340/365 P |
| 4,784,274 A | 11/1988 | Mori et al. .................... 209/534 |
| 4,803,347 A | 2/1989 | Sugahara et al. .............. 235/379 |
| 4,806,709 A | 2/1989 | Evans ............................ 179/19 |
| 4,811,004 A | 3/1989 | Person et al. .................. 340/712 |
| 4,817,176 A | 3/1989 | Marshall et al. ................ 382/43 |
| 4,821,332 A | 4/1989 | Durham .......................... 382/7 |
| 4,823,393 A | 4/1989 | Kawakami ....................... 382/7 |
| 4,825,246 A | 4/1989 | Fukuchi et al. .................. 355/4 |
| 4,827,531 A | 5/1989 | Milford ......................... 382/29 |
| 4,837,842 A | 6/1989 | Holt ............................. 382/26 |
| 4,841,358 A | 6/1989 | Kammoto et al. .............. 358/75 |
| 4,843,219 A | 6/1989 | Franchi ........................ 235/379 |
| 4,851,616 A | 7/1989 | Wales et al. .................... 178/18 |
| 4,877,230 A | 10/1989 | Winkler et al. ................... 271/3 |
| 4,880,096 A | 11/1989 | Kobayashi et al. ........... 194/206 |
| 4,881,268 A | 11/1989 | Uchida et al. .................... 382/7 |
| 4,883,181 A | 11/1989 | Yoshikawa .................. 209/534 |
| 4,888,812 A | 12/1989 | Dinan et al. ...................... 382/7 |
| 4,903,953 A | 2/1990 | Winkler et al. .................. 271/4 |
| 4,905,839 A | 3/1990 | Yuge et al. .................... 209/534 |
| 4,905,840 A | 3/1990 | Yuge et al. .................... 209/534 |
| 4,908,516 A | 3/1990 | West ............................ 250/556 |

(56) References Cited

U.S. PATENT DOCUMENTS

| | | | |
|---|---|---|---|
| 4,922,109 A | 5/1990 | Bercovitz et al. | 250/556 |
| 4,928,094 A | 5/1990 | Smith | 340/712 |
| 4,931,782 A | 6/1990 | Jackson | 340/706 |
| 4,947,441 A | 8/1990 | Hara et al. | 382/7 |
| 4,948,174 A | 8/1990 | Thomson et al. | 283/58 |
| 4,954,697 A | 9/1990 | Kokubun et al. | 235/381 |
| 4,958,235 A | 9/1990 | Sims et al. | 358/402 |
| 4,960,981 A | 10/1990 | Benton et al. | 235/379 |
| 4,970,655 A | 11/1990 | Winn et al. | 364/479 |
| 4,973,851 A | 11/1990 | Lee | 250/556 |
| 4,980,543 A | 12/1990 | Hara et al. | 235/379 |
| 4,984,280 A | 1/1991 | Abe | 382/7 |
| 4,992,860 A | 2/1991 | Hamaguchi et al. | 358/75 |
| 4,996,604 A | 2/1991 | Ogawa et al. | 358/474 |
| 5,001,766 A | 3/1991 | Baird | 382/290 |
| 5,010,238 A | 4/1991 | Kadono et al. | 235/379 |
| 5,023,782 A | 6/1991 | Lutz et al. | 364/405 |
| 5,025,483 A | 6/1991 | Dinan et al. | 382/58 |
| 5,027,415 A | 6/1991 | Hara et al. | 382/7 |
| 5,040,226 A | 8/1991 | Elischer et al. | 382/7 |
| 5,047,871 A | 9/1991 | Meyer et al. | 358/486 |
| 5,053,607 A | 10/1991 | Carlson et al. | 705/18 |
| 5,054,621 A | 10/1991 | Murphy et al. | 209/534 |
| 5,055,834 A | 10/1991 | Chiba | 340/825.34 |
| 5,063,599 A | 11/1991 | Concannon et al. | 382/7 |
| 5,064,999 A | 11/1991 | Okamoto et al. | 235/379 |
| 5,068,519 A | 11/1991 | Bryce | 235/449 |
| 5,076,441 A | 12/1991 | Gerlier | 209/534 |
| 5,091,961 A | 2/1992 | Baus, Jr. | 382/7 |
| 5,097,517 A | 3/1992 | Holt | 382/7 |
| 5,105,364 A | 4/1992 | Kawamura et al. | 364/478 |
| 5,105,601 A | 4/1992 | Horiguchi et al. | 53/465 |
| 5,114,381 A | 5/1992 | Ueda et al. | 453/57 |
| 5,119,433 A | 6/1992 | Will | 382/7 |
| 5,120,944 A | 6/1992 | Kern et al. | 235/379 |
| 5,122,754 A | 6/1992 | Gotaas | 324/676 |
| 5,134,663 A | 7/1992 | Kozlowski | 382/7 |
| 5,135,115 A | 8/1992 | Miller et al. | 209/564 |
| 5,144,115 A | 9/1992 | Yoshida | 235/379 |
| 5,146,067 A | 9/1992 | Sloan et al. | 235/381 |
| 5,146,512 A | 9/1992 | Weideman et al. | 382/30 |
| 5,151,607 A | 9/1992 | Crane et al. | 250/556 |
| 5,154,272 A | 10/1992 | Nishiumi et al. | 194/318 |
| 5,159,548 A | 10/1992 | Caslavka | 364/408 |
| 5,163,672 A | 11/1992 | Mennie | 271/187 |
| 5,163,868 A | 11/1992 | Adams et al. | 453/11 |
| 5,167,313 A | 12/1992 | Dobbins et al. | 194/317 |
| 5,179,517 A | 1/1993 | Sarbin et al. | 364/410 |
| 5,183,142 A | 2/1993 | Latchinian et al. | 194/206 |
| 5,184,115 A | 2/1993 | Black et al. | 340/708 |
| 5,184,709 A | 2/1993 | Nishiumi et al. | 194/318 |
| 5,186,334 A | 2/1993 | Fukudome et al. | 209/534 |
| 5,187,750 A | 2/1993 | Behera | 382/7 |
| 5,191,525 A | 3/1993 | LeBrun et al. | 364/419 |
| 5,193,121 A | 3/1993 | Elischer et al. | 382/7 |
| 5,198,976 A | 3/1993 | Form et al. | 364/410 |
| 5,199,543 A | 4/1993 | Kamagami et al. | 194/207 |
| 5,201,395 A | 4/1993 | Takizawa et al. | 194/206 |
| 5,204,811 A | 4/1993 | Bednar et al. | 705/45 |
| 5,206,915 A | 4/1993 | Kern et al. | 382/7 |
| 5,207,788 A | 5/1993 | Geib | 271/122 |
| 5,220,501 A | 6/1993 | Lawlor et al. | 364/408 |
| 5,231,381 A | 7/1993 | Duwaer | 340/712 |
| 5,237,158 A | 8/1993 | Kern et al. | 235/379 |
| 5,237,159 A | 8/1993 | Stephens et al. | 235/379 |
| 5,239,593 A | 8/1993 | Wittner et al. | 382/14 |
| 5,251,273 A | 10/1993 | Betts et al. | 382/311 |
| 5,251,738 A | 10/1993 | Dobrowski | 194/206 |
| 5,252,811 A | 10/1993 | Henochowicz et al. | 235/379 |
| 5,258,855 A | 11/1993 | Lech et al. | 358/462 |
| 5,261,518 A | 11/1993 | Bryce | 194/206 |
| 5,265,008 A | 11/1993 | Benton et al. | 364/408 |
| 5,272,641 A | 12/1993 | Ford et al. | 364/468 |
| 5,274,641 A | 12/1993 | Shobalake et al. | 370/94.1 |
| 5,279,403 A | 1/1994 | Harbaugh et al. | 194/207 |
| 5,286,954 A | 2/1994 | Sato et al. | 235/379 |
| 5,295,196 A | 3/1994 | Raterman et al. | 382/135 |
| 5,297,030 A | 3/1994 | Vassigh et al. | 364/405 |
| 5,304,813 A | 4/1994 | De Man | 250/556 |
| 5,308,992 A | 5/1994 | Crane et al. | 250/556 |
| 5,309,515 A | 5/1994 | Troung et al. | 382/7 |
| 5,317,140 A | 5/1994 | Dunthorn | 250/221 |
| 5,321,238 A | 6/1994 | Kamata et al. | 235/379 |
| 5,335,292 A | 8/1994 | Lovelady et al. | 382/17 |
| 5,341,408 A | 8/1994 | Melcher et al. | 377/8 |
| 5,342,165 A | 8/1994 | Graef et al. | 414/788.9 |
| 5,363,949 A | 11/1994 | Matsubayashi | 194/206 |
| 5,367,577 A | 11/1994 | Gotaas | 382/7 |
| 5,368,147 A | 11/1994 | Menke et al. | 194/206 |
| 5,371,345 A | 12/1994 | LeStrange et al. | 235/380 |
| 5,371,798 A | 12/1994 | McWhortor | 380/51 |
| 5,373,550 A | 12/1994 | Campbell et al. | 379/100 |
| 5,379,344 A | 1/1995 | Larsson et al. | 380/23 |
| 5,381,019 A | 1/1995 | Sato | 250/556 |
| 5,383,754 A | 1/1995 | Sumida et al. | 412/11 |
| 5,394,969 A | 3/1995 | Harbaugh | 194/206 |
| 5,399,874 A | 3/1995 | Gonsalves et al. | 250/556 |
| 5,402,895 A | 4/1995 | Mikkelsen et al. | 209/534 |
| 5,416,307 A | 5/1995 | Danek et al. | 235/449 |
| 5,417,316 A | 5/1995 | Harbaugh | 194/206 |
| 5,418,458 A | 5/1995 | Jeffers | 324/235 |
| 5,419,424 A | 5/1995 | Harbaugh | 194/206 |
| 5,421,443 A | 6/1995 | Hatamachi et al. | 194/206 |
| 5,422,467 A | 6/1995 | Graef et al. | 235/379 |
| 5,430,664 A | 7/1995 | Cargill et al. | 364/550 |
| 5,434,427 A | 7/1995 | Crane et al. | 250/556 |
| 5,437,357 A | 8/1995 | Ota et al. | 194/206 |
| 5,438,184 A | 8/1995 | Roberts et al. | 235/380 |
| 5,442,162 A | 8/1995 | Armel | 235/381 |
| 5,444,793 A | 8/1995 | Kelland | 382/138 |
| 5,444,794 A | 8/1995 | Uhland, Sr. | 382/137 |
| 5,453,601 A | 9/1995 | Rosen | 235/379 |
| 5,459,304 A | 10/1995 | Eisenmann | 235/380 |
| 5,465,301 A | 11/1995 | Jotcham et al. | 380/54 |
| 5,465,821 A | 11/1995 | Akioka | 194/207 |
| 5,467,405 A | 11/1995 | Raterman et al. | 382/135 |
| 5,467,406 A | 11/1995 | Graves et al. | 382/135 |
| 5,468,941 A | 11/1995 | Sasaki | 235/379 |
| 5,468,971 A | 11/1995 | Ebstein et al. | 250/556 |
| 5,469,241 A | 11/1995 | Takahashi et al. | 355/64 |
| 5,471,039 A | 11/1995 | Irwin et al. | 235/441 |
| 5,476,169 A | 12/1995 | Takarada et al. | 194/207 |
| 5,481,377 A | 1/1996 | Udagawa et al. | 358/501 |
| 5,488,671 A | 1/1996 | Kern | 382/138 |
| 5,491,325 A | 2/1996 | Huang et al. | 235/379 |
| 5,504,822 A | 4/1996 | Holt | 382/218 |
| 5,506,691 A | 4/1996 | Bednar et al. | 358/402 |
| 5,509,692 A | 4/1996 | Oz | 283/70 |
| D369,984 S | 5/1996 | Larsen | D10/97 |
| 5,523,575 A | 6/1996 | Machida et al. | 250/208.1 |
| 5,530,772 A | 6/1996 | Storey | 382/135 |
| 5,530,773 A | 6/1996 | Thompson | 382/138 |
| 5,537,486 A | 7/1996 | Stratigos et al. | 382/137 |
| 5,539,825 A | 7/1996 | Akiyama et al. | 705/68 |
| 5,544,043 A | 8/1996 | Miki et al. | 364/406 |
| 5,544,086 A | 8/1996 | Davis et al. | 364/408 |
| 5,545,885 A | 8/1996 | Jagielinski | 235/449 |
| 5,564,546 A | 10/1996 | Molbak et al. | 194/216 |
| 5,586,036 A | 12/1996 | Pintsov | 364/464.02 |
| 5,590,196 A | 12/1996 | Moreau | 380/18 |
| 5,592,377 A | 1/1997 | Lipkin | 395/242 |
| 5,592,561 A | 1/1997 | Moore | 382/103 |
| 5,594,225 A | 1/1997 | Botvin | 235/379 |
| 5,600,704 A | 2/1997 | Ahlberg et al. | 379/58 |
| 5,600,732 A | 2/1997 | Ott et al. | 382/112 |
| 5,602,933 A | 2/1997 | Blackwell et al. | 382/116 |
| 5,602,936 A | 2/1997 | Green et al. | 382/140 |
| 5,607,040 A | 3/1997 | Mathurin, Sr. | 194/207 |
| 5,615,280 A | 3/1997 | Izawa et al. | 382/135 |
| 5,616,902 A | 4/1997 | Cooley | 235/380 |
| 5,620,079 A | 4/1997 | Molbak | 194/217 |
| 5,633,949 A | 5/1997 | Graves et al. | 382/135 |
| 5,640,463 A | 6/1997 | Csulits | 382/135 |
| 5,652,802 A | 7/1997 | Graves et al. | 382/135 |

(56) References Cited

U.S. PATENT DOCUMENTS

| | | | | |
|---|---|---|---|---|
| 5,657,846 A | 8/1997 | Schwartz | | 194/206 |
| 5,671,282 A | 9/1997 | Wolff et al. | | 380/25 |
| 5,678,046 A | 10/1997 | Cahill et al. | | 395/616 |
| 5,680,472 A | 10/1997 | Conant | | 382/135 |
| 5,687,963 A | 11/1997 | Mennie | | 271/119 |
| 5,692,067 A | 11/1997 | Raterman et al. | | 382/135 |
| 5,703,344 A | 12/1997 | Bezy et al. | | 235/379 |
| 5,704,491 A | 1/1998 | Graves | | 209/534 |
| 5,708,810 A | 1/1998 | Kern et al. | | 395/712 |
| 5,719,948 A | 2/1998 | Liang | | 382/112 |
| 5,724,438 A | 3/1998 | Graves | | 382/135 |
| 5,727,667 A | 3/1998 | Nye | | 194/207 |
| 5,729,623 A | 3/1998 | Omatu et al. | | 382/155 |
| 5,751,840 A | 5/1998 | Raterman et al. | | 382/135 |
| 5,751,842 A | 5/1998 | Riach et al. | | 382/137 |
| 5,754,673 A | 5/1998 | Brooks et al. | | 382/112 |
| 5,761,089 A | 6/1998 | McInerny | | 364/550 |
| 5,768,416 A | 6/1998 | Lech et al. | | 382/180 |
| 5,781,654 A | 7/1998 | Carney | | 382/137 |
| 5,790,693 A | 8/1998 | Graves et al. | | 382/135 |
| 5,790,697 A | 8/1998 | Munro et al. | | 382/135 |
| 5,799,767 A | 9/1998 | Molbak | | 194/217 |
| 5,806,650 A | 9/1998 | Mennie et al. | | 194/206 |
| 5,813,510 A | 9/1998 | Rademacher | | 194/206 |
| 5,815,592 A | 9/1998 | Mennie et al. | | 382/135 |
| 5,822,448 A | 10/1998 | Graves et al. | | 382/135 |
| 5,830,054 A | 11/1998 | Petri | | 453/5 |
| 5,832,104 A | 11/1998 | Graves et al. | | 382/135 |
| 5,832,463 A | 11/1998 | Funk | | 705/35 |
| 5,842,188 A | 11/1998 | Ramsey et al. | | 705/416 |
| 5,852,811 A | 12/1998 | Atkins | | 705/36 |
| 5,867,589 A | 2/1999 | Graves et al. | | 382/135 |
| 5,870,487 A | 2/1999 | Graves et al. | | 382/135 |
| 5,870,725 A | 2/1999 | Bellinger et al. | | 705/45 |
| 5,871,209 A | 2/1999 | Orchard et al. | | |
| 5,874,717 A | 2/1999 | Kern et al. | | 235/379 |
| 5,875,259 A | 2/1999 | Mennie et al. | | 382/135 |
| 5,892,211 A | 4/1999 | Davis et al. | | 235/380 |
| 5,894,937 A | 4/1999 | Schmidt | | 209/534 |
| 5,905,810 A | 5/1999 | Jones et al. | | 382/135 |
| 5,909,502 A | 6/1999 | Mazur | | 382/135 |
| 5,909,503 A | 6/1999 | Graves et al. | | 382/135 |
| 5,912,982 A | 6/1999 | Munro et al. | | 382/135 |
| 5,917,930 A | 6/1999 | Kayani et al. | | 382/135 |
| 5,918,748 A | 7/1999 | Clark et al. | | 209/534 |
| 5,923,413 A | 7/1999 | Laskowski | | 356/71 |
| 5,926,392 A | 7/1999 | York et al. | | 364/478.11 |
| 5,926,550 A | 7/1999 | Davis | | 380/25 |
| 5,930,778 A | 7/1999 | Geer | | 705/45 |
| 5,936,219 A | 8/1999 | Yoshida et al. | | 235/379 |
| 5,938,044 A | 8/1999 | Weggesser | | 209/534 |
| 5,940,623 A | 8/1999 | Watts et al. | | 395/712 |
| 5,940,844 A | 8/1999 | Cahill et al. | | 707/526 |
| 5,942,255 A | 8/1999 | Klesges | | 424/682 |
| 5,943,655 A | 8/1999 | Jacobson | | 705/30 |
| 5,947,255 A | 9/1999 | Shimada et al. | | 194/207 |
| 5,960,103 A | 9/1999 | Graves et al. | | 382/135 |
| 5,966,456 A | 10/1999 | Jones et al. | | 382/135 |
| 5,982,918 A | 11/1999 | Mennie et al. | | 382/135 |
| 5,992,601 A | 11/1999 | Mennie et al. | | 194/207 |
| 6,012,565 A | 1/2000 | Mazur | | 194/207 |
| 6,021,883 A | 2/2000 | Casanova et al. | | 194/217 |
| 6,023,684 A | 2/2000 | Pearson | | 705/35 |
| 6,026,175 A | 2/2000 | Munro et al. | | 382/135 |
| 6,028,951 A | 2/2000 | Raterman et al. | | 382/135 |
| 6,036,344 A | 3/2000 | Goldenberg | | 364/408 |
| 6,038,553 A | 3/2000 | Hyde, Jr. | | 705/45 |
| 6,045,039 A | 4/2000 | Stinson et al. | | 235/379 |
| 6,065,672 A | 5/2000 | Haycock | | 235/379 |
| 6,068,194 A | 5/2000 | Mazur | | 235/492 |
| 6,072,896 A | 6/2000 | Graves et al. | | 382/135 |
| 6,073,744 A | 6/2000 | Raterman et al. | | 194/207 |
| 6,074,334 A | 6/2000 | Mennie et al. | | 493/438 |
| 6,076,826 A | 6/2000 | Gerlier et al. | | 271/274 |
| 6,078,683 A | 6/2000 | Denison et al. | | 382/135 |
| D427,623 S | 7/2000 | Kuwanda | | D18/3 |
| 6,097,834 A | 8/2000 | Krouse et al. | | 382/137 |
| 6,101,266 A | 8/2000 | Laskowski et al. | | 382/135 |
| 6,105,007 A | 8/2000 | Norris | | 705/38 |
| 6,119,946 A | 9/2000 | Teicher | | 235/492 |
| 6,128,402 A | 10/2000 | Jones et al. | | 382/135 |
| 6,131,718 A | 10/2000 | Witschorik | | 194/206 |
| 6,141,438 A | 10/2000 | Blanchester | | 382/140 |
| 6,144,459 A | 11/2000 | Satou | | 358/1.15 |
| 6,145,738 A | 11/2000 | Stinson et al. | | 235/379 |
| 6,181,837 B1 | 1/2001 | Cahill et al. | | 382/305 |
| 6,220,419 B1 | 4/2001 | Mennie | | 194/207 |
| 6,237,739 B1 | 5/2001 | Mazur et al. | | 194/207 |
| 6,241,069 B1 | 6/2001 | Mazur et al. | | 194/207 |
| 6,256,407 B1 | 7/2001 | Mennie et al. | | 382/135 |
| 6,264,101 B1 | 7/2001 | Ryan et al. | | 235/379 |
| 6,278,795 B1 | 8/2001 | Anderson et al. | | 382/135 |
| 6,282,523 B1 | 8/2001 | Tedesco et al. | | 705/45 |
| 6,283,366 B1 | 9/2001 | Hills et al. | | 235/379 |
| 6,311,819 B1 | 11/2001 | Stromme et al. | | 194/207 |
| 6,318,537 B1 | 11/2001 | Jones et al. | | 194/346 |
| 6,350,029 B1 * | 2/2002 | Szlucha et al. | | 347/104 |
| 6,351,551 B1 | 2/2002 | Munro et al. | | 382/135 |
| 6,351,552 B1 | 2/2002 | Weaver et al. | | 382/135 |
| 6,354,491 B2 | 3/2002 | Nichols et al. | | 235/379 |
| 6,363,164 B1 | 3/2002 | Jones et al. | | 382/135 |
| 6,363,362 B1 | 3/2002 | Burfield | | 705/40 |
| 6,371,303 B1 | 4/2002 | Klein et al. | | 209/534 |
| 6,373,965 B1 | 4/2002 | Liang | | 382/112 |
| 6,378,683 B2 | 4/2002 | Mennie | | 194/207 |
| 6,381,354 B1 | 4/2002 | Mennie et al. | | 382/135 |
| 6,398,000 B1 | 6/2002 | Jenrick et al. | | 194/200 |
| 6,415,983 B1 | 7/2002 | Ulvr et al. | | 235/487 |
| 6,430,320 B1 | 8/2002 | Jia et al. | | 382/289 |
| 6,459,806 B1 | 10/2002 | Raterman et al. | | 382/135 |
| 6,460,705 B1 | 10/2002 | Hallowell | | 209/534 |
| 6,473,519 B1 | 10/2002 | Pidhirny et al. | | 382/140 |
| 6,493,461 B1 | 12/2002 | Mennie et al. | | 382/135 |
| 6,516,078 B1 | 2/2003 | Yang et al. | | 382/100 |
| 6,539,104 B1 | 3/2003 | Raterman et al. | | 382/135 |
| 6,540,090 B1 | 4/2003 | Sakai et al. | | 209/534 |
| 6,546,351 B1 | 4/2003 | Haycock et al. | | 702/127 |
| 6,550,671 B1 | 4/2003 | Brown et al. | | 235/379 |
| 6,560,355 B2 | 5/2003 | Graves et al. | | 382/135 |
| 6,573,983 B1 | 6/2003 | Laskowski | | 356/71 |
| 6,574,377 B1 | 6/2003 | Cahill et al. | | 382/305 |
| 6,588,569 B1 | 7/2003 | Jenrick et al. | | 194/206 |
| 6,601,687 B1 | 8/2003 | Jenrick et al. | | 194/206 |
| 6,603,872 B2 | 8/2003 | Jones et al. | | 382/135 |
| 6,611,351 B1 | 8/2003 | Simonoff | | 358/1.18 |
| 6,621,919 B2 | 9/2003 | Mennie et al. | | 382/135 |
| 6,628,816 B2 | 9/2003 | Mennie et al. | | 382/135 |
| 6,636,624 B2 | 10/2003 | Raterman et al. | | 382/135 |
| 6,637,576 B1 | 10/2003 | Jones et al. | | 194/216 |
| 6,647,136 B2 | 11/2003 | Jones et al. | | 382/137 |
| 6,650,767 B2 | 11/2003 | Jones et al. | | 382/135 |
| 6,654,149 B1 | 11/2003 | Sheng | | 358/474 |
| 6,654,486 B2 | 11/2003 | Jones et al. | | 382/135 |
| 6,661,910 B2 | 12/2003 | Jones et al. | | 382/135 |
| 6,665,431 B2 | 12/2003 | Jones et al. | | 382/135 |
| 6,678,401 B2 | 1/2004 | Jones et al. | | 382/135 |
| 6,678,402 B2 | 1/2004 | Jones et al. | | 382/135 |
| 6,697,511 B1 | 2/2004 | Haycock | | 382/135 |
| 6,705,470 B2 | 3/2004 | Klein et al. | | 209/534 |
| 6,721,442 B1 | 4/2004 | Mennie et al. | | 382/135 |
| 6,724,926 B2 | 4/2004 | Jones et al. | | 382/135 |
| 6,724,927 B2 | 4/2004 | Jones et al. | | 382/135 |
| 6,731,785 B1 | 5/2004 | Mennie et al. | | 382/135 |
| 6,731,786 B2 | 5/2004 | Jones et al. | | 382/135 |
| 6,748,101 B1 | 6/2004 | Jones et al. | | 382/135 |
| 6,778,693 B2 | 8/2004 | Jones et al. | | 382/135 |
| 6,783,065 B2 | 8/2004 | Spitz et al. | | 235/380 |
| 6,785,405 B2 | 8/2004 | Tuttle et al. | | 382/112 |
| 6,786,398 B1 | 9/2004 | Stinson et al. | | 235/379 |
| 6,798,899 B2 | 9/2004 | Mennie et al. | | 382/135 |
| 6,810,137 B2 | 10/2004 | Jones et al. | | 382/135 |
| 6,843,418 B2 | 1/2005 | Jones et al. | | 235/462.01 |
| 6,860,375 B2 | 3/2005 | Hallowell et al. | | 194/328 |
| 6,863,214 B2 | 3/2005 | Garner et al. | | 235/379 |

(56) References Cited

U.S. PATENT DOCUMENTS

| | | | |
|---|---|---|---|
| 6,866,134 B2 | 3/2005 | Stromme et al. | 194/207 |
| 6,868,954 B2 | 3/2005 | Stromme et al. | 194/207 |
| 6,880,692 B1 | 4/2005 | Mazur et al. | 194/207 |
| 6,883,706 B2 | 4/2005 | Mastie et al. | 235/379 |
| 6,883,707 B2 | 4/2005 | Nagasaka et al. | 235/379 |
| 6,913,130 B1 | 7/2005 | Mazur et al. | 194/207 |
| 6,913,260 B2 | 7/2005 | Maier et al. | 271/265.04 |
| 6,915,893 B2 | 7/2005 | Mennie | 194/207 |
| 6,929,109 B1 | 8/2005 | Klein et al. | 194/206 |
| 6,955,253 B1 | 10/2005 | Mazur et al. | 194/207 |
| 6,957,733 B2 | 10/2005 | Mazur et al. | 194/215 |
| 6,959,800 B1 | 11/2005 | Mazur et al. | 194/207 |
| 6,962,247 B2 | 11/2005 | Maier et al. | 194/207 |
| 6,980,684 B1 | 12/2005 | Munro et al. | 382/135 |
| 6,994,200 B2 | 2/2006 | Jenrick et al. | 194/206 |
| 6,996,263 B2 | 2/2006 | Jones et al. | 382/135 |
| 7,000,828 B2 | 2/2006 | Jones | 235/379 |
| 7,006,664 B2 | 2/2006 | Paraskevakos | 382/100 |
| 7,016,767 B2 | 3/2006 | Jones et al. | 700/224 |
| 7,028,888 B2 | 4/2006 | Laskowski | 235/379 |
| 7,034,324 B2 | 4/2006 | Voser | 250/556 |
| 7,036,651 B2 | 5/2006 | Tam et al. | 194/217 |
| 7,082,216 B2 | 7/2006 | Jones et al. | 382/137 |
| 7,092,560 B2 | 8/2006 | Jones et al. | 382/135 |
| 7,103,206 B2 | 9/2006 | Graves et al. | 382/135 |
| 7,103,438 B2 | 9/2006 | Hallowell et al. | 700/116 |
| 7,113,615 B2 | 9/2006 | Rhoads et al. | 382/100 |
| 7,113,925 B2 | 9/2006 | Waserstein et al. | 705/50 |
| 7,124,113 B1 | 10/2006 | Fairclough | 705/50 |
| 7,146,245 B2 | 12/2006 | Jones et al. | 700/224 |
| 7,149,336 B2 | 12/2006 | Jones et al. | 382/135 |
| 7,158,662 B2 | 1/2007 | Chiles | 382/135 |
| 7,171,032 B2 | 1/2007 | Jones et al. | 382/135 |
| 7,187,795 B2 | 3/2007 | Jones et al. | 382/135 |
| 7,191,657 B2 | 3/2007 | Maier et al. | 73/587 |
| 7,197,173 B2 | 3/2007 | Jones et al. | 382/135 |
| 7,200,255 B2 | 4/2007 | Jones et al. | 382/135 |
| 7,201,320 B2 | 4/2007 | Csulits et al. | 235/462.01 |
| 7,201,340 B2 | 4/2007 | Dietrich et al. | 241/101.2 |
| 7,216,106 B1 | 5/2007 | Buchanan et al. | 705/45 |
| 7,232,024 B2 | 6/2007 | Mazur et al. | 194/207 |
| 7,243,773 B2 | 7/2007 | Bochonok et al. | 194/350 |
| 7,248,730 B2 | 7/2007 | Matsui et al. | 382/135 |
| 7,248,731 B2 | 7/2007 | Raterman et al. | 382/135 |
| 7,256,874 B2 | 8/2007 | Csulits et al. | 356/71 |
| 7,269,279 B2 | 9/2007 | Chiles | 382/135 |
| 7,312,902 B2 | 12/2007 | Mastie et al. | 358/3.28 |
| 7,349,566 B2 | 3/2008 | Jones et al. | 382/139 |
| 7,362,891 B2 | 4/2008 | Jones et al. | 382/135 |
| 7,366,338 B2 | 4/2008 | Jones et al. | 382/135 |
| 7,391,897 B2 | 6/2008 | Jones et al. | 382/135 |
| 7,419,088 B2 | 9/2008 | Zhao et al. | 235/379 |
| 7,441,712 B2 | 10/2008 | Silverbrook et al. | 235/494 |
| 7,454,049 B2 | 11/2008 | Paraskevakos | 382/135 |
| 7,494,052 B1 | 2/2009 | Carpenter et al. | 235/379 |
| 7,505,831 B2 | 3/2009 | Jones et al. | 700/224 |
| 7,506,168 B2 | 3/2009 | Silverbrook et al. | 713/176 |
| 7,513,413 B2 | 4/2009 | Graef et al. | 235/379 |
| 7,536,046 B2 | 5/2009 | Raterman et al. | 382/135 |
| 7,542,598 B2 | 6/2009 | Jones et al. | 382/135 |
| 7,551,764 B2 | 6/2009 | Chiles et al. | 382/135 |
| 7,567,698 B2 | 7/2009 | Paraskevakos | 382/135 |
| 7,574,377 B2 | 8/2009 | Carapelli | 705/26 |
| 7,590,274 B2 | 9/2009 | Raterman et al. | 382/135 |
| 7,591,428 B2 | 9/2009 | Freeman et al. | 235/449 |
| 7,599,543 B2 | 10/2009 | Jones et al. | 382/137 |
| 7,600,626 B2 | 10/2009 | Hallowell et al. | 194/206 |
| 7,602,956 B2 | 10/2009 | Jones et al. | 382/135 |
| 7,619,721 B2 | 11/2009 | Jones et al. | 356/71 |
| 7,620,231 B2 | 11/2009 | Jones et al. | 382/137 |
| 6,381,354 C1 | 12/2009 | Mennie et al. | 382/135 |
| 7,628,326 B2 | 12/2009 | Freeman et al. | 235/450 |
| 7,635,082 B2 | 12/2009 | Jones | 235/379 |
| 7,647,275 B2 | 1/2010 | Jones | 705/40 |
| 7,650,980 B2 | 1/2010 | Jenrick et al. | 194/206 |
| 7,672,499 B2 | 3/2010 | Raterman et al. | 382/135 |
| 7,686,151 B2 | 3/2010 | Renz et al. | 194/206 |
| 7,724,938 B2 | 5/2010 | Pareskevakos | 382/135 |
| 7,726,457 B2 | 6/2010 | Maier et al. | 194/206 |
| 7,735,621 B2 | 6/2010 | Hallowell et al. | 194/206 |
| 7,753,189 B2 | 7/2010 | Maier et al. | 194/206 |
| 7,762,380 B2 | 7/2010 | Freeman et al. | 194/210 |
| 7,778,456 B2 | 8/2010 | Jones et al. | 382/135 |
| 7,779,982 B2 | 8/2010 | Fitzgerald et al. | 194/206 |
| 7,806,317 B2 | 10/2010 | Laskowski | 235/379 |
| 7,817,842 B2 | 10/2010 | Mennie | 382/137 |
| 7,849,994 B2 | 12/2010 | Klein et al. | 194/206 |
| 7,873,576 B2 | 1/2011 | Jones et al. | 705/43 |
| 7,881,519 B2 | 2/2011 | Jones et al. | 382/135 |
| 7,882,000 B2 | 2/2011 | Jones | 705/35 |
| 7,885,880 B2 | 2/2011 | Prasad et al. | 705/35 |
| 7,900,829 B1 | 3/2011 | Folk et al. | 235/380 |
| 7,903,863 B2 | 3/2011 | Jones et al. | 382/135 |
| 7,929,749 B1 | 4/2011 | Jones et al. | 382/135 |
| 7,938,245 B2 | 5/2011 | Jenrick et al. | 194/206 |
| 7,949,582 B2 | 5/2011 | Mennie et al. | 705/35 |
| 7,962,411 B1 | 6/2011 | Prasad et al. | 705/45 |
| 7,974,899 B1 | 7/2011 | Prasad et al. | 705/35 |
| 8,011,581 B1 | 9/2011 | Folk et al. | 235/385 |
| 8,023,715 B2 | 9/2011 | Jones et al. | 382/135 |
| 8,041,098 B2 | 10/2011 | Jones et al. | 382/137 |
| 8,103,084 B2 | 1/2012 | Jones et al. | 382/140 |
| 8,125,624 B2 | 2/2012 | Jones et al. | 356/71 |
| 8,126,793 B2 | 2/2012 | Jones | 705/35 |
| 8,141,772 B1 | 3/2012 | Folk et al. | 235/379 |
| 8,162,125 B1 | 4/2012 | Csulits et al. | 194/206 |
| 8,169,602 B2 | 5/2012 | Jones et al. | 356/71 |
| 8,171,567 B1 | 5/2012 | Fraser et al. | 726/32 |
| 8,204,293 B2 | 6/2012 | Csulits et al. | 382/135 |
| 8,225,989 B1* | 7/2012 | Turocy et al. | 235/379 |
| 8,265,346 B2* | 9/2012 | Blair | 382/112 |
| 8,297,428 B2 | 10/2012 | Renz et al. | 194/206 |
| 8,322,505 B2 | 12/2012 | Freeman et al. | 194/210 |
| 8,331,643 B2 | 12/2012 | Yacoubian et al. | 382/135 |
| 8,339,589 B2 | 12/2012 | Jones et al. | 356/71 |
| 8,346,610 B2 | 1/2013 | Mennie et al. | 705/16 |
| 8,352,322 B2 | 1/2013 | Mennie et al. | 705/16 |
| 8,380,573 B2 | 2/2013 | Jones et al. | 705/16 |
| 8,391,583 B1 | 3/2013 | Mennie et al. | 382/135 |
| 8,396,278 B2 | 3/2013 | Jones et al. | 382/135 |
| 8,396,586 B2 | 3/2013 | Klein et al. | 700/224 |
| 8,401,268 B1 | 3/2013 | Yacoubian et al. | 382/135 |
| 5,692,067 C1 | 4/2013 | Raterman et al. | 382/135 |
| 8,413,888 B2 | 4/2013 | Jones | 235/379 |
| 8,417,017 B1 | 4/2013 | Beutel et al. | 382/135 |
| 8,428,332 B1 | 4/2013 | Csulits et al. | 382/135 |
| 8,433,123 B1 | 4/2013 | Csulits et al. | 382/135 |
| 8,433,126 B2 | 4/2013 | Jones et al. | 382/137 |
| 8,437,528 B1 | 5/2013 | Csulits et al. | 382/135 |
| 8,437,529 B1 | 5/2013 | Mennie et al. | 382/135 |
| 8,437,530 B1 | 5/2013 | Mennie et al. | 382/135 |
| 8,437,531 B2 | 5/2013 | Jones et al. | 382/137 |
| 8,437,532 B1 | 5/2013 | Jones et al. | 382/135 |
| 2001/0006557 A1 | 7/2001 | Mennie et al. | 382/135 |
| 2001/0015311 A1 | 8/2001 | Mennie | 194/207 |
| 2001/0018739 A1 | 8/2001 | Anderson et al. | 713/176 |
| 2001/0019624 A1 | 9/2001 | Raterman et al. | 382/135 |
| 2001/0035603 A1 | 11/2001 | Graves et al. | 271/265.01 |
| 2001/0053241 A1 | 12/2001 | Haycock | 382/135 |
| 2002/0001393 A1 | 1/2002 | Jones et al. | 382/100 |
| 2002/0020603 A1 | 2/2002 | Jones et al. | 194/346 |
| 2002/0033359 A1 | 3/2002 | Graef et al. | 209/534 |
| 2002/0037097 A1 | 3/2002 | Hoyos et al. | 382/137 |
| 2002/0056605 A1 | 5/2002 | Mazur et al. | 194/207 |
| 2002/0082993 A1 | 6/2002 | Hoyos et al. | 705/43 |
| 2002/0085245 A1 | 7/2002 | Mennie et al. | 358/498 |
| 2002/0085745 A1 | 7/2002 | Jones et al. | 382/135 |
| 2002/0100660 A1 | 8/2002 | Stieber et al. | 194/215 |
| 2002/0103757 A1 | 8/2002 | Jones et al. | 705/45 |
| 2002/0104785 A1 | 8/2002 | Klein et al. | 209/534 |
| 2002/0107801 A1 | 8/2002 | Jones et al. | 705/45 |
| 2002/0118871 A1 | 8/2002 | Jones et al. | 382/137 |
| 2002/0120572 A1 | 8/2002 | Bellucci et al. | 705/43 |
| 2002/0122580 A1 | 9/2002 | Jones et al. | 382/137 |

(56) References Cited

U.S. PATENT DOCUMENTS

| | | | |
|---|---|---|---|
| 2002/0126885 A1 | 9/2002 | Mennie et al. | 382/135 |
| 2002/0126886 A1 | 9/2002 | Jones et al. | 382/135 |
| 2002/0131630 A1 | 9/2002 | Jones et al. | 382/137 |
| 2002/0136442 A1 | 9/2002 | Jones et al. | 382/135 |
| 2002/0145035 A1 | 10/2002 | Jones | 235/379 |
| 2002/0154804 A1 | 10/2002 | Jones et al. | 382/135 |
| 2002/0154805 A1 | 10/2002 | Jones et al. | 382/135 |
| 2002/0154806 A1 | 10/2002 | Jones et al. | 382/135 |
| 2002/0154807 A1 | 10/2002 | Jones et al. | 382/135 |
| 2002/0154808 A1 | 10/2002 | Jones et al. | 382/135 |
| 2002/0181805 A1 | 12/2002 | Loeb et al. | 382/317 |
| 2002/0186876 A1 | 12/2002 | Jones et al. | 382/135 |
| 2003/0005303 A1 | 1/2003 | Auslander et al. | 713/176 |
| 2003/0006277 A1 | 1/2003 | Maskatiya et al. | 235/379 |
| 2003/0009420 A1 | 1/2003 | Jones | 705/39 |
| 2003/0015395 A1 | 1/2003 | Hallowell et al. | 194/206 |
| 2003/0015396 A1 | 1/2003 | Mennie | 194/206 |
| 2003/0023557 A1 | 1/2003 | Moore | 705/50 |
| 2003/0059098 A1 | 3/2003 | Jones et al. | 382/135 |
| 2003/0062242 A1 | 4/2003 | Hallowell et al. | 194/302 |
| 2003/0080032 A1 | 5/2003 | Heidi et al. | 209/534 |
| 2003/0081824 A1 | 5/2003 | Mennie et al. | 382/135 |
| 2003/0099379 A1 | 5/2003 | Monk et al. | 382/115 |
| 2003/0108233 A1 | 6/2003 | Raterman et al. | 382/135 |
| 2003/0121752 A1 | 7/2003 | Stromme et al. | 194/207 |
| 2003/0121753 A1 | 7/2003 | Stromme et al. | 194/207 |
| 2003/0128274 A1 | 7/2003 | Martinez et al. | 345/764 |
| 2003/0132281 A1 | 7/2003 | Jones et al. | 235/379 |
| 2003/0139994 A1 | 7/2003 | Jones | 705/36 |
| 2003/0168308 A1 | 9/2003 | Maier et al. | 194/207 |
| 2003/0174874 A1 | 9/2003 | Raterman et al. | 382/135 |
| 2003/0182217 A1 | 9/2003 | Chiles | 705/35 |
| 2003/0183685 A1 | 10/2003 | Steele Moore et al. | 235/379 |
| 2003/0198373 A1 | 10/2003 | Raterman et al. | 382/135 |
| 2003/0201318 A1* | 10/2003 | Graef et al. | 235/379 |
| 2003/0202690 A1 | 10/2003 | Jones et al. | 382/139 |
| 2003/0233317 A1 | 12/2003 | Judd | 705/39 |
| 2004/0003980 A1 | 1/2004 | Hallowell et al. | 194/206 |
| 2004/0016621 A1 | 1/2004 | Jenrick et al. | 194/206 |
| 2004/0016797 A1 | 1/2004 | Jones et al. | 235/379 |
| 2004/0028266 A1 | 2/2004 | Jones et al. | 382/135 |
| 2004/0037456 A1 | 2/2004 | Haycock | 382/135 |
| 2004/0083149 A1 | 4/2004 | Jones | 705/35 |
| 2004/0131230 A1 | 7/2004 | Paraskevakos | 382/100 |
| 2004/0145726 A1 | 7/2004 | Csulits et al. | 356/71 |
| 2004/0149538 A1 | 8/2004 | Sakowski | 194/207 |
| 2004/0153408 A1 | 8/2004 | Jones et al. | 705/43 |
| 2004/0154964 A1 | 8/2004 | Jones | 209/534 |
| 2004/0173432 A1 | 9/2004 | Jones | 194/216 |
| 2004/0182675 A1 | 9/2004 | Long et al. | 194/206 |
| 2004/0238619 A1 | 12/2004 | Nagasaka et al. | 235/379 |
| 2004/0251110 A1 | 12/2004 | Jenrick et al. | 194/207 |
| 2005/0029168 A1 | 2/2005 | Jones et al. | 209/534 |
| 2005/0035034 A1 | 2/2005 | Long et al. | 209/534 |
| 2005/0040225 A1 | 2/2005 | Csulits et al. | 235/379 |
| 2005/0045448 A1 | 3/2005 | Sugano et al. | 194/207 |
| 2005/0047642 A1 | 3/2005 | Jones et al. | 382/137 |
| 2005/0060055 A1 | 3/2005 | Hallowell et al. | 700/95 |
| 2005/0060059 A1 | 3/2005 | Klein et al. | 700/213 |
| 2005/0060061 A1 | 3/2005 | Jones | 700/226 |
| 2005/0077142 A1 | 4/2005 | Tam et al. | 194/217 |
| 2005/0086271 A1 | 4/2005 | Jones et al. | 707/200 |
| 2005/0087422 A1 | 4/2005 | Maier et al. | 194/207 |
| 2005/0108164 A1 | 5/2005 | Salafia et al. | 705/42 |
| 2005/0108165 A1 | 5/2005 | Jones et al. | 705/43 |
| 2005/0117791 A2 | 6/2005 | Raterman et al. | 382/135 |
| 2005/0117792 A2 | 6/2005 | Graves et al. | 382/135 |
| 2005/0150738 A1 | 7/2005 | Hallowell et al. | 194/206 |
| 2005/0151995 A1 | 7/2005 | Hauser et al. | 358/1.15 |
| 2005/0163361 A1 | 7/2005 | Jones et al. | 382/135 |
| 2005/0163362 A1 | 7/2005 | Jones et al. | 382/137 |
| 2005/0169511 A1 | 8/2005 | Jones | 382/135 |
| 2005/0173221 A1 | 8/2005 | Maier et al. | 194/207 |
| 2005/0183928 A1 | 8/2005 | Jones et al. | 194/207 |
| 2005/0207634 A1 | 9/2005 | Jones et al. | 382/135 |
| 2005/0213803 A1 | 9/2005 | Mennie et al. | 382/135 |
| 2005/0241909 A1 | 11/2005 | Mazur et al. | 194/207 |
| 2005/0249394 A1 | 11/2005 | Jones et al. | 382/135 |
| 2005/0258235 A1 | 11/2005 | Silverbrook et al. | 235/379 |
| 2005/0265591 A1 | 12/2005 | Jones et al. | 382/135 |
| 2005/0267843 A1 | 12/2005 | Acharya et al. | 705/42 |
| 2005/0276458 A1 | 12/2005 | Jones et al. | 382/135 |
| 2005/0278239 A1 | 12/2005 | Jones et al. | 705/35 |
| 2005/0281450 A1 | 12/2005 | Richardson | 382/139 |
| 2005/0289030 A1 | 12/2005 | Smith | 705/35 |
| 2006/0010071 A1 | 1/2006 | Jones et al. | 705/42 |
| 2006/0016883 A1 | 1/2006 | Silva et al. | 235/381 |
| 2006/0054454 A1 | 3/2006 | Oh | 194/207 |
| 2006/0078186 A1 | 4/2006 | Freeman et al. | 382/135 |
| 2006/0106717 A1 | 5/2006 | Randle et al. | 705/45 |
| 2006/0124724 A1 | 6/2006 | Kotovich et al. | 235/379 |
| 2006/0182330 A1 | 8/2006 | Chiles | 382/135 |
| 2006/0195567 A1 | 8/2006 | Mody et al. | 709/224 |
| 2006/0210137 A1 | 9/2006 | Raterman et al. | 382/135 |
| 2006/0274929 A1 | 12/2006 | Jones et al. | 382/135 |
| 2007/0040014 A1 | 2/2007 | Zhao et al. | 235/379 |
| 2007/0064991 A1 | 3/2007 | Douglas et al. | 382/137 |
| 2007/0071302 A1 | 3/2007 | Jones et al. | 382/135 |
| 2007/0076939 A1 | 4/2007 | Jones et al. | 382/135 |
| 2007/0078560 A1 | 4/2007 | Jones et al. | 700/224 |
| 2007/0095630 A1 | 5/2007 | Mennie et al. | 194/206 |
| 2007/0102863 A1 | 5/2007 | Burns et al. | 271/3.01 |
| 2007/0112674 A1 | 5/2007 | Jones et al. | 705/45 |
| 2007/0122023 A1 | 5/2007 | Jenrick et al. | 382/135 |
| 2007/0172106 A1 | 7/2007 | Paraskevakos | 382/135 |
| 2007/0172107 A1 | 7/2007 | Jones et al. | 382/137 |
| 2007/0209904 A1 | 9/2007 | Freeman et al. | 194/210 |
| 2007/0221470 A1 | 9/2007 | Mennie et al. | 194/216 |
| 2007/0237381 A1 | 10/2007 | Mennie et al. | 382/135 |
| 2007/0258633 A1 | 11/2007 | Jones et al. | 382/135 |
| 2007/0269097 A1 | 11/2007 | Chiles et al. | 382/135 |
| 2007/0278064 A1 | 12/2007 | Hallowell et al. | 194/206 |
| 2007/0288382 A1 | 12/2007 | Narayanan et al. | 705/45 |
| 2007/0291328 A1* | 12/2007 | Furihata et al. | 358/498 |
| 2008/0006505 A1 | 1/2008 | Renz et al. | 194/206 |
| 2008/0033829 A1 | 2/2008 | Mennie et al. | 705/16 |
| 2008/0037856 A1 | 2/2008 | Paraskevakos | 382/140 |
| 2008/0044077 A1 | 2/2008 | Mennie et al. | 382/135 |
| 2008/0052189 A1 | 2/2008 | Walker et al. | 705/26 |
| 2008/0060906 A1 | 3/2008 | Fitzgerald et al. | 194/207 |
| 2008/0099555 A1 | 5/2008 | Silva et al. | 235/381 |
| 2008/0123932 A1 | 5/2008 | Jones et al. | 382/135 |
| 2008/0133411 A1 | 6/2008 | Jones et al. | 705/42 |
| 2008/0141126 A1 | 6/2008 | Johnson et al. | 715/273 |
| 2008/0177420 A1 | 7/2008 | Klein et al. | 700/224 |
| 2008/0219543 A1 | 9/2008 | Csultis et al. | 382/135 |
| 2008/0220707 A1 | 9/2008 | Jones et al. | 453/2 |
| 2008/0285838 A1 | 11/2008 | Jones et al. | 382/135 |
| 2009/0001661 A1 | 1/2009 | Klein et al. | 271/258.01 |
| 2009/0013653 A1 | 1/2009 | Sekiguchi | 53/531 |
| 2009/0022390 A1 | 1/2009 | Yacoubian et al. | 382/135 |
| 2009/0087076 A1 | 4/2009 | Jenrick | 382/135 |
| 2009/0090779 A1 | 4/2009 | Freeman | 235/450 |
| 2009/0144620 A1 | 6/2009 | Bauchot et al. | 715/277 |
| 2009/0145959 A1* | 6/2009 | VanKirk et al. | 235/379 |
| 2009/0148025 A1 | 6/2009 | Calman | 382/135 |
| 2009/0148027 A1 | 6/2009 | Paraskevakos | 382/135 |
| 2009/0183967 A1 | 7/2009 | Hamasaki | 194/320 |
| 2009/0310188 A1 | 12/2009 | Jones et al. | 358/448 |
| 2009/0313159 A1 | 12/2009 | Jones et al. | 705/35 |
| 2010/0034454 A1 | 2/2010 | Jones et al. | 382/137 |
| 2010/0051687 A1 | 3/2010 | Jones et al. | 235/379 |
| 2010/0057617 A1 | 3/2010 | Jones et al. | 705/44 |
| 2010/0063916 A1 | 3/2010 | Jones et al. | 705/35 |
| 2010/0092065 A1 | 4/2010 | Jones et al. | 382/135 |
| 2010/0108463 A1 | 5/2010 | Renz et al. | 194/206 |
| 2010/0116619 A1 | 5/2010 | Jones | 194/217 |
| 2010/0163366 A1 | 7/2010 | Jenrick et al. | 194/206 |
| 2010/0236892 A1 | 9/2010 | Jones et al. | 194/206 |
| 2010/0263984 A1 | 10/2010 | Freeman et al. | 194/206 |
| 2010/0276485 A1 | 11/2010 | Jones et al. | 235/379 |
| 2010/0303111 A1 | 12/2010 | Kupershmidt | 372/32 |
| 2011/0035316 A2 | 2/2011 | Morgan et al. | 705/39 |
| 2011/0042178 A1 | 2/2011 | Luecking | 194/302 |

(56) References Cited

U.S. PATENT DOCUMENTS

| | | | |
|---|---|---|---|
| 2011/0048890 A1* | 3/2011 | Billet et al. | 194/206 |
| 2011/0087599 A1 | 4/2011 | Jones | 705/45 |
| 2011/0099105 A1 | 4/2011 | Mennie et al. | 705/41 |
| 2011/0170761 A1 | 7/2011 | Fu | 382/135 |
| 2011/0206267 A1 | 8/2011 | Jones et al. | 382/139 |
| 2011/0215034 A1 | 9/2011 | Mennie et al. | 209/534 |
| 2011/0220717 A1 | 9/2011 | Jones et al. | 235/380 |
| 2011/0255767 A1 | 10/2011 | Jenrick et al. | 382/135 |
| 2011/0258113 A1 | 10/2011 | Jones et al. | 705/39 |
| 2012/0008131 A1 | 1/2012 | Jones et al. | 356/71 |
| 2012/0008850 A1 | 1/2012 | Jones et al. | 382/135 |
| 2012/0013891 A1 | 1/2012 | Jones et al. | 356/71 |
| 2012/0013892 A1 | 1/2012 | Jones et al. | 356/71 |
| 2012/0077476 A1 | 3/2012 | Paraskevakos et al. | 455/414.2 |
| 2012/0150745 A1 | 6/2012 | Csulits et al. | 705/45 |
| 2012/0185083 A1 | 7/2012 | Klein et al. | 700/223 |
| 2012/0189186 A1 | 7/2012 | Csulits et al. | 382/135 |
| 2012/0215689 A1 | 8/2012 | Jones | 705/40 |
| 2012/0313316 A1 | 12/2012 | Yamamoto et al. | 271/220 |
| 2012/0321170 A2 | 12/2012 | Jones | 382/135 |
| 2013/0068585 A1 | 3/2013 | Freeman et al. | 194/210 |
| 2013/0098992 A1 | 4/2013 | Jenrick et al. | 235/375 |

FOREIGN PATENT DOCUMENTS

| | | | | |
|---|---|---|---|---|
| DE | 28 24 849 | A1 | 12/1979 | G07D 7/00 |
| EP | 0 030 413 | A1 | 6/1981 | G07F 7/02 |
| EP | 0 071 421 | A2 | 2/1983 | G07D 7/00 |
| EP | 0 077 464 | A2 | 4/1983 | G03H 1/08 |
| EP | 0 083 062 | A2 | 7/1983 | G07D 7/00 |
| EP | 0 101 115 | A1 | 2/1984 | G07D 7/00 |
| EP | 0 109 743 | A2 | 5/1984 | G07D 1/00 |
| EP | 0 185 200 | A2 | 6/1986 | G06F 3/14 |
| EP | 0 253 935 | A2 | 1/1988 | G06K 7/10 |
| EP | 0 314 312 | A2 | 5/1989 | G07D 7/00 |
| EP | 0 325 364 | A2 | 7/1989 | H04N 1/46 |
| EP | 0 338 123 | A2 | 10/1989 | G07D 7/00 |
| EP | 0 342 647 | A2 | 11/1989 | G07D 7/00 |
| EP | 0 402 627 | A1 | 12/1990 | H01R 17/12 |
| EP | 0 416 916 | A2 | 3/1991 | G07F 7/10 |
| EP | 0 416 960 | A1 | 3/1991 | G07F 7/10 |
| EP | 0 473 106 | A2 | 3/1992 | G07D 1/00 |
| EP | 0 548 142 | A1 | 6/1993 | G06K 19/08 |
| EP | 0 578 875 | A1 | 1/1994 | G06F 15/68 |
| EP | 0 583 526 | A1 | 2/1994 | G06K 7/00 |
| EP | 0 583 723 | A1 | 2/1994 | G06K 7/00 |
| EP | 0 593 209 | A2 | 4/1994 | H04L 29/06 |
| EP | 0 612 042 | A2 | 8/1994 | G07D 7/00 |
| EP | 0 613 107 | A1 | 8/1994 | G07F 19/00 |
| EP | 0 616 296 | A2 | 9/1994 | G06K 9/20 |
| EP | 0 686 292 | A1 | 9/1994 | G07D 7/00 |
| EP | 0 632 415 | A1 | 1/1995 | G07F 7/10 |
| EP | 0 633 533 | A2 | 1/1995 | G06F 15/00 |
| EP | 0 633 552 | A2 | 1/1995 | G07C 5/00 |
| EP | 0 633 553 | A1 | 1/1995 | G07D 7/00 |
| EP | 0 661 654 | A2 | 7/1995 | G06F 17/60 |
| EP | 0 671 696 | A1 | 9/1995 | G06F 17/30 |
| EP | 0 708 419 | A1 | 4/1996 | G07D 7/00 |
| EP | 0 718 809 | A2 | 6/1996 | G07D 7/00 |
| EP | 0 760 987 | A1 | 9/1996 | G07D 7/00 |
| EP | 0 824 736 | A1 | 11/1996 | G07D 7/00 |
| EP | 1 004 089 | A1 | 6/1998 | G06K 9/00 |
| EP | 1 008 096 | A2 | 9/1998 | |
| EP | 1 019 869 | A1 | 10/1998 | G06K 9/78 |
| EP | 0 984 410 | A1 | 3/2000 | G07F 19/00 |
| EP | 1 028 359 | A1 | 8/2000 | G03H 1/18 |
| EP | 1 041 523 | A2 | 10/2000 | G07F 7/10 |
| EP | 1 134 704 | A1 | 9/2001 | G07D 7/00 |
| EP | 1 160 737 | A2 | 12/2001 | G07D 3/00 |
| EP | 1 437 692 | A1 | 7/2004 | G07D 11/00 |
| EP | 1 480 177 | B1 | 11/2007 | G07F 19/00 |
| FR | 2 539 898 | A1 | 7/1984 | G07D 7/00 |
| FR | 2 722 316 | A1 | 1/1996 | G07D 7/00 |
| GB | 2 038 063 | A | 7/1980 | G07D 7/00 |
| GB | 2 190 996 | A | 12/1987 | G06K 5/00 |
| GB | 2 204 166 | A | 11/1988 | G06M 9/02 |
| GB | 2 272 762 | A | 5/1994 | G01N 21/88 |
| GB | 2 355 522 | A | 4/2001 | G07D 7/00 |
| GB | 2 464 826 | A | 5/2010 | G07D 11/00 |
| JP | 62-220843 | A | 9/1987 | G01N 21/89 |
| JP | 63-073497 | A | 4/1988 | G07D 9/00 |
| JP | 02-012492 | A | 1/1990 | G07D 7/00 |
| JP | 04-131986 | A | 5/1992 | G07D 9/00 |
| JP | 04-243497 | A | 8/1992 | G07D 9/00 |
| JP | 06-203248 | A | 7/1994 | G07D 9/00 |
| JP | 07-168857 | A | 7/1995 | G06F 17/40 |
| WO | WO 85/02148 | A1 | 5/1985 | B42D 15/00 |
| WO | WO 87/06041 | A1 | 10/1987 | G07D 7/00 |
| WO | WO 90/07165 | A1 | 6/1990 | G07D 7/00 |
| WO | WO 91/11778 | A1 | 8/1991 | G06K 9/00 |
| WO | WO 92/04692 | A1 | 3/1992 | G06K 19/08 |
| WO | WO 92/14221 | A1 | 8/1992 | G07D 7/00 |
| WO | WO 92/16931 | A2 | 10/1992 | |
| WO | WO 92/17394 | A1 | 10/1992 | B65H 3/06 |
| WO | WO 93/23824 | A1 | 11/1993 | G06K 9/00 |
| WO | WO 94/06102 | A1 | 3/1994 | G07D 7/00 |
| WO | WO 94/16412 | A1 | 7/1994 | G07D 7/00 |
| WO | WO 94/19773 | A1 | 9/1994 | G07D 7/00 |
| WO | WO 95/10088 | A1 | 4/1995 | G06F 15/30 |
| WO | WO 95/19019 | A2 | 7/1995 | G07D 7/00 |
| WO | WO 95/24691 | A1 | 9/1995 | G06K 9/00 |
| WO | WO 96/03719 | A1 | 2/1996 | G07F 7/10 |
| WO | WO 96/10800 | A1 | 4/1996 | G06K 9/00 |
| WO | WO 96/29683 | A1 | 9/1996 | G07D 7/00 |
| WO | WO 96/36021 | A1 | 11/1996 | G07D 7/00 |
| WO | WO 96/36933 | A1 | 11/1996 | G06K 9/00 |
| WO | WO 97/05583 | A1 | 2/1997 | G07F 7/10 |
| WO | WO 97/29459 | A1 | 8/1997 | G07D 7/00 |
| WO | WO 97/30422 | A1 | 8/1997 | G07D 7/00 |
| WO | WO 97/43734 | A1 | 11/1997 | G06K 9/00 |
| WO | WO 97/45810 | A1 | 12/1997 | G06K 7/00 |
| WO | WO 98/12662 | A1 | 3/1998 | G06K 9/00 |
| WO | WO 98/13785 | A1 | 4/1998 | G06K 9/46 |
| WO | WO 98/24041 | A1 | 6/1998 | G06F 17/60 |
| WO | WO 98/24052 | A1 | 6/1998 | G06K 9/00 |
| WO | WO 98/24067 | A1 | 6/1998 | G07D 3/14 |
| WO | WO 98/26364 | A1 | 6/1998 | G06F 17/60 |
| WO | WO 98/35323 | A2 | 8/1998 | |
| WO | WO 98/40839 | A2 | 9/1998 | |
| WO | WO 98/47100 | A1 | 10/1998 | G06K 9/78 |
| WO | WO 98/50892 | A1 | 11/1998 | G07D 7/00 |
| WO | WO 98/51082 | A1 | 11/1998 | H04N 1/18 |
| WO | WO 99/00776 | A1 | 1/1999 | G07F 9/06 |
| WO | WO 99/09511 | A1 | 2/1999 | G06K 9/00 |
| WO | WO 99/14668 | A1 | 3/1999 | G06F 9/445 |
| WO | WO 99/23601 | A1 | 5/1999 | G06K 9/00 |
| WO | WO 99/41695 | A1 | 8/1999 | G06K 9/00 |
| WO | WO 99/48040 | A1 | 9/1999 | G06K 9/00 |
| WO | WO 99/48042 | A1 | 9/1999 | G06K 9/20 |
| WO | WO 99/50795 | A1 | 10/1999 | G07D 1/00 |
| WO | WO 99/50796 | A1 | 10/1999 | G07D 7/00 |
| WO | WO 00/24572 | A1 | 5/2000 | B31F 1/00 |
| WO | WO 00/58876 | A1 | 10/2000 | G06F 17/60 |
| WO | WO 00/65546 | A1 | 11/2000 | G07F 1/04 |
| WO | WO 01/008108 | A2 | 2/2001 | |
| WO | WO 01/059685 | A2 | 8/2001 | G06K 9/00 |
| WO | WO 01/059723 | A1 | 8/2001 | G07F 7/04 |
| WO | WO 02/029735 | A2 | 4/2002 | G07D 7/00 |
| WO | WO 02/054360 | A2 | 7/2002 | G07D 11/00 |
| WO | WO 03/005312 | A1 | 1/2003 | G07F 19/00 |
| WO | WO 03/028361 | A2 | 4/2003 | |
| WO | WO 03/029913 | A2 | 4/2003 | |
| WO | WO 03/030113 | A1 | 4/2003 | G07F 7/04 |
| WO | WO 03/067532 | A1 | 8/2003 | G07F 7/04 |
| WO | WO 03/107282 | A2 | 12/2003 | |
| WO | WO 2004/010367 | A1 | 1/2004 | G06K 5/00 |
| WO | WO 2004/027717 | A2 | 4/2004 | |
| WO | WO 2004/036508 | A2 | 4/2004 | G07D 7/12 |
| WO | WO 2004/038631 | A2 | 5/2004 | G06F 17/60 |
| WO | WO 2004/068422 | A1 | 8/2004 | G07D 11/00 |
| WO | WO 2005/013209 | A2 | 2/2005 | G07D 11/00 |
| WO | WO 2005/017842 | A2 | 2/2005 | G07D 11/00 |
| WO | WO 2005/028348 | A2 | 3/2005 | B65H 1/00 |

(56) References Cited

FOREIGN PATENT DOCUMENTS

| WO | WO 2005/029240 A2 | 3/2005 | |
|---|---|---|---|
| WO | WO 2005/036445 A1 | 4/2005 | ............. G06F 19/00 |
| WO | WO 2005/041134 A2 | 5/2005 | |
| WO | WO 2005/076229 A1 | 8/2005 | ............. G07D 7/12 |
| WO | WO 2006/039439 A2 | 4/2006 | ............. G06K 9/00 |
| WO | WO 2006/076289 A2 | 7/2006 | ............. G07D 11/00 |
| WO | WO 2006/076634 A2 | 7/2006 | ............. G06Q 90/00 |
| WO | WO 2007/044570 A2 | 4/2007 | ............. G07D 11/00 |
| WO | WO 2007/120825 A2 | 10/2007 | ............. G06K 9/00 |
| WO | WO 2007/143128 A2 | 12/2007 | ............. B65H 29/12 |
| WO | WO 2008/030356 A1 | 3/2008 | ............. G06K 7/00 |
| WO | WO 2008/112132 A1 | 9/2008 | ............. G06K 9/00 |
| WO | WO 2009/081085 A1 | 7/2009 | ............. G07D 11/00 |
| WO | WO 2011/109569 A1 | 9/2011 | ............. G07D 11/00 |

OTHER PUBLICATIONS

Applied Communications Inc.: BASE24 software, "Applied Communications Announces Joint Venture," Business Wire, 4 pages (Jan. 6, 1989).
AFB: AFB Currency Recognition System, 1 page (1982).
ASCOM: Cashflow Emerald, 2 pages, (date unknown, prior to Jan. 15, 2001).
ATM Cardpay Corp: "ATM Cardpay Introduces New Bill Payment Idea," Retail Delivery Systems News, vol. 3, Iss. 1, p. 1; 2 pages (Jan. 16, 1998).
ATM Cardpay Corp: "'The Next Generation of ATM Network Survival.' ATM Cardpay Shows Switches How to Win Bill Presentment/Payments Market," EFT Report, vol. 20, Iss. 17, p. 1; 3 pages (Aug. 27, 1997).
AUI: Coinverter—"No More Lines . . . Self-Serve Cash-Out," by Cassius Elston, 1995 World Games Congress/Exposition Converter, 1 page (dated prior to 1995).
BARS: 5000 Currency Sorter, 6 pages (estimated prior to Aug. 13, 2003).
BARS: 5600 Currency Sorter, 6 pages (estimated prior to Aug. 12, 2003).
BARS: 6000 Single Note Inspection System, 6 pages (estimated prior to Aug. 12, 2003).
Barton, Louis L., "Check Processing Operations" —A Hands-On Guide to Developing and Managing a State-of-the-Art Check Processing Operation, Chp. 8 and App. 2, 31 pages (1994).
Brandt: Mach 7 High-Speed Coin Sorter/Counter, 2 pages (1992).
Brandt: Model 8904 Upfeed—"High Speed 4-Denomination Currency Dispenser," 2 pages (1989).
Cummins: JetScan™ iFX i100 Series Currency Scanner brochure (Form 023-1789), 6 pages (May 2009).
Cummins: JetScan™ iFX i100 Series Currency Scanner brochure (Form 023-1789, Rev. 1), 6 pages (Sep. 2009).
Cummins: JetScan™ iFX i100 Series Currency Scanner brochure (Form 023-1789, Rev. 2), 6 pages (© 2010).
Cummins: JetScan™ iFX Series i100 shell, "The Next Generation JetScan," (Form 023-1792), 2 pages (May 2009).
Cummins: JetScan™ iFX i100 Series Currency Scanner brochure, "Ideal for Law Enforcement Applications," (Form 023-1798), 1 page (Sep. 2009).
Cummins: JetScan™ iFX i100 Series Currency Scanner mailer, "Don't Let the Evidence Get Away!," (Form 023-1799), 2 pages (Sep. 2009).
Cummins: JetScan™ iFX i100 Series Currency Scanner mailer, "Two departments just made large drug busts . . . ," (Form 023-1820), 3 pages (Jun. 2010).
Cummins: JetScan™ iFX i100 Series Currency Scanner, Operating Instructions (Form 022-7614-00), 108 pages (Oct. 2010).
Cummins: JetScan™ iFX i100 Series Currency Scanner brochure, "Advanced Evidence Processing for Law Enforcement," (Form 023-1816), 6 pages (© 2010).
Cummins: JetScan™ iFX Series i100 brochure, "The Next Generation JetScan," (Form 023-1792 Rev. 1), 2 pages (Mar. 2011).
Cummins: JetScan™ iFX i100 Series, Quick Reference (022-7631-00), 28 pages (Mar. 2011).
Cummins: JetScan™ iFX i100 Currency and Check Processor website, "Revolutionizing the way you process currency and checks," (http://ifx.cumminsallison.com/models/i100), 2 pages (Jul. 2011).
Cummins: JetScan™ iFX Series i100 Currency and Check Solution brochure, "Never process a check or bill the same way again," (Form 023-1858), 6 pages (© 2011).
Cummins: JetScan™ iFX Series i100 Currency and Check Scanner brochure, "Never process a check or bill the same way again," (Form 023-1858), 6 pages (© 2011) [downloaded Jul. 20, 2011].
Cummins: JetScan™ iFX Series i100 Currency Scanner brochure, "Never Photocopy a Bill Again," (Form 023-1863), 4 pages (© 2011).
Cummins: JetScan™ iFX Series i200 Currency Scanner brochure, "20%, 60% Fewer Rejects," (Form 023-1859), 6 pages (© 2011).
Cummins: JetScan™ iFX i400 Series, Quick Reference (022-7669-00), 20 pages (May 2011).
Cummins: JetScan™ iFX i400 Series Currency Scanner, Operating Instructions (Form 022-7666-00), 87 pages (May 2011).
Cummins: JetScan™ iFX Series i400 Multi-Pocket Sorter brochure, "Smallest, fastest, most flexible multi-pocket sorter," (Form 023-1860), 6 pages (© 2011).
Cummins: JetScan™ iFX Image-Management Software, Operating Instructions (022-7615-00), 58 pages (Jul. 2011).
Cummins: JetScanTM Model 4060, Currency Scanner/Counter, Operator's Manual, 43 pages (Aug. 1991).
Cummins: JetScanTM Model 4060, Sale of JetScan Currency Scanner/Counter, 1 page (Aug. 1991).
Cummins: JetScanTM Model 4061, Currency Scanner/Counter—Operating Instructions, 47 pages (Apr. 20, 1993).
Cummins: JetScanTM Model 4061, Sale of JetScan Currency Scanner/Counter, 1 page (Apr. 20, 1993).
Cummins: JetScanTM Model 4062, Currency Scanner/Counter—Operating Instructions (022-7120-00), 53 pages (Nov. 28, 1994).
Cummins: JetScanTM Model 4062, Sale of JetScan Currency Scanner/Counter, Model 4062, 1 page (Nov. 28, 1994).
Cummins: JetSort® High Speed Sorter/Counter Kits I & J—Operating Instructions (Form 022-7123-00) 12 pages (1994).
Currency Systems International: Mr. W. Kranister in Conversation with Richard Haycock, 5 pages (estimated 1994).
Currency Systems International: CPS 300 Currency Processing System, 4 pages (© 1992).
Currency Systems International: CPS 600/900, Medium Speed Currency Sorting Family, CPS 600 and CPS 900, 4 pages (© 1994).
Currency Systems International: CPS 600/900, Description of CSI CPS 600 and CPS 900 devices, 1 page (date: estimated 1994).
De La Rue: 2700 Currency Counting Machine—User Guide, Revision 1, 53 pages (Aug. 26, 1999).
De La Rue: CDS 5700 and CDS 5800 Cash Deponier System (German) and translation, 7 pages (date unknown, prior to Aug. 13, 1996).
Document Solutions Inc.: Image Solution, DialogWeb, "Bank Gets Big Response to Image Statements", Electronic Imaging Report, vol. 2, No. 9, 3 pages (May 6, 1992 ).
EP App. No. 04 020 193.1 [claiming priority to U.S. Appl. No. 60/043,516], European Patent Office, Communication pursuant to Article 96(2), Discussion of FR 2 722 316, 4 pages (Jul. 18, 2005).
Elcom International Inc: PECOS Internet Procurement Manager, "Elcom.com and Visa Announce Systems Link to Offer B2B Ecommerce Solutions," PRNewsire, 4 pages (Nov. 29, 1999).
Glory: CRS-8000 Cash Redemption System, 2 pages (1996).
Glory: GFB-200/210/220/230 DeskTop Bank Note Counter brochure, 2 pages (estimated before Aug. 9, 1994).
Glory: GFF-8CF and GFF-8 Desktop Currency and Check Counter, 4 pages (date estimated Jan. 1994).
Glory: GSA-500 Sortmaster brochure, 2 pages (estimated Jan. 14, 1994).
Glory: System 8000 Recycle Currency Processing Teller System, p. 5 of General Catalogue of Glory Products, 2 pages (1995).
Glory: UF-1D brochure and translation, 2 pages (estimated before Aug. 9, 1994).
Hayosh, Thomas D, "The History of the Check and Standardization Efforts," 5 pages, dated Sep. 26, 1995, available at http://home.comcast.net/~hayosh/HISTMICR.pdf (visited Sep. 22, 2011).

(56) References Cited

OTHER PUBLICATIONS

ISH Electronic: ISH 12005/500 Coin Counter (with translation), 4 pages (date unknown, prior to Aug. 1996).
ISH Electronic: ISH 12005/501 Self-Service Unit (with translation), 4 pages (date unknown, prior to Aug. 1996).
J&B Software Inc.: TMS Image, "J&B Software Announces New Successes for TMS Image™ Remittance," PRNewswire, 2 pages (Mar. 23, 1998).
Litton Integrated Automation: Proceedings, SPIE—International Society for Optical Engineering, Optical Security and Anticounterfeiting Systems (vol. 1210), "High Speed Print Quality Inspection and Verification," by Cynthia Ott and Nagesh Chowla re MAVIS, 9 pages (Jan. 1990).
NCR: NCR 5685 ATM Deposit Processing Module, DialogWeb, "NCR's ATM Captures Images at the Point of Deposit. (NCR Corp.'s New Automated Teller Machine)", Financial Services Report, vol. 10, No. 2, p. 8(1), 2 pages (Jan. 20, 1993).
NCR: Intelligent Deposit ATM's, "Mixes of cash, checks no problem with Regions Bank ATMs," article, 2 pages (Jun. 10, 2009).
NGZ Geldzahlmaschinengesellschaft: NGZ 2100 Automated Coin Depository, 4 pages (date unknown, prior to Sep. 1996).
Perconta: Cassomat A.C.S. Automated Cash System Types I and II, 6 pages (1998).
Perconta: Contomat Coin Settlement Machine for Customer Self Service, 2 pages (date unknown, prior to Apr. 2003).
Prema GmbH: Prema 405 (RE) Self Service Coin Deposit Facility, 2 pages (date unknown, prior to Apr. 2003).
Reis Eurosystems: CRS 6501/CRS 6510 Cash Receipt Systems for Self-Service Area, 3 pages (date unknown, prior to Apr. 2003).
Scan Coin: CDS 600 Cash Deposit System, 2 pages (1994).
Scan Coin: CDS 640 Cash Deposit System, "With Scan Coin's customer operated coin deposit system . . . ," 2 pages (date unknown, prior to Apr. 2003).
ShieldSpec LLC: Currency Manager for Law Enforcement, 1 page (downloaded from www.shieldspec.com/product.html on Aug. 18, 2010).
ShieldSpec LLC: Presentation on Currency Manager for Law Enforcement, 10 pages (downloaded from www.shieldspec.com/documents/CurrencyManagerLawEnforcement.pdf on Aug. 18, 2010), © 2005.
Toshiba/(Mosler): CF-400 Series Fitness Sorter, 6 pages (estimated 1989 or earlier).
(Toshiba)/Mosler: CF-420 Cash Management System—Operator's Manual, 137 pages (© 1989).
Toshiba/Mosler: CF-420—Description of Toshiba/Mosler CF-420 Device, 1 page (date estimated 1989).
Toshiba/Mosler: CF-420—Revised drawings of portions of Mosler CF-420 Cash Management System (Figs. A-C) and description of the same, 4 pages (1989).
Vector: Miscellaneous meeting notes and communications between Cummins Allison Corp. and Vector Co. Ltd regarding Vector imager, 65 pages (Apr. 1, 1996 to Jun. 15, 1997).
Andy Pargh, "Vending Machines Dispense New Tricks It's a Breeze. Just Drop in Your Money and Create a Card, Buy a Ticket or Even Pose for a Photo on the Moon.; [3 Star Editiion]." Orlando Sentinel, Orlando, Fla., Nov. 1, 1993, p. D2, ProQuest Oct. 19, 2010, 2 pages.
Chargeback Management Guidelines for Visa Merchants, VISA, pp. 1-30, 2011, available at http://usa.visa.com/download/merchants/chargeback-management-guidelines-for-visa-merchants.pdf.
Vector Tech.: Document Imaging Product Demonstration video on CD in .wmv format (Jun. 1996).
U.S. Appl. No. 10/084,856, filed Feb. 27, 2002, J. Jones et al., Automatic Funds Processing System.
U.S. Appl. No. 10/256,818, filed Sep. 27, 2002, Hallowell et al., Currency Handling System Having Multiple Output Receptacles Interfaced with One or More Cash Processing Devices.
U.S. Appl. No. 11/803,381, filed May 14, 2007, Mennie et al., Automatic Funds Processing System.
U.S. Appl. No. 11/890,638, filed Aug. 7, 2007, Hallowell et al., Currency Processing and Strapping Systems and Methods.
U.S. Appl. No. 12/260,973, filed Oct. 29, 2008, Jenrick et al., System and Method for Processing Currency Bills and Tickets.
U.S. Appl. No. 12/636,513, filed Dec. 11, 2009, J. Jones et al., An Automated Document Processing System and Method.
U.S. Appl. No. 12/758,847, filed Apr. 13, 2010, Csulits et al., Apparatus and System for Imaging Currency Bills and Financial Documents and Method for Using the Same.
U.S. Appl. No. 12/758,882, filed Apr. 13, 2010, Csulits et al., Apparatus and System for Imaging Currency Bills and Financial Documents and Method for Using the Same.
U.S. Appl. No. 12/758,904, filed Apr. 13, 2010, Csulits et al., Apparatus and System for Imaging Currency Bills and Financial Documents and Method for Using the Same.
U.S. Appl. No. 12/758,934, filed Apr. 13, 2010, W. Jones et al. Apparatus and System for Imaging Currency Bills and Financial Documents and Method for Using the Same.
U.S. Appl. No. 12/758,945, filed Apr. 13, 2010, Csulits et al., Apparatus and System for Imaging Currency Bills and Financial Documents and Method for Using the Same.
U.S. Appl. No. 95/001,419, filed Aug. 13, 2010, Raterman et al., Reexamination of U.S. Pat. No. 7,672,499.
U.S. Appl. No. 12/965,626, filed Dec. 10, 2010, W. Jones et al., Apparatus and System for Imaging Currency Bills and Financial Documents and Method for Using the Same.
U.S. Appl. No. 13/014,823, filed Jan. 27, 2011, John E. Jones, Document Processing System.
U.S. Appl. No. 13/039,296, filed Mar. 2, 2011, Mennie et al., Currency Bill Processing Device and Method.
U.S. Appl. No. 13/087,960, filed Apr. 15, 2011, Mennie et al., Apparatus and system for imaging Currency Bills and financial documents and method for using the same.
U.S. Appl. No. 13/166,978, filed Jun. 23, 2011, Jones et al., Document Processing System Using Full Image Scanning.
U.S. Appl. No. 13/169,307, filed Jun. 27, 2011, Mennie et al., Currency Processing System with Fitness Detection.
U.S. Appl. No. 13/240,122, filed Sep. 22, 2011, Jones et al., Check and U.S. Bank Note Processing Device and Method.
U.S. Appl. No. 13/402,633, filed Feb. 22, 2012, Csulits et al., Document Imaging and Processing System.
U.S. Appl. No. 13/404,774, filed Feb. 24, 2012, John E. Jones, Automated Payment System and Method.
U.S. Appl. No. 13/405,418, filed Feb. 27, 2012, Robert J. Klein, System and Method for Processing Batches of Documents.
U.S. Appl. No. 13/437,691, filed Apr. 2, 2012, Csulits et al., Apparatus and System for Imaging Currency Bills and Financial Documents and Method for Using the Same.
U.S. Appl. No. 13/677,985, filed Nov. 15, 2012, Freehman et al., Currency Discrimination System and Method.
U.S. Appl. No. 13/710,258, filed Dec. 10, 2012, Jenrick et al., System and Method for Processing Currency Bills and Tickets.
U.S. Appl. No. 13/758,755, filed Feb. 4, 2013, Douglas U. Mennie et al., Apparatus and System for Imaging Currency Bills and Financial Documents and Method for Using the Same.
U.S. Appl. No. 13/760,884, filed Feb. 6, 2013, John E. Jones et al., System and Method for Processing a Deposit Transaction.
U.S. Appl. No. 13/768,586, filed Feb. 15, 2013, Araz Yacoubian et al., Optical Imaging Sensor for a Document Processing Device.
U.S. Appl. No. 13/785,628, filed Mar. 5, 2013, Douglas U. Mennie et al., Apparatus and System for Imaging Currency Bills and Financial Documents and Method for Using the Same.
U.S. Appl. No. 13/785,636, filed Mar. 5, 2013, Douglas U. Mennie et al., Apparatus and System for Imaging Currency Bills and Financial Documents and Method for Using the Same.
U.S. Appl. No. 13/785,001, filed Mar. 5, 2013, William J. Jones et al., Apparatus and System for Imaging Currency Bills and Financial Documents and Method for Using the Same.
U.S. Appl. No. 13/786,290, filed Mar. 5, 2013, Frank M. Csulits et al., Apparatus and System for Imaging Currency Bills and Financial Documents and Method for Using the Same.
U.S. Appl. No. 13/786,077, filed Mar. 5, 2013, Douglas U. Mennie et al., Apparatus and System for Imaging Currency Bills and Financial Documents and Method for Using the Same.

(56) References Cited

OTHER PUBLICATIONS

U.S. Appl. No. 13/787,678, filed Mar. 6, 2013, Frank M. Csulits et al., Apparatus and System for Imaging Currency Bills and Financial Documents and Methods for Using the Same.

U.S. Appl. No. 13/788,119, filed Mar. 7, 2013, Frank M. Csulits et al., Apparatus and System for Imaging Currency Bills and Financial Documents and Method for Using the Same.

U.S. Appl. No. 13/788,560, filed Mar. 7, 2013, Dale E. Beutel et al., Apparatus and System for Imaging Currency Bills and Financial Documents and Method for Using the Same.

U.S. Appl. No. 13/794,189, filed Mar. 11, 2013, William J. Jones et al., Apparatus and System for Imaging Currency Bills and Financial Documents and Method for Using the Same.

U.S. Appl. No. 13/794,279, filed Mar. 11, 2013, Frank M. Csulits et al., Apparatus and System for Imaging Currency Bills and Financial Documents and Method for Using the Same.

U.S. Appl. No. 13/794,305, filed Mar. 11, 2013, Douglas U. Mennie et al., Apparatus and System for Imaging Currency Bills and Financial Documents and Method for Using the Same.

U.S. Appl. No. 13/801,085, filed Mar. 13, 2013, John E. Jones, Currency Dispenser.

U.S. Appl. No. 13/828,720, filed Mar. 14, 2013, Douglas U. Mennie et al., Currency Bill Processing Device and Method.

U.S. Appl. No. 13/842,772, filed Mar. 15, 2013, John H. Daniel, III et al., Apparatus, Method, and System for Loading Currency Bills into a Currency Processing Device.

U.S. Appl. No. 12/543,865, filed Aug. 19, 2009, J. Jones et al., Document Processing System Using Full Image Scanning.

U.S. Appl. No. 12/615,167, filed Nov. 9, 2009, Jones, Currency Dispenser.

U.S. Appl. No. 12/758,934, filed Apr. 13, 2010, W. Jones et al., Apparatus and System for Imaging Currency Bills and Financial Documents and Method for Using the Same.

U.S. Appl. No. 13/014,823, filed Jan. 27, 2011, J. Jones et al., Document Processing System.

\* cited by examiner

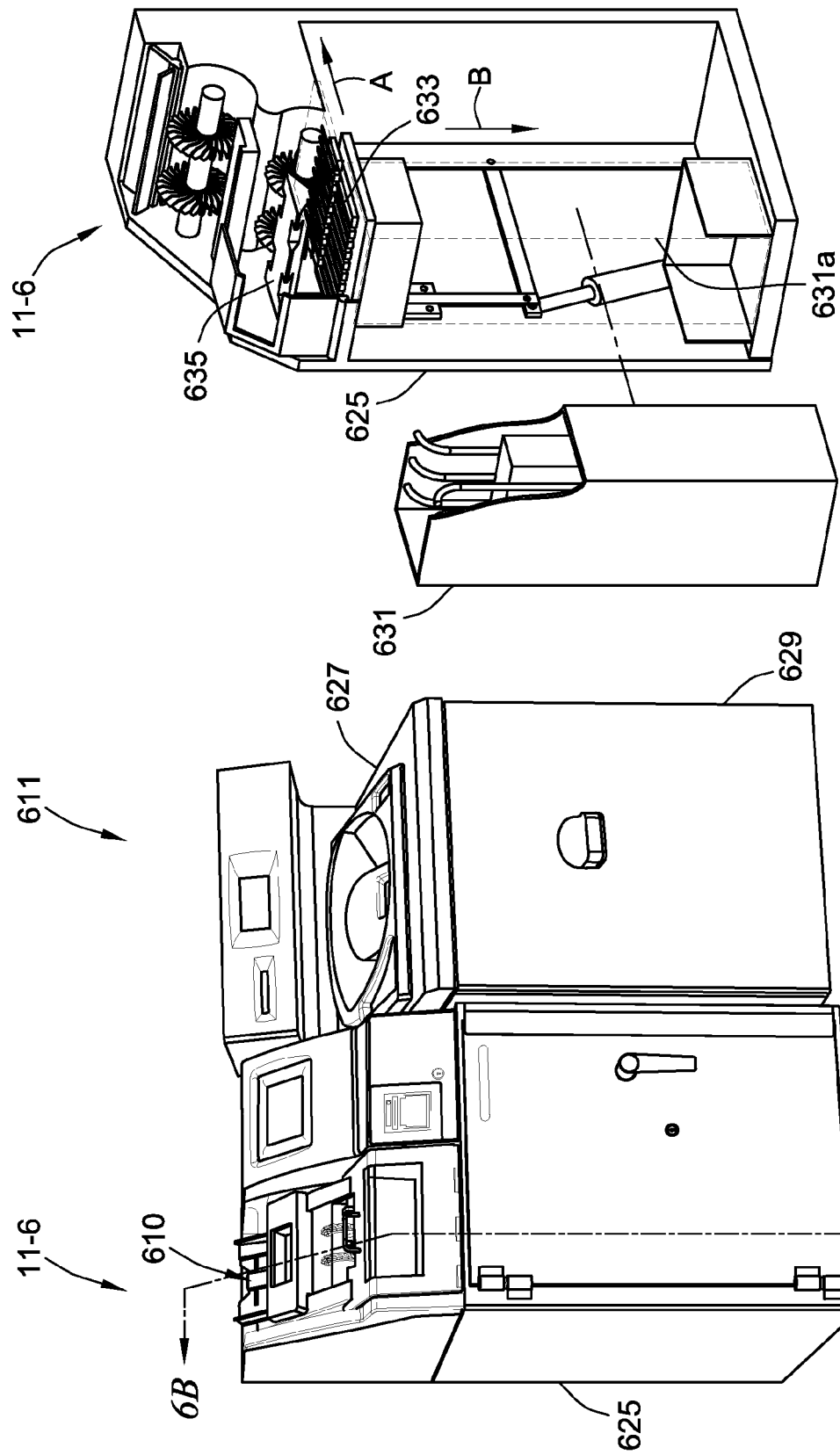

FIG. 8D

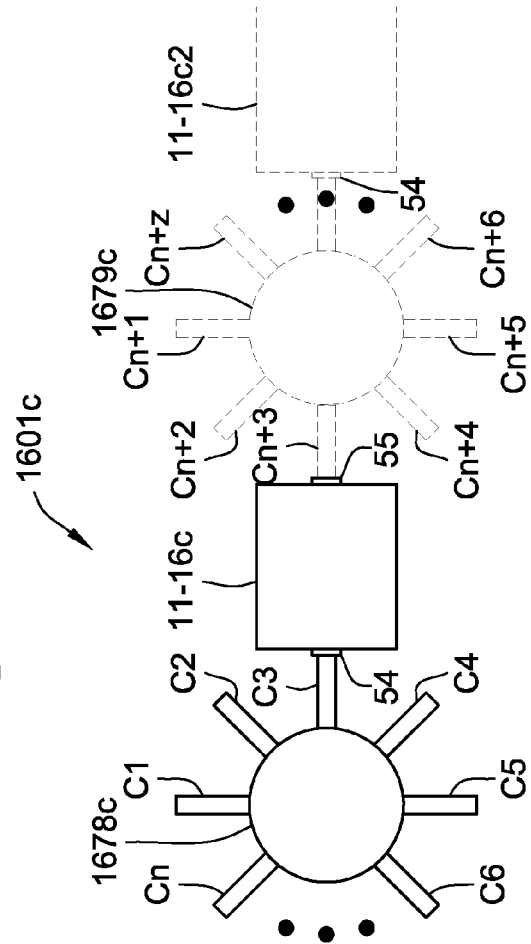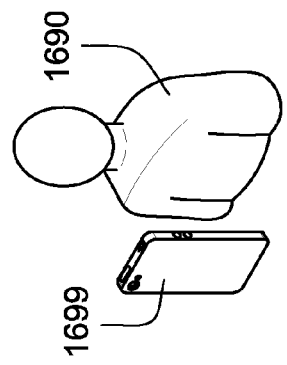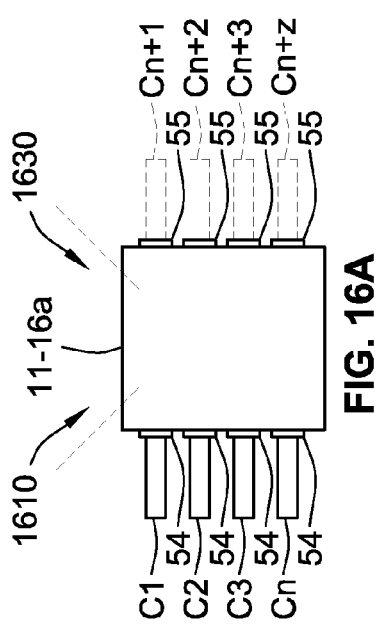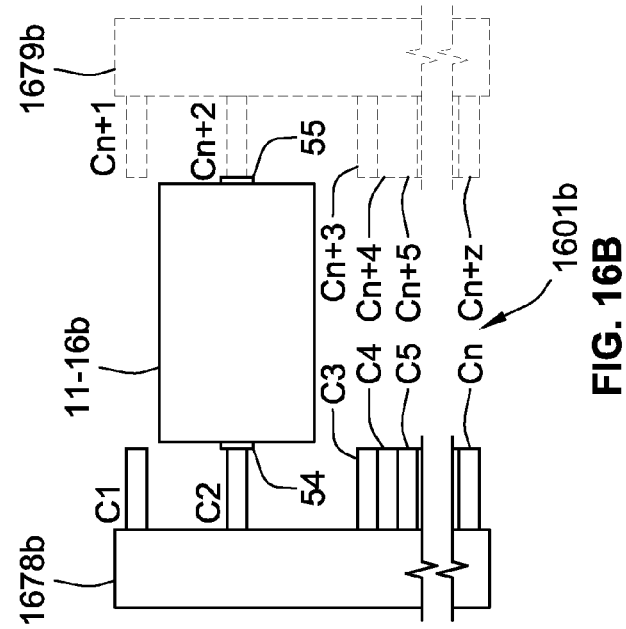
FIG. 16A
FIG. 16B
FIG. 16C

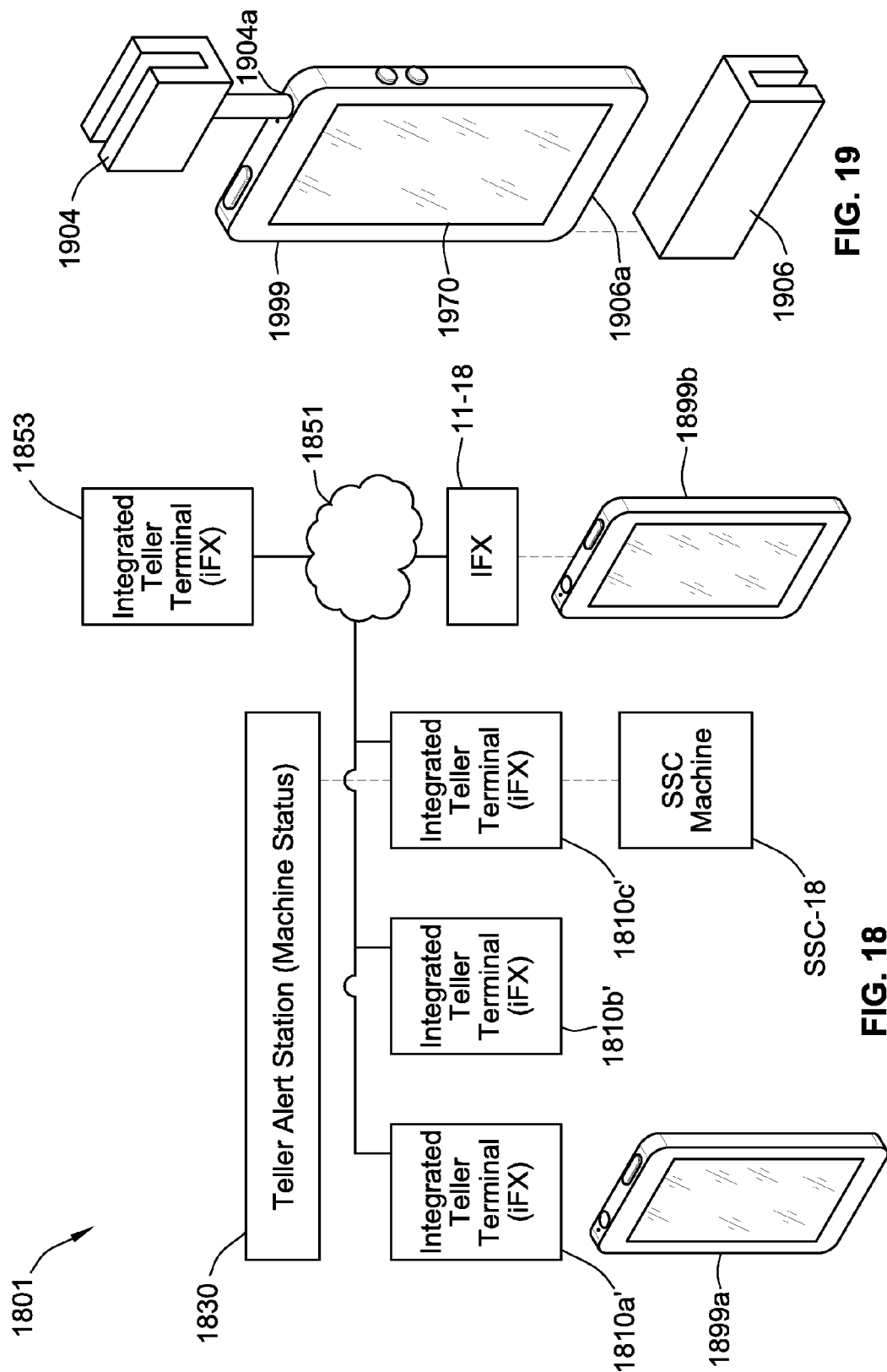

APPARATUS AND SYSTEM FOR PROCESSING CURRENCY BILLS AND FINANCIAL DOCUMENTS AND METHOD FOR USING THE SAME

FIELD OF THE INVENTION

The field of the invention relates generally to imaging and otherwise processing currency bills and financial documents and apparatuses, systems, and methods for doing the same.

BACKGROUND

Previous document processing devices for financial documents have various shortcomings.

SUMMARY

According to some embodiments, a method of processing documents including currency bills in a document processing device includes receiving a first container within a first input port of the document processing device such that the first container is coupled to the first input port. The first container includes a plurality of documents therein in a secure manner. A housing of the first container extends from the document processing device such that a portion of the housing of the first container protrudes from a housing of the document processing device. At least a portion of the plurality of documents is transported, using a transport mechanism of the document processing device, from the first container along a transport path past a sensor. At least a portion of each of the documents transported past the sensor is scanned to produce data. A first portion of scanned ones of the plurality of documents is delivered to a second container coupled to a first output port of the document processing device. The second container is configured to contain the first portion of the scanned ones of the plurality of documents therein in a secure manner. A housing of the second container extends from the document processing device such that a portion of the housing of the second container protrudes from the housing of the document processing device.

According to some such embodiments, the method further includes subsequent to all of the plurality of documents included in the first container being transported along the transport path and delivered to the second container, the first container is decoupled from the first input port and the second container is decoupled from the first output port. A third container is received within the first input port of the document processing device such that the third container is coupled to the first input port. The third container includes a second plurality of documents therein in a secure manner. A housing of the third container extends from the document processing device such that a portion of the housing of the third container protrudes from the housing of the document processing device. The first container is received within the first output port of the document processing device. At least a portion of the second plurality of documents is transported, using the transport mechanism of the document processing device, from the third container along the transport path past the sensor. A first portion of the second plurality of documents is delivered to the first container. The first container is configured to contain the first portion of the second plurality of documents therein in a secure manner.

According to some embodiments, a method of processing documents including currency bills in a document processing device includes receiving a plurality of documents in an input receptacle of the document processing device in an unsecure manner. The plurality of documents is transported, using a transport mechanism of the document processing device, one at a time in a serial fashion, from the input receptacle past an image scanner. At least a portion of each of the plurality of documents transported past the image scanner is imaged, using the image scanner, to generate image data that is reproducible as a visually readable image of at least a portion of each of the plurality of documents. A first portion of imaged ones of the plurality of documents is delivered to an automated document container coupled to an output port of the document processing device. The automated document container is configured to contain the first portion of the scanned ones of the plurality of documents therein in a secure manner. A housing of the automated document container extends from the document processing device such that a portion of the housing of the automated document container protrudes from a housing of the document processing device.

According to some embodiments a method of processing documents including currency bills in a document processing system includes receiving a first plurality of documents in an input receptacle of a first document processing device in an unsecure manner. The first plurality of documents is transported, one at a time in a serial fashion, from the input receptacle past a scanner. Each of the first plurality of documents transported past the scanner is scanned to generate a first set of data. A value associated with each of the first plurality of documents transported past the scanner is determined based on the generated first set of data. The first plurality of documents is delivered to an automated document container coupled to an output port of the first document processing device. The automated document container is configured to contain the scanned ones of the plurality of documents therein in a secure manner. A housing of the automated document container extends from the first document processing device such that a portion of the housing of the automated document container protrudes from a housing of the first document processing device. The determined values of the delivered ones of the plurality of documents are stored in a memory device of the automated document container. The automated document container is decoupled from the output port of the first document processing device. The automated document container is physically transported to a new location including a second document processing device. The automated document container is received within an input port of the second document processing device such that the automated document container is coupled to the input port of the second document processing device. The automated document container includes a second plurality of documents therein in a secure manner. The housing of the automated document container extends from the second document processing device such that a portion of the housing of the automated document container protrudes from a housing of the second document processing device. The second plurality of documents is transported, one at a time in a serial fashion, from the automated document container past a scanner of the second document processing device. Each of the second plurality of documents transported past the scanner of the second document processing device is scanned to generate a second set of data. A value associated with each of the second plurality of documents transported past the scanner of the second document processing device is determined based on the generated second set of data. The determined values of the second plurality of documents are compared with the determined values of the first plurality of documents stored on the memory device of the automated document container.

A document processing device convertible between a first configuration and a second configuration includes an input receptacle, a transport mechanism, a scanner, and a convertible output area. The input receptacle is configured to receive documents including currency bills therein. The transport mechanism is configured to transport the documents along a transport path from the input receptacle. The scanner is positioned along the transport path and is configured to scan at least a portion of each of the documents transported to generate data associated therewith. The convertible output area is configured to be selectively coupled with a first output assembly and a second output assembly.

Additional aspects of the present disclosure will be apparent to those of ordinary skill in the art in view of the detailed description of various embodiments, which is made with reference to the drawings, a brief description of which is provided below.

BRIEF DESCRIPTION OF THE DRAWINGS

FIG. 1CB is a perspective view of a document processing device according to some embodiments of the present disclosure;

FIG. 6A is a perspective view of a document processing vault system according to some embodiments of the present disclosure;

FIG. 6B is a partial cross-sectional perspective view of the document processing vault system of FIG. 6A;

FIG. 8D is a representation for a record of a currency bill according to some embodiments of the present disclosure;

FIGS. 16A-16D are block representations of document processing systems according to some embodiments of the present disclosure;

FIG. 18 is a block diagram illustrating a banking-related system according to some embodiments;

FIG. 19 is a block representation of a wireless device with magnetic sensors according to some embodiments;

Figure 1A:
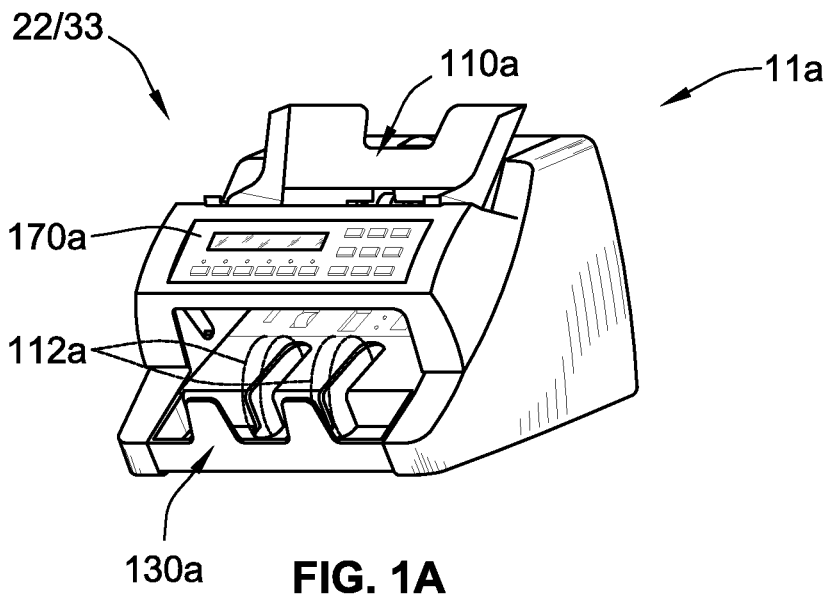
FIG. 1A is a perspective view of a document processing device according to some embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF ILLUSTRATIVE EMBODIMENTS

All of the following listed U.S. patent applications and U.S. patents are hereby incorporated by reference herein in their entireties:

U.S. patent application Ser. No. 12/758,876, filed Apr. 13, 2010, now U.S. Pat. No. 8,162,125, entitled "Apparatus and System for Imaging Currency Bills and Financial Documents and Method for Using The Same";

U.S. patent application Ser. No. 08/340,031, filed Nov. 14, 1994, now U.S. Pat. No. 5,815,592, entitled "Method and Apparatus for Discriminating and Counting Documents";

U.S. patent application Ser. No. 08/864,423, filed May 28, 1997, now U.S. Pat. No. 6,311,819, entitled "Method and Apparatus for Document Processing";

U.S. patent application Ser. No. 11/809,621, filed Jun. 1, 2007, now U.S. Pat. No. 7,686,151, entitled "Angled Currency Processing System";

U.S. patent application Ser. No. 13/039,296, filed Mar. 2, 2011, published as U.S. Published Application No. 2011-0215034, entitled "Currency Bill Processing Device and Method";

U.S. patent application Ser. No. 09/502,666, filed Feb. 11, 2000, now U.S. Pat. No. 6,398,000, entitled "Currency Handling System Having Multiple Output Receptacles";

U.S. patent application Ser. No. 08/664,262, filed May 13, 1996, now U.S. Pat. No. 5,982,918, entitled "Automatic Funds Processing System";

U.S. patent application Ser. No. 09/059,813, filed Apr. 14, 1998, now U.S. Pat. No. 6,661,910, entitled "Network For Transporting and Processing Images in Real Time";

U.S. patent application Ser. No. 08/814,978, filed Mar. 11, 1997, now U.S. Pat. No. 6,363,164, entitled "Automated Document Processing System Using Full Image Scanning";

U.S. patent application Ser. No. 09/635,967, filed Aug. 10, 2000, now U.S. Pat. No. 6,929,109, entitled "Method and Apparatus for Document Processing";

U.S. patent application Ser. No. 09/965,428, filed Sep. 27, 2001, now U.S. Pat. No. 7,187,795, entitled "Document Processing System Using Full Image Scanning";

U.S. patent application Ser. No. 10/981,315, filed Nov. 2, 2004, now allowed, entitled "Multiple Pocket Currency Bill Processing Device and Method";

U.S. patent application Ser. No. 10/068,977, filed Feb. 8, 2002, now U.S. Pat. No. 6,860,375, entitled "Multiple Pocket Currency Bill Processing Device and Method";

U.S. patent application Ser. No. 10/638,231, filed Aug. 7, 2003, entitled "Currency Bill Tracking System";

U.S. patent application Ser. No. 10/903,745, filed Jul. 30, 2004, now allowed, entitled "Currency Processing Device, Method and System";

U.S. patent application Ser. No. 11/036,686, filed Jan. 14, 2005, now allowed, entitled "Currency Processing Device, Method and System"; and U.S. patent application Ser. No. 11/048,296, filed Feb. 1, 2005, entitled "Automated Document Processing System and Method Using Image Scanning".

As stated above, all of the above mentioned U.S. patent applications and U.S. patents are hereby incorporated by reference herein in their entireties.

I. Definitions

When describing various embodiments, the term "currency bills" refers to official currency bills including both U.S. currency bills, such as a $1, $2, $5, $10, $20, $50, or $100 bills, and foreign currency bills. Foreign currency bills are notes issued by a non-U.S. governmental agency as legal tender, such as a euro, Japanese yen, pound sterling (e.g., British pound), Canadian dollar, Australian dollar bill, Mexican Peso, or Turkish lira.

The term "brick U.S. currency bills" generally refers to U.S. currency bills in mint or near mint condition having the highest fitness level. Brick U.S. currency can also refer to non-circulated U.S. currency bills, such as, for example, new bills shipped by the U.S. Federal Reserve to commercial banks Brick U.S. currency bills are crisp, free of holes, free of tears, free of wrinkles, free of stray markings (pen and/or pencil marks), etc.

The term "general circulation U.S. currency bills" refers to random U.S. currency bills having a variety of different fitness levels (e.g., some mint bills, some near mint bills, some heavily worn bills, some bills with holes, some bills with tears, some soiled bills, or combinations thereof). For example, general circulation U.S. currency bills would include currency bills scheduled to be deposited by a retail store in a bank for a given workday and/or work week that were collected from customers. For another example, general circulation U.S. currency bills include all of or a portion of the bills in a bank vault. For another example, general circulation U.S. currency bills do not only include heavily worn bills and/or torn bills.

The term "star note" refers to a U.S. currency bill that has an asterisk (*), or star, after the serial number. A U.S. currency bill that is discovered to have been printed incorrectly (such as having the serial numbers upside down, etc.) can be replaced with a star note because no two bills within a certain series can be produced with the same serial number in the U.S. According to some embodiments, star note serial numbers including an asterisk can be extracted and processed in the same, or similar, manner as non-star notes described herein.

The term "wildcard character" refers to a character that matches zero or more other characters, such as "a-z" or "0-9," during a comparison operation. That is, a wildcard character can be used to substitute for or represent any other character or characters in a string of characters. There are two types of wildcard characters disclosed herein, which include "a single wildcard character" and "a multiple wildcard character." A single wildcard character represents exactly one character. The exactly one represented character can be any character, such as, for example, any letter "a" through "z" irrespective of case, any single digit number "0" through "9," or any symbol. As described in detail in the Modes of Operation—Searching/Master Database Section of U.S. Pat. No. 8,162,125, which is hereby incorporated by reference herein in its entirety, single wildcard characters can be substituted for and/or used to represent individual identifier characters that were not determined during character extraction. A common single wildcard character is a question mark "?" symbol. That is, according to some embodiments, the "?" can serve as a placeholder for a single unknown character. A multiple wildcard character represents zero or more characters. The zero or more represented characters can be any combination of characters, such as, for example, letters "a" through "z" irrespective of case, numbers "0" through "9," and/or symbols. As described in detail in the Modes of Operation—Searching/Master Database Section of U.S. Pat. No. 8,162,125, which is hereby incorporated by reference herein in its entirety, target identifiers, such as a target serial number or a portion thereof, can include one or more multiple wildcard characters to perform many types of searches. A common multiple wildcard character is a percent symbol "%."

"Substitute currency notes" are sheet-like documents similar to currency bills, but are issued by non-governmental agencies such as casinos and amusement parks and include, for example, casino script and Disney Dollars. Substitute currency notes each have a denomination and an issuing entity associated therewith such as, for example, a $5 Disney Dollar, a $10 Disney Dollar, a $20 ABC Casino note, and a $100 ABC Casino note.

"Currency notes" consist of currency bills and substitute currency notes.

"Substitute currency media" are documents that represent a value by some marking or characteristic such as a bar code, color, size, graphic, or text. Examples of "substitute currency media" include without limitation: casino cashout tickets (also variously called cashout vouchers or coupons) such as, for example, "EZ Pay" tickets issued by International Gaming Technology or "Quicket" tickets issued by Casino Data Systems; casino script; promotional media such as, for example, Disney Dollars or Toys 'R Us "Geoffrey Dollars"; or retailer coupons, gift certificates, gift cards, or food stamps. Accordingly, substitute currency media includes, but is not limited to, substitute currency notes. Substitute currency media may or may not be issued by a governmental body.

The term "currency documents" includes both currency bills and "substitute currency media." The terms "financial documents" and "documents" are used throughout the specification to generally refer to any of currency bills, substitute currency notes, currency notes, substitute currency media, and currency documents. According to some embodiments, the term document can also refer to full sheets of letter sized (e.g., 8-½"×11") and/or A4 sized documents. According to some such embodiments, a document processing system or device of the present disclosure can be configured to run in a scan-only mode that scans documents, including full sheets of letter and/or A4 sized documents, to generate a visually readable image of the document.

The term "deposit document" includes deposit slips, cash-in tickets, and cash-out tickets. A deposit document is generally associated with a deposit of currency bills and/or checks into, for example, a bank by a bank customer. A deposit slip can include information such as, for example, a customer financial account number, a total deposit amount, a total currency bill deposit amount, a number of deposited currency bills broken down by denomination, a total check deposit amount, a number of deposited checks broken down by on-us checks and transit checks, a total on-us check deposit amount, a total transit check deposit amount, a total cashout amount, or combinations thereof.

"Deposit transaction documents" consist of currency bills, checks, deposit slips, deposit transaction separator cards such as header cards or trailer cards.

Every day, businesses and people unknowingly accept counterfeit currency documents as genuine. A counterfeit currency document is a currency document which is not issued by an authorized maker and/or a currency document which has been altered, for example, a $1 bill which has been altered to appear to be a $20 bill. For example, in the case of U.S. currency bills, a counterfeit currency bill would be a document printed to look like a genuine U.S. bill but not printed by the U.S. Treasury Department's Bureau of Engraving and Printing or one that has been tampered with or altered. As another example, in the case of casino script, a counterfeit currency document would be a script that is not issued by the corresponding casino or one that has been tampered with or altered.

The term "financial institution" as used herein includes, but is not limited to, banks, such as, brick and mortar banks, internet/online banks, casinos, brokers, investment banks, and armored carriers. Armored carriers can be stand-alone financial institutions and/or agents of another financial institution.

Throughout this disclosure, the terms "Store," "Retailer," and "Bank" are used for ease of description to describe parties involved in typical document transactions according to some embodiments of the present disclosure. It should be understood, however, that this disclosure also applies to people, companies, corporations, financial institutions, and any other entity that receives and/or transmits documents and/or visually readable images of documents. For example, the term Bank can also be used to refer to a financial institution. Additionally, the term Store can be used to refer to any financial institution customer or bank customer that retains an account at a bank, such as, for example, a casino, an armored carrier, a supermarket, a toy store, an amusement park, a school district, a municipality, a law firm, a restaurant, or other enterprise. The term Store can also include individual consumers and/or self-employed enterprises.

Throughout this disclosure, the term "operator" is used to refer to a person or persons operating a document processing device or system under normal operating conditions such as, for example, a store clerk, a store manager, a bank employee, a bank teller, or a bank customer.

Throughout this disclosure, the term "teller" is used to refer to a person (or persons) that processes deposits of documents at a bank branch, a bank vault, an ATM, an armored carrier, etc.

Throughout this disclosure, the term "batch" is used to refer to a set of documents that is associated with a transaction. A batch of documents can include one or more deposit documents, one or more currency bills, one or more checks, a header card, a trailer card, or any combination thereof. For example, a batch of documents associated with a first transaction between a store and a bank can include ten documents, the ten documents including one deposit slip, eight currency bills, and one check. For another example, a batch of documents associated with a second transaction between an individual and a bank can include twenty-five documents, the twenty-five documents including one deposit slip, twenty currency bills, and four checks.

The disclosure refers to at least two types of batches of documents, which include a "sorted batch of documents" and an "intermingled or commingled batch of documents." A sorted batch of documents is a batch of documents wherein the order of different types of documents, such as, for example, currency bills, checks, and deposit documents, is arranged by groups, wherein each batch consists of at most only one group for each type of document. For example, for a batch consisting of ten checks and ten currency bills, a sorted batch of documents would include one group of the ten checks preceding or following a group of the ten currency bills. For another example, for a batch consisting of one deposit slip, five checks, and five currency bills, a sorted batch of documents would include the deposit slip and one group of the five checks preceding or following a group of the five currency bills. It is contemplated that the deposit slip can precede or follow either of the two groups of documents.

An intermingled batch of documents is a batch of documents wherein the order of different types of documents, such as, for example, currency bills, checks, and deposit documents, is mixed or random. For example, a batch consisting of ten checks and ten currency bills would be an intermingled batch of documents if the batch consisted of, in order, two bills, then three checks, then one bill, then seven checks, and finally seven bills. For another example, a batch consisting of one deposit slip, one cash-out ticket, ten currency bills, and twenty checks would be an intermingled batch of documents if the batch consisted of, in order, the deposit slip, five currency bills, ten checks, the cash-out ticket, five checks, five currency bills, and finally five checks.

A batch of documents including currency bills, checks, and/or deposit documents can be processed in a document processing device or system according to several modes of operation, such as, for example, a sorted-group mode, an ordered-batch mode, and an intermingled-batch mode. According to some embodiments, sorted batches of documents can be processed according to the sorted-group mode or the ordered-batch mode. According to some embodiments, intermingled batches of documents can be processed according to the intermingled-batch mode.

In the sorted-group mode, the currency bills are processed in separate groups from the checks. For example, for a batch of documents that includes one hundred currency bills and twenty-five checks, the one hundred currency bills are input into an input receptacle of the document processing device and processed as a first group of documents. Subsequently, the twenty-five checks are input into an input receptacle of the document processing device and processed separately as a second group of documents. That is, the currency bills and the checks of the batch of documents are processed in separate groups of documents by the same device.

In the ordered-batch mode, the currency bills are sorted from the checks into separate groups of documents, but the currency bills and the checks are input into an input receptacle of the document processing device together as a single batch of documents such that the document processing device can process the currency bills and then process the checks as a batch of documents associated with a transaction. For example, for a batch of documents that includes three hundred and fifty-five currency bills and six hundred checks, according to some embodiments, the three hundred and fifty-five currency bills are input into the input receptacle of the document processing device and the six hundred checks are positioned on top of the currency bills such that the currency bills are transported and processed first, and then the checks are transported and processed second. That is, the currency bills and the checks of the batch of documents are processed together, one after the other. For another example, for a sorted batch of documents that includes five currency bills and ten checks, according to some embodiments, the ten checks are input into the input receptacle of the document processing device and the five currency bills are positioned on top of the checks such that the checks are transported and processed first, and then the currency bills are transported and processed second.

In the intermingled-batch mode, the currency bills are mixed with the checks and input into the input receptacle of the document processing device together as a single intermingled or commingled batch of documents. For example, for a batch of documents that includes ten currency bills and ten checks, where the documents are ordered from one to twenty, the batch can be ordered such that the first five documents in the batch are currency bills, the second five documents in the batch are checks, then three currency bills, then two checks, then two currency bills, followed by three checks. In the intermingled-batch mode, the document processing device is configured to process the mixed currency bills and checks of the intermingled or commingled batch of documents together. Furthermore, in the intermingled-batch mode, the order of the documents does not matter and the processing device does not expect or require the documents in a batch to be in any particular order. Thus, a sorted batch of documents can be processed in the intermingled-batch mode.

Throughout this disclosure, the term "stack" or stack of documents is used to refer to a set of documents that is received in an input receptacle of a document processing device or system. A stack of documents can include a group of currency bills only; a group of checks only; a batch of documents including currency bills, checks, and/or other documents, such as deposit documents; one or more batches of documents; one or more sub-batches of documents, one or more ordered batches of documents; an intermingled batch of documents; one or more deposit documents; one or more header cards and/or trailer cards; or any combination thereof.

Throughout this disclosure, the term "visually readable image," as would be understood by one of ordinary skill in the art, refers to image data or a portion of image data obtained for a document, that image data or portion thereof being reproducible as a visually readable image—that is, a visually readable image is reproducible from or using image data. For example, one of ordinary skill in the art would understand a visually readable image would be reproduced on a display device, or otherwise, for viewing by a human user of the devices and systems described herein. The visually readable image reproduced on the display device is associated with image data or a portion of image data obtained from a physical document (for example, currency bill, check, deposit slip). Therefore, one of ordinary skill in the art would understand the phrases "image data" and "visually readable image," as either individually or in some combination, to generally refer to and include image data or a portion of image data from which a visually readable image may be produced. In some contexts, reference may be made to, for example, the electronic storage or transmittal of image data that is reproducible as a visually readable image. In other contexts, reference may be made to, for example, the electronic storage or transmittal of a visually readable image. In both contexts, one of ordinary skill in the art would understand both phrases to generally be the same or similar, that is, image data, or a portion thereof, from which a visually readable image may be produced. The image data and/or visually readable images of the present disclosure can be in any of a variety of file formats, such as, for example, JPEG, JFIF, Exif, TIFF, RAW, PNG, GIF, BMP, etc.

"Ordered document containers" are containers configured to neatly hold one or more batches of one or more types of documents in an ordered fashion and to permit documents contained therein to be conveniently moved from location to location. They include, for example, trays, cassettes, and mini-safes.

"Automated document containers" are document containers configured to be coupled to a document processing device 11 and permit one or more types of documents to be automatically withdrawn or dispensed from (i.e., input or dispensing containers) or inserted or received into (i.e., output or receiving containers) or both (re-cycle type containers). They may include, for example, trays, cassettes, and mini-safes.

II. Introduction

Many individuals have a need to handle, count, sort, and otherwise process currency documents such as currency bills and other financial documents such as checks, deposit slips, etc. For example, retailers often receive currency bills, coins, and/or checks from customers in return for the sale of goods and services. Retailers must then count the received currency bills, coins, and checks and arrange to deposit them into their respective bank accounts. The bills, coins, and/or checks are often bundled and delivered to banks for deposit sometimes employing armored carrier services to transport the bills, coins, and/or checks to the bank.

III. Exemplary Types Of Devices

A. Document Processing Devices 11, Note counters 22, Currency Bill Denominating Devices 33, Document Imaging Devices 44 (DIDs), Automated Teller Machines (ATMs), Merchant Teller (MT), Recyclers (RC), Personal Teller Machines, Automated Employee Bank Machines, Employee Safes, and Cashier Balancing Machines Document processing devices 11 for processing currency bills and other financial documents can take a variety of forms and can perform a variety of functions. Exemplary devices include note counters 22, currency bill denominating devices 33, document imaging devices (44, DIDs), automatic teller machines (ATMs), merchant teller machines (MTs), recycler devices (RCs), Personal Teller Machines (PTMs), Automated Employee Bank Machines (AEBMs), Employee Safes (ESs), and Cashier Balancing Machines (CBMs), and other devices.

A note counter 22 counts the number of documents or currency bills in a stack of documents. A note counter, however, does not have the capacity to process a stack of currency bills having a plurality of denominations and determine the denominations of currency bills and total the value of bills in a stack of bills having mixed denominations. Rather, note counters are designed to process stacks of bills that all have the same denomination. An example of a note counter is the JetCount® note counter manufactured by Cummins-Allison Corp. of Mt. Prospect, Ill.

A currency bill denominating device 33 comprises one or more sensors configured to retrieve information from currency bills used by the device to determine the denomination of processed currency bills. A currency bill denominating device 33 is configured to determine the denominations of currency bills including currency bills of a plurality of denominations, count and total the value of all the bills in a stack of bills (including the capacity to total the value of bills of mixed denominations) processed by the currency bill denominating device 33. According to some embodiments, currency bill denominating devices 33 are configured to denominate bills using data from one or more sensors which do not generate visually readable images of the bills. Examples of currency bill denominating devices are the JetScan™ currency bill denominators manufactured by Cummins-Allison Corp. of Mt. Prospect, Ill. such as described in U.S. Pat. Nos. 5,295,196; 5,815,592; and 6,311,819, each of which is incorporated herein by reference in its entirety.

Document imaging devices (DIDs) 44 obtain a visually readable image of one or both surfaces of processed documents and/or portions of one or both surfaces of processed documents. According to some embodiments, document imaging devices 44 are configured to determine the denominations of currency bills, including currency bills of a plurality of denominations, count and total the value of all bills in a stack of bills processed by the document imaging devices. According to some embodiments, documents imaging devices are configured to denominate bills using data from one or more image scanners and/or from one or more non-image scanning sensors. According to some embodiments, document imaging devices are configured to process other documents such as checks, deposit slips, and/or other documents as described herein and as described in U.S. Pat. No. 8,162,125, which is hereby incorporated by reference herein in its entirety. Examples of document imaging devices include the JetScan™ iFX™ scanners manufactured by Cummins-Allison Corp. of Mt. Prospect, Ill.

Examples of ATMs include ATMs manufactured by NCR (e.g., NCR SelfSery 14), Diebold (e.g., Diebold 720—Advanced-function Lobby ATM), Wincor Nixdorf (e.g., Wincor Nixdorf CINEO C2060), Nautilus Hyosung (e.g., Nautilus Hyosung NH-1800), and Tidel (e.g., Tidel 3400).

Examples of recyclers include recyclers manufactured by CTS Cashpro (e.g., CTS Cashpro CM18), Hitachi (e.g., Hitachi SR7500), Wincor Nixdorf (e.g., Wincor Nixdorf CINEO C4040), and Cima s.p.a. (e.g., Cima s.p.a. AST 7000 NT).

FIG. 1A is a perspective view of a single output document processing device 11a such as a single output receptacle currency bill processing device. According to some embodiments, device 11a is a note counter 22. A stack of documents to be counted is inserted into an input hopper 110a. The device 11a serially feeds documents from the stack and along a transport path and into an output receptacle 130a. According to some embodiments, the device comprises one or more stacking wheels 112a configured to neatly stack processed documents in the output receptacle 130a. According to some embodiments, the device 11a is a currency bill denominating device 33. Additionally details about currency denominating devices can be found in U.S. Pat. Nos. 5,815,592 and 5,295,196, each of which is hereby incorporated by reference herein in its entirety. According to some embodiments, note counters and currency bill denominating devices 11a incorporate one or more authentication sensors. Data from the authentication sensor(s) is used to determine if any processed bills are suspected counterfeits or suspect bills, for example, when the data from a bill fails one or more authentication tests.

Figure 1B:
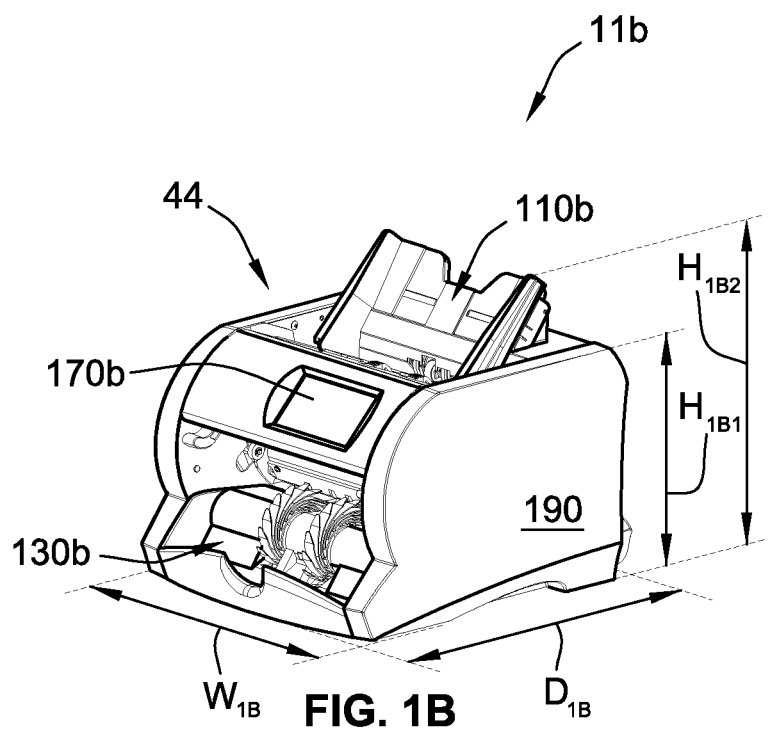
FIG. 1B is a perspective view of a document processing device according to some embodiments of the present disclosure.

FIG. 1B is a perspective view of a single output document processing device 11b which is a document imaging device 44 which obtains a visually readable image of one or both surfaces of processed documents and/or portions of one or both surfaces of processed documents. As illustrated, device 11b comprises an input receptacle 110b. According to some embodiments, the document processing device 11b has a height $H_{1B2}$ of less than about twelve inches, a width $W_{1B}$ of less than about fourteen inches, and a depth $D_{1B}$ of less than about fifteen inches. According to some embodiments, the document processing device 11b has a height $H_{1B1}$ of less than about nine and a half inches, a width $W_{1B}$ of less than about fourteen inches, and a depth $D_{1B}$ of less than about thirteen and a half inches. According to some embodiments, the document processing device 11b has a footprint of less than about two square feet. According to some embodiments, the document processing device 11b has a footprint of less than about one and a half square feet. According to some embodiments, the document processing device 11b has a footprint of less than one and a quarter square feet. According to some embodiments, the document processing device 11b weighs less than about 35 lbs. According to some embodiments, the document processing device 11b weighs less than about 25 lbs. According to some embodiments, the document processing device 11b weighs about twenty lbs. According to some embodiments, the document processing device 11b is compact and configured to be rested on a tabletop or countertop. Additionally details about document images devices 11b can be found in U.S. patent application Ser. No. 12/758,876, filed Apr. 13, 2010, now issued as U.S. Pat. No. 8,162,125, entitled "Apparatus and System for Imaging Currency Bills and Financial Documents and Method for Using The Same", which is hereby incorporated by reference herein in its entirety. As with respect to note counters 22 and currency bill denominating devices 33, according to some embodiments, document imaging devices 44 such as device 11b incorporate one or more authentication sensors.

Figure 1C:
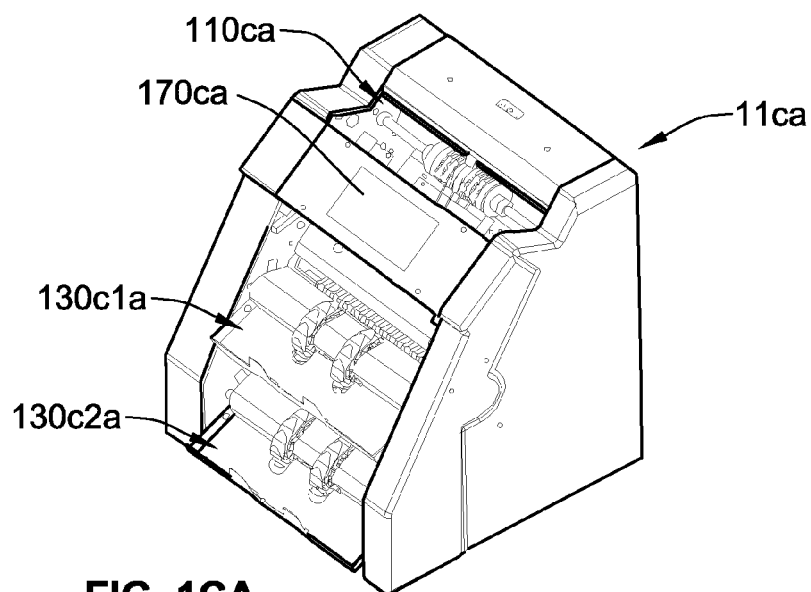
FIG. 1CA is a perspective view of a document processing device according to some embodiments of the present disclosure.
Figure 1C:
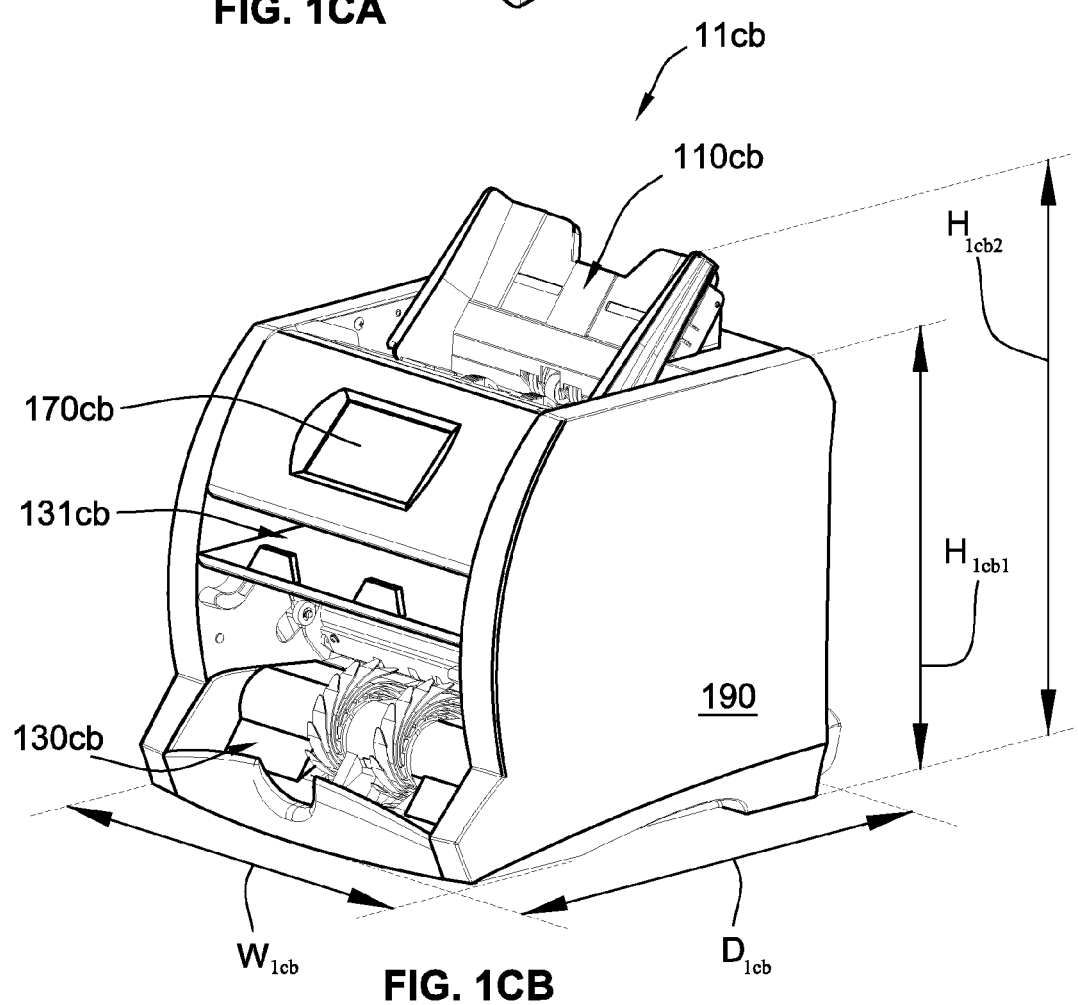

FIG. 1CA is a perspective view of a two or dual output receptacle document processing device 11ca having and an input receptacle 110ca and two output receptacles 130c1a, 130c2a. According to some embodiments, device 11ca is a note counter 22, currency bill denominating device 33, document imaging device 44, and/or a document authenticating device. Additionally details about two or dual output document processing devices can be found in U.S. Pat. No. 6,311, 819 and U.S. Pat. No. 8,162,125, each of which is hereby incorporated by reference herein in its entirety.

FIG. 1CB is a perspective view of a one and a half output receptacle document processing device 11cb. According to some embodiments, the device 11cb is a currency bill denominating device 33. According to some embodiments, the device 11cb is a document imaging device 44 which obtains a visually readable image of one or both surfaces of processed documents and/or portions of one or both surfaces of processed documents. The device 11cb may be similar to devices 11a or 11b described above, except that the device 11cb includes an additional small capacity output receptacle 131cb as compared to the single output receptacle 130a, 130b of the devices 11a and 11b, respectively, shown in FIGS. 1A and 1B. For example, according to some embodiments, the output receptacle 131cb may have a capacity for fifty documents whereas the output receptacle 130a, 130b has a capacity for one hundred documents. For another example, the output receptacle 131cb may have a capacity for ten documents whereas the output receptacle 130a, 130b has a capacity for three hundred documents. According to some embodiments, the output receptacle 131cb is used as a reject pocket (e.g., a reject receptacle). As illustrated, device 11cb comprises an input receptacle 110cb. According to some embodiments, the document processing device 11cb has a height $H_{1cb2}$ of less than about fourteen inches, a width $W_{1cb}$ of less than about fourteen inches, and a depth $D_{1cb}$ of less than about fifteen inches. According to some embodiments, the document processing device 11cb has a height $H_{1cb1}$ of less than about eleven and a half inches, a width $W_{1cb}$ of less than about fourteen inches, and a depth $D_{1cb}$ of less than about thirteen and a half inches. According to some embodiments, the document processing device 11cb is compact and configured to be rested on a tabletop or countertop. Additionally details about the document images device 11cb can be found in U.S. Pat. No. 8,162,125, entitled "Apparatus and System for Imaging Currency Bills and Financial Documents and Method for Using The Same", which is hereby incorporated by reference herein in its entirety.

Figure 1D:
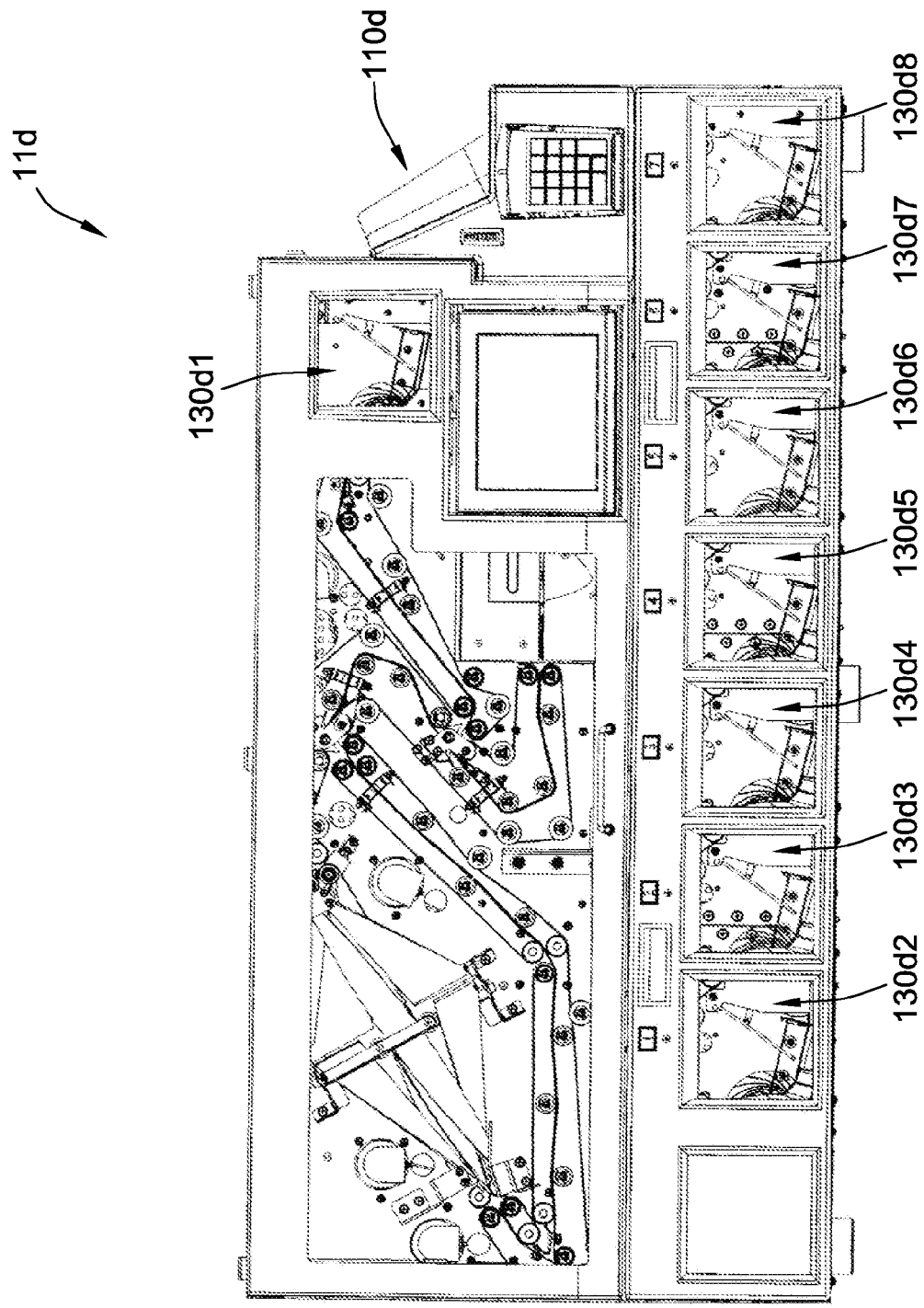
FIG. 1D is a front view of a document processing device according to some embodiments of the present disclosure.

FIG. 1D is a front view of multiple output receptacle document processing device 11d having an input receptacle 110d and a plurality of output receptacles 130d1-130d8 and configured to be placed on a desktop or countertop. According to some embodiments, device 11d is a currency bill denominating device 33, document imaging device 44, and/or a document authenticating device. Additionally details about exemplary embodiments of multiple output document processing devices such as illustrated in FIG. 1D can be found in U.S. Pat. No. 7,686,151, which is hereby incorporated by reference herein in its entirety. According to some embodiments, device 11d is a currency bill denominating device 33 such as Cummins JetScan™ MPS 4200 series currency bill denominating device available from Cummins-Allison Corp. of Mt. Prospect, Ill.

Figure 1E:
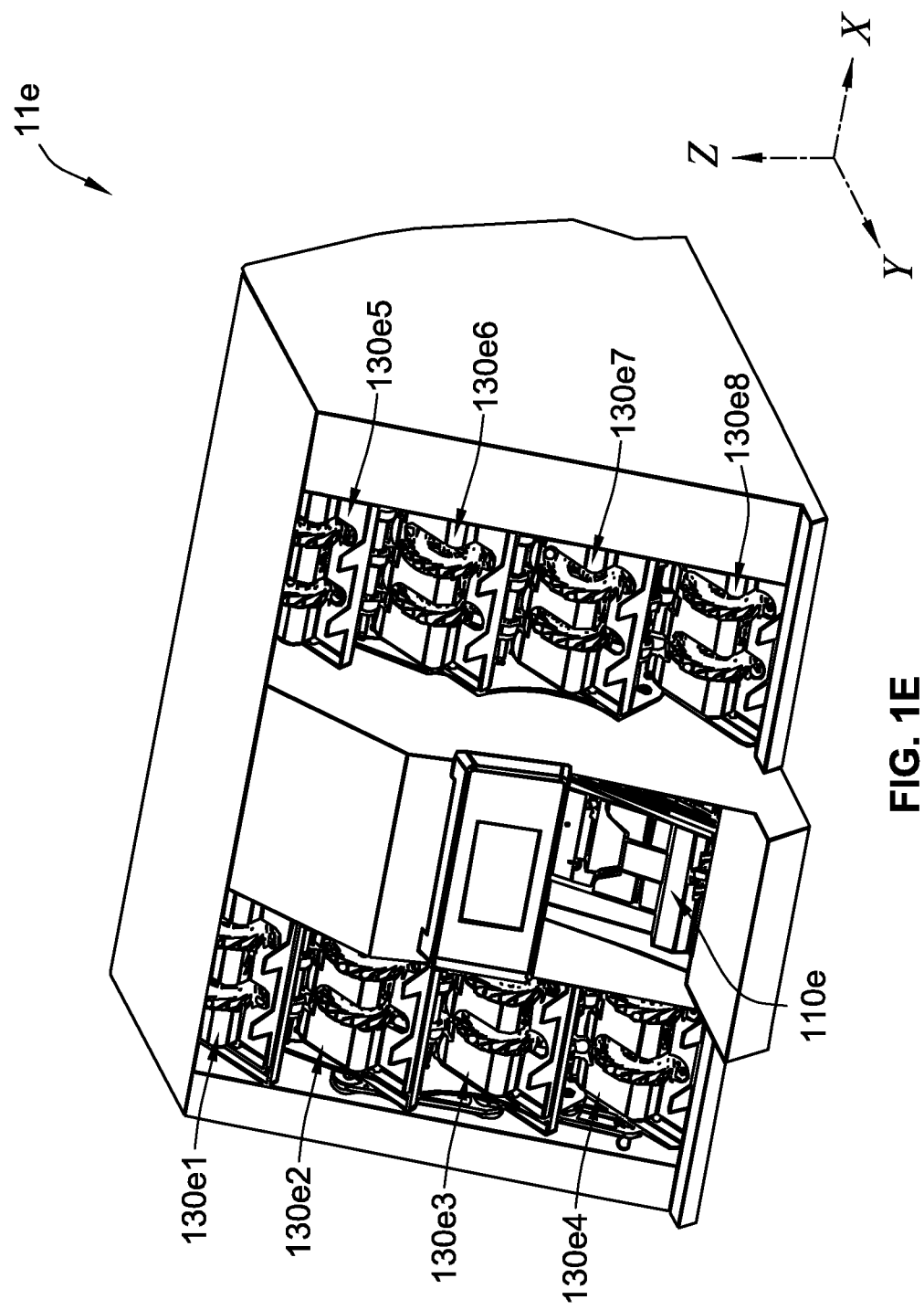
FIG. 1E is a perspective view of a document processing device according to some embodiments of the present disclosure.

FIG. 1E is a perspective view of multiple output receptacle document processing device 11e having an input receptacle 110e and a plurality of output receptacles 130e1-130e8 and configured to be placed on a desktop or countertop. According to some embodiments, device 11e is a currency bill denominating device 33, document imaging device 44, and/or a document authenticating device. Additionally details about exemplary embodiments of multiple output document processing devices such as illustrated in FIG. 1E can be found in U.S. Pat. No. 7,686,151, which is hereby incorporated by reference herein in its entirety. According to some embodiments, device 11e is a currency bill denominating device 33 such as a Cummins JetScan™ currency bill denominating device available from Cummins-Allison Corp. of Mt. Prospect, Ill.

Figure 1F:
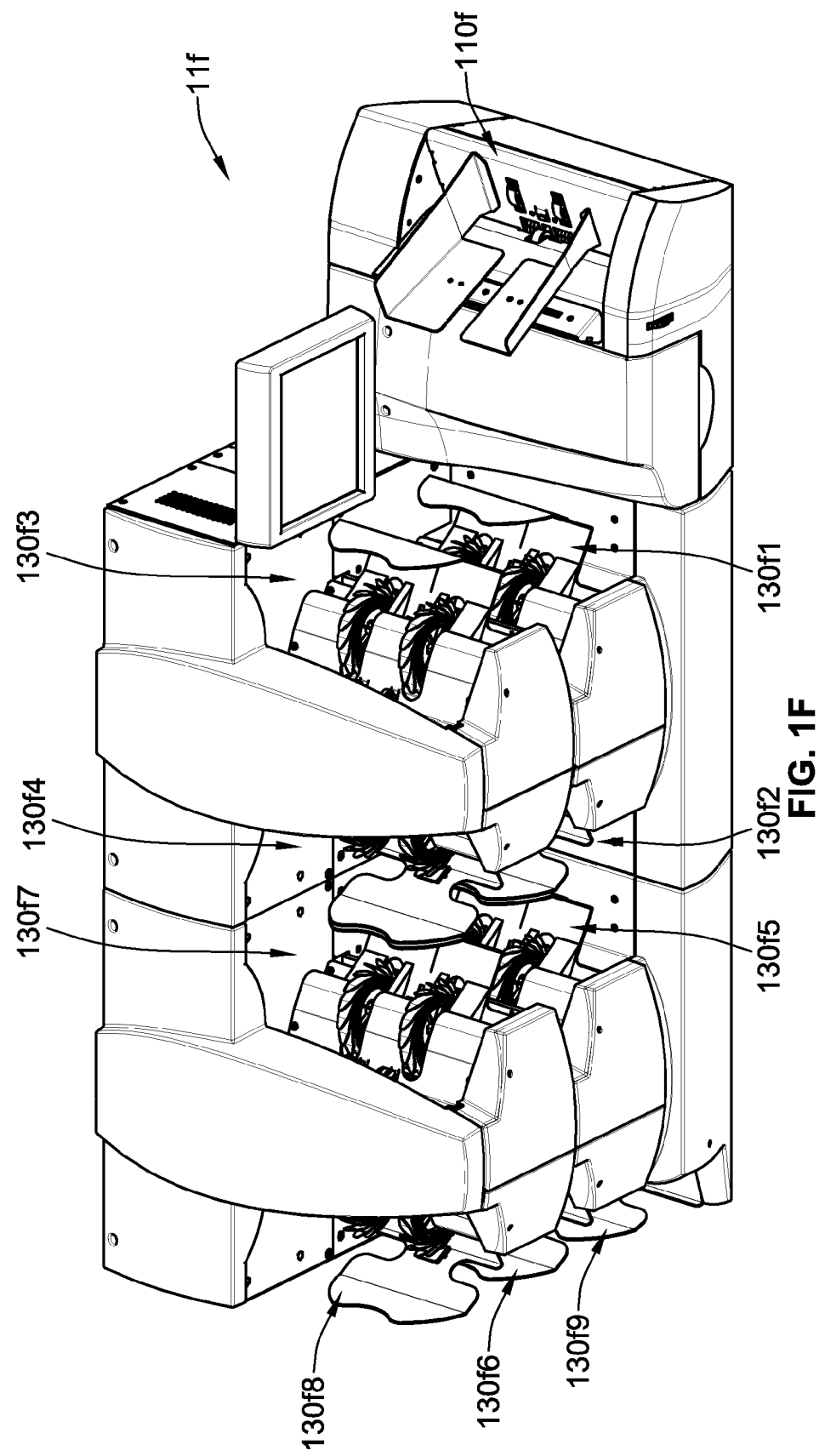
FIG. 1F is a perspective view of a document processing device according to some embodiments of the present disclosure.

FIG. 1F is a front view of multiple output receptacle document processing device 11f having an input receptacle 110f and a plurality of output receptacles 130f1-130f9 and configured to be placed on a desktop or countertop. According to some embodiments, device 11f is a currency bill denominating device 33, document imaging device 44, and/or a document authenticating device. Additionally details about exemplary embodiments of multiple output document processing devices such as illustrated in FIG. 1F can be found in U.S. patent application Ser. No. 13/039,296, filed Mar. 2, 2011, published as U.S. Published Application No. 2011-0215034, which is hereby incorporated by reference herein in its entirety. According to some embodiments, device 11f is a document imaging device 44 such as a Cummins JetScan™ iFX™ imaging device available from Cummins-Allison Corp. of Mt. Prospect, Ill.

Figure 1G:
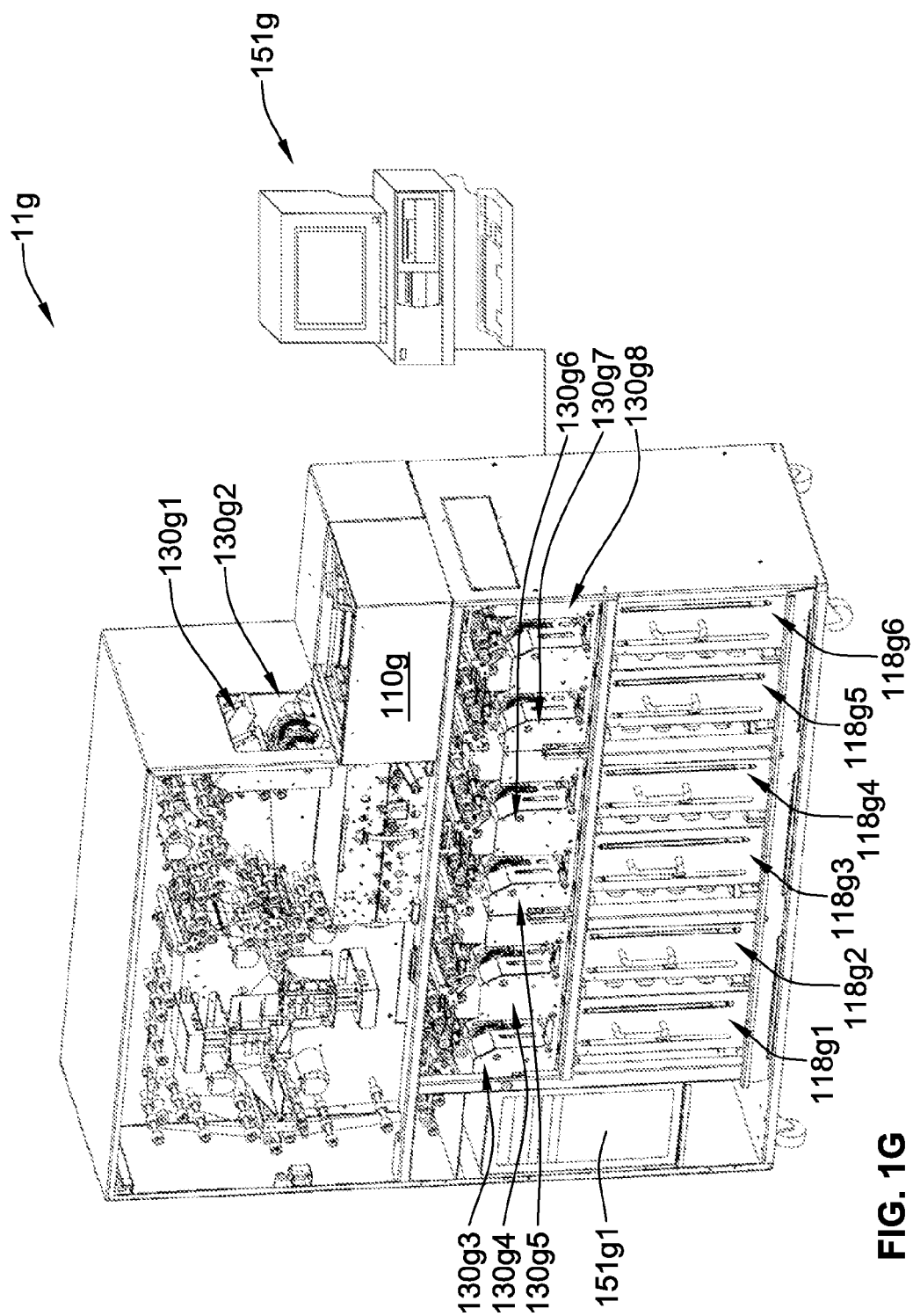
FIG. 1G is a perspective view of a document processing device according to some embodiments of the present disclosure.

Some currency bill or document processing devices and systems are configured to be placed on a floor and yet having sufficient height to be conveniently used by an operator. FIG. 1G is a perspective view of a multiple output receptacle document processing device 11g having a plurality of output receptacles 130g1-130g8 and configured to be rest on a floor (be floor-standing). As illustrated, device 11g comprises an input receptacle 110g. According to some embodiments, device 11g is a currency bill denominating device 33, document imaging device 44, and/or a document authenticating device. Additionally details about exemplary embodiments of multiple output document processing devices such as illustrated in FIG. 1G can be found in U.S. Pat. No. 7,686,151, which is hereby incorporated by reference herein in its entirety. According to some embodiments, device 11g is a currency bill denominating device 33 such as a Cummins JetScan™ MPS 4100 series currency bill denominating device available from Cummins-Allison Corp. of Mt. Prospect, Ill.

Figure 1H:
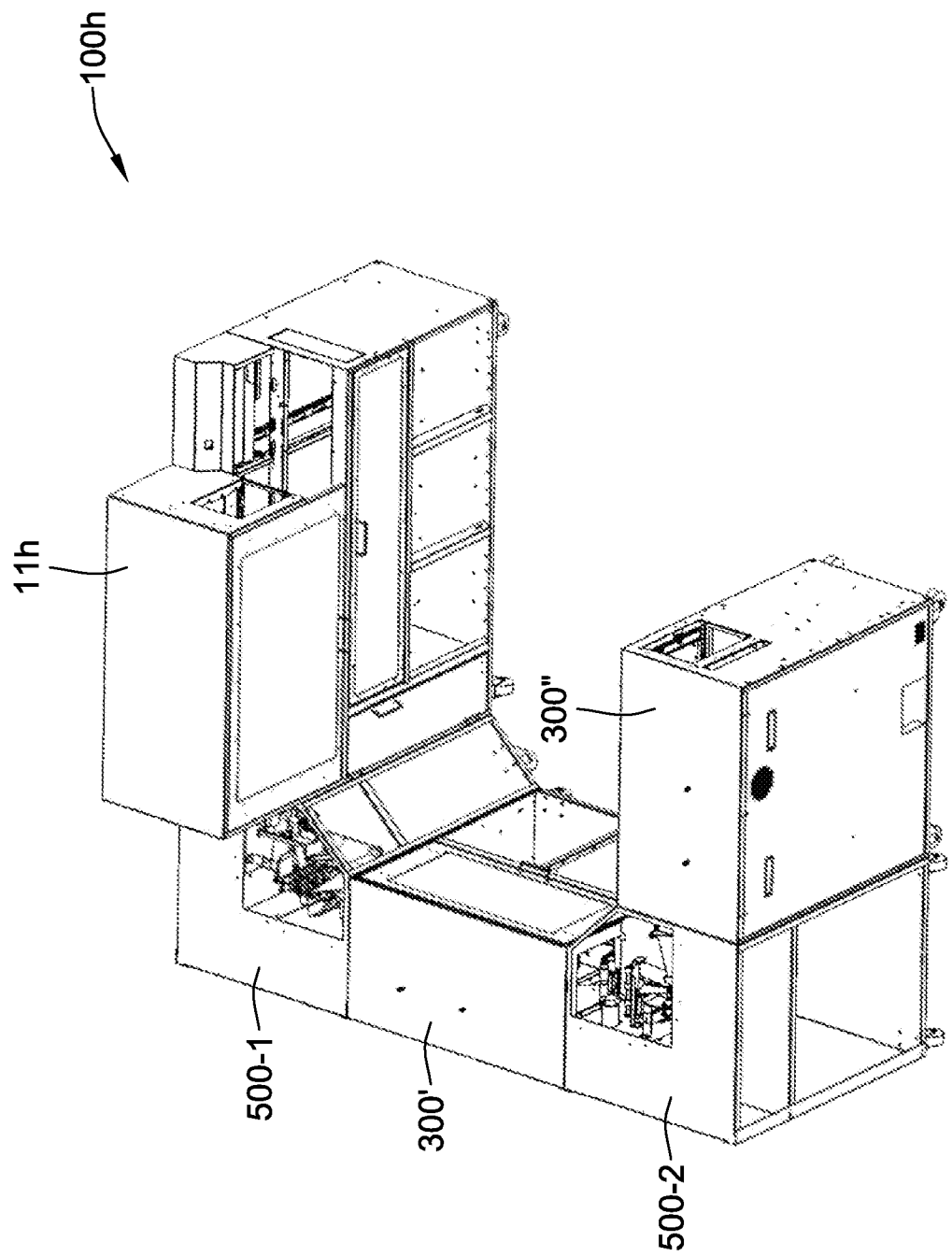
FIG. 1H is a perspective view of a document processing system according to some embodiments of the present disclosure.

FIG. 1H is a perspective view of document processing system 100h configured to be rest on a floor (be floor-standing). The system 100h comprising a multiple output receptacle document processing device 11h having a plurality of output receptacles. According to some embodiment the document processing device 11h is the same as or similar to the device 11g. According to some embodiments, device 11h is a currency bill denominating device 33, document imaging device 44, and/or a document authenticating device. The system 100h further comprises one or more angular transport units 500-1, 500-2, and one or more document receiving units 300', 300". According to some embodiments, the document receiving units 300', 300" are document strapping units such as currency bill strapping units configured to place a strap about a predetermined numbers of documents such as a stack of 100 currency bills. Additionally details about exemplary embodiments of system 100h such as illustrated in FIG. 1H can be found in U.S. Pat. No. 7,686,151, which is hereby incorporated by reference herein in its entirety.

Details of multiple output receptacles and systems/devices (MPS) are described in International Publication No. WO 97/45810 and U.S. Pat. No. 6,311,819, entitled "Method and Apparatus for Document Processing"; U.S. Pat. No. 7,600, 626, entitled "Currency Processing and Strapping Systems and Methods"; U.S. Patent Application No. 2008/0060906 A1, entitled "Currency Processing and Strapping System and Methods"; U.S. Pat. No. 6,860,375, entitled "Multiple Pocket Currency Processing Device and Method"; U.S. Pat. No. 6,588,569, entitled "Currency Handling System Having Multiple Output Receptacles"; U.S. Pat. No. 6,601,687, entitled "Currency Handling System Having Multiple Output Receptacles"; and U.S. Patent Application No. 2008/0006505 A1, entitled "Angled Currency Processing System", each of which is hereby incorporated by reference herein in its entirety. Additional details of imaging multiple output receptacle systems/devices (imaging MPS) are described in U.S. Patent Application No. 2005/0029168 A1, entitled "Currency Processing Device, Method and System" and U.S. Patent Application No. 2005/0183928 A1, entitled "Currency Processing Device, Method and System", each of which is hereby incorporated by reference herein in its entirety. It is contemplated that any of the MPS devices/systems described in the aforementioned patent applications can be modified or otherwise altered to include image scanners, such as, for example, image scanners 140a and/or 140b, for imaging documents as described in reference to FIG. 2 and throughout the present disclosure and otherwise can be modified to operate in the various manners described in the present disclosure.

According to some embodiments, note counters, currency denominating devices, and document imaging devices can be divided into two categories and/or stages of devices: Stage I and/or first stage devices and Stage II and/or second stage devices. In some embodiments, Stage I devices are designed to be used by operators while the devices are resting on desk-tops, table-tops or countertops, whereas Stage II devices are designed to be used by operators while the devices are standing on the floor; however, in some embodiments, Stage II devices can be designed to be used by operators while the devices are resting on desk-tops, table-tops or countertops. Thus, in some embodiments, Stage I devices tend to be smaller and lighter and Stage II devices tend to be larger and heavier. In some embodiments, Stage I devices have three or fewer output receptacles and Stage II devices have six or more output receptacles. In some other embodiments, Stage I devices have six or fewer output receptacles and Stage II devices have six or more (e.g., seven, ten, etc.) output receptacles. According to some embodiments, Stage I devices are incapable of sorting by six or more denominations of currency, whereas Stage II devices are capable of sorting by six or more denominations of currency. Thus, in some such embodiments, Stage II devices can be used as a Stage I device, but a Stage I device cannot be used as a Stage II device.

IV. Generic Document Processing Device

A. Document Imaging Device 44

Figure 2:
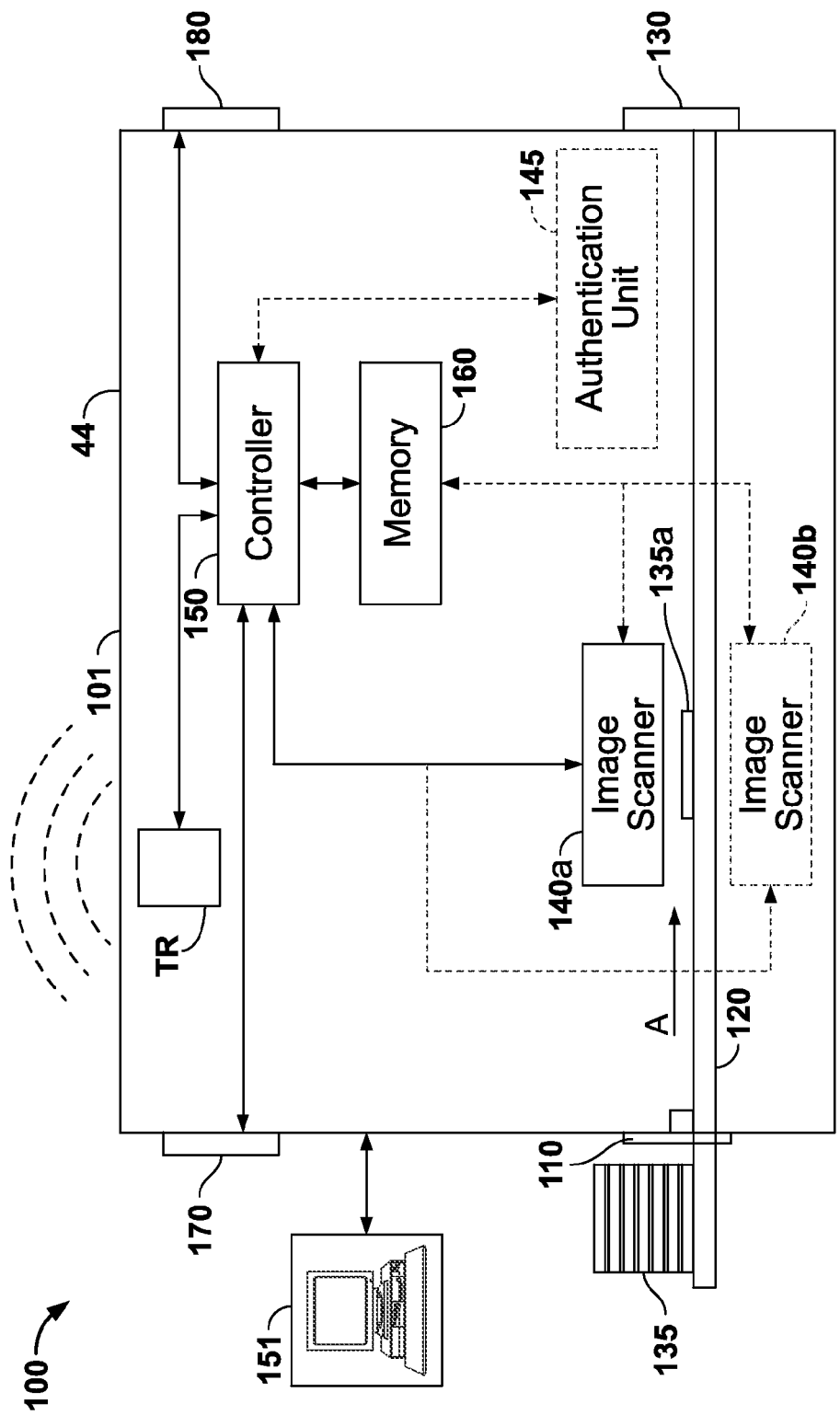
FIG. 2 is a block diagram of a document processing system according to some embodiments of the present disclosure.

Turning now to FIG. 2, a block diagram of a document processing system 100 according to some embodiments of the present disclosure is illustrated. The document processing system 100 is also known as a document scanning system for scanning a plurality of documents. According to some embodiments, as illustrated, the document processing system 100 includes a document processing device 101 communicatively connected to a computer 151 (e.g., a customer computer, a store computer, a bank computer, a financial institution computer, a processor(s) etc.). Alternatively, the document processing system 100 can include a document processing device and a computer and/or a processor in a single housing. According to various embodiments, the document processing system 100 and/or document processing device 101 can take a variety of forms and comprise a variety of number of output receptacles such as described above in conjunction with FIGS. 1A-1H in conjunction with devices 11a-11h. As illustrated, the document processing device 101 is a document imaging device 44 comprising one or more image scanners 140a, 140b (described below) configured to capture the image of one or both sides of a document.

According to some embodiments, the document processing device 101 includes an input receptacle 110, a transport mechanism 120, and an output receptacle 130. Only one input receptacle 110 and one receptacle 130 are shown in FIG. 2 for simplicity. According to other embodiments, however, the document processing device 101 may include a plurality of input receptacles 110 and a plurality of output receptacles 130. For example, according to some embodiments, the document processing device 101 may have two input receptacles 110, one for currency bills and one for checks, or simply to accommodate a greater number of documents. As another example, the document processing device 101 can have a single input receptacle 110 capable of accommodating both sorted batches of documents and intermingled batches of documents including, for example, currency bills and checks, within the input receptacle 110 and one or more output receptacles 130. According to some embodiments, the document processing device 101 can include one or more input receptacles 110 and a plurality of output receptacles 130, such as, for example, an imaging multiple pocket document processing device or an imaging MPS—where an imaging MPS is a multiple pocket document processing device that includes image scanners configured to image documents. According to some embodiments, the document processing device 101 can include one or more input receptacles 110 and a plurality of output receptacles 130, such as, for example, a non-imaging multiple pocket document processing device or a non-imaging MPS—where a non-imaging MPS is a document processing device that does not include image scanners and is not configured to image documents. According to some embodiments, the document processing device 101 is configured to receive a one or more intermingled batches of documents, such as, for example, an intermingled batch of currency bill and checks, in the input receptacle 110 and to process the one or more intermingled batches of documents according to an intermingled-batch mode of operation as described herein in the Definitions Section, and in other sections of the present disclosure. According to other embodiments, the document processing device 101 is configured to receive a sorted batch of documents including currency bills and checks in the input receptacle 110 and to process the currency bills and the checks according to a sorted-group mode of operation or an ordered-batch mode of operation as described herein in the Definitions Section, and in other sections of the present disclosure.

According to some embodiments, an operator inserts a plurality of documents 135 into the input receptacle 110. According to some embodiments, the document processing device 101 is configured to receive only one document at a time. According to other embodiments, the document processing device 101 is configured to receive a stack of documents in the input receptacle 110. The transport mechanism 120 is coupled to the input receptacle 110 and is configured to transport the plurality of documents 135, one at a time, along a transport path in the direction of arrow A, through the document processing device 101, past one or more image scanner(s) 140*a* and/or 140*b*, and to one or more output receptacles 130. By "one at a time" it is meant that the documents are transported serially in a non-overlapping fashion along the transport path. That is, according to some embodiments, multiple ones of the documents 135 can be transported serially by the transport mechanism 120 simultaneously. According to some embodiments, each of the documents 135 is removed from the input receptacle 110 one at a time by the transport mechanism 120, and transported along the transport path in the direction of arrow A in a serial non-overlapping fashion such that each document can be individually imaged using the one or more image scanner(s) 140*a* and/or 140*b*. According to some embodiments, the documents 135 are transported continuously past the one or more image scanner(s) 140*a* and/or 140*b* without stopping the documents to image the documents. According to some embodiments, the transport mechanism 120 is configured to stop transportation of documents such that the documents are located in a variety of positions along the transport path. For example, according to some embodiments, the transport mechanism 120 is configured to halt transportation of documents such that desired documents are located upstream from, downstream from, and/or under the image scanner(s) (e.g., image scanners 140*a* and/or 140*b*).

According to some embodiments, the document processing device 101 includes a single image scanner 140*a* to image one or both sides of each passing document. According to other embodiments, the document processing device 101 includes a first image scanner 140*a* to image a first side of each passing document and a second scanner 140*b* to image a second opposing side of each respective passing document. The second image scanner 140*b* is positioned on an opposing side of the transport path as compared with the position of the first image scanner 140*a*. According to some embodiments, the second image scanner 140*b* is opposite or off-set up or downstream from the first image scanner 140*a*. According to some embodiments, the imaging of both sides of currency bills enables the device 101 to denominate bills and/or extract a serial number from image data associated with bills regardless of the orientation of the currency bill during transportation and/or imaging (e.g., face up/down, forward/reverse). Additional details of image sensors are described in U.S. patent application Ser. No. 12/553,296, entitled "Optical Imaging Sensor For A Document Processing Device", which is hereby incorporated by reference herein in its entirety.

According to some embodiments, the input receptacle 110 is configured to receive the plurality of documents 135 with a wide edge or a longer edge of the plurality of documents 135 being initially fed into the document processing device 101. That is, according to some embodiments, the wide edge of the plurality of documents 135 is perpendicular to the direction of document transport (e.g., the direction of arrow A) along the transport path. According to some embodiments, transporting the plurality of documents 135 with the wide edge leading can increase the overall processing speed of the document processing device 101 such as, for example, as described in the Document Processing Speed Section of U.S. Pat. No. 8,162,125, which is hereby incorporated by reference herein in its entirety. According to some embodiments, the input receptacle 110 includes two slidable guides that are adjustable such that the input receptacle 110 can receive the plurality of documents 135 with the wide edge leading or a narrow edge or shorter edge of the plurality of documents leading. That is, according to some embodiments, the narrow edge of the plurality of documents 135 is perpendicular to the direction of document transport (e.g., the direction of arrow A) along the transport path.

According to some embodiments, for currency bills transported in a wide edge lead manner having a narrow dimension of about 2.6 inches, the transport mechanism 120 is configured to transport the currency bills from the input receptacle with about a 2.6 inch gap between the bills at a 50% duty cycle at about 5200 inches per minute, or about 87 inches per second. According to some such embodiments, for a feed inefficiency of about 13 percent, the transport mechanism is configured to transport the currency bills at about 100 inches per second.

According to some embodiments, the document processing device 100 is configured to denominate currency bills independent of the currency bill's orientation in the input receptacle 110 of the device 101 (e.g., forward/backward, face up/down, shifted left/right). According to some such embodiments, the device 101 is configured to denominate bills from image data associated with the bills. According to some embodiments, the image data is reproducible as visually readable images of at least a portion of the bills, yet according to other embodiments, the image data is down-sampled to non-visually readable images for denomination purposes. According to some embodiments, the device 101 can denominate bills in a forward and/or reverse manner. That is, according to some embodiments, the device 101 can denominate a bill regardless of whether the bill is fed in a top-edge leading manner or a bottom-edge leading manner as the bill is transported along the transport path. According to some embodiments, a forward/reverse algorithm is executed on the image data to denominate the associated bill. It is contemplated that the forward/reverse algorithm can be executed on raw image data and/or down-sampled image data.

It is contemplated that the device 101 can process a variety of different sized documents in a single stack of documents, such as, for example, the device 101 can denominate a stack of documents that includes U.S. bills and Euros. According to some embodiments, in the absence of input receptacle guides to align currency bills therein prior to being transported, bills can be shifted left and/or right. It is contemplated that the device 101 is configured to denominate such shifted bills by cropping appropriate portions of generated image data.

According to some embodiments, the device 101 is configured to detect a leading edge of each bill and/or to detect a trailing edge of each bill. According to some embodiments, the document processing device and/or systems of the present disclosure execute a leading/trailing edge detection algorithm to determine a location of the leading and/or trailing edges. By detecting both the leading edge of a bill (and/or leading edge of print or fine line on a bill) and/or a trailing edge (and/or trailing edge of print or fine line on a bill), the device is able to denominate bills that have one distorted edge and/or distorted fine line (such as the fine line found on some U.S. bills). According to some embodiments, the device 101 is configured to determine a leading edge and/or a trailing edge of image data that is reproducible as a visually readable image associated with a bill by taking several readings along the lead edge and/or trailing edge. According to some embodiments, in response to determining the lead edge and/or the trailing edge, the device 101 determines the appropriate area(s) on the image data from the determined lead and/or trailing edge to sample/crop to accurately denominate the bill. According to some embodiments, such edge detection techniques are referred to as leading/trailing edge detection.

According to some embodiments, a controller or processor 150 is coupled to the image scanner(s) 140*a* and/or 140*b*, the transport mechanism 120, a memory 160, an operator interface or control panel 170, and a communications port or network device 180. The controller 150 is configured to control the operation of the transport mechanism 120 and the image scanner(s) 140a and/or 140b. The controller 150 is also configured to communicate information to and from the memory 160, the control panel 170, and the communications port 180. For example, the controller 150 may send information to and receive operator input from the control panel 170. The control panel 170 can be configured to display information regarding the documents 135 and/or status information concerning the operation of the document processing system 100. For example, according to some embodiments, the control panel 170 is configured to display an image or a partial image (e.g., snippet image) of a document of concern, such as a currency bill that may be identified as a possible counterfeit currency bill (e.g., a suspect currency bill). According to some embodiments, the controller 150 is one or more computers. According to some embodiments, the controller 150 can replace the computer 151 such that the document processing system 100 only includes the document processing device 101 configured to perform the same operations as the document processing system 100. In these embodiments, the controller 150 can include a plurality of memory devices (e.g., RAM, ROM, Hard Drive, etc.), processor(s), etc. necessary to perform a plurality of document processing operations within the document processing device 101. Some examples of document processing operations, which are described in detail below, include, but are not limited to, facing (front/back), orienting (forward/reverse), cropping, de-skewing, compressing, down-sampling, denominating (forward/reverse), extracting, comparing, determining, storing, transmitting, etc.

According to some embodiments, the operator can initiate document processing via use of the control panel 170. According to some embodiments, the operator can initiate document processing via use of the computer 151. According to some embodiments, the control panel 170 is a full graphics color touch screen display with various soft touch keys used to operate the document processing system 100. Alternatively or additionally, the control panel 170 may contain physical keys or buttons and/or another type of display such as an LED display. For example, a QWERTY keyboard and/or a ten key numerical keypad may be utilized. According to some embodiments, the control panel 170 displays soft keys or touch keys when appropriate. According to some embodiments, the control panel 170 is integrated within a single housing of the document processing device 101. Alternatively, the control panel 170 can be remotely positioned from the document processing device 101, but communicatively connected therewith via a wired connection (e.g., electronic, optical, other direct connection), a wireless connection, a Bluetooth connection, a WI-FI connection, etc. For example, according to some embodiments, the control panel 170 is a component of the computer 151. For another example, the document processing system 100 is located at a first financial institution branch location and a control panel 170 is located at a second financial institution headquarter location. According to some embodiments, the control panel 170 is a Sharp® display such as a 4.3 inch touchscreen display unit manufactured by Sharp® Corporation.

In response to the operator initiating document processing, the transport mechanism 120 transports the plurality of documents in the direction of arrow A in a non-overlapping serial fashion, one at a time, one after the other. As one of the plurality of documents 135a is transported, a record and/or a data file associated with the document 135a is generated using, for example, the image scanner(s) 140a and/or 140b and/or controller 150. According to some embodiments, the image scanner(s) 140a and/or 140b generate the record. Yet, according to other embodiments, the image scanner(s) 140a and/or 140b generate data used by the document processing system 100 to generate the records. Exemplary data records and data files are discussed in more detail below in connection with records 300a-300b of FIG. 8A-8B and data file 301 of FIG. 8E and in U.S. Pat. No. 8,162,125, entitled "Apparatus and System for Imaging Currency Bills and Financial Documents and Method for Using The Same," which is hereby incorporated by reference herein in its entirety. According to some embodiments, the record at least includes image data that is reproducible as a visually readable image or a human readable image of substantially the entire document 135a (a "full image") and/or of selected portions of the document 135a (a "snippet image"). In some embodiments, the record can include a full image, one or more snippet images, or a combination thereof. According to some embodiments, a visually readable and/or human readable image is defined based on a number of dots or pixels per inch ("DPI") that form the image. For purposes of the present disclosure, a visually readable image is an image having a resolution of at least 50 DPI×50 DPI—that is, the image includes 2500 dots or pixels per square inch. According to some embodiments, the visually readable image is formed with a resolution of at least 100 DPI×100 DPI. According to some embodiments, the visually readable image is formed with a resolution of at least 200 DPI×100 DPI. According to some embodiments, the visually readable image is formed with a resolution of at least 200 DPI×200 DPI. As the DPI increase, the amount of data generated by the image scanner(s) 140a and/or 140b increases, which may be a factor in causing relatively slower processing speeds in some embodiments. According to some embodiments, the resolution of an image is defined as P DPI X Q DPI, where P is the resolution in the x-direction or the direction perpendicular to the direction of document transport (e.g., perpendicular to the direction of arrow A), and Q is the resolution in the y-direction or the direction parallel to the direction of transport (e.g., the direction of arrow A).

According to some embodiments, the image scanner(s) 140a and/or 140b, the controller 150, and/or the memory 160 includes data extraction software such as optical character recognition (OCR) software for identifying characters contained in one or more fields of the image data and/or the visually readable images of the plurality of documents 135 and extracting the characters as extracted data. It is contemplated that according to some embodiments, other software can be used to extract character or symbol information from the image data and/or the visually readable images. According to some embodiments, the document processing system 100 uses the OCR software to obtain or extract identifying information from each of the visually readable images. For example, the OCR software may implement a search of image data that is reproducible as a visually readable image of a currency bill for a serial number data field and extract a serial number of the currency bill once the data field is located. According to some embodiments, the OCR software can obtain or extract both serial numbers in a visually readable image of a currency bill regardless of the face orientation of the currency bill during transportation via the transport mechanism 120. The OCR or other software can be implemented to extract a variety of other types of information, such as, for example, transactional information. Exemplary data extraction software such as OCR software is described in more detail below in the Optical Character Recognition Section, and in U.S. Pat. No. 8,162,125, and in other sections of the present disclosure.

According to some embodiments, the visually readable image is formed with a resolution of 300 DPI×200 DPI, 300

DPI×300 DPI, 400 DPI×200 DPI, or 400 DPI×400 DPI. Such elevated resolutions can be desirable when using OCR software to extract relatively small characters from an image. For example, when trying to extract small characters on a currency bill, such as, for example, back plate numbers, check letter and quadrant numbers, check letter and face plate numbers, etc., the image scanner(s) 140a and/or 140b can be configured to generate image data that is reproducible as visually readable images having elevated resolutions (e.g., 400 DPI×200 DPI).

Figure 8A:
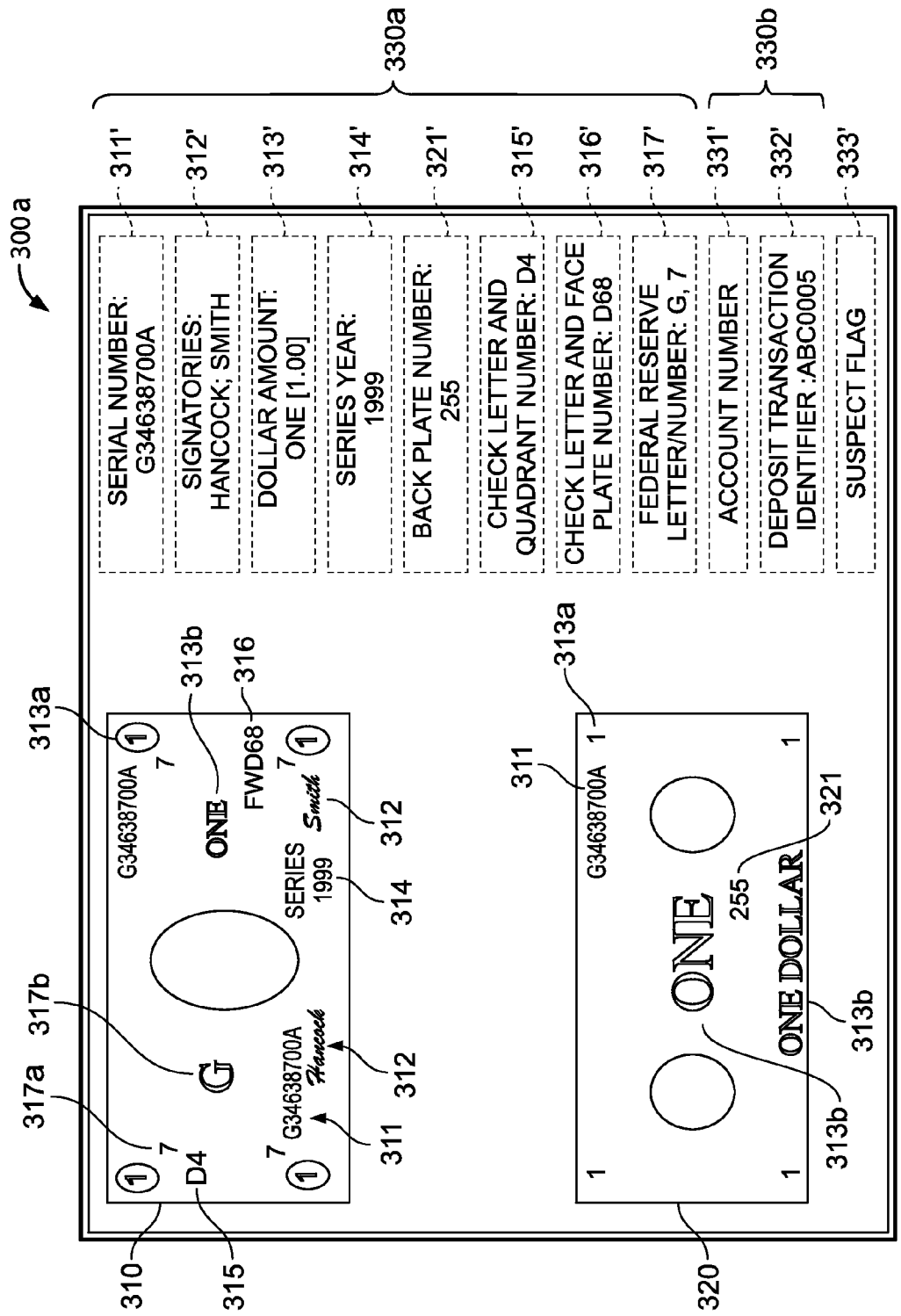
FIG. 8A is a representation for a record for a currency bill according to some embodiments of the present disclosure.
Figure 8B:
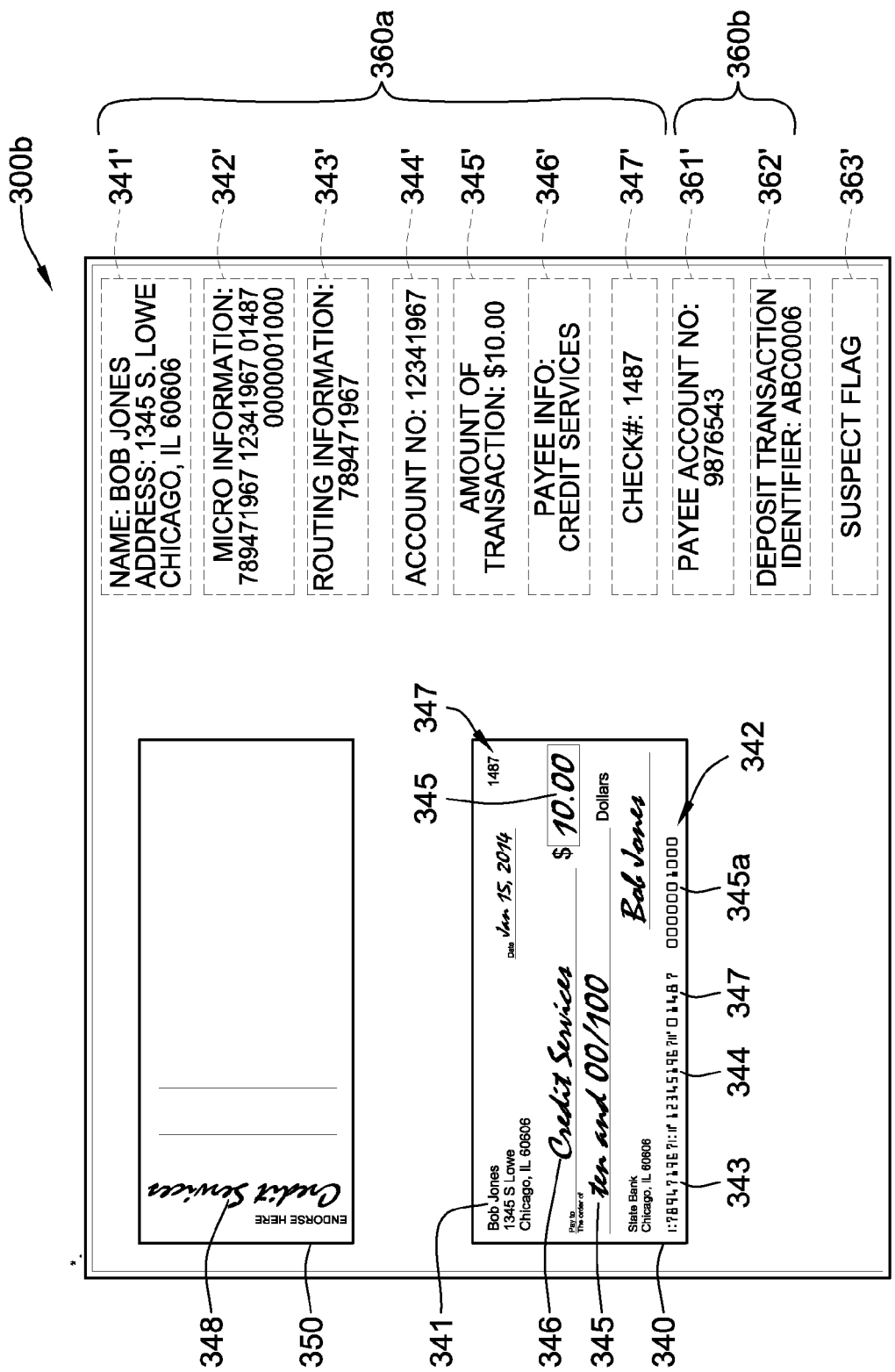
FIG. 8B is a representation for a record of a check according to some embodiments of the present disclosure.

According to some embodiments, the extracted data can be tagged to the record in one or more data fields (e.g., data fields 330a, 360a of FIGS. 8A-8B). The term "tag" or "tagging" generally refers to the document processing system 100 associating alphanumeric characters or symbols with a record and/or a data file or with image data that is reproducible as a visually readable image in a record and/or a data file. For example, the record can include the identifying information extracted from the visually readable image. If the document 135a is a currency bill, the identifying information can include a serial number, a denomination, a type of note, a federal reserve letter/number, a series, a check letter and quadrant number, a check letter and face plate number, a back plate number, or combinations thereof. If the document 135a is a check, the identifying information can include a checking account number, a routing and transit number, a check number, a check amount, a drawer name, a drawer address, a payee name, or combinations thereof. If the document is a deposit slip, the identifying information can include a customer financial account number, a total deposit amount, a total currency bill deposit amount, a number of deposited currency bills broken down by denomination, a total check deposit amount, a number of deposited checks broken down by on-us checks and transit checks, a total on-us check deposit amount, a total transit check deposit amount, or combinations thereof.

According to some embodiments, the data tagged to the record includes transactional information such as, for example, a transaction identifier number, a customer name or customer identification number, a teller name or identification number, an employee identification number, a bank account number, a store or customer number, a batch number, a subbatch number, a batch start time, a batch end time, a subbatch start time, a subbatch end time, a device identifier, or any combination thereof. The transactional information can be obtained based on operator input directly or indirectly into the document processing system 100. According to some embodiments, the operator inputs the transactional information into the document processing device 101 using the control panel 170. In these embodiments, the manually entered transactional information is automatically associated with the visually readable images generated using the image scanner(s) 140a and/or 140b and/or the records for each of the subsequently processed documents 135 associated with the same transactional information. For example, the employee identification number associated with an employee or operator of the document processing system 100 can be automatically tagged to all records generated while the employee operates the document processing system 100.

According to some embodiments, the transaction information (e.g., transaction identifier number, batch number, subbatch number, bank account number, etc.) is obtained and/or extracted from a header card and/or a trailer card. In some such embodiments, prior to inserting the stack of documents 135 into the input receptacle 110, the operator puts a header card and/or a trailer card onto the stack of documents 135, or otherwise associates the header/trailer card with the plurality of documents 135. According to some embodiments, a batch of documents associated with a deposit transaction will already have a header and/or trailer card included in the batch of documents, such as when the header and/or trailer card is added to the batch of documents at the time the batch of documents is prepared for deposit prior to being transported to a bank. According to some embodiments, the header/trailer card includes indicia representing the transactional information. For example, the header/trailer card can be a barcoded ticket including a barcode indicia that encodes a bank account number of a customer associated with the documents 135. In response to initiating the document processing, the document processing device 101, via the image scanner(s) 140a and/or 140b, scans the header/trailer card and accompanying stack of documents 135 to generate a data file including a record for the header/trailer card and a record for each of the documents 135. According to some embodiments, the record of the header/trailer card includes a visually readable image of the header/trailer card and the records of the documents 135 include respective visually readable images. The document processing system 100 is configured to use software to decode the generated image of the barcode indicia to extract the transaction information. According to some embodiments, the extracted transactional information can be automatically associated with the records of the documents 135 within the data file. According to some embodiments, the document processing system 100 includes a barcode scanner to scan and decode the barcode indicia as is commonly known in the art and the document processing system 100 associates data obtained from the barcode scanner with the appropriate records. According to some embodiments, missing or incomplete transactional information can be corrected or entered in the same, or similar, manner as the identifying information described in the Modes of Operation—Flagging Section of U.S. Pat. No. 8,162,125, which is hereby incorporated by reference herein in its entirety, and in other sections of the present disclosure.

Details of barcode scanners are described in U.S. Patent Publication No. 2002-0020603, entitled "System and Method for Processing Currency Bills and Substitute Currency Media in a Single Device", which is hereby incorporated by reference herein in its entirety. Details of header/trailer cards are described in U.S. Pat. No. 7,016,767, entitled "System and Method for Processing Currency and Identification Cards in a Document Processing Device" and in U.S. Pat. No. 7,146,245, entitled "System and Method for Processing Currency and Identification Cards in a Document Processing Device", each of which is hereby incorporated by reference herein in its entirety.

According to other such embodiments, prior to inserting the stack of documents 135 into the input receptacle 110, the operator and/or a customer preparing a batch of documents for deposit puts a deposit slip onto the stack of documents 135, or otherwise associates the deposit slip with the plurality of documents 135. According to some embodiments, the deposit slip includes a MICR encoded customer financial account number and one or more handwritten totals (e.g., total declared deposit, total currency bill deposit, total check deposit, etc.). According to other embodiments, the deposit slip is machine generated and/or printed to include a customer financial account number and one or more printed totals (e.g., total declared deposit, total currency bill deposit, total check deposit, etc.). According to some embodiments, a customer making a deposit transaction includes the deposit slip with the documents being deposited. The deposit slip is a summary of the documents being deposited. As discussed above, the deposit slip can include transaction information such as, for example, a customer financial account number, a total deposit amount, a total currency bill deposit amount, a number of deposited currency bills broken down by denomination, a total check deposit amount, a number of deposited checks broken down by on-us checks and transit checks, a total on-us check deposit amount, and a total transit check deposit amount. According to some embodiments, in response to initiating the document processing, the document processing device 101, via the image scanner(s) 140a and/or 140b, images the deposit slip and accompanying stack of documents 135 to generate a data file including a record for the deposit slip and a record for each of the documents 135. According to some embodiments, the record of the deposit slip includes image data that is reproducible as a visually readable image of the deposit slip and the records of the documents 135 include image data that is reproducible as respective visually readable images. The document processing system 100 is configured to use OCR or other software (e.g., CAR/LAR software, handwriting extraction software, etc.) to extract some or all of the transaction information on the generated image of the deposit slip. According to some embodiments, the extracted transactional information can be automatically associated with the records of the documents 135 within the data file. According to some alternative embodiments, the document processing system 100 includes a MICR reader to read the MICR encoded customer financial account number from the deposit slip.

According to some embodiments, the device 101 and/or system 100 is configured to perform a check cashing transaction such as in a bank or other financial institution. For example, a bank customer enters a bank with a deposit slip and 5 checks having a total value of $3000.00. The customer desires to deposit the $3000.00 of checks and to withdraw $1000.00 of the $3000.00 deposit. According to some embodiments, a bank teller places the deposit slip and checks into the input receptacle of the device 101 and images the documents to generate a data file associated with the deposit transaction, similar to the data files described in the Document Records and Data Files Section of U.S. Pat. No. 8,162,125, which is hereby incorporated by reference herein in its entirety, and in connection with FIG. 8E described herein, and in other sections of the present disclosure. According to some embodiments, the device 101 is configured to generate a cash-out ticket associated with the $1000.00 being withdrawn. According to other embodiments, the teller and/or the customer manually fills out a cash-out ticket. According to some embodiments, the manually generated cash-out ticket is imaged along with the other documents. According to some embodiments, the data file includes a record for each check, the deposit slip, and the cash-out ticket. The data file can be transmitted or otherwise made available to an item processing system, such as the item processing system described in the Electronic Portion of Deposit Transaction Section of U.S. Pat. No. 8,162,125, which is hereby incorporated by reference herein in its entirety, and in other sections of the present disclosure, to further processing the check cashing transaction, such as, for example, to update an account of the customer to reflect the deposit/withdrawal, to proof the checks, and/or to clear the checks.

Referring back to FIG. 2, according to some embodiments, the memory 160 is configured to store and/or buffer the record associated with the document 135a and/or other records associated with other documents for the same deposit transaction. According to some embodiments, the memory 160 is configured to store and/or buffer a record including a full image of the processed document 135a or other information from the processed documents (e.g., data associated with a picture or visually readable image of the document 135a). According to some embodiments, the memory 160 is configured to only store and/or buffer a record including a visually readable image of a portion of the document 135a. For example, for a particular application it may be that the memory 160 only needs to store an image of half of the document 135a or a snippet image of the document 135a. According to some embodiments, the memory 160 is configured to store and/or buffer the extracted data, such as, for example, the identifying information and/or the transactional information associated with one or more batches of processed documents, such as, for example, serial numbers, denominations, checking account numbers, routing numbers, bank account numbers, batch/deposit identification numbers, etc.

According to some embodiments, the document processing system 100 is configured to store and/or buffer a plurality of records associated with a single deposit transaction of a plurality of documents. In some such embodiments, in response to the document processing system 100 generating a record for each of the plurality of documents, the document processing system 100 generates a data file that includes the plurality of stored and/or buffered records. The data file can include a plurality of additional information, such as, for example, an financial institution account number, a transaction identifier, a customer name, address, phone number, a total deposit amount, a total currency bill deposit amount, a number of deposited currency bills broken down by denomination, a total check deposit amount, a number of deposited checks broken down by on-us checks and transit checks, a total on-us check deposit amount, and a total transit check deposit amount. According to some embodiments, the data file can be transmitted from the document processing system 100 to a financial institution for a credit based on the total deposit amount associated with the deposit transaction. Further details on transmitting a data file for a credit is described in U.S. Pat. No. 8,162,125, which is hereby incorporated by reference herein in its entirety, and herein in reference to FIGS. 9A-9B and other sections of the present disclosure. According to some embodiments, the memory 160 is configured to store a database or a suspect database. Additional details about embodiments employing one or more databases can be found in U.S. Pat. No. 8,162,125, which is hereby incorporated by reference herein in its entirety.

According to some embodiments, the document processing device 101 includes an authentication sensor or authentication unit 145. Yet according to other embodiments, the document processing device 101 does not include an authentication sensor 145. In some such embodiments, the lack of the authentication sensor 145 reduces the overall weight, size, and cost of the document processing device 101. Authentication can be accomplished using the authentication sensor 145 and/or by using a database of serial numbers for known or suspected counterfeit currency bills and a database of checking account numbers for known or suspected checks associated with fraudulent activity. The authentication sensor 145 is optionally positioned adjacent to the transport path in a similar fashion as the image scanner(s) 140a and/or 140b. The authentication sensor 145 is configured to authenticate the documents 135 based on one or more criteria and/or authentication tests as is commonly known in the art. Some examples of authentication sensors and authentication tests are described in U.S. Pat. No. 5,640,463, issued on Jun. 17, 1997, entitled "Method and Apparatus For Authenticating Documents Including Currency"; U.S. Pat. No. 5,790,693, issued on Aug. 4, 1998, entitled "Currency Discriminator and Authenticator"; U.S. Pat. No. 5,992,601, issued on Nov. 30, 1999, entitled "Method and Apparatus for Document Identification and Authentication"; and U.S. Pat. No. 5,960,103, issued on Sep. 28, 1999, entitled "Method and Apparatus for Authenticating Currency"; each of which is hereby incorporated by reference herein in its entirety.

Additional details about embodiments including one or more authentication sensors, databases, or techniques can be found in, for example, U.S. Pat. No. 8,162,125, which is hereby incorporated by reference herein in its entirety.

As described above, according to some embodiments, the controller 150 is configured to communicate information to and from the communications port 180. The communications port 180 is configured to be communicatively connected to a network (e.g., Internet, private network, customer network, financial institution network, LAN, WAN, secured network, etc.) to permit information to be transmitted to and from the document processing device 101. For example, according to some embodiments, the document processing device 101 comprises an Ethernet card comprising the communications port 180 that is communicatively connected to the network (e.g., the customer network). It is contemplated that according to some embodiments, the document processing device 101 includes two or more communications ports 180 to increase the flow and/or transfer of data to and from the document processing device 101. As described above, the controller 150 can transmit a data file including a plurality of records associated with a deposit transaction from the document processing device 101. According to some embodiments, the data file is communicated via the communications port 180 from the document processing device 101 over a customer network to the customer computer 151. According to some embodiments, the data files are communicated from the document processing device 101 and/or the customer computer 151 over the network to a financial institution system associated with a customer financial institution account. According to some embodiments, the financial institution is configured to apply a provisional credit to the customer financial institution account based on information in the data file.

As described below in the Deposit Transaction Section and/or the Electronic Portion of Electronic Transaction Section of U.S. Pat. No. 8,162,125, which is hereby incorporated by reference herein in its entirety, and in other sections of the present disclosure, according to some embodiments, the financial institution is configured to apply a provisional credit for a complete deposit or a percentage of the deposit, such as, for example, the provisional credit can be given for 80% or 90% of a deposit. According to some embodiments, the financial institution is configured to apply a final credit for all of or a percentage of a deposit. According to some embodiments, the transmitted data file may include information relating to a plurality of documents including a deposit slip, currency bills, checks, identifying information, and transactional information.

According to some embodiments, the document processing device 101 and/or system 100 can provide an operator a receipt and/or a printed record providing details of a transaction such as copies of the imaged documents and/or portions thereof, such as copies of image snippets. The record can also include identifying information for the transaction such as operator information, processing device information, unique transaction identifiers, etc. The record can be printed by a printer integral with and/or communicatively connected to the document processing device 101 and/or system 100. Alternatively, the receipt can be sent electronically such as by an e-mail or an entry into a log. According to some embodiments, the operator can download and/or upload records to a printer. It is contemplated that the records can be stored in a memory of the printer and/or printed upon receipt of the records in memory and/or at a later time.

According to some embodiments, an operator of a document processing device and/or system can print a deposit transaction receipt for a bank customer/depositor that includes visually readable images of all documents or a portion of the documents included in the deposit. For example, for a bank customer that deposits five $20 bills and three checks, the deposit transaction receipt can include images of each of the five $20 bills, images of each of the three checks, or any combination thereof. According to some embodiments, a deposit transaction receipt only includes images of checks included in a deposit. According to some embodiments, a deposit transaction receipt only includes images of currency bills included in a deposit. According to some embodiments, a deposit transaction receipt includes images of checks included in a deposit and currency bill denominations for currency bills included in the deposit. According to some embodiments, a deposit transaction receipt includes images of checks included in a deposit and currency bill denominations and serial numbers for currency bills included in the deposit.

It is contemplated that according to some embodiments, a bank keeps a receipt or internal record in electronic form and/or printed form for each transaction. The receipts can be printed and kept in a printed journal and/or electronically stored in a memory of the device and/or system, and/or in a memory communicatively connected thereto.

According to some embodiments, printing a deposit transaction receipt for each bank customer allows the bank to terminate the physical document paper trail for checks at the point of interacting with the bank customer and taking/recording the deposit as the receipt provides the bank customer with instant proof of deposit and the bank can further process and/or proof the checks via the electronic images of the checks. That is, the bank can destroy the deposited checks because the bank can process the checks via image data that is reproducible as a visually readable image of the checks and the bank customer has a printed receipt including a visually readable image of at least a portion of the checks.

For example, after receiving one or more checks for deposit from a customer, according to some embodiments, the bank physically destroys (e.g., shreds) the checks after they have been processed and imaged by the document processing device 101 and/or system 100. According to some embodiments, the checks are destroyed at the point of deposit after they have been processed and imaged by the document processing device 101 and/or system 100. For example, according to some embodiments, the document processing device 101 and/or system 100 is coupled to a document destruction device such as a shredder or granulator and checks are automatically routed to the document destruction device after each check has been properly imaged and/or after the deposit transaction involving the checks has been accepted by the customer and/or operator of the document processing device 101 and/or system 100.

According to some embodiments, the document processing system 100 and/or device 101 is configured to process casino cashout tickets bearing one or more respective barcodes thereon. According to such embodiments, the device 101 is configured to operate in an imaging mode and/or a casino ticket mode to image tickets and create a record for each ticket processed. The records can include a variety of information and or images, such as, for example, an image or snippet image of the ticket, an extracted barcode number, a time of processing, a teller identifier, a casino identifier, etc. Additional details on imaging and/or processing casino tickets can be found in U.S. Patent Application No. 2009/0087076 A1, entitled "System and Method For Processing Currency Bills and Tickets".

B. Optical Character Recognition

As described herein, the document processing devices and systems of the present disclosure are configured to process documents. According to some embodiments, processing documents includes imaging the documents to produce image data that is reproducible as a visually readable image of at least a portion of each document—that is, a visually readable image is reproducible from or using image data. According to some embodiments, the document processing devices and systems are further configured to run or execute one or more OCR algorithms to extract one or more sets of characters from the image data for one or more documents.

According to some embodiments, the document processing device 11, 101 such as, for example, device 11b, executes an OCR algorithm to extract a serial number from image data associated with a currency bill and/or MICR data from image data associated with a check processed by the document processing device 11. According to some embodiments, the OCR algorithms of the present disclosure are run or executed on-board of the document processing device in real-time. That is, the document processing device extracts characters from image data as documents are being processed using on-board processor(s) and/or controller(s). The document processing device can execute the OCR algorithms to extract data from a stack of documents at a variety of document processing speeds, such as, for example, those speeds described herein and in the Document Processing Speed Section of U.S. Pat. No. 8,162,125, which is hereby incorporated by reference herein in its entirety. Additional details about embodiments employing OCR can be found in U.S. Pat. No. 8,162,125, which is hereby incorporated by reference herein in its entirety.

C. Communication

According to some embodiments, document processing devices 11, 101 such as currency bill denominating devices 33 and document imaging devices 44 (DIDs) (e.g., Cummins® JetScan™ iFX™ devices) are configured to communicate with other devices. According to some embodiments, communication is established between and/or among document processing devices 11, 101 such as DIDs and other devices via a hard-wired or physical connection (e.g., an Ethernet connection), a wireless connection, and/or some combination thereof. According to some embodiments, communication is established between and/or among document processing devices 11, 101 such as DIDs with wireless devices (WDs) such as personal digital assistants (PDAs) such as cell phones including Smartphones such as Apple® iPhones® and Motorola® Droids, tablets such as Apple® iPads®, laptop computers, or other devices. According to some embodiments, DIDs comprise or are communicatively coupled to a communications port 180, a wireless communicator TR such as a transceiver, or other device configured to permit communication to and/or from WDs to, for example, exchange information such as deposit transaction data such as electronic deposit slip data. According to some such embodiments, such wirelessly coupled devices may be used to control the document processing device 11, 101 such as DIDs 44 and/or otherwise interact with the document processing devices 11, 101, DIDs 44. According to some embodiments, the wireless communication is established via a radio frequency link, infrared link, or other link. According to some embodiments, the wireless communication is limited to short range links such as via Bluetooth or Wi-Fi. For example, the document processing devices 11, 101, DIDs 44a and/or WDs may form and/or communicate over one or more wireless local area networks (WLAN) and/or wireless personal area networks (WPAN).

Accordingly, in some embodiments such WDs (including, for example, an iPhone® or iPad®) form an integral part of a document processing device 11, 101, DID 44 and may, for example, be integrated into the document processing device 11, 101, DID 44 or housed within the housing of a document processing device 11, 101, DID 44 or coupled to the housing of a document processing device 11, 101, DID 44. Alternately, in some embodiments, such WDs are not integral to or physically coupled to a document processing device 11, 101, DID 44.

According to some embodiments the WDs are configured to and used to command and control one or more document processing devices 11, 101, DIDs 44. Alternately or additionally, a document processing device 11, 101, DID 44 can retain its own hardware and software for controlling its operation. According to embodiments in which a document processing device 11, 101, DID 44 retains its own hardware and/or software to control its operation, a WD and the document processing device 11, 101, DID 44 are configured to enable the WD to send and/or receive information from the document processing device 11, 101, DID 44.

These integrated wireless systems can be an open system (e.g., without security, without a password, without encryption, etc.) or a closed system (e.g., with security, with a password, with encryption, etc.) to add security.

According to some embodiments, a document processing device 11, 101, DID 44 and/or a document processing device 11, 101, DID 44 via a WD is configured to received and be responsive to voice commands and/or via physical control inputs such as via a keypad, mouse, physical buttons, touch screen, etc.

According to various embodiments, WDs in combination with document processing devices 11, 101, DIDs 44 are used at various locations such as, for example, where one or more document processing devices 11, 101, DIDs 44 are located at one or more bank teller areas or in cash vaults.

According to various embodiments, the WDs are communicatively coupled with document processing devices 11, 101, DIDs 44 comprising a single output receptacle (e.g. 11a, 11b of FIGS. 1A, 1B), two output receptacles (e.g. 11ca of FIG. 1CA, 11cb of FIG. 1CB), or three or more output receptacles (e.g., 11d-11h of FIGS. 11D-11H). According to some such embodiments, the document processing devices 11, 101, DIDs 44 comprise a dedicated reject output receptacle.

V. Exemplary Document Containers

A. Bags [B]

Figure 3A:
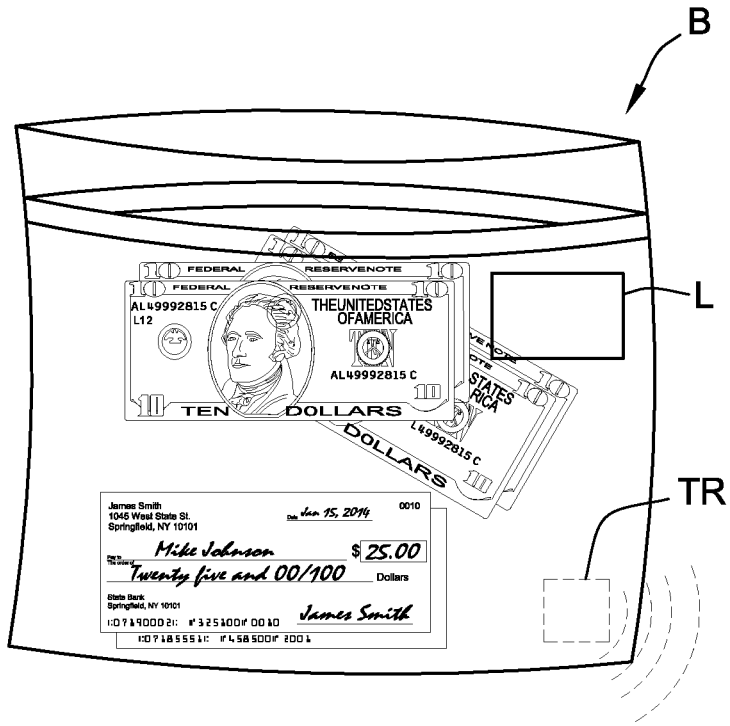
FIG. 3A is a perspective view of a document bag according to some embodiments of the present disclosure.

According to some embodiments, currency bills, currency documents, checks, deposit transaction documents, and/or financial documents are placed in a variety of containers. For example, such documents are sometimes placed into bags such a bag B illustrated in FIG. 3A. According to some embodiments the bags B are clear and are sealed with tamper-proof or tamper-evident seals after being filled with documents. According to some embodiments, the bag B has a label L affixed thereto. According to some embodiments, the bag B has a wireless communication device TR affixed or coupled thereto or inserted therein. For example, the wireless communication device TR according to some embodiments is an RFID tag, a Bluetooth device, a cellular device, etc.

B. Trays [T]

Figure 3B:
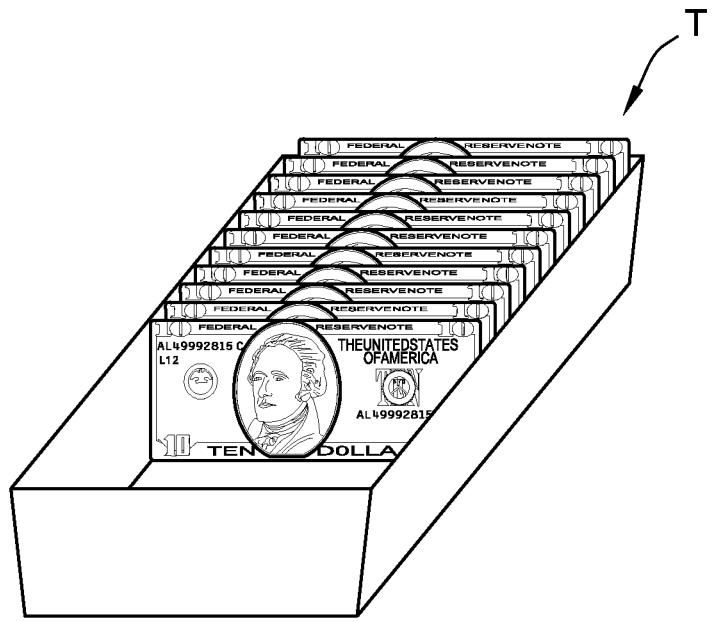
FIG. 3B is a perspective view of a document tray according to some embodiments of the present disclosure.

FIG. 3B is a perspective view of a document tray T configured to hold one more of types of documents such as currency bills, substitute currency media, header and/or trailer cards, deposit slips, and/or checks. According to some embodiments, the tray T has a wireless communication device TR (not shown) affixed or coupled thereto or inserted therein such as described above in connection with FIG. 3A (e.g., RFID tag, Bluetooth device, etc.). In some embodiments, in vaults the trays have a cover that can be put on top of the tray and can be locked. The cover can be hinged to the tray T or separate from the tray T (e.g., like a lid on a shoebox). The lid (not shown) can aid in preventing someone from tampering with the contents of the tray T (e.g., currency bills, etc.), and further can make multiple ones of the trays easier to stack.

C. Cassette [CS] and Mini-Safe [SF]

1. Cassettes

Figure 4B:
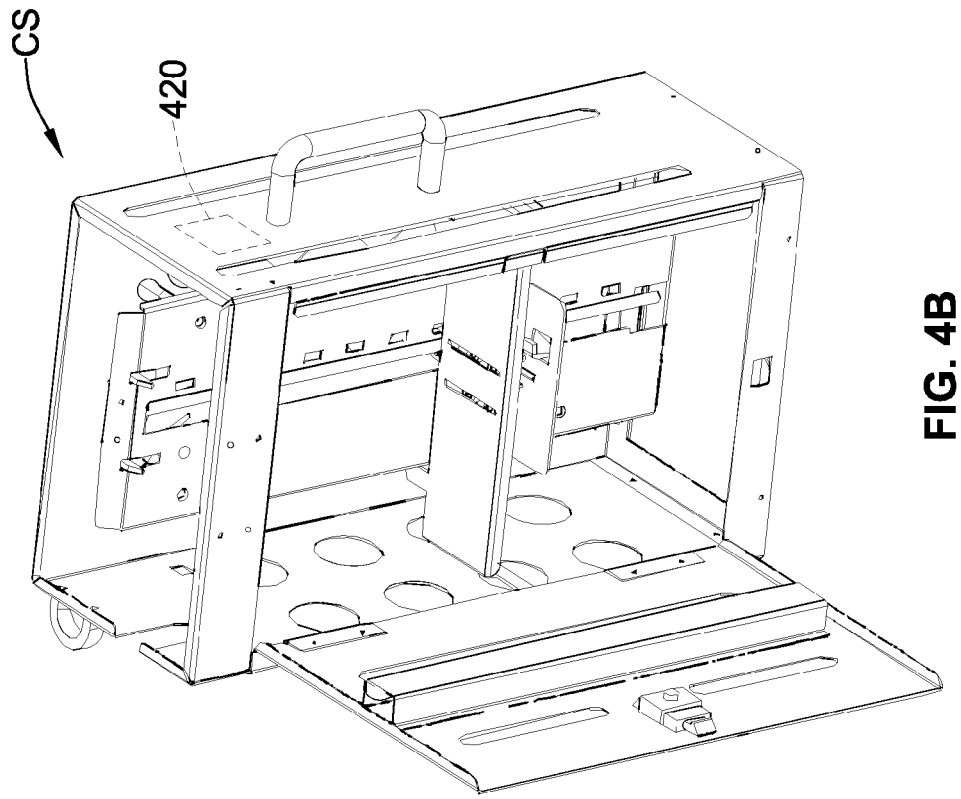
FIGS. 4A and 4B are perspective views of document cassette according to some embodiments of the present disclosure.
Figure 4A:
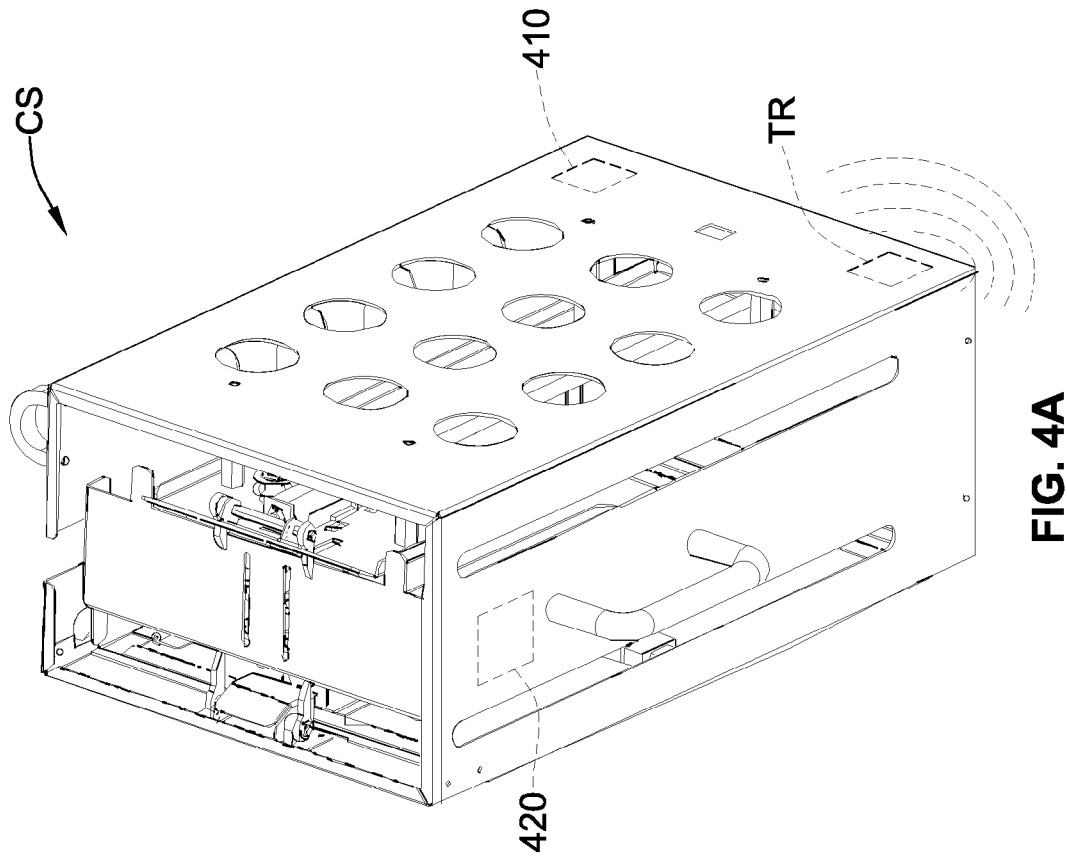

FIG. 4A illustrates a perspective view of a closed document cassette CS and FIG. 4B illustrates a perspective view of an open document cassette CS. According to various embodiments, cassettes CS are configured to hold various types of documents such as, for example, currency bills, checks, deposit slips, debit and credit memos, substitute currency media, header and/or trailer cards, etc. More details about exemplary cassettes are described in U.S. Pat. No. 6,398,000, which is hereby incorporated by references in its entirety. As illustrated in FIG. 1G, according to some embodiments, document processing devices 11 are configured to store processed documents in one or more cassettes 118g1-118g6. According to some embodiments, the cassette CS has a wireless communication device TR affixed or coupled thereto or inserted therein such as described above in connection with FIG. 3A. According to some embodiments, the cassette CS includes a memory and/or processor 410 and/or an interface 420 such as a display and/or input device. According to some embodiments, the wireless communication device TR, the memory, the processor 410, and/or the interface 420 are communicatively coupled to each other.

2. Mini-Safe

Figure 4C:
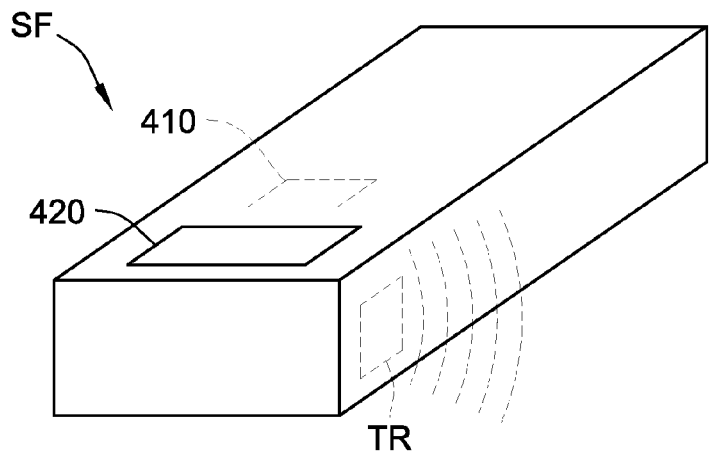
FIG. 4C is a perspective view of a document mini-safe according to some embodiments of the present disclosure.

FIG. 4C illustrates a perspective view of a portable mini-safe SF. According to various embodiments, mini-safes SF are configured to hold various types of documents such as, for example, currency bills, checks (e.g., personal checks, commercial checks, etc.), deposit slips, debit and credit memos, substitute currency media, header and/or trailer cards. For example, according to some embodiments, mini-safes SF are sized and configured to store U.S. currency bills and other documents having the size of the U.S. currency bills such as some personal checks, some deposit slips, some debit and credit memos, some header and/or trailer cards, some substitute currency media, etc. The mini-safes SF are constructed to be lockable and constructed of strong material (such as metal and/or tamperproof plastic) that inhibits unauthorized access into and removal of the documents locked inside. Thus, mini-safes are secure document containers. According to some embodiments, the mini-safes comprise a memory and/or processor 410 and/or an interface 420 such as a display and/or input device. According to some embodiments, the mini-safe SF has a wireless communication device TR affixed or coupled thereto or inserted therein such as described above in connection with FIG. 3A. According to some embodiments, the wireless communication device TR, the memory, the processor 410, and/or interface 420 are communicatively coupled to each other.

According to some embodiments, the mini-safes are configured to fold flat when no documents are contained therein.

According to some embodiments, the mini-safes have a height of about 5 inches, a width of about 7.75 inches, and a length of about 15 inches. According to some such embodiments, the mini-safes have a document capacity to hold about 2,300 documents (e.g., 2,300 U.S. currency bills). According to some embodiments, the mini-safes have a height of about 4.5 inches, a width of about 8.5 inches, and a length of about 16.25 inches. According to some such embodiments, the mini-safes have a document capacity to hold about 2,700 documents (e.g., 2,700 U.S. currency bills). According to some embodiments, the mini-safes have a height of about 5.25 inches, a width of about 8.5 inches, and a length of about 13.5 inches. According to some such embodiments, the mini-safes have a document capacity to hold about 2,000 documents (e.g., 2,000 U.S. currency bills). According to some embodiments, the mini-safes have a height of about 5 inches, a width of about 8.75 inches, and a length of about 20 inches. According to some such embodiments, the mini-safes have a document capacity to hold about 3,000 documents (e.g., 3,000 U.S. currency bills). According to some embodiments, the mini-safes have a height of about 3.5 inches, a width of about 7.75 inches, and a length of about 6 inches. According to some such embodiments, the mini-safes have a document capacity to hold about 900 documents (e.g., 900 U.S. currency bills). According to some embodiments, the mini-safes have a height of about 7.5 inches, a width of about 4 inches, and a length of about 6.5 inches. According to some such embodiments, the mini-safes have a document capacity to hold about 500 documents (e.g., 500 U.S. currency bills). According to some embodiments, the mini-safes have a height, a width, and a length such that the mini-safes have a document capacity to hold between about 25 documents (e.g., 25 commercial checks) and about 3000 documents (e.g., 25 commercial checks).

3. Smart/Dumb Container Description

Containers such as mini-safes and cassettes comprising memory(ies) and/or processor(s) are "smart" containers (e.g., "smart" mini-safes and "smart" cassettes) whereas containers such as mini-safes and cassettes lacking a memory and/or processor(s) are said to be "dumb." According to some embodiments, the memories of smart mini-safes and cassettes store information about the documents contained in the mini-safe or cassette and/or a transaction such as a deposit transaction associated with those documents (e.g., document records and/or data files as discussed in connection with FIGS. 8A-8E and/or Electronic Deposit Slip (EDS) information as discussed in connection with FIGS. 10B-10E) and/or a container ID. According to some embodiments, smart containers keep an electronic record of exactly what is inventoried inside the container, e.g., a full denomination count of single or mixed currency bills and how many bills of each denomination are in the container, and/or breakdown information of checks in the container.

4. Ways of Communication Between Devices 11 and Smart Cassettes/Safes

According to some embodiments, smart automated mini-safes SFs and cassettes CSs are configured such that when they are coupled to a document processing device 11, the document processing device 11 and a mini-safe SF/cassette CS are communicatively coupled to each other such that information contained in a memory of the device 11 may be stored in a memory in the mini-safe SF or cassette CS and/or information in a memory of the mini-safe or cassette may be transferred to the device 11 and stored in a memory of the device 11. Similarly, according to some embodiments, smart lockable trays T can be configured such that when they are coupled to a document processing device 11, the document processing device 11 and the tray T are communicatively coupled to each other such that information contained in a memory of the device 11 may be stored in a memory in the tray T and/or information in a memory of the tray T may be transferred to the device 11 and stored in a memory of the device 11. According to some embodiments, the communication coupling is achieved via a physical electrical connection between a mini-safe SF or cassette CS and a device 11. According to some embodiments, a wired or physical communication channel is established between a smart automated container and a device 11 configured to be coupled with the smart container via a dock or port of the device such as dock or port 54/55 described below. Some examples of couplers for establishing a physical, hard-wired connection between a container and a device 11 is the use USB connectors and an RJ-45 connector and, for example, an Ethernet cable. Alternatively, or additionally, according to some embodiments, the communication coupling is achieved via a wireless connection between a mini-safe SF or cassette CS and a device 11 such as via a Bluetooth connection, Wi-Fi connection, etc. According to such embodiments, the device 11 and the mini-safe or cassette comprise wireless connection components such as a transmitter and/or receiver. According to some embodiments, wireless communication is established between a smart container and device 11, a device port or dock 54/55, a PDA such as cell phones including Smartphones such as Apple® iPhones® and Motorola® Droids, tablets such as Apple® iPads®, laptop computers, a LAN, a WAN, the Internet, or some other network. For example, according to some embodiments, wireless communication is established between a smart container and device 11, a PDA or tablet being held by or associated with an operator of a device 11 which is to receive or has received the smart container.

5. Secure Containers

As will be described, according to some embodiments, containers such as cassettes CS and mini-safes SF are secure and may be treated like small vaults that may be transported among different locations such as, for example, from a retail store to a bank, an armored carrier, or elsewhere. Further, certain trays T can be configured to be treated like a vault (e.g., when the tray includes a locking/lockable lid).

6. Secure Communication

As described above and further below, smart containers such as smart cassettes have memory which may store a variety of information about the contents of a cassette, its source, its destination, account information such as, e.g., a bank account number into which funds in a smart container are to be deposited. According to some embodiments, the memory in a smart container stores information including the total or individual value or amount of checks stored in the container, images (e.g., full images and/or snippet images) of checks, bills, and/or other documents in a container, totals and/or breakdown information of currency bills stored in a container, the serial numbers of bills stored in a container, data related to and/or extracted from images of documents in a container, etc. Such data may be confidential and/or sensitive information relative to a particular customer of a bank or armored carrier. According to some embodiments, the smart container, the device 11, network, system etc. is/are configured to prevent or inhibit unauthorized access to such information, e.g., the information may not simply be downloaded by anyone who would have access to the smart container.

Therefore, according to some embodiments, some or all of the data in a memory of a smart container is protected against unauthorized access such as via encryption, password protection, physical security features such as requiring the use of a physical key to enable access to the contents of a memory in a smart container, etc. For example, methods for protection of data could include a requirement for the entry a password before access in permitted to a memory in a smart container and/or to data/files stored in that memory (e.g., a password to access the memory and/or unlock or decrypt stored data). For example, in some embodiments, only authorized personnel with an appropriate password could place information into the memory of a smart container and/or extract such information from the memory of a smart container. According to some embodiments, the device 11, the container, and/or a remote device communicatively coupled to the device and/or container, etc. has an interface configured to request and/or accept the entry of a password (e.g., via a keyboard, touchscreen, microphone (e.g., voice recognition), biometric interface (e.g., fingerprint scanner; voice recognition interface; retina, iris, cornea scanner, etc.). According to some embodiments, the password or key to gain access to and/or decrypt data in a smart container is key swipe or ID card which would be recognized such as via, a magnetic reader, RFID interface, etc. According to some embodiments, a code or key is resident on a wireless device (WD) such as a smartphone. For example, according to some embodiments, the cell phone or other device of an authorized user with an encryption key or code is read or recognized by the smart container (e.g., a processor of the smart container), the device 11, and/or another device communicatively coupled to the smart container (e.g., via a LAN, Bluetooth, Wi-Fi, etc.).

According to various embodiments, authorized persons may include authorized bank personnel, authorized depositor (e.g., retailer) personnel, authorized armored carrier personnel, and/or other users of the smart containers. According to some embodiments, multiple levels of access are utilized, e.g., some authorized personnel are permitted to access only some of the data whereas other authorized personnel are permitted to access all of the data.

VI. Input/Output Container Docks

As mentioned above in the Definitions section, "automated document containers" are document containers configured to be coupled to a document processing device 11 and permit one or more types of documents to be automatically withdrawn or dispensed from (e.g., input or dispensing containers) or inserted or received into (e.g., output or receiving containers) or both (e.g., re-cycle type containers). Automated document containers (smart and dumb) or containers may include, for example, trays, cassettes (smart and dumb), and mini-safes (smart and dumb).

Figure 5A:
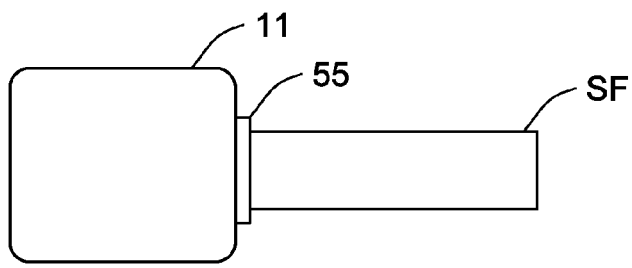
FIGS. 5A-5D are block representations of document processing devices having one or more input/output container docks according to some embodiments of the present disclosure.
Figure 5B:
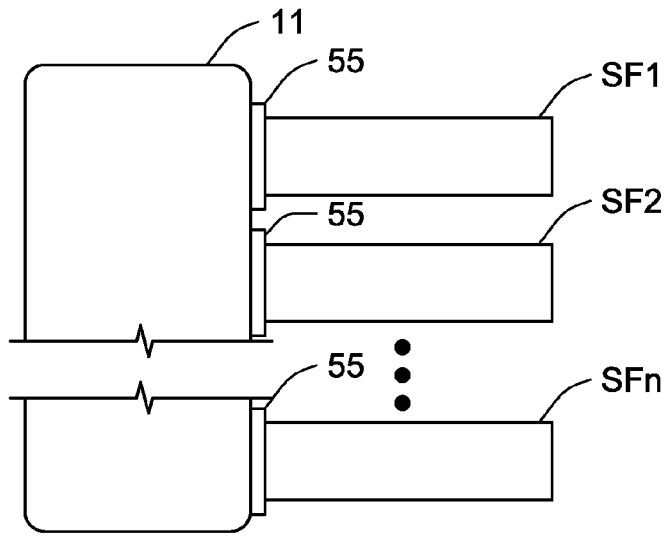

FIGS. 5A and 5B illustrate block representations of document processing devices 11 (such as note counters 22, denominating devices 33, and document imaging devices 44 such as, for example, devices 11a-11h described above) configured to receive and be releasably coupled to one mini-safe SF (FIG. 5A) or a plurality of mini-safes SF1-SFn (FIG. 5B). According to some embodiments each device 11 has one or more output container docks 55 configured to permit a mini-safe SF to be releasably coupled to the device 11. According to some embodiments, a device 11 is provided with one or more output container docks 55 configured to permit one or more cassettes CS to be releasably coupled to the device 11. The cassettes can be secured cassettes and/or unsecured cassettes with the ability to feed documents or without the ability to feed documents (e.g., the documents are manually removed from the cassette). In operation, a device 11 is configured to store some or all of the documents processed by the device 11 in one or more mini-safes SF and/or cassettes coupled thereto via an output container dock. According to some embodiments, ATMs, recyclers, merchant teller machines, and/or other devices are configured to receive and be releasably coupled to cassettes CS and/or mini-safes SF and to store documents in such cassettes and/or mini-safes. As the containers in FIGS. 5A and 5B are configured to be coupled to devices 11 and to permit one or more types of documents processed by a device 11 to be automatically inserted or received therein receive documents, they are output or receiving containers and/or re-cycle type containers.

Figure 5C:
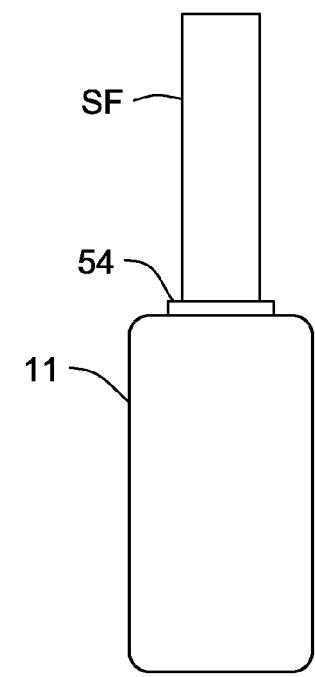

FIG. 5C illustrates a document processing device 11 having an input container dock 54 configured to permit a minisafe SF or cassette CS to be releasably coupled to an input region of the device such that documents in a mini-safe SF or cassette CS may be drawn out of a container coupled to the device via input container dock 54 and processed by the device 11. As the container in FIG. 5C is configured to be coupled to devices 11 and to dispense and/or to permit one or more types of documents to be automatically withdrawn therefrom, it is an input or dispensing container and/or re-cycle type container.

Figure 5D:
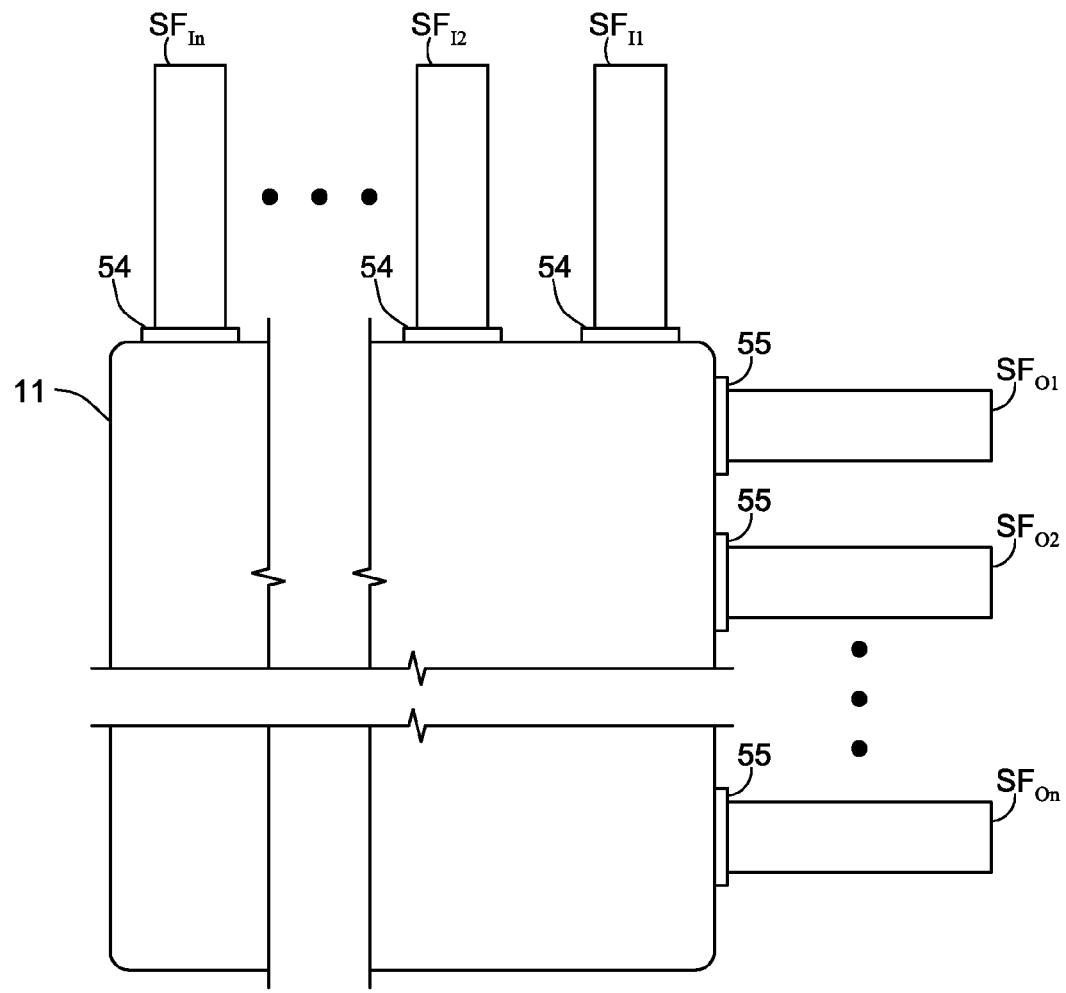

FIG. 5D illustrates a block representations of a document processing device 11 (such as note counters 22, denominating devices 33, and document imaging devices 44 such as, for example, devices 11a-11h described above) configured to receive and be releasably coupled to one or more input containers (e.g., mini-safes $SF_{I1}$-$SF_{In}$) and/or one or more output containers (e.g., mini-safes $SF_{O1}$-$SF_{On}$).

According to some embodiments, each device 11 has one or more input container docks 54 configured to permit an input automated document container (e.g., a mini-safe SF, a cassette CS, etc.) to be releasably coupled to the device 11. As such, documents in the input automated document container (coupled to one of the input container docks 54) may be drawn out of the input automated document container in an automated fashion and processed (e.g., imaged, denominated, authenticated, etc.) by the device 11.

According to some embodiments each device 11 has one or more output container docks 55 configured to permit an output automated document container (e.g., a mini-safe SF, a cassette CS, etc.) to be releasably coupled to the device 11. As such, documents processed by the device 11 may be deposited into the output automated document container (coupled to one of the output container docks 55) in an automated fashion.

According to some embodiments, containers (such as cassettes CS and mini-safes SF) are configured to only allow documents to be automatically stacked therein. Such receiving containers do not permit a device coupled thereto to automatically extract documents contained in such containers. Rather, such containers must be opened (such as by using a key to unlock the container) and the documents therein need to be manually removed. Conversely, according to some embodiments, containers (such as cassettes CS and minisafes SF) are configured to only allow documents to be automatically removed or dispensed therefrom. Such dispensing containers do not permit a device coupled thereto to automatically insert or stack documents into such containers. Rather, such containers must be opened (such as by using a key to unlock the container) and documents need to be manually inserted therein. Finally, according to some embodiments, containers (such as cassettes CS and mini-safes SF) are configured to allow documents to be automatically stacked therein and to be automatically removed therefrom. Such re-cycle type containers do permit a device coupled thereto to automatically insert or stack documents into such containers and to automatically extract documents contained in such containers. Such re-cycle type containers (such as cassettes CS and mini-safes SF) may be used in re-cycle type machines, e.g., bill recyclers or recycle-type ATMs which both accept deposits of currency bills and dispense currency bills including dispensing bills in a second dispensing transaction to a second customer that were previously received in the device during a first deposit transaction from a first customer. According to some embodiments, a recycle-type container is employed to receive documents from a first device 11 (e.g., 11-11 in FIG. 11) and then is decoupled from the first device and coupled to a second device (e.g., 11-13b in FIG. 13A) and documents in the container are received into the second device for processing and/or vice versa.

According to some embodiments, the devices 11 in FIGS. 5A-5C are note counters 22, currency bill denominating devices 33, or document imaging devices 44 such as, for example, the devices described above in connection with FIGS. 1A-1H and 2 and/or an ATM such as ATM#1 or recyclers (e.g., RC-1, RC-2) such as those described in connection with FIG. 14 or devices similar thereto.

According to some embodiments, the input containers (e.g., input automated document containers) and the output containers (e.g., output automated document containers) are substantially identical. According to some embodiments, the input containers (e.g., input automated document containers) and the output containers (e.g., output automated document containers) are identical. According to some embodiments, the input containers (e.g., input automated document containers) and the output containers (e.g., output automated document containers) are different.

According to some embodiments, the input/output containers are configured to be coupled to the input/output container ports of a document processing device 11 such that a housing of the input/output containers extends from the document processing device 11 with a portion of the housing of the input/output container protruding from a housing of the document processing device. In some such embodiments, a majority of the housing of the input/output container protrudes from the housing of the document processing device 11. In some other embodiments, at least about twenty percent of the housing of the input/output container protrudes from the housing of the document processing device 11. In some other embodiments, at least about eighty percent of the housing of the input/output container protrudes from the housing of the document processing device 11.

VII. Document Processing Vault Systems

Figure 6C:
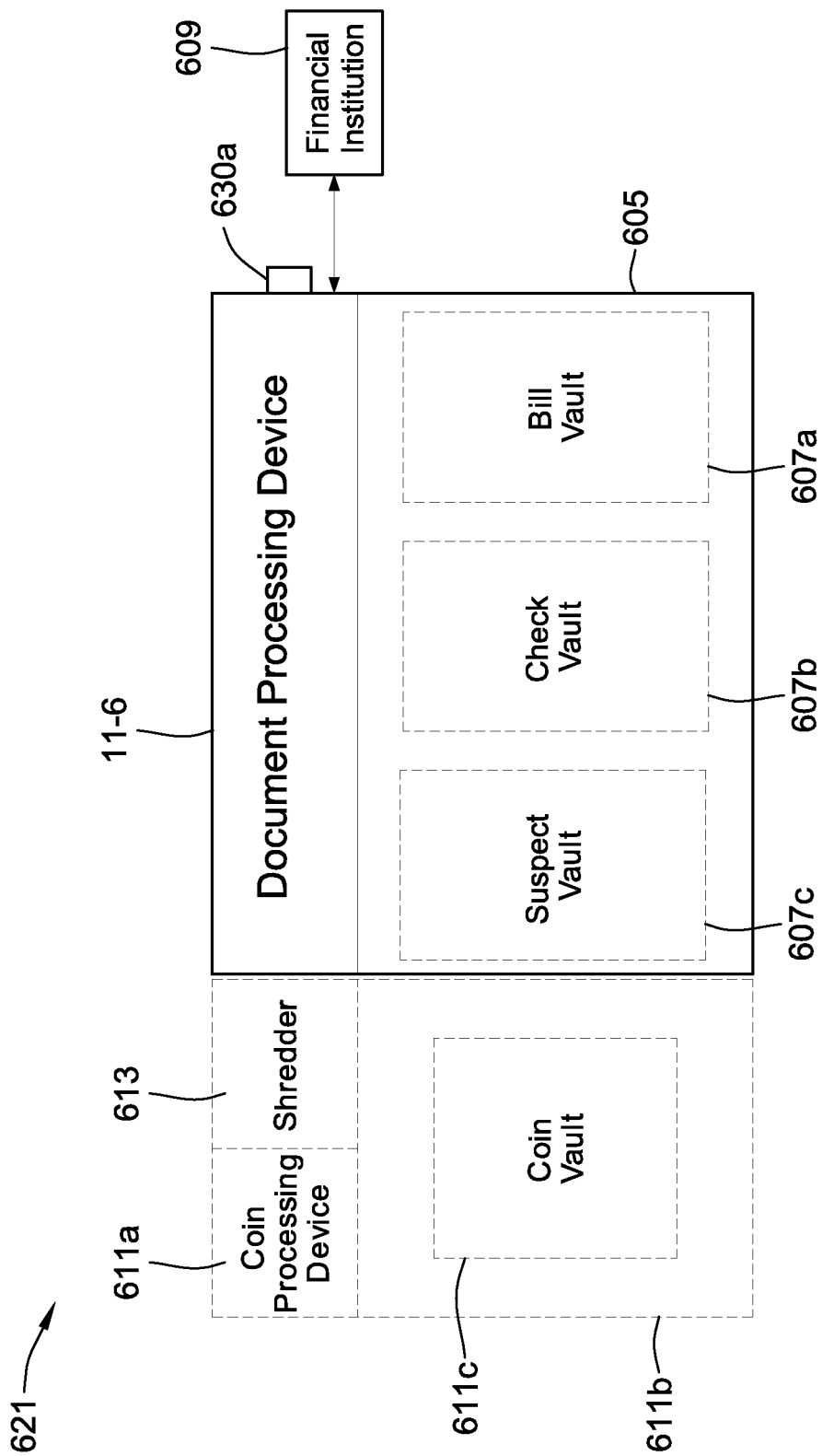
FIG. 6C is a block diagram of a document processing vault system according to some embodiments of the present disclosure.

Referring to FIG. 6A, a perspective view of a document processing vault system 611 is shown according to some embodiments of the present disclosure. The document processing vault system 611 is similar to the document processing vault system 621 described below in reference to FIG. 6C. The document processing vault system 611 includes a document processing device 11-6 coupled with an outer vault 625. The outer vault 625 can include one or more inner bill vaults, inner check vaults, and/or inner suspect vaults.

According to some alternative embodiments, the document processing vault system 611 is coupled with a coin processing device 627, which is coupled with an outer coin vault 629. The coin processing device 627 is configured to receive, process, and store coins in the outer coin vault 629. According to some embodiments, the coin processing device 627 is configured to denominate coins, count coins, sort coins, authenticate coins, or any combination thereof. The outer coin vault 629 can include one or more inner coin vaults, which can be, for example, metal bins, plastic bins, and/or coin bags. Additional details regarding coin processing devices and methods for processing coins are described in U.S. Patent Publication No. 2009/0236200, entitled "Apparatus, System and Method For Coin Exchange", and U.S. Pat. No. 8,162,125, entitled "Apparatus and System for Imaging Currency Bills and Financial Documents and Method for Using The Same", each of which is hereby incorporated by reference herein in its entirety.

Referring to FIG. 6B, a partial cross-sectional perspective view of the document processing vault system 611 of FIG. 6A is shown according to some embodiments of the present disclosure. FIG. 6B illustrates a transport path of documents from an input receptacle 610 (FIG. 6A) of the document processing device 11-6 to one or more of the inner vaults, such as, for example, an inner vault 631. The inner vault 631 is shown outside of its operational position, which is shown in dotted lines as 631a, for illustrative purposes. According to some embodiments, the inner vault 631 is an automated document container such as, for example, an automated cassette CS or automated mini-safe SF.

According to some embodiments, documents are processed by the document processing device 11-6 and are stacked on top of a moveable gate 633. According to some embodiments, in response to a predetermined amount of documents being stacked and/or in response to all of the documents in the input receptacle 610 being processed and stacked on the moveable gate 633, the moveable gate 633 is moved in the direction of arrow A, and a plunger assembly 635 forces the stacked documents in the direction of arrow B into the inner vault 631.

According to some embodiments, the inner vault 631 can be removed from the outer vault 625 for transportation of the entire inner vault 631 to, for example, a bank or armored carrier. Additional details of inner vaults and/or cassettes are described in U.S. Pat. No. 6,601,687, entitled "Currency Handling System Having Multiple Output Receptacles", which is hereby incorporate by reference herein in its entirety.

Referring to FIG. 6C, a block diagram of a document processing vault system 621 is shown according to some embodiments of the present disclosure. The document processing vault system 621 can include one or more of the document processing devices and/or systems described herein in combination with one or more vaults or safes. As shown in FIG. 6C, the document processing vault system 621 includes a document processing device 11-6, an outer vault 605, and an inner bill vault or compartment 607a. The document processing device 11-6 is similar to, and can perform the same or similar operations as, the document processing device 11a-11cb, 101, 44-9a, 44-9b shown in, for example, FIGS. 1A-1CB, 2, 9A-9B and described herein in the Document Processing Device and System Section and in the Deposit Transaction Section of U.S. Pat. No. 8,162,125, which is hereby incorporated by reference in its entirety, and in other sections of the present disclosure.

According to some embodiments, an operator inserts a stack of documents including checks and currency bills into an input receptacle of the document processing device 11-6. The stack of documents can include one or more sorted batches of documents and/or one or more intermingled batches of documents. According to some alternative embodiments, the operator inserts a single document at a time into the input receptacle for processing. According to such embodiments, the operator can insert one bill or one check into the input receptacle for processing. According to some embodiments, the document processing vault system 621 processes all of the documents and transports the checks to one or more output receptacles 630a that are accessible by the operator and transports the currency bills into the bill vault 607a, which can be a secure storage compartment or cassette within the outer vault 605. In some such embodiments, the operator cannot retrieve the currency bills stored in the bill vault 607a. In other embodiments, the operator can retrieve some or all of the currency bills by using a key or by entering a code, or the like. Yet in other embodiments, only a third party can retrieve the currency bills stored in the secured storage compartment, such as, for example, a bank employee or armored carrier employee.

According to some embodiments, the outer vault 605 includes one secured storage compartment or cassette for securely storing each type of denomination of currency bill processed by the document processing vault system. That is, according to some embodiments, the document processing vault system 621 can be configured to sort currency bills by denomination. For U.S. currency bills, according to some embodiments, the document processing vault system includes at least seven compartments or cassettes, one for each of the denominations, $1, $2, $5, $10, $20, $50, and $100. According to some alternative embodiments, the outer vault 605 includes a single secured storage compartment or cassette for securely storing each denomination of currency bill processed by the document processing vault system 621, such that the stored currency bills having a plurality of denominations are intermingled within the single compartment. According to some embodiments, the document processing vault system 621 further includes at least one check vault 607b, such as, for example, a secure storage compartment for receiving and storing checks. According to some embodiments, the document processing vault system 621 includes a single inner vault (not shown), such as, for example, a secure storage compartment for receiving and storing currency bills and checks. According to some embodiments, the document processing vault system 621 includes a shredder 613 or document destruction device for receiving and destroying checks after being imaged and/or otherwise processed by the document processing vault system 621.

According to some embodiments, the outer vault 605 includes a suspect vault 607c for receiving and securely storing suspect bills determined to be suspect by the document processing device 11-6. According to some embodiments, the document processing vault system 621 is physically and/or communicatively connected to a coin processing device 611a and an outer coin vault 611b. The outer coin vault 611b can include one or more inner coin vaults 611c for securely storing coins processed by the coin processing device 611a.

According to some embodiments, the document processing vault system 621 is communicatively connected to one or more financial institutions 609 via one or more networks. It is contemplated that, according to some embodiments, the document processing vault system 621 can be configured to make a data file available to the financial institution 609 to receive a provisional and/or final credit for some or all of the documents and/or coins processed and/or stored in the document processing vault system 621, in the same, or similar, manner that the customer document processing system 902 obtains credit from the financial institution system 903 described in connection with FIGS. 9A and 9B. According to some embodiments, the document processing vault system 621 can be configured to automatically transmit a data file that is similar to, for example, the data file 301 described above in reference to FIG. 8E in the Document Records and Data Files Section of the present disclosure, and in other sections of the present disclosure, to the financial institution 609. According to some such embodiments, the financial institution 609 can credit a financial institution account based on the value of documents and/or coins stored in the document processing vault system 621 and/or processed by the document processing vault system 621 in the same, or similar, fashion as described herein, such as, for example, as described in reference to FIG. 9A.

According to some embodiments, the document processing vault system 621 is located within a financial institution (e.g., a bank) and accessible by multiple customers of the financial institution to make deposits therein and/or to withdraw money therefrom (e.g., U.S. currency bills) without active involvement from an employee of the financial institution. According to some other embodiments, the document processing vault system 621 is located within a non-financial institution (e.g., a mall, a store, a distribution company, a currency exchange, an airport, transit station, etc.) and accessible by multiple customers of a financial institution (e.g., a bank) to make deposits therein and/or to withdraw money therefrom (e.g., U.S. currency bills) without active involvement from an employee of the financial institution. Such a document processing vault system 621 located at, for example, a mall, can also be referred to as a merchant teller machine.

According to some embodiments, one or more financial institution accounts associated with deposited documents and/or coins stored in the document processing vault system 621 can receive interest based on a value of the deposited documents and/or coins in the document processing vault system 621. According to some such embodiments, interest can begin to accrue in response to documents and/or coins being deposited and processed by the document processing vault system 621 and stored in the vaults 607a-c and 611c.

According to some embodiments, the bill vault 607a, the check vault 607b, and/or the suspect vault 607c are cassettes CS, mini-safes SF, or some combination thereof.

VIII. Overview—Map Of City

Figure 7:
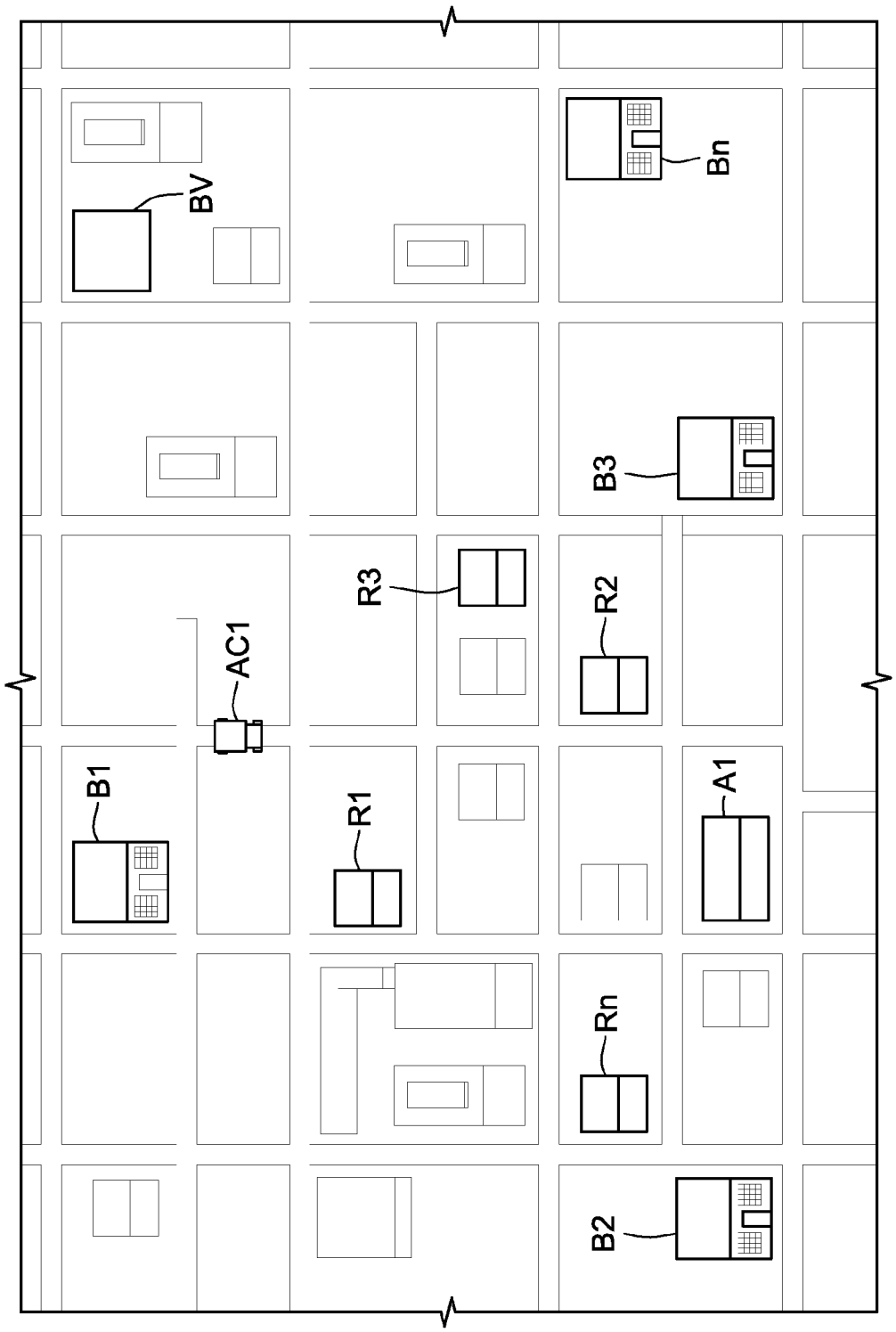
FIG. 7 is an illustration of an exemplary city or town according to some embodiments of the present disclosure.

FIG. 7 is an illustration of exemplary city or town. A number of retail stores R1-Rn are located around the town. Additionally, a bank has a number of branch buildings B1-Bn located around the town. The bank has a central vault BV. Likewise, an armored carrier company has a central vault A1. An armored car AC1 is also illustrated and may be employed to pick up currency bills, coins, checks, and/or other financial documents from one or more locations and deliver them to one or more other locations. For example, the armored car AC1 may pick up financial documents from retail store R1, then proceed to retail store R2 and pick up additional documents, and then deliver some or all of the documents picked up from retail stores R1, R2 to the central bank vault BV and/or to the armored carrier company's central vault A1. Likewise, on the same trip and/or on another trip, the armored car AC1 may deliver currency bills, coins, checks, and/or other financial documents to one or more retail stores R1-Rn and/or bank branch locations B1-Bn.

IX. Creation Of Image Records

A. Document Records and Data Files

Referring now to FIG. 8A, an exemplary record 300a for a currency bill is illustrated according to some embodiments of the present disclosure. According to some embodiments, the record 300a comprises several parts including, but not limited to, one or more image sections 310, 320 and a plurality of currency bill identifying information data fields 330a. While the record 300a is shown according to a non-limiting example, it is contemplated that the record 300a can include any number, size, shape, type, and orientation of image sections and/or data fields. The first image section 310 includes a visually readable image of a first side of the currency bill. Similarly, the second image section 320 includes a visually readable image of a reverse side of the currency bill. The visually readable images can be reproduced by a display device such as a computer monitor or by a printer device. According to some embodiments, the visually readable image sections 310, 320 can include one or more snippet images in lieu of or in addition to the full images as shown in FIG. 8A. In both the first and the second image sections 310, 320 there is identifying information that can be extracted using OCR software and/or other extraction software and tagged into one or more of the identifying information or extracted data fields 330a. For example, the front side of the one dollar currency bill illustrated in the first image section 310 includes a serial number 311 and the back side of the currency bill illustrated in the second image section 320 includes a back plate number 321. Both of these pieces of identifying information may be extracted using OCR software and tagged to data fields 311' and 321', respectively, for use during subsequent analysis and/or processing of the currency bill.

According to some embodiments, the currency bill identifying information data fields 330a can include: a serial number data field 311', a signatories data field 312', a denomination data field 313', a series data field 314', a back plate number data field 321', a check letter and quadrant number data field 315', a check letter and face plate number data field 316', and/or a federal reserve letter/number data field 317'. To better understand these various data fields, reference is made to the image fields 310 and 320, which include images of a $1 currency bill having a variety of identifying information. For example, the $1 currency bill shown has a serial number 311, two signatories 312 (Treasurer's signature and signature of the Secretary of Treasury), a numeric denomination 313a in addition to one or more written denominations 313b, series 314, a back plate number 321, a check letter and quadrant number 315, a check letter and face plate number 316, a federal reserve number 317a, and a federal reserve letter 317b. The various corresponding currency bill identifying information data fields 330a include data, such as, for example, alphanumeric data or characters extracted from the visually readable images of the $1 currency bill in the image sections 310, 320. For example, the serial number 311 is extracted from the image data that is reproducible as a visually readable currency bill image and tagged or recorded into the serial number data field 311'.

According to some embodiments, the record 300a includes a flag code field 333' such as a suspect flag. The flag code field 333' can be used to visually and/or electronically flag the record 300a as a suspect, a no-show, unexpected, etc. According to some embodiments, the flag code field 333' includes characters and/or symbols that can be the word "suspect" or any other term or phrase or bit or bit-sequence to indicate a condition or flag status associated with the record 300a. For example, a "1" in a suspect field may indicate the record has been tagged to indicate it is associated with a suspect document and a "0" may indicate that the record has not been tagged which would indicate that the record is not associated with a suspect document. Likewise, the flag code field 333' may comprise different portions or codes associated with one or more flagging conditions such no-call, find document, etc.

According to some embodiments, the flag code field 333' can be used to visually and/or electronically include a reason associated with why a document was flagged. For example, for a currency bill, the document processing device may identify the currency bill as suspect based on any of a number of attributes, such as, for example, a serial number extracted from the currency bill matching a serial number in a suspect or blacklist database, non-conforming magnetic properties, non-conforming infrared characteristics, non-conforming UV characteristics, non-conforming iridescence characteristics, non-conforming thread characteristics, non-conforming watermark characteristics, non-conforming paper characteristics, and other types of security characteristics known in the art. That is, according to some embodiments, an operator of a document processing device and/or system reviewing and/or searching records, such as described in the Modes of Operation—Searching/Master Database Section of U.S. Pat. No. 8,162,125, which is hereby incorporated by reference herein in its entirety, and in other sections of the present disclosure, can determine the reason that a particular record was tagged as being associated with a suspect document by looking up the reason contained in the flag code field 333'.

According to some alternative embodiments, a record including a determined suspect attribute and image data associated with a document can be created and stored in a suspect database for later evaluation. According to some such embodiments, a serial number of the determined suspect document, for currency bills, can further be included in the record and the records can be stored in a memory of a document processing device such that subsequent identification of currency bills including the serial number and/or the same counterfeit attributes can be readily identified.

In addition to the image sections 310, 320 and the currency bill identifying information data fields 330a, the record 300a may also include transaction information data fields 330b, such as, for example, alphanumeric or biometric data associated with a person or a bank account associated with the processed documents. For example, the record 300a may also include an account number data field 331' that is associated with a financial institution account that the currency bill was deposited into for a credit. The account number 331' can be the financial institution account number (e.g., bank account number) of a customer, such as a store, depositing the currency bill associated with the record 300a into its financial institution account. According to some embodiments, the deposit of the currency bill is associated with a deposit transaction, where the deposit transaction involves the depositing of a plurality of documents into the financial institution account along with the currency bill associated with the record 300a. According to some embodiments, the deposit transaction can be identified with a deposit transaction identifier 332' and/or batch identifier. According to some embodiments, the deposit transaction identifier is a unique identifier. The deposit transaction identifier 332' can be an alphanumeric string of characters (e.g., ABC0005) that identifies a deposit and/or financial transaction at least involving the currency bill. According to some embodiments, the deposit transaction identifier 332' identifies the customer (e.g., store ABC) and/or a number of the transaction between the customer and the financial institution (e.g., 5th transaction between the store ABC and the financial institution). The transaction information may be tagged to the record 300a by the document processing device 44, 101, 11b, or a processor, and/or a computer (e.g., the computer 151) coupled thereto. According to some embodiments, the transaction information can be obtained from an operator, a deposit slip (e.g., virtually created deposit slip or MICR encoded deposit slip), a header/trailer card, a networked bank computer, and/or teller software. According to some embodiments, the record 300a may also include an operator or teller field (not shown). The operator field can be used to provide the identity of the operator of the device 44, 101, 11b for a transaction. For example, the operator field provides the identity of a bank teller or cashier associated with a transaction. According to some embodiments, a personnel field could be included in the record to identify the individual from whom processed documents were obtained (e.g., individual cashier or bank teller) and an operator field could be included to identify the operator of the device which may be beneficial where the operator of the device 44, 101, 11b differs from the individual providing a stack of documents to be processed by the device 44, 101, 11b. As will be described in more detail below, such fields may be useful in subsequently identifying a teller or an operator and/or other personnel associated with a particular document, for example, where a currency bill is later determined to be counterfeit and/or determined to be missing.

According to some embodiments, other image sections and/or data fields may also be included for a currency bill, such as, a data field relating to the issuing federal reserve bank, the country of origin (if multiple country currencies are accepted), and others. It is also contemplated that foreign currency may have other useful information on the bill, such as, other security measures which it may be useful to extract from the image of the bill. One example would be a data field identifying the size of the currency document. In many foreign countries, the size of the currency bill varies with denomination.

According to some embodiments, the record 300a only includes a snippet image of a serial number and a serial number data field. According to some embodiments, the record 300a only includes a snippet image of a serial number, a serial number data field, and a transaction identifier. According to some such embodiments, the transaction identifier can be associated with the customer's financial institution account number to enable a post-processing lookup or query if necessary to perform a charge-back, which is described in detail in the Modes of Operation—Searching/Master Database Section of U.S. Pat. No. 8,162,125, which is hereby incorporated by reference herein in its entirety, and in other sections of the present disclosure. According to some embodiments, the record 300a includes one or more of the above data fields, but does not include any of the image sections 310, 320.

Turning now to FIG. 8B, an exemplary record 300b for a check is illustrated according to some embodiments of the present disclosure. According to some embodiments, the record 300b comprises several parts including, but not limited to, one or more image sections 340, 350 and a plurality of check identifying information data fields 360a. While the record 300b is shown according to a non-limiting example, it is contemplated that the record 300b can include any number, size, shape, type, and orientation of image sections and/or data fields. In the illustrated check example, both sides of the check have been scanned and imaged. In other embodiments, it may be desirable to scan and/or image only one side of the check. Yet in other embodiments, it may be desired to scan and produce a snippet image of, for example, a MICR section of the check, a courtesy amount section (CAR), a legal amount section (LAR), or a combination thereof. In the embodiment illustrated, the first image section 340 includes a visually readable image of a first side of the check. Similarly, the second image section 350 includes a visually readable image of a reverse side of the check. The visually readable images can be reproduced by a display device such as a computer monitor or by a printer device. In both the first and second image sections 340, 350 there is identifying information that can be extracted from the visually readable images using OCR software and/or other extraction software and tagged to one or more of the identifying information data fields 360b.

According to some embodiments, the check identifying information data fields 360a can include: a drawer data field 341', a MICR data field 342', a routing data filed 343', an account number data field 344', a transaction amount data field 345', a payee data field 346', and a check number data field 347'. To better understand these various data fields, reference is made to the first and the second image sections 340 and 350. In the image sections 340 and 350, the visually readable image of the check reveals that the check includes a variety of identifying information. For example, the check shown has drawer identification information 341, MICR data 342, an ABA number 343 (that is a routing and transit number), a bank account number 344, a check amount 345 (courtesy amount and/or legal amount), a MICR encoded check amount 345a, a payee name 346, a check number 347, and an endorser signature 348 (back surface of the check). The various check identifying information data fields include data such as, for example, alphanumeric data or characters extracted from the image data that is reproducible as the visually readable images of the check in the image sections 340, 350. For example, the MICR data 342 is extracted using OCR software and/or other extraction software and tagged into the data portion 342', such as described in, for example, the Optical Character Recognition Section of the present disclosure and in U.S. Pat. No. 8,162,125, which is hereby incorporated by reference herein in its entirety, and in other sections of the present disclosure. According to some alternative embodiments, the transaction amount 345 is extracted and printed on the check as the MICR encoded check amount 345a such that a MICR reader can obtain the check amount.

In addition to the image sections 340, 350 and the check identifying information data fields 360a, the record 300b may also include transaction information data fields 360b, such as, for example, alphanumeric or biometric data associated with a person or a bank account associated with the processed documents. For example, the record 300b may also include a payee account number data field 361' that is associated with a financial institution account of a person or company endorsing and/or depositing the check for a credit. The payee account number 361' can be the financial institution account number (e.g., bank account number) of a customer, such as a store, depositing the check associated with the record 300b into its financial institution account. According to some embodiments, the deposit of the check is associated with a deposit transaction, where the deposit transaction involves the depositing of a plurality of documents into the financial institution account along with the check associated with the record 300b. According to some embodiments, the deposit transaction can be identified with a deposit transaction identifier 362'. According to some embodiments, the deposit transaction identifier is a unique identifier. The deposit transaction identifier 362' can be an alphanumeric string of characters (e.g., ABC0006) that identifies a deposit and/or financial transaction at least involving the check. According to some embodiments, the deposit transaction identifier 362' identifies the customer (e.g., store ABC) and/or a number of the transaction between the customer and the financial institution (e.g., 6th transaction between the store ABC and the financial institution). Thus, as compared to the deposit transaction identifier 332' associated with the record 300a, the deposit transaction identifier 362' indicates that the record 300b is associated with the 6th deposit transaction between Store ABC and the financial institution, which occurred after the deposit transaction associated with the record 300a. According to some embodiments, the transaction information may be tagged to the record 300b by the document processing device 44, 101, 11b or a processor, and/or a computer (e.g., the computer 151) coupled thereto. According to some embodiments, the transaction information in the transaction information data fields 360b can be obtained from an operator, a deposit slip (e.g., virtually created deposit slip or MICR encoded deposit slip), a header/trailer card, a networked bank computer, and/or teller software.

It should be recognized that the data fields 360a,b are not inclusive of all possible data fields and types of information that can be tagged to the record 300b. For example, in some cases, it may also be useful to extract characters corresponding to the memo line of the check. In addition, it is contemplated that in some embodiments the operator may fill in and/or correct one or more of the data fields. According to some embodiments, the record 300b includes one or more of the above data fields, but does not include any of the image sections 340, 350. According to some embodiments, the record 300b may also include an operator field and/or a personnel field (not shown) as described above in connection with record 300a.

According to some embodiments, the record 300b includes a flag code field 363', such as a suspect flag. The flag code field 363' can be used to visually and/or electronically flag the record 300b as a suspect, a no-show, and/or unexpected. According to some embodiments, the flag code field 363' includes characters and/or symbols that can be the word "suspect" or any other term or phrase to indicate a condition or status associated with the record 300b or otherwise indicate various flag code information similar to the flag code field 333' described above.

According to some embodiments, the flag code field 363' can be used to visually and/or electronically include a reason associated with why a document was flagged. For example, for a check, the document processing device may identify the check as suspect based on any of a number of attributes, such as, for example, a MICR line or a portion thereof extracted from the check matching a MICR line information or a portion thereof in a suspect or blacklist database, non-conforming magnetic properties, non-conforming infrared characteristics, non-conforming UV characteristics, non-conforming iridescence characteristics, non-conforming thread characteristics, non-conforming watermark characteristics, non-conforming paper characteristics, and other types of security characteristics known in the art. That is, according to some embodiments, an operator of a document processing device and/or system reviewing and/or searching records, such as described in the Modes of Operation—Searching/Master Database Section of U.S. Pat. No. 8,162,125, which is hereby incorporated by reference herein in its entirety, and in other sections of the present disclosure, can determine the reason that a particular record was tagged as being associated with a suspect document by looking up the reason contained in the flag code field 363'.

According to some embodiments, the data fields 330a,b and 360a,b include characters such as alphanumeric data as opposed to images of the corresponding data to facilitate processing of the imaged document and/or forwarding of the record 300a,b or portions thereof and/or searching or querying of a database containing a plurality of records or portions thereof such as a database containing the data (non-image) portions of the records 300a,b. Yet, according to other embodiments, the image fields can include snippet images of the corresponding data and/or the alphanumeric data. In these embodiments, the snippet images allow an operator to check the accuracy of the OCR or other extraction software at a later time.

Figure 8C:
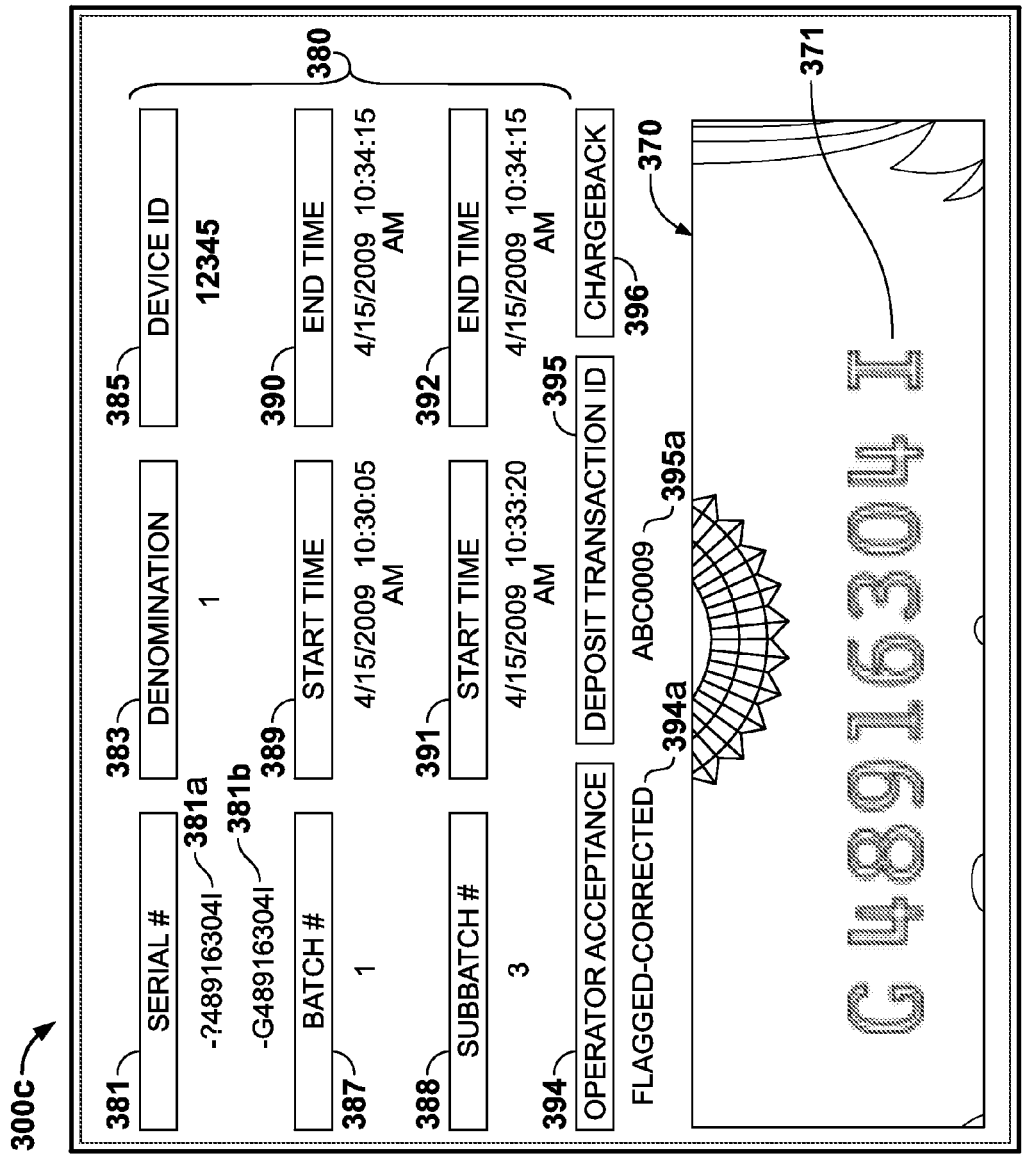
FIG. 8C is a representation for a record of a currency bill according to some embodiments of the present disclosure.
Figure 8D:
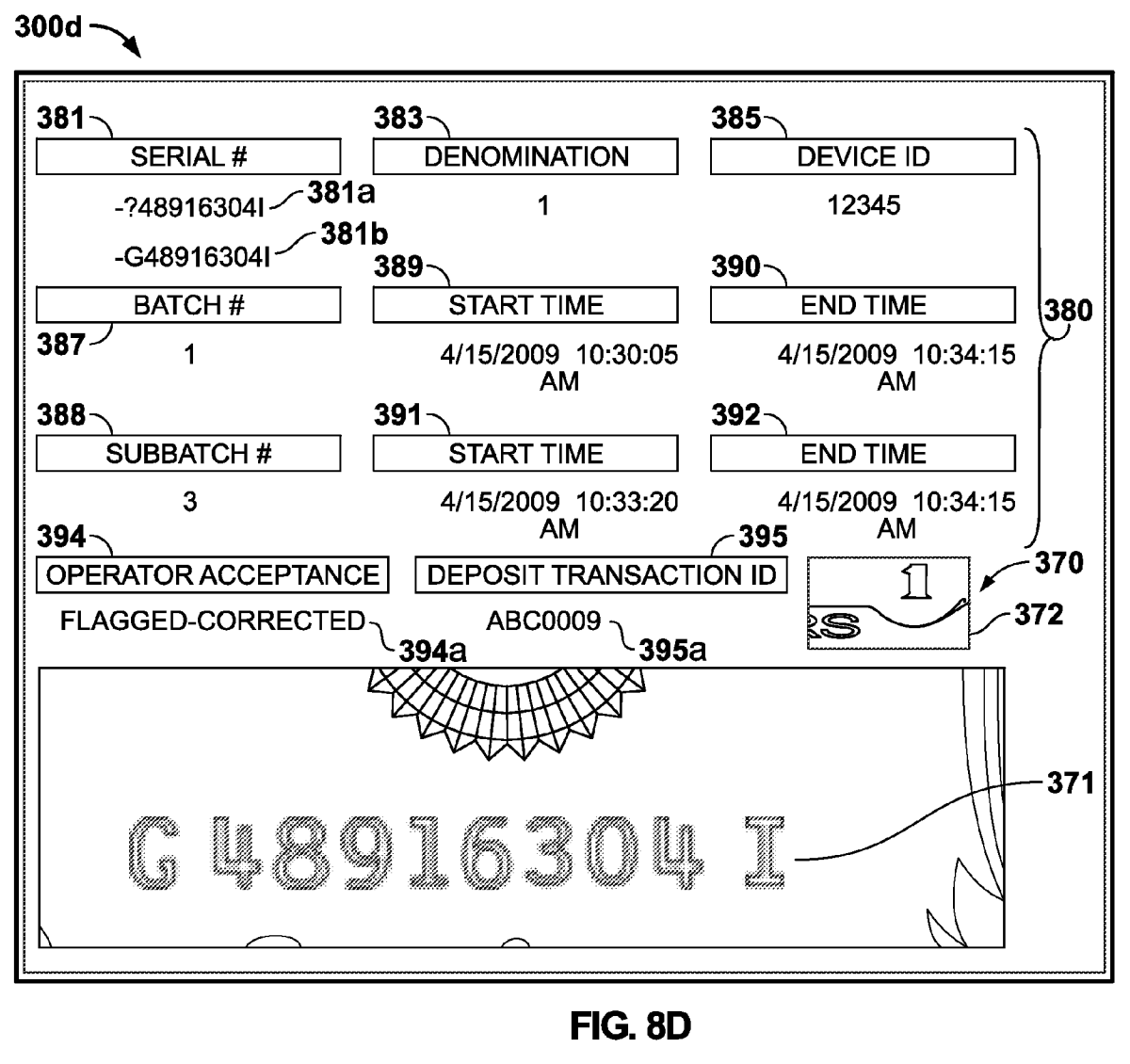

Now turning to FIGS. 8C and 8D, exemplary records 300c and 300d for a currency bill are illustrated according to some embodiments of the present disclosure. According to some embodiments, the records 300c,d each comprise several parts including, but not limited to, one or more image sections 370, and a plurality of data fields 380. While the records 300c and 300d are shown according to a non-limiting example, it is contemplated that the records 300c and 300d can include any number, size, shape, type, and orientation of image sections and/or data fields. For example, the image section 370 of the record 300c includes a visually readable image of a currency bill serial number snippet. For another example, the image section 370 of the record 300d includes a visually readable image of a currency bill serial number snippet and a currency bill denomination or corner snippet. The currency bill denomination or corner snippet includes a visual representation of a denomination 372 associated with the record 300d. The visually readable snippet images can be reproduced by a display device such as a computer monitor or by a printer device. In the image section 370 there is identifying information that can be extracted from the visually readable images using OCR software and/or other extraction software and tagged into one or more of the data fields 380. For example, the serial number snippet of the currency bill illustrated in the image section 370 includes a serial number 371. This serial number 371 may be extracted using OCR software and tagged to serial number data field 381 for use during subsequent analysis and/or processing of the currency bill.

According to some embodiments, for an eleven character serial number, the OCR or other software accurately extracts ten or eleven of the eleven alphanumeric characters in the serial number. According to some embodiments, the OCR or other software accurately extracts ten of the ten alphanumeric characters in the serial number 371. According to some embodiments, the OCR or other software accurately extracts nine of the ten alphanumeric characters in the serial number 371, as shown in FIG. 8C. Put another way, the document processing device 44, 101, 11b that runs the OCR or other software cannot determine one or more of the characters with a confidence equal to or greater than a predetermined confidence level. In the example shown in FIGS. 8C and 8D, the document processing device 44, 101, 11b was unable to determine the first character of the serial number 371. Thus, the initial serial number extraction 381a contains a "?" as the first of the ten characters. According to some embodiments, the document processing system 100 is configured to provide a means (e.g., keyboard, softkeys, mouse, touch screen, etc.) for an operator to enter the missing character (e.g., "G"), which is described below in the Modes of Operation—Flagging Section of U.S. Pat. No. 8,162,125, which is hereby incorporated by reference herein in its entirety, and in other sections of the present disclosure. The corrected or manually completed serial number 381b is shown below the initial serial number extraction 381a in the serial number data field 381.

According to some embodiments, the data fields 380 may further include a denomination data field 383, a device ID data field 385, a batch number data field 387, a subbatch number data field 388, a batch start time data field 389, a batch end time data field 390, a subbatch start time data field 391, a subbatch end time data field 392, an operator acceptance data field 394, a deposit transaction ID data field 395, an operator field (not shown), a personnel field (not shown) or any combination thereof. The serial number snippet image of the currency bill partially depicted in the image section 370 is associated with a denomination. As described above, the document processing system 100 or device 44, 101, 11b is configured to determine the denomination of the currency bill and tag the determined denomination to the record 300c,d in the denomination data field 383. As shown, the associated denomination of the currency bill is a one dollar currency bill. The device ID can be any name, reference, or serial number of the document processing system 100 or device 44, 101, 11b being used to generate the record 300c. In the illustrated embodiment, the device ID is 12345, which is included in the device ID data field 385.

A batch number and subbatch number correspond to primary and sub-sessions of processing documents with the document processing system 100 or device 44, 101, 11b. In the illustrated embodiment, the record 300c,d was generated by the document processing system 100 or device 44, 101, 11b during a third subbatch of a first primary session. For example, an operator is processing seven hundred and fifty documents deposited by a Store in a Bank. The operator turns on the document processing system 100 or device 44, 101, 11b that prepares to receive documents of a first batch. The operator inputs two hundred and fifty documents into the input receptacle 110 of the document processing system 100. These two hundred and fifty documents comprise a first subbatch of the first batch. After the first subbatch is processed, the operator can remove the documents from the output receptacle 130 and insert an additional three hundred of the seven hundred and fifty documents as a second subbatch. Similarly, after the second subbatch is processed, the operator can remove the documents from the output receptacle 130 and insert the remaining two hundred documents as the third and final subbatch of the first batch of documents. Thus, each individual run or processing of batches or subbatches of documents can be identified using by the batch data field 387 and/or by the subbatch data field 388.

According to some embodiments, the batch start time data field 389, the batch end time data field 390, the subbatch start time data field 391, and the subbatch end time data field 392 can further be used to identify the batch and subbatch of the document associated with the record 300c,d. As shown in the illustrated embodiment, the processing of the first batch started on Apr. 15, 2009 at 10:30:05 AM and ended on Apr. 15, 2009 at 10:34:15 AM. Additionally, as shown in the sub-batch start and end time data fields 391 and 392, the processing of the third subbatch started on Apr. 15, 2009 at 10:33:20 AM and ended on Apr. 15, 2009 at 10:34:15 AM.

According to some embodiments, as described above, the record 300c,d can also include the operator acceptance data field 394. The operator acceptance data field 394 can be used to visually and/or electronically flag the record 300c as being associated with a suspect document, a no-show document, an unexpected document, a manually corrected document, an automatically corrected document, and/or an accepted document. According to some embodiments, the operator acceptance data field 394 includes information associated with one or more flag conditions or flag criteria and a related outcome. The flag criteria can include, but are not limited to, no-call denomination, extraction error-currency bill, extraction error-check or extraction error MICR line, suspect, fitness, soil, no-show, unexpected, serial number location, and bill characteristic location. As shown in FIGS. 8C and 8D, the operator acceptance data field 394 includes a flagged—corrected outcome 394a. According to some embodiments, the flagged—corrected outcome 394a indicates that the currency bill associated with the record 300c,d was flagged by the document processing system 100 or device 44, 101, 11b as missing data. In some embodiments, the missing data can be a missing denomination, a missing alphanumeric character from a currency bill serial number or from a check MICR line. The missing data can be caused by a failure to completely OCR image data. Other flagged—outcomes include, but are not limited to, flagged—corrected denomination, flagged—corrected serial number, flagged—corrected MICR line, flagged—suspect, flagged—accepted, flagged—no-show, flagged—unexpected, and not flagged. The flag criteria and related outcomes are further described in the Modes of Operation—Flagging Section of U.S. Pat. No. 8,162,125, which is hereby incorporated by reference herein in its entirety, and in other sections of the present disclosure.

According to some embodiments, the deposit transaction ID data field 395 includes a transaction identifier 395a. The transaction identifier 395a may be the same as, or similar to, the deposit transaction identifiers 332' and 362' described above in reference to FIGS. 8A and 8B. According to some embodiments, an operator of the document processing system 100 can use the transaction identifier 395a to identify a customer financial account number that the currency bill associated with the record 300c,d is to be or was deposited into for a credit. In the case of the currency bill being a suspect, the operator can then initiate a charge-back if credit was already given for the deposit of the currency bill via the document processing system 100 and/or teller software communicatively connected with a banking system (e.g., the banking system 960 for FIGS. 9A-9B) that maintains the customer financial institution account.

Additional details about records can be found in U.S. Pat. No. 8,162,125, entitled "Apparatus and System for Imaging Currency Bills and Financial Documents and Method for Using The Same", which is hereby incorporated by reference herein in its entirety.

B. Data Files

Figure 8E:
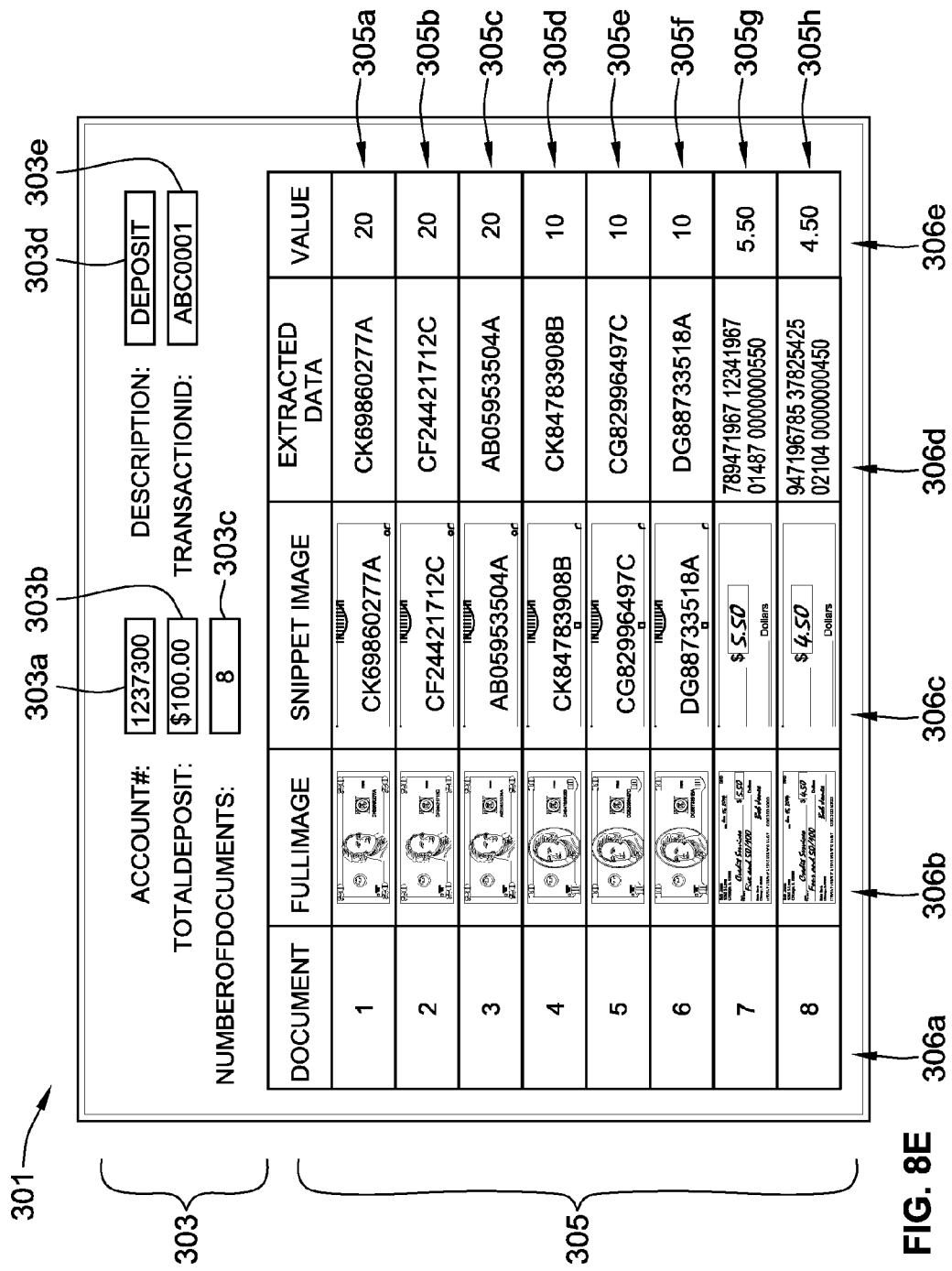
FIG. 8E is a representation of a data file including a plurality of records of a plurality of currency bills and checks according to some embodiments of the present disclosure.

Now turning to FIG. 8E, a data file 301 including transaction information 303 and a plurality of records 305 is shown according to some embodiments. According to some embodiments, each of the plurality of records 305 corresponds with one of a plurality of documents associated with a deposit transaction. According to some embodiments, the deposit transaction is between a customer (e.g., the Store) and a financial institution (e.g., the Bank). According to some such embodiments, the customer desires to deposit the plurality of documents into the financial institution for a credit to the customer's financial institution account, which is maintained at the financial institution. The document processing system 100 is configured to receive the plurality of documents associated with the deposit transaction and to process the plurality of documents, as described above in reference to FIGS. 1A-1H and 2, to generate the data file 301. According to some embodiments, as described in detail below in reference to FIGS. 9A-9B, the data file 301 can be transmitted electronically over a network from the customer to the financial institution for a provisional and/or a final credit to the customer's financial institution account for all of or a portion of the plurality of documents. According to some embodiments, issuing a final credit makes the credit available for immediate withdrawal by the customer.

According to some embodiments, the transaction information 303 can include a financial institution account number field 303a, a declared deposit amount or a total deposit amount field 303b, a number of documents field 303c, a description of a type of financial transaction field 303d, a transaction identifier field 303e, an operator field (not shown), a personnel field or a combination thereof. According to some embodiments, an operator of the document processing system 100 inputs some or all of the transaction information 303 into the document processing system 100, which is configured to automatically populate and/or insert the inputted transaction information into the data file 301. According to some embodiments, the transaction information 303 forms a virtual deposit slip, a header card, a trailer card, or a combination thereof. According to some embodiments, the document processing system 100 can be configured to, and/or communicatively connected to a printer to, print the virtual deposit slip (and/or a header/trailer card) for forwarding with the physical documents associated with the deposit transaction to be deposited.

Alternatively or additionally, the transaction information 303 is displayed as a visually readable image of a preprinted deposit slip within the data file 301. In some such alternative embodiments, the customer can fill out the preprinted deposit slip with hand-written data (e.g., a total deposit amount, a total number of documents, etc.) and the document processing system 100 can be configured to include a visually readable image of the preprinted deposit slip including the hand-written data in the data file 301. Additionally, in some embodiments, the document processing system 100 can be configured to use OCR and/or other software (e.g., CAR/LAR software) to extract the hand-written data on the preprinted deposit slip and populate and/or insert the extracted data in one of the corresponding transaction information fields 303 of the virtual deposit slip.

The financial institution account number field 303a includes a financial account number (e.g., 1237300) of, for example, the customer conducting the deposit transaction with the financial institution (e.g., the Bank) into which funds associated with the deposit transaction are to be deposited, e.g., the value of the plurality of documents deposited. According to some embodiments, the financial account number indicates to the Bank which customer transmitted the data file 301 for the credit. The total deposit amount and/or a value of the plurality of documents is included in the total deposit amount field 303b. The total deposit amount field 303b includes a value, for example, $100.00, as shown, associated with a sum of values associated with each of the documents associated with the deposit transaction to be deposited. The total number of documents field 303c includes the number of documents, for example, 8, as shown, in the plurality of documents that is associated with the deposit transaction to be deposited. The description of a type of financial transaction field 303d indicates that the data file 301 is associated with a deposit transaction between, for example, the customer and the financial institution. The transaction identifier field 303e includes a transaction identifier, for example, ABC 0001, as shown, that can be used to uniquely identify the deposit transaction involving the data file 301. Put another way, the transaction identifier can be used to reference the deposit of the plurality of documents into the customer's financial account.

As discussed above, the data file 301 includes the plurality of records 305, where each of the plurality of records 305 corresponds with one of the plurality of documents associated with the deposit transaction. According to some embodiments, the records 305 are organized into a plurality of data columns 306a-e. For example, according to some embodiments, the data file 301 includes a document number or document ID column 306a, a full visually readable document image column 306b, a visually readable snippet image column 306c, an extracted data (e.g., extracted serial number, extracted MICR line, or any other data extracted from a currency bill or a check) column 306d, a document value column 306e, or any combination thereof and each record includes a field corresponding to each column, such as, for example, a document number or ID field, a full image field, etc. It is contemplated that according to some embodiments, the data file 301 can include more or less data columns. For example, according to some such embodiments, the data file 301 can include a financial account number data column, a device ID column, a batch number column, a subbatch number column, start and end batch and/or subbatch processing time column(s), an operator acceptance column, or any combination thereof. According to some embodiments, some or all of the transaction information 303 may instead be included in corresponding columns and the data file 301 need not include a separate transactional section in the data file. Rather, the records associated with a particular transaction can be identified from the information in the transactional columns or fields.

According to some alternative embodiments, the data file 301 is a teller drawer file. The teller drawer file includes a plurality of records, like records 305. Further details of the teller drawer file as discussed in the Document Auditing and Tracking Section in U.S. Pat. No. 8,162,125, which is hereby incorporated by reference herein in its entirety, and in other sections of the present disclosure.

As shown in FIG. 8E, the document ID column 306a includes a document identifier for each of the records 305. According to some embodiments, the document ID indicates an order that the plurality of documents were processed in the document processing system 100. For example, as shown, the plurality of documents includes six currency bills (e.g., documents 1-6) and two checks (documents 7-8) to be deposited into the financial institution. The first record 305a is associated with a first of the documents to be processed and the eighth record 305h is associated with a last of the documents to be processed that are associated with the deposit transaction identified by the transaction ID ABC 0001.

According to some embodiments, the data file 301 includes the full visually readable document image column 306b. The full visually readable document image column 306b can include a full visually readable image of one or both sides of each respective document. For example, the third record 305c includes a full visually readable image of the third document associated with the deposit transaction. Alternatively or additionally, the data file 301 includes the visually readable snippet image column 306c. The visually readable snippet image column 306c can include one or more visually readable snippet images of each respective document. For example, the fifth record 305e includes a visually readable serial number snippet image of the fifth document associated with the deposit transaction. For another example, the seventh record 305g includes a visually readable CAR/LAR snippet image of the seventh document associated with the deposit transaction. According to some embodiments, the visually readable snippet image column 306c can include a denomination and/or corner snippet image in lieu of or in addition to the serial number snippet images shown in FIG. 8E.

According to some embodiments, the data file 301 includes the extracted data column 306d. According to some embodiments, for currency bills, the extracted data column 306d includes serial numbers extracted from each respective document. According to some embodiments, the serial number is extracted from a respective full visually readable image and/or a respective serial number snippet image. For checks, the extracted data column 306d can include MICR characters extracted from a full visually readable image and/or a MICR and/or a CAR/LAR snippet image (see e.g., documents 7 and 8) and/or extracted check amount (see e.g., value column 306e for documents 7 and 8).

According to some embodiments, the data file 301 includes the document value column 306e. The document value column 306e includes a denomination and/or value for each of the records 305 associated with respective ones of the documents to be deposited. For example, the first, second, and third records 305a-c are associated with twenty dollar currency bills to be deposited. Thus, the document value column 306e includes a value of "20" for the records 305a-c. Similarly, the fourth, fifth, and sixth records 305d-f are associated with ten dollar currency bills to be deposited. Thus, the document value column 306e includes a value of "10" for the records 305d-f. Similarly, the seventh and eighth records 305g-h are associated with a $5.50 check and a $4.50 check, respectively, to be deposited. Thus, the document value column 306e includes a value of "5.50" and "4.50" for the records 305g-h, respectively.

X. Send It Forward Concept—Remote/Armored Carrier/Bank

A. Deposit Transaction

Currently, banks and stores (e.g., retail store) lack real-time visibility of on hand currency, which limits the efficient use of the on hand currency. For example, a typical retail store does not currently have visibility or current data relative to checks, currency, and/or other mediums of payment about to be deposited at its bank. The larger the retail store, the greater the amount of currency in process and in transit between the store and the bank of deposit. It is contemplated that knowledge of on hand currency and knowledge of currency and checks in transit to the bank enables a store to better forecast currency requirements for the store's clerk drawers for the following day of business.

Similarly, banks currently lack real-time visibility relative to incoming deposits for the bank's various commercial customers until the deposits arrive at the bank or at one of the bank's vaults for processing. It is contemplated that visibility of deposits at the time the deposits are being created at the store and prior to transport to the bank and/or bank vault can enable a bank to better anticipate and plan for expected currency receipts in a given day. With such information banks would be better equipped to manage the bank's overall currency inventory, accelerate accounting of currency balances, and in turn reduce the amount of currency inventory on hand required to effectively service the bank's commercial customers.

According to some embodiments, the document processing devices and systems of the present disclosure can be implemented to enable stores to better manage their respective currency balances and increase velocity or turnover of cash flow. Similarly, according to some embodiments, the document processing devices and systems of the present disclosure can be implemented to enable banks to provide their commercial customers credit for deposits even before the deposits physically reach the bank or the bank's vault. Such apparatuses, systems, and methods are described herein.

According to some embodiments, a bank customer (e.g., a grocery store, a hardware store, a clothing store, etc.) receives documents including, currency bills and checks, throughout a workday from patrons purchasing products and/or services. These currency bills and checks are temporarily stored in a plurality of cash registers or cash tills. At the end of the workday, or at one or more periods throughout the day (e.g., shift changes), the plurality of currency bills and checks in the cash tills is removed for processing in one or more document processing devices. Alternatively, only an excess portion of the currency bills in the cash tills is removed with the checks.

According to some embodiments, a store employee (e.g., a clerk or manager of the bank customer) inserts one or more stacks or batches of currency bills and checks into an input receptacle of a document processing system, such as, for example, the document processing system 100. The document processing system at least includes a document processing device, such as, for example, the document processing device 44, 101. In some embodiments, the document processing system also includes a computer communicatively connected to the document processing device. Yet, in other embodiments, the document processing system includes a document processing device with a built-in processor or controller with enough computing power to perform a plurality of document processing operations on-board. The document processing system transports the currency bills and checks one at a time along a transport path such that each of the currency bills and checks is scanned and imaged by one or more image scanners to generate image data and/or records associated with the currency bills and checks. According to some embodiments, the records each include image data that can be reproduced as a visually readable image of one of the currency bills or checks. A record can include a visually readable image of one or more sides of a document, a portion of the document, a snippet image of the document, or a combination thereof. According to some embodiments, the records include extracted identifying information, which corresponds to the visually readable image(s) included in the respective record. For example, a currency bill serial number or a checking account number can be extracted from image data and included in a data field of a respective record. According to some embodiments, each record includes a store employee identifier associated with the store employee that received the respective document throughout the store employee's shift. According to some embodiments, the generated records include all of or a portion of the information/data and/or images in the records 300a-d described in the Document Records and Data Files Section and in connection with FIGS. 8A-8D, and in other sections of the present disclosure and in U.S. Pat. No. 8,162,125, which is hereby incorporated by reference herein in its entirety.

According to other embodiments, the store employee inserts a plurality of currency bills and a plurality of checks into the input receptacle. According to some such embodiments, the plurality of currency bills is a first group of documents processed separately from the plurality of checks, which is a second group of documents. The two groups of documents can be related via a transaction identifier, a customer identifier, and/or a batch identifier. According to some embodiments, processing the currency bills separately from the checks as different groups increases overall processing efficiencies and decreases the overall document processing time. According to some embodiments, the store employee inserts a plurality of currency bills and a plurality of checks into the input receptacle as a sorted batch of documents to be processed according to an order-batch mode of operation as defined herein in the Definitions Section.

According to some embodiments, one or more store employees can review and/or analyze the records to obtain real time information associated with the currency bills and/or checks to be deposited into the store's bank that day. According to some embodiments, the document processing system is configured to generate one or more reports including information associated with the processed documents to be deposited, such as, for example, check totals and currency bill totals, which can give one or more store employees overall visibility of the size of the store's deposit at the bank. The generated report can be printed on a communicatively connected printing device and/or displayed on one or more communicatively connected displays, such as, for example, control panel 170.

According to some embodiments, after the groups of currency bills and checks are processed by the document processing system, a data file including the records associated with those documents are transmitted over a network to a bank for a provisional deposit credit. It is contemplated that according to some embodiments, the store may decide to send a data file to its bank several times a day (e.g., at the end of each shift) in order to obtain credit at an earlier time for excess cash on hand. The bank receives the data file and records over the network in a financial institution system which includes a bank document processing system (e.g., one or more bank computers and one or more bank document processing devices) and an accounting and/or banking system. According to some embodiments, based on the electronic data file and records alone, the financial institution system is configured to automatically issue a credit (e.g., provisional credit and/or final credit) to the store's bank account. According to some such embodiments, the crediting of a customer account based on a data file including records associated with documents to be physically delivered to a bank at a later time gives the bank the benefit of having cash on hand and on the bank's books before the cash is physically delivered to the bank or the bank's vault.

According to some embodiments, in response to receiving a data file (e.g., electronically receiving) including records associated with checks, the bank starts to proof the checks based on the records alone. It is contemplated that such advanced proofing can enable the store to obtain deposit credit for the checks earlier in the day and before certain cut off time deadlines set by the bank. Similarly, the bank obtains the value of these deposits via the checks earlier in the day and may capture significant value and deposits prior to the day's cut-off. In the past, such checks would be physically received after the cut off time for a given date and therefore, the bank would not have received the benefit of recording the checks on its books until the following day.

Typically, banks have a deadline for receiving deposits to be credited on that business day. For example, some banks require all deposits to be received prior to 3 PM in order for the customer to receive a same day credit. According to some embodiments, banks may give a customer an extended period of time to deliver physical documents associated with a batch of documents being deposited at the bank if the customer previously transmitted a data file as described herein. For example, a bank might give a customer until 5 PM or even later to transport a physical batch of documents to the bank in order to receive a same day credit.

According to some embodiments, the bank receives the data file and records over the network in one or more memory/storage devices of one of the bank computers (e.g., an item processing system) and based on the records alone, the bank computer automatically transmits a credit instruction to an accounting system. In these embodiments, in response to receiving the credit instruction, the accounting system can be configured to automatically issue a provisional credit. It is contemplated that, according to some embodiments, such a deposit system, such as described above and below in reference to FIGS. 9A and 9B, can reduce the time involved to obtain deposit credit from anywhere of a minimum of six hours to as much as a 12 to 24 hour improvement.

According to some embodiments, a store is communicatively connected to its bank such as described below and in connection with FIGS. 9A and 9B. According to some such embodiments, a store employee via one or more store computers communicatively connected with one or more bank computers can monitor which ones of the store's deposit transactions have cleared the bank and been accepted. The bank acceptance can be either through the physical processing of the currency and checks once received at the bank (FIG.

Figure 9A:
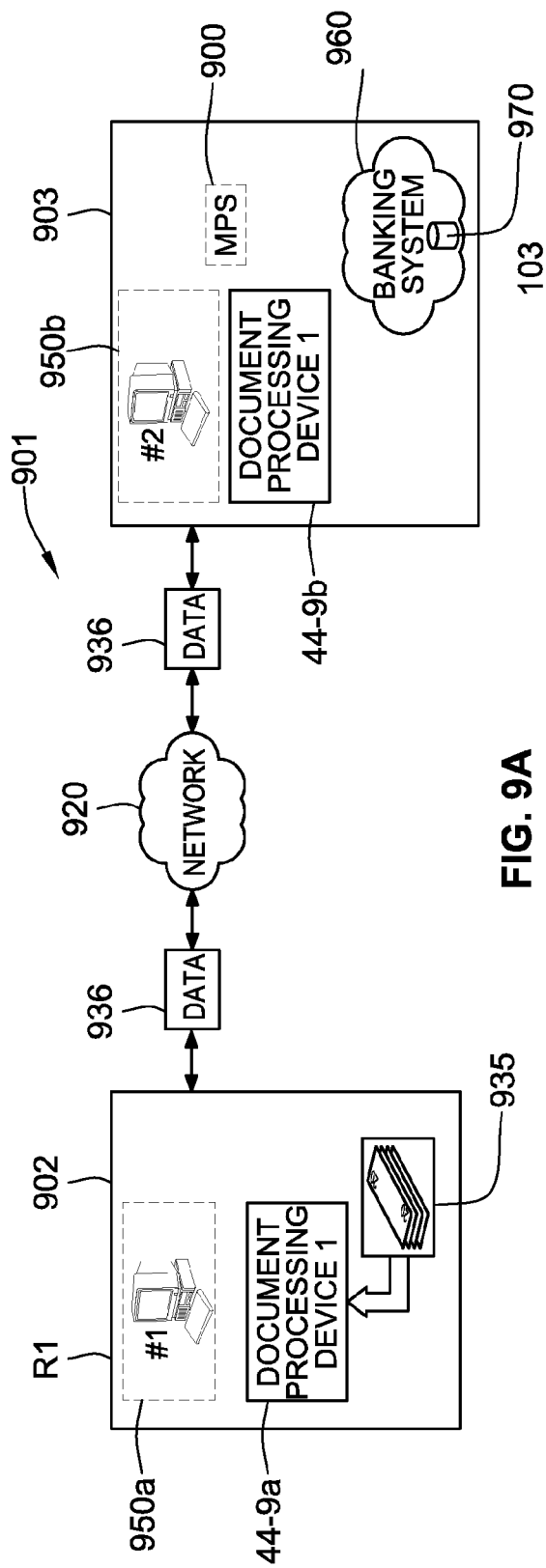
FIG. 9A is a block diagram of a financial transaction system according to some embodiments of the present disclosure.

9B) or the bank accepting electronically transmitted data files including records associated with currency bills and checks for deposit credit even before the physical documents arrive at the bank (FIG. 9A).

In response to the records being transmitted over the network, a store employee can gather all of the processed physical currency bills and physical checks as a batch of documents for pickup by an armored carrier or for drop-off at the bank. Alternatively, only the processed physical currency bills, and not any of the physical checks are physically transported to the bank such that the bank can verify received records against corresponding received physical documents.

According to some embodiments, in response to receiving the physical batch of documents, a bank employee or teller inserts the batch of received documents into an input receptacle of a bank document processing system located at the bank. The bank document processing system can include one or more input receptacles and/or one or more output receptacles. The bank document processing system scans and images the documents in the same, or similar, manner as the document processing system located at the store to produce bank records. The bank document processing system compares the bank records with the records transmitted by the store to determine if any expected documents are missing (e.g., no-show documents). If the bank document processing system determines that one or more documents are missing, then the bank document processing system can instruct the accounting system to automatically charge-back the store's bank account for an amount equal to a value of the missing document(s).

It is contemplated that, according to some embodiments, the bank document processing system is a single output receptacle device (e.g., document processing device 11b) used to rerun the batch of documents to verify the store's deposit. In response to the batch of documents being verified, the batch of documents can be put into a tray of documents including a multitude of batches of documents to be sorted using a non-imaging MPS or an imaging MPS.

Alternatively, the bank document processing device can be an imaging MPS configured to verify the batch of documents and to sort the batch of documents by denominations and/or type of document (e.g., bills sorted from checks). According to some such embodiments, the batch of documents is immediately placed in a tray for processing in the imaging MPS without first being rerun on the single output receptacle device. It is contemplated that such an alternative method can reduce processing of commercial deposits.

According to some embodiments, the batch of documents is placed into a tray of documents associated with the same bank customer—that is, each tray only includes documents associated with a single bank customer for processing in the imaging MPS. It is contemplated that grouping all of a customer's deposits into one or more associated trays can increase overall document processing efficiency in the bank. For example, a store includes 35 locations in a city. All 35 locations prepare and transport a respective batch of documents to a bank for deposit into the same customer account. The 35 batches of documents are placed into, for example, 5 bulk currency trays for processing. The 5 trays of documents (including the 35 batches of documents only) are then processed in an imaging MPS as described above. In response to the imaging MPS determining any variances (e.g., no-show documents, unexpected documents, suspect documents), the imaging MPS can be configured to automatically attribute the variance(s) to the store's customer account, as all documents in the 5 trays are associated with the store. Thus, processing all of the 35 batches of documents as described permits the bank to bypass individually processing each of the 35 batches of documents on a first pass on a single output receptacle device and then sending the 35 batches of documents via bulk currency trays on a second pass through an MPS or imaging MPS.

According to some embodiments, the bank document processing system can also be configured to authenticate the currency bills, the checks, or a combination of intermingled currency bills and checks. According to some embodiments, the bank document processing system can also automatically charge-back the store's bank account or generate a charge-back instruction for any currency bills determined to be suspect currency bills and any checks determined to be associated with/or suspected of being associated with fraudulent activity.

According to some embodiments, a bank receives records associated with physical documents from a store over a network in a bank document processing system. Prior to receiving the physical documents at the bank, the bank document processing system automatically compares the received records associated with the physical documents with data in a suspect database to determine if any of the records are associated with a suspect document. The comparison determines if any of the physical documents to be deposited are suspect or associated with fraudulent activity. If the bank document processing system determines that one or more of the records are associated with suspect documents, a notice is automatically transmitted from the bank document processing system over the network to one of the customer's computers. The notice indicates that the bank via the bank document processing system determined that one or more of the records is associated with a suspect and/or fraudulent document. In these embodiments, after detecting a suspect and/or fraudulent document to be deposited, the provisional credit applied to the store's bank account may be reduced accordingly by the bank document processing system in communication with the accounting system.

According to some embodiments, a bank contracts with one or more third parties to receive and process documents, such as, for example, currency bills, checks, or both. The third party can be an armored carrier that generally performs all operations of a bank vault on behalf of the bank. That is, according to some embodiments, a third party such as an armored carrier counts, discriminates, and totals all currency bill deposits and/or proofs, clears, and totals all check deposits. All of the calculated totals can be transmitted to the bank at one or more times throughout the day such that the bank can maintain visibility of its incoming currency bills and/or overall deposits. Based on the calculated totals and/or other deposit related information generated by the third party and transmitted or otherwise made available to the bank, the bank can update financial records in the bank's accounting system, such as, for example, the accounting system 1750 described in connection with FIGS. 17A and 17B and in connection with other portions of the present disclosure, and as described in the Document Processing Device Operations in a Financial Institution System Section and other sections of U.S. Pat. No. 8,162,125, which is hereby incorporated by reference herein in its entirety.

According to some embodiments, under the third party agreements, the third party (e.g., armored carrier) maintains physical custody of the currency bills and sometimes checks such that the physical documents are never transported to the bank's own vault. According to some embodiments, the third party keeps track of all currency that belongs to the bank, arranges for the sale of excess currency from the third party's vault to the United States Federal Reserve, arranges for delivery of currency to one or more of the bank's branches, and arranges for delivery of currency and/or coin to customers of the bank.

According to some embodiments, the third party is the same as, or similar to, the financial institution system 903 described in connection with FIGS. 9A and 9B. Thus, the third party can include one or more document processing devices and/or systems, such as, for example, one or more devices 44, 101, 11*b*, 11*ca*, 11*cb*, one or more imaging MPS(s) and/or non-imaging MPS(s), e.g., 11*g*-11*h*. According to some embodiments, the devices and/or systems of the third party is/are configured to electronically communicate with one or more bank accounting systems in order to update financial records for each customer or account in a similar manner as described herein in connection with FIGS. 9A and 9B.

Figure 9B:
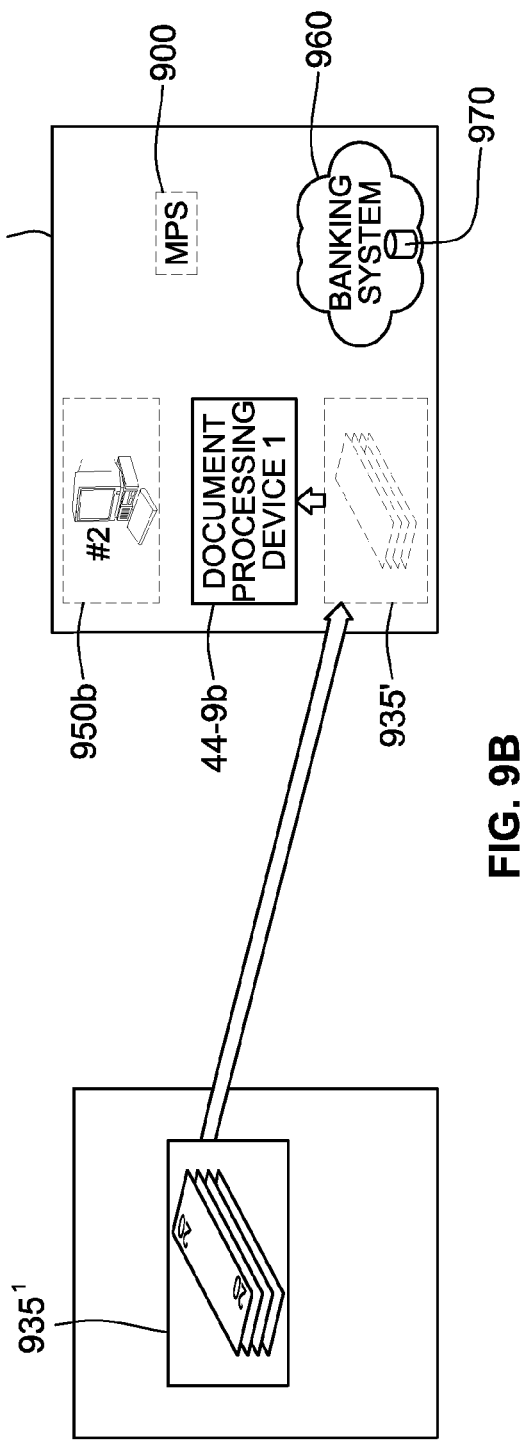
FIG. 9B is a block diagram illustrating a transportation of physical documents in the financial transaction system of FIG. 9A.

According to some embodiments, a store can transmit records and/or data files directly to a bank for processing as described in reference to FIGS. 9A and 9B. According to some embodiments, the store transmits the records and/or data files to the bank and/or to a third party, such as an armored carrier, for processing. Alternately, according to some embodiments, the store only transmits records and/or data files directly to the third party for processing. As such, the third party acts as an agent of the bank and receives and processes all records and/or data files associated with deposit transactions. According to some embodiments, the one or more devices and/or systems of the third party can be configured to forward or otherwise make available the records and/or data files to the bank according to rules and/or guidelines developed between the bank and the third party. According to some embodiments, the one or more devices and/or systems of the third party are configured to communicate with one or more devices and/or systems of the bank regarding no-show documents, unexpected documents, and/or suspect documents.

Now turning to FIGS. 9A and 9B, a block diagram of a financial transaction system 901 is described according to some embodiments of the present disclosure. FIGS. 9A and 9B illustrate non-limiting examples suitable for describing an electronic portion and a physical portion of a deposit transaction between a customer, such as a Store, and a financial institution, such as a Bank, according to some embodiments of the present disclosure. As discussed above, according to some embodiments, the Store can be a person, a casino, a department store, etc. Similarly, the Bank can be any financial institution including, but not limited to, a bank, an internet bank, an armored carrier, etc. Thus, the following use of the terms "Store" and "Bank" in this description should not be limited to the literal definition of such words, but are merely non-limiting examples for ease of description.

The financial transaction system 901 includes a customer document processing system 902 and a financial institution system 903. A network 920 communicatively connects the customer document processing system 902 and the financial institution system 903. The customer document processing system 902 includes a customer document processing device 44-9*a*. Although the customer document processing device 44-9*a* may provide processing capability, the customer document processing system 902 in some embodiments may also include a customer computer 950*a* communicatively connected to the customer document processing device 44-9*a* via a wired (e.g., electrical, optic) or wireless connection. According to some embodiments, the customer document processing device 44-9*a* and the customer computer 950*a* may share a single housing (e.g., the housing 190 of the document processing device 11*b*) or may be separately housed. Although FIG. 9A may illustrate a single customer computer 950*a* connected to a single customer document processing device 44-9*a*, it is understood that one or more customer computers 950*a* may be connected to one or more customer document processing devices 44-9*a* in any number of combinations. In general, processing may be distributed between any or all of the customer document processing devices 44-9*a* and the customer computers 950*a* in the customer document processing system 902. In some embodiments, aspects of the customer document processing system 902 may be the same as, or similar to, the document processing system 100 described above.

The financial institution system 903 includes a second document processing device 44-9*b* (e.g., a financial institution or bank document processing device 44-9*b*) and a banking system 960. Although the financial institution document processing device 44-9*b* may provide processing capability, the financial institution system 903 may include a second computer or a financial institution/bank computer 950*b* communicatively connected to the financial institution document processing device 44-9*b* via a wired (e.g., electrical, optic) or wireless connection. The financial institution document processing device 44-9*b* and the bank computer 950*b* may share a single housing or may be separately housed. Although FIG. 9A may illustrate a single financial institution computer 950*b* connected to a single financial institution document processing device 44-9*b*, it is understood that one or more bank computers 950*b* may be connected to one or more financial institution document processing devices 44-9*b* in any number of combinations. In some embodiments, aspects of the financial institution document processing device 44-9*b* may be the same as, or similar to, the document processing device 44, 101, 11*b* described above. According to some embodiments, the financial institution system 903 also includes a multiple pocket document processing device 900 in addition to the second document processing device 44-9*b*.

According to some embodiments, the customer document processing device 44-9*a* and/or the financial institution document processing device 44-9*b* is a document processing vault system, such as document processing vault system 611, 621, described in connection with FIGS. 6A-6C, and in other sections of the present disclosure. According to some embodiments, the customer document processing device 44-9*a* and/or the financial institution document processing device 44-9*b* is a document processing recycler system, such as the document processing recycler system described in U.S. Pat. No. 8,162,125, which is hereby incorporated by reference herein in its entirety, and in other sections of the present disclosure.

B. Electronic Portion of Deposit Transaction

According to some embodiments, a store operator, such as, a store employee or manager, initiates an electronic portion of a deposit transaction in the Store by gathering a plurality of documents 935 to be deposited in the Bank for a credit to the Store's financial institution account. As similarly described in relation to the document processing device 101 of FIG. 2, the document processing device 44-9*a* is configured to receive the plurality of documents 935 as one or more batches and/or subbatches of documents in an input receptacle. The plurality of documents 935 are then processed by the customer document processing system 902 to generate an electronic data file or data file 936 (e.g., data file 301) that provides information on the one or more batches and/or subbatches processed by the customer document processing device 44-9*a*. The document processing device 44-9*a* and/or the customer computer 950*a* may generate the data file 936. In general, the data file 936 provides deposit or transaction information (e.g., transaction information 303) relating to the Store's deposit with the Bank. For example, the transaction information may include a customer financial account number, a declared deposit amount or a total deposit amount, a total number of documents to be deposited, a total currency bill deposit amount, a number of deposited currency bills broken down by denomination, a total check deposit amount, a number of deposited checks broken down by on-us checks and transit checks, a total on-us check deposit amount, a total transit check deposit amount, a description of a type of financial transaction, or any combination thereof.

According to some embodiments, for a deposit of checks, the document processing device 44-9a processes the checks including imaging a front and back side of each check and extracting one or more fields of data therefrom (e.g., MICR line, CAR, LAR, etc.). According to some such embodiments, the document processing device 44-9a transmits such images (e.g., image data) and extracted data to the customer computer 950a that includes software for formatting the data. Once received by the customer computer 950a, the software running on the customer computer 950a organizes the received images and extracted data according to a set of rules and/or file format (e.g., x.937 standard file format) suitable for transfer to the financial institution system 903 for credit. According to some embodiments, the software includes a Deposit Balancing Manager (DBM) system that is configured to format the data for transmission to the financial institution system 903 as the data file 936. According to some embodiments, the data file 936 is formatted as an image cash letter (ICL) for use in clearing deposited checks by the financial institution system 903. According to some other embodiments, the software includes an Image Solution Provider (ISP) system that is configured to format the data for transmission to the financial institution system 903 as the data file 936 (e.g., as an ICL). According to some embodiments, by "ISP" and/or DBM systems it is meant to include conduits for check data over the internet (e.g., conduits for cash letters). The ISP system and/or DBM system can also be configured to perform and/or enable a financial institution (e.g., a bank) to perform CAR/LAR of check images. Examples of ISPs that provide software and/or processing services used in transmitting images of checks (e.g., ICLs) and/or clearing checks include fiserv, FIS, Jack Henry Banking, and WAUSAU Financial Systems.

The data file 936 may have any format that is readable by the financial institution system 903. For example, the data file 936 may be a plain text file, a binary file, or a mixed text and binary file. Additionally, the data file 936 may be encrypted or otherwise encoded to be readable only by the financial institution system 903, especially to ensure the security of the data in the data file 936.

The data file 936 may present the data as one or more store records (e.g., records 300a-d, 305a-h), which are associated with the documents 935 to be deposited. In some embodiments, one store record corresponds directly to one document 935, but in other embodiments, one store record may correspond to a plurality of documents 935, which have been consolidated. For example, the data file 936 may be organized, in the same, or similar, manner as described above in reference to the data file 301 shown in FIG. 8E. In another example, the data file 936 may include delimited or fixed length fields which correspond to the categories of transaction information associated with each store record. In a further example, the data file 936 may be specially encoded as a database table that is compatible with database software employed by the financial institution system 903.

According to some embodiments, each of the store records includes data configured to visually represent one or both sides of a document in the plurality of documents 935 and/or one or more snippet images from one or both sides of a document. Put another way, each of the store records in the data file 936 includes a visually readable or human readable image of a document, such as, for example, a currency bill, a check, or in some embodiments a deposit slip. According to some embodiments, the store records solely contain the visually readable image of one or both sides of a document. According to other embodiments, the store records include a visually readable image of both sides of a document, identifying information (e.g., currency bill serial number, denomination, checking account number, check amount, routing number, etc.) and transactional information (e.g., bank account number, depositor ID and/or depositor contact information, etc.). According to other embodiments, the store records only include identifying information and transaction information without any images.

In addition to providing store records corresponding to the documents 935, the data file 936 may also include other data, such as header data, that applies to the more than one store record. For example, header data may include the date and time stamp for the transaction, Store's financial institution account number, and the like. In general, by providing the transaction information as described previously, the generated data file 936 may act as a virtual deposit slip. Additionally or alternatively, a visually readable image of a preprinted deposit slip may be provided by the data file 936. Thus, according to some embodiments, the transaction information included in the data file 936 may be contained within and/or formatted as a virtual deposit slip and/or a visually readable image of a preprinted deposit slip associated with the deposit transaction between the Store and the Bank.

According to some embodiments, the store operator can input all of, or a portion of, the transaction information and/or data included in the data file 936 into the customer document processing system 902. To facilitate the entry of data for the data file 936, the customer document processing system 902 may provide graphical user interface (GUI) utility (e.g., the control panel 170) via the document processing device 44-9a and/or the computer 950a.

Alternatively or additionally, according to some embodiments, the document processing system 902 is configured to automatically populate all of, or a portion of, the transaction information and/or data included in the data file 936. For example, the customer document processing system 902 can be preprogrammed with the Store's financial institution account number and/or the description of the type of financial transaction (and/or a document processing system ID and/or document processing device ID) such that the financial institution account number and the description of the type of financial transaction (and/or the document processing system ID and/or document processing device ID) are automatically included in any data file generated by the document processing system 902. For another example, the customer document processing system 902 can be configured to count and denominate the plurality of documents such that the declared deposit amount, the total number of documents to be deposited, the total currency bill deposit amount, the number of deposited currency bills broken down by denomination, the total check deposit amount, the number of deposited checks broken down by on-us checks and transit checks, the total on-us check deposit amount, and the total transit check deposit amount are automatically included in any data file generated by the customer document processing system 902. Alternatively or additionally, according to some embodiments, the customer document processing system 902 can be configured to display one or more drop down menus and/or other data entry GUI utility to facilitate the completion of transaction information and/or data included in the data file.

According to some embodiments, the customer document processing system 902 is configured to save the store data file 936 in a storage medium or memory device (e.g., a memory of the first computer 950*a* and/or a memory of the first document processing device 44-9*a*) such that a store personnel such as a store operator can view and/or print the store record associated with each of the processed documents 935 to be deposited.

According to some embodiments, the data file is stored in a database and at least includes serial numbers of bills associated with a store customer transaction, a transaction date and/or time, and images or partial images (snippet images) of each document associated with the store customer transaction. According to some such embodiments, the customer document processing system 902 is configured to transmit and/or otherwise make available the database and/or data contained within the database to the store's customer associated with the store customer transaction. For example, a store customer purchases a television from the store and gives the store $1000 in U.S. currency bills for the television. The customer document processing system 902 is configured to process the $1000 transaction, generate a database including a record for each bill in the $1000 transaction, and to transmit or send the database and/or data contained within the database to the store customer such that the store customer has a complete electronic record of each bill used to purchase the television from the store. It is contemplated that according to some embodiments, data contained within the database can be printed and physically given to the store customer by the operator of the customer document processing system 902. According to such embodiments, if one of the bills turns out to be a counterfeit, the store and the store's customer has a record of the transaction and can identify the bills by serial number such that the store can chargeback the store customer if so desired.

As described previously, processing may be distributed between the customer document processing device 44-9*a* and the customer computer 950*a* in the customer document processing system 902. In some embodiments, the customer document processing device 44-9*a* may write raw data to a data file 936 and transmit the data file 936 to the customer computer 950*a*, which may further process and/or sort the store records. For example, the customer computer 950*a* can be configured to calculate a total deposit value equal to the value of a sum total of values of the documents 935 associated with the deposit transaction.

According to some embodiments, in response to generating the data file 936, the store operator may use a control panel (e.g., the control panel 170) or other software operations of the customer document processing system 902 to electrically transmit the generated store data file 936 over the network 920 to the financial institution system 903. Alternatively, the customer document processing system 902 automatically transmits the data file 936 over the network 920 to the financial institution system 903 as an electronic transmission without further input from the store operator. In general, the data file 936 may be electrically transmitted from the customer document processing device 44-9*a*, the customer computer 950*a*, and/or another device or computer within the customer document processing system 902 to the financial institution system 902.

Although the customer document processing system 902 may initiate a push-based file transfer, the financial institution system 903 may alternatively initiate a pull-based file transfer. For example, the customer document processing system 902 may make the data file 936 available at a specific location within the customer document processing system 902, e.g., the storage medium of the customer computer 950*a*. The financial institution system 903 may then be responsible for initiating a download of the data file 936 from the customer document processing system 902.

In some embodiments, the data file 936 may be transmitted, for example, via any file transfer protocol, to a specific location on a file system on the network of the financial institution system 903, thus, providing any subsystems of the financial institution system 903 with access to the data file 936, for example, via the local area network (LAN). In other embodiments, the data file 936 may be transmitted to a storage medium on the financial institution computer 950*b* which is connected to the network 920. After the financial institution system 903 receives the data file 936, the financial institution document processing device 44-9*b*, the financial institution computer 950*b*, the banking system 960, and/or one or more other aspects of the financial institution system 903 may access the data file 936.

The handling of the data file 936 by both the customer document processing system 902 and the financial institution system 903 may include aspects of a deposit processing system, such as a deposit aggregator system. In general, a deposit aggregator system may receive and/or send data files associated with one or more deposit transactions between one or more customers and one or more financial institutions. According to some embodiments, the customer document processing system 902 is configured to transmit or upload the store data file 936 to the deposit aggregator via the network 920. The deposit aggregator then receives and sends the data file to one or more financial institutions. For example, the deposit aggregator system can be configured to receive the store data file 936 associated with the deposit transaction between the Store and the Bank. According to some embodiments, the store data file 936 is stored on one or more storage devices of the deposit aggregator system until the Bank downloads the store data file 936 in a pull-based transfer. Thus, the customer document processing system 902 uploads the store data file 936 onto the deposit aggregator system and the Bank downloads the store data file 936 from the deposit aggregator system. Alternatively or additionally, the deposit aggregator system may automatically upload or pull one or more store data files from the customer document processing system 902 and/or automatically transmit or push the one or more uploaded store data files to one or more financial institutions associated with the respective data files.

According to some embodiments, the deposit aggregator system can read at least a portion of the store data files (e.g., transaction identifier, customer account number, etc.) to determine a proper destination for each data file 936. According to some embodiments, the deposit aggregator system may automatically upload (pull) and/or transmit (push) the data files at one or more predetermined times (e.g., at 3 PM everyday or every business day, at 3 AM on predetermined days, etc.). According to other embodiments, the customer document processing system 902 and/or the financial institution system 903 automatically upload (push) and/or download (pull) data files at one or more predetermined times (e.g., at 3 PM everyday or every business day; pull at 3:15 PM every day and push at 9:30 AM every day, etc.).

In other embodiments, the deposit aggregator may read the records in the data files 936 to determine the types of deposits, for example, cash deposits, on-us checks, transit checks, etc., in the records. As such, the deposit aggregator may organize the records in the data file 936 according to deposit type and route the records according to deposit type. In other words, the deposit aggregator may create new one or more new data files, each of which contains records of a particular deposit type from the original data file 936. For example, the deposit aggregator may determine that the data file 936 includes records for cash deposits and transit checks and may process each set of records according to a different procedure. On the one hand, the deposit aggregator may send the cash deposit records in a new data file to the customer's financial institution to credit the customer's account. On the other hand, the deposit aggregator may send the transit check records to the one or more financial institutions corresponding to the drawee of each check. As there may be more than one financial institution corresponding to the transit checks, the deposit aggregator may create one or more data files for each institution and divide the transit check records appropriately among these data files. Each of these data files indicates the customer's financial institution for appropriate crediting. Advantageously, processing of the checks at the drawees' financial institution and appropriate crediting of the customer's account at the customer's financial institution can occur more quickly. Moreover, this approach reduces the administrative burden associated with the processing of transit checks by the customer's financial institution.

According to some embodiments, an item processing system that resides within and/or is an integral component of the banking system receives the store data file 936 for processing. Such processing may be conducted in real-time, near real-time, or in batch at scheduled times of the day. According to some embodiments, the item processing system analyzes and/or reviews the data and information (e.g., store records, virtual deposit slip, etc.) included in the store data file 936 and compares the values associated with each of the store records in the data file 936 with the various declared totals (e.g., total declared deposit, total declared currency bill deposit, total declared check deposit, etc.) to balance the deposit transaction. In the case of a discrepancy, the item processing system can be configured to modify the data file 936, one or more of the store records in the store data file 936, and/or the virtual deposit slip. Alternatively or additionally, in the case of a discrepancy, the item processing system can be configured to create a credit/debit memo and/or an offsetting record or an offsetting data file associated with the deposit transaction such that the store data file 936 and the offsetting data file balance. That is, the store data file 936 plus the offsetting data file balance the deposit transaction. According to some embodiments, a discrepancy between the values of the store records and the declared totals of the deposit slip can occur due to an error in generating the virtual deposit slip. For example, the operator of the customer document processing system 902 can erroneously input incorrect data via, for example, the control panel, the first computer 950a, and/or one of the dropdown windows. For another example, in the case of a preprinted deposit slip being imaged and included in the data file, the operator can erroneously record or write data on the preprinted deposit slip and/or the customer document processing system 902 can erroneously extract the data via OCR and/or CAR/LAR software.

According to some embodiments, the store data file 936 includes a plurality of records associated with currency bills and a plurality of records associated with checks. According to some such embodiments, the item processing system is configured to process and/or proof the store records included in the data file 936 associated with checks based on the data (e.g., the visually readable image of one or both sides of the respective check) included in the respective store record. That is, according to some embodiments, the item processing system can fully process the store records associated with checks without further processing and/or examination of the corresponding physical check. According to some embodiments, the item processing system includes a proof of deposit system (POD), which is described in greater detail in the Document Processing Device Operations in a Financial Institution System Section of U.S. Pat. No. 8,162,125, which is hereby incorporated by reference herein in its entirety, and in other sections of the present disclosure.

According to some embodiments, the item processing system is configured to transmit a credit instruction to cause the banking system to credit the financial institution account of the customer in response to receiving the store data file 936. According to some embodiments, the item processing system is configured to transmit a credit instruction to cause the banking system to credit the financial institution account of the customer in response to a determination that the store records included in the store data file 936 balance with the declared totals of the virtual deposit slip. According to some such embodiments, the credit can be a provisional credit (e.g., funds available subject to review and/or additional processing or funds temporarily available) or a final credit (e.g., funds are immediately available for withdrawal). The credit can be for an amount based on the total declared deposit amount, the total declared currency bill deposit amount, the total declared check deposit amount, the total declared on-us check deposit amount, and/or the total declared transit check deposit amount. For example, the credit can be a percentage of the total declared deposit amount. According to some embodiments, the credit can be a provisional credit for an amount based on the total declared currency bill deposit amount and a final credit for an amount based on the total declared check deposit amount. According to some embodiments, the credit can be a provisional credit for an amount equal to the total declared currency bill deposit amount and a final credit for an amount equal to the total declared check deposit amount.

The banking system 960 can be any financial institution computer, system, network, and/or any combination thereof. According to some embodiments, the banking system 960 includes a plurality of communicatively connected computers, servers, storage devices, and/or processors configured to at least run teller software. According to some embodiments, the teller software can be operated automatically via software instructions. Alternatively, the teller software is operated via software instructions and/or operator control. In these embodiments, the financial institution operator, such as a bank teller, can manually manipulate the teller software using one or more computers to perform a variety of financial institution operations, such as, for example, debiting/crediting financial institution accounts, creating offsetting records and/or offsetting data files, etc.

According to some embodiments, the banking system 960 includes a database 970. According to some embodiments, the database 970 includes a plurality of individual databases that are stored on one or more memory devices. For example, according to some embodiments, the database 970 can include a separate customer information database, a deposit database, a loan account database, and a transaction history database. The customer information database can include information about the Bank's customers, such as, for example, names, addresses, phone numbers, etc. The deposit database can include customer financial account numbers (e.g., the Store's bank account) for all of the Bank's customers and the balances of each account. Alternatively, the database 970 is a single database that includes all customer information, deposit information, transaction history, etc. The database 970 can be located within the banking system 960, within the financial institution system 903, or external to one or both. According to some embodiments, the database 970 is stored on a plurality of different memory devices, which can be physically located in a plurality of different locations (e.g., different computers with the same or different financial institutions). According to some embodiments, the database 970 has one or more memory back-ups located in a plurality of locations (e.g., online server back-up).

According to some embodiments, the financial institution system 903 is configured to provisionally credit the Store's bank account in response to receiving the store data file 936 associated with the deposit transaction. According to some embodiments, in response to the financial institution 903 receiving the store data file 936 over the network 920, the financial institution 903 automatically issues an immediate provisional credit to the Store's bank account, which is stored within the database 970 in the banking system 960. In some of these embodiments, the financial institution 903 issues a provisional credit in an amount equal to the total deposit value calculated by the first computer 950*a*. In other embodiments, the financial institution 903 issues a provisional credit in an amount equal to a total deposit value calculated by the second computer 950*b* or other financial institution computer. Yet in other embodiments, the financial institution 903 issues a provisional credit in an amount equal to a predetermined percentage of a total deposit value. The predetermined percentage can be determined by the financial institution 903 based on previous dealings with the Store, based on the amount of the total deposit value, and/or various other factors.

According to some embodiments, the second computer 950*b* is configured to receive the store data file 936 either directly or indirectly from the customer-side financial transaction system 902. In these embodiments, in response to receiving the data file 936, the second computer 950*b* can be configured to automatically transmit a credit instruction to the banking system 960. In some of these embodiments, the teller software running on the banking system 960 can be configured to receive the credit instruction and automatically apply a provisional credit to the Store's bank account based on the credit instruction. Alternatively, the teller software running on the banking system 960 can further require operator input from a bank employee or teller to complete the provisional credit. Such operator input can include an operator credit command directly received by the banking system 960 via the teller software.

XI. Deposit Slips

A. Physical Deposit Slip

Figure 10A:
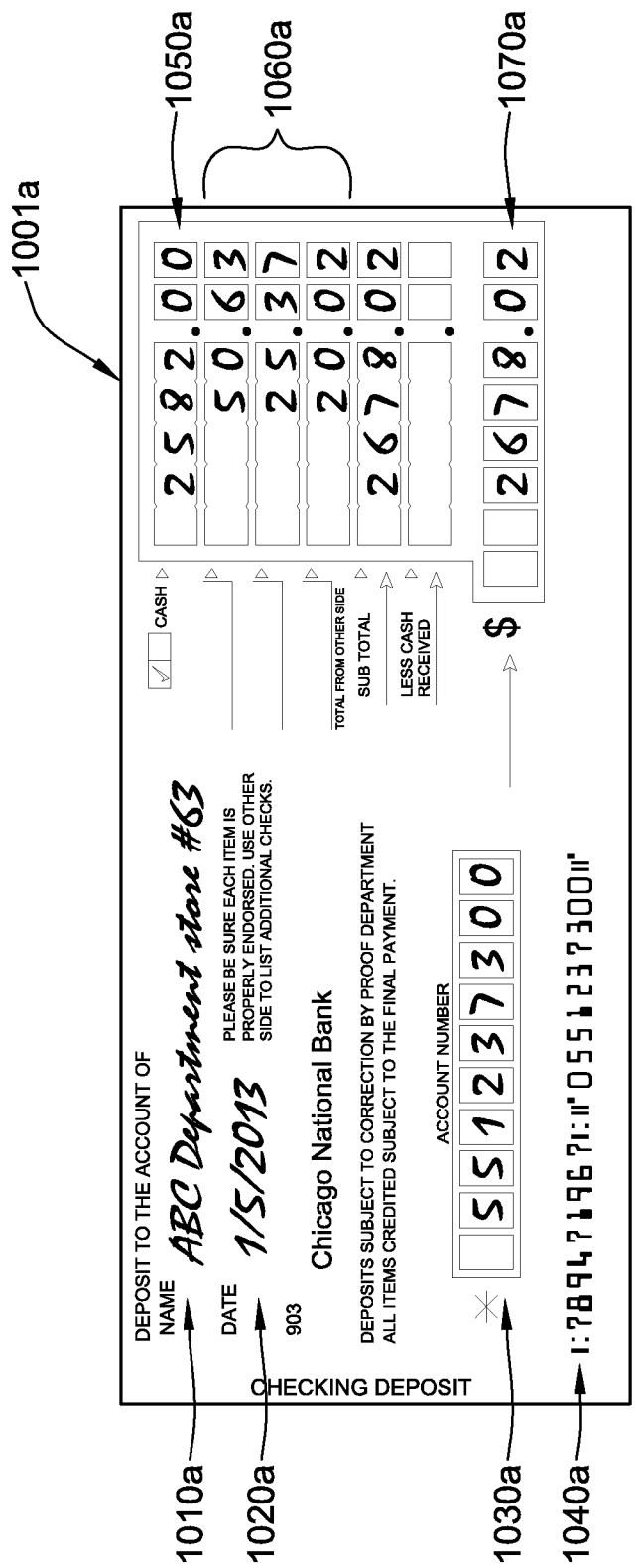
FIG. 10A is a representation for a physical deposit slip according to some embodiments of the present disclosure.

Traditionally, once a customer such as a retailer has counted currency bills, coins, and checks to be deposited, the customer manually prepared a paper deposit slip, places the deposit slip, the currency bills, coins, and checks into a bag B and seals the bag B. The bag B is then either taken to the customer bank by the customer or given to armor carrier personnel who transport the bag B to the bank in an armored car. FIG. 10A illustrates an exemplary paper deposit slip 1001 which is completed manually by a customer. The paper deposit slip 1001*a* can have a variety of fields such as an account name field 1010*a*, a date field 1020*a*, an account number field 1030*a*, a MICR field 1040*a*, a cash total field 1050*a*, fields to itemize individual checks 1060*a*, and a grand total field 1070*a*. Often the deposit slips are customized for a particular account and the MICR field 1040*a* is preprinted to include the account number in addition to the bank routing information.

B. Electronic Deposit Slip (EDS)

According to some embodiments, electronic deposit slips are employed. Electronic deposit slips may contain the same or similar fields as traditional paper deposit slips and/or may contain additional fields. As will be described in more detail, electronic deposit slips are created on an electronic device. According to some embodiments, electronic deposit slips are maintained in electronic form throughout the life of a deposit transaction. Alternatively or additionally, electronic deposit slips may be printed out or otherwise converted into a non-electronic form. According to some such embodiments, the printed deposit slip can be printed at a location of a bank customer and included with associated documents (e.g., currency bills and/or checks for deposit listed on the printed deposit slip) for transport to a bank for deposit therein.

1. Fields

Figure 10B:
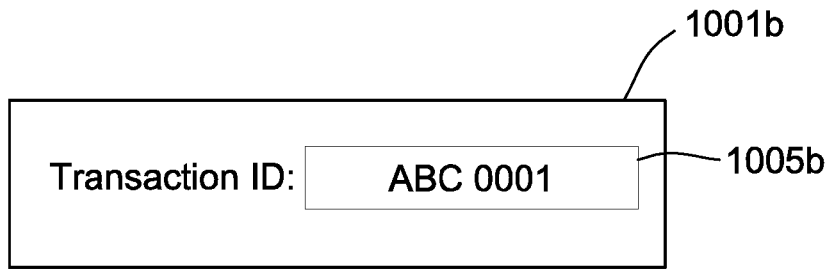
FIGS. 10B-10E are representations of data that may be included in electronic deposit slips according to some embodiments of the present disclosure.

FIG. 10B illustrates a deposit slip 1001*b* that consists solely of a transaction ID field 1005*b*. According to some embodiments, the transaction ID (illustrated in FIG. 10B as "ABC 00001") is generated by or received from a document processing device 11 such as a document imaging device 44 in communication with a bank computer. For example, as discussed above in connection with FIGS. 9A and 9B, document processing device 44-9*a* located at, for example, a retail store is communicatively coupled to a banking system 960 and either the banking system 960, the local document processing device 44-9*a*, a computer on the network 920, some other computer, and/or some combination of these devices generates a transaction ID for a particular deposit transaction. Preferably, the transaction ID is unique. According to some embodiments, other relevant information associated with a particular deposit transaction is associated with the transaction ID such that the other information need not be contained on the deposit slip 1001*b*. For example, the customer name and account number could be associated with a transaction ID in a database accessible by the bank to receive the associated deposit such that it need not be included on a deposit slip. Once the bank receives the deposit slip 1001*b*, a computer accessible by the bank such as, for example, banking system 960 can retrieve the associated deposit information in response to the computer receiving the transaction ID (e.g., via manual entry of the transaction ID by a teller or electronic receipt of the transaction ID). According to some embodiments, the deposit slip 1001*b* is a paper deposit slip and the customer manually fills in the transaction ID. According to some embodiments, the document processing device 44-9*a* (or a computer or other electronic device communicatively coupled to the document processing device) causes the deposit slip 1001*b* to be printed out as a physical deposit slip. Alternatively or additionally, the document processing device 44-9*a* (or a computer or other electronic device communicatively coupled to the document processing device) transfers an electronic version of the deposit slip 1001*b* or the transaction ID into a memory of a "smart" document container such as a smart mini-safe SF or smart cassette CS.

Figure 10C:
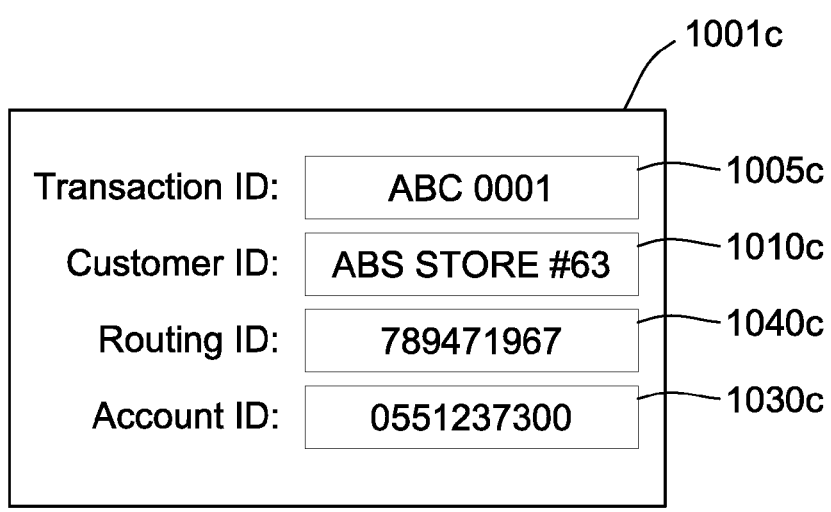

FIG. 10C illustrates a deposit slip 1001*c* that has a transaction ID field 1005*c*, a customer ID field 1010*c*, a routing information field 1040*c*, and an account information field 1030*c*. The deposits slip 1001*b*, the transaction ID field, and the generation and use of the same and the information in all the fields may be substantially similar to or the same as described above in connection with FIG. 10B.

Figure 10D:
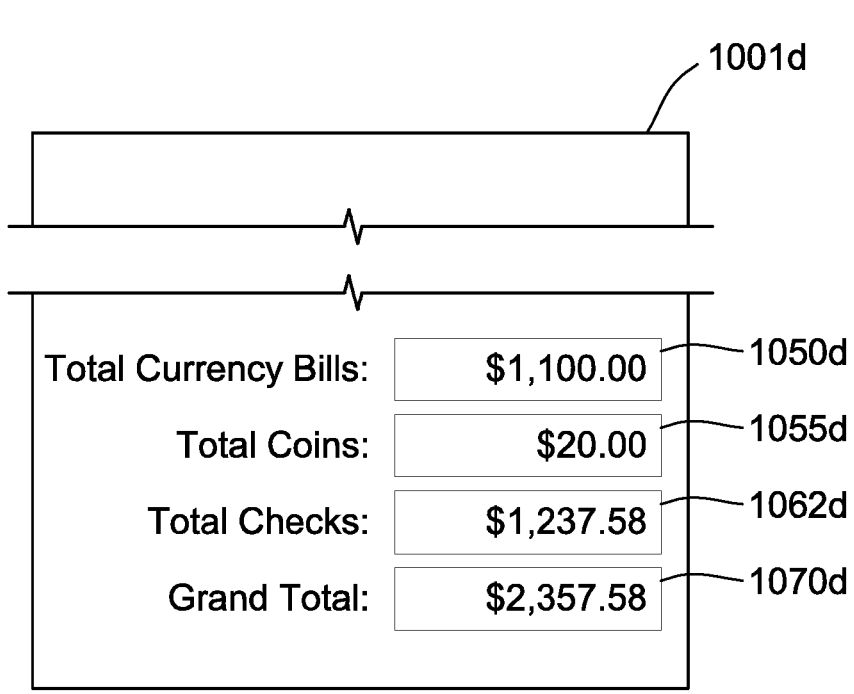

FIG. 10D illustrates a portion of a deposit slip 1001*d*. The deposit slip may have some or all of the transaction, customer, routing, and customer identification fields as discussed above in connection with FIGS. 10B and 10C and may otherwise be substantially similar to or the same as described above in connection with FIG. 10B including how it is generated and used. The deposit slip 1001d has some additional fields in which the total value of currency bills 1050e, the total value of coins 1055d, the total value of checks 1062d, and the grand total of the funds 1070d to be deposited is specified.

Figure 10E:
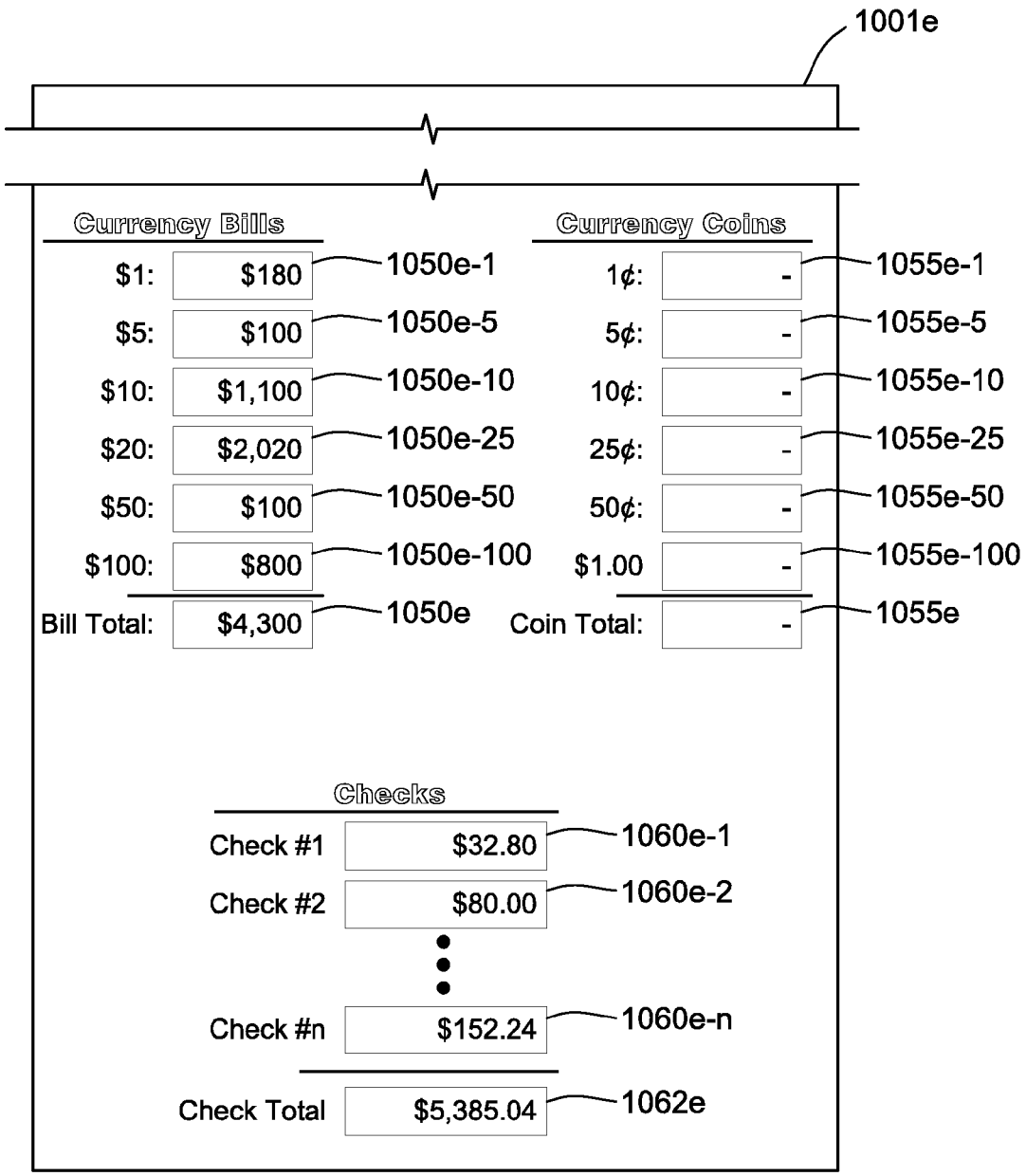

FIG. 10E illustrates a portion of a deposit slip 1001e which is the same as or similar to the deposit slip 1001d but comprises additional fields to further breakdown the composition of the funds to be deposited. In particular, the deposit slip 1001e comprises individual currency bill denomination fields 1050e-1, 1050e-5, 1050e-100 in which the value or units of each denomination of bill is specified. Likewise, the deposit slip 1001e comprises individual coin denomination fields 1055e-1, 1055e-5, 1055e-100 in which the value or units of each denomination of coin is specified. Finally, the deposit slip 1001e comprises individual check value fields 1060e-1, 1060e-2, 1060e-n in which the value of each individual check to be deposited is specified. Otherwise the generation and use of the deposit slip and the information in all the fields may be substantially similar to or the same as described above in connection with FIGS. 10B-10D.

According to some alternative embodiments, in addition to the individual coin denomination fields 1055e-1, 1055e-5, 1055e-100 of FIG. 10E in which the value or units of each denomination of coin is specified, the individual coin denominations can be further listed and/or divided based on "rolled" coin verses "unrolled" or "loose" coin status. That is, the deposit slip can list the value of each denomination of coin being deposited that is rolled and the value of each denomination of coin being deposited that is loose.

According to some other alternative embodiments, a deposit slip (e.g., deposit slip 1001e of FIG. 10E) that is the same as, or similar to, the deposit slip 1001d includes additional fields to further breakdown the composition of the funds to be deposited. For example, such a deposit slip can include coupon fields in which the value or units of each coupon is specified. In addition or in lieu thereof, the deposit slip can include traveler checks fields, gift certificate fields, credit card receipt fields, etc. in which the value or units of each traveler check/gift certificate/credit card receipt is specified. According to some such embodiments, a total credit card deposit can be listed or each individual credit card slip can be listed on the deposit slip.

Along the same lines, any of the data and/or images discussed above in connection with data records and data files in connection with FIGS. 8A-8E may be included on deposit slips. For example, the data file discussed above in connection with FIG. 8E may be used as a deposit slip. For example, according to some embodiments, the data and images in FIG. 8E are included in an electronic deposit slip which is electronically sent to a remote bank or other remotely located computer or network and/or are transferred to a memory of a smart container such as a smart cassette CS or smart mini-safe SF.

2. Manual Entry of Data in Electronic Deposit Slip

Electronic deposit slips may be created in a variety of manners. For example, once a customer determines the information to be included on an electronic deposit slip, that information may be entered into an electronic deposit slip form via a computer such as a PC (e.g., 151 of FIG. 2, 950a of FIG. 9A, 1152 of FIG. 11) or PDA (e.g., iPad®, smart phone such as an iPhone®, e.g., 1199 of FIG. 11). For example, an electronic deposit slip application on a smart phone may prompt a user to enter the appropriate data into various fields such as those discussed above in connection with FIGS. 8A-8E and 10A-10E. Additionally, a smart container such as a smart cassette CS or smart mini-safe SF may have a similar program resident on an on-board processor and have an interface, e.g., interface 420 shown in FIG. 4C, which permits a user to enter information to be included on an electronic deposit slip into a memory (e.g., memory 410 of FIG. 4C) of the smart container.

3. Currency Bill Denominating Device 33 Creation

According to some embodiments, currency bills are processed by a currency bill denominating device 33 and the currency bill processing device has an electronic deposit slip program running on a resident processor and populates some of the fields of an electronic deposit slip with the data determined from the processing of currency bills on the currency denominating device, e.g., the total value of currency bills processed and/or a denominational breakdown of the bills processed by denomination. Furthermore, according to some embodiments, the currency processing device has a user interface that permits an operator of the currency processing device to enter other relevant data such as the total value and/or denominational breakdown of coins to be deposited and/or the total value and/or individual breakdown of checks to be deposited (see e.g., deposit slips shown in FIGS. 10D and 10E). According to some embodiments, the currency denominating device is communicatively coupled to other devices such as coin sorters or check processing devices and electronically receives relevant information about the coins and/or checks to be included in a deposit from such other devices and populates the appropriate fields in an electronic deposit slip. Likewise, transactional ID information, customer ID information, routing information, and account information may be entered via the currency bill denominating device interface and/or received electronically from another electronic device communicatively coupled to the currency bill denominating device. According to some embodiment, some data may be stored in a memory of the currency bill denominating device and used repeatedly to populate relevant fields in electronic deposit slips for multiple deposit transactions. For example, if a currency bill denominating device is located in a store such as ABC STORE #63, the relevant customer ID, e.g., "ABC Store #63" (see field 1010c of FIG. 10C), routing ID, e.g., "789471967" (see field 1040c of FIG. 10C), and account ID, e.g., "1237300" (see field 1030c of FIG. 10C) may be stored in a memory in the currency bill denominating device (or some other computer communicatively coupled to the currency bill denominating device) and used repeatedly to populate appropriate fields in electronic deposit slips (and/or in the creation of data records and/or data files) each time the currency bill denominating device is operated in a particular mode such as a deposit mode.

4. DID 44 Creation

According to some embodiments, documents to be deposited are processed by a document imaging device 44 and the document imaging device 44 has an electronic deposit slip program running on a resident processor and populates some of the fields of an electronic deposit slip with the data determined from the processing of documents (e.g., currency bills, checks, physical deposit slips) on the document imaging device, e.g., the total value of currency bills processed, a denominational breakdown of the bills by denomination, extracted serial numbers of processed bills, and/or full or snippet images of processed bills and/or information about processed checks (e.g., the total value and/or individual breakdown of individual check values, full or snippet images of checks)—see e.g., the data and images contained in data file 301 discussed above in connection with FIG. 8E. Furthermore, according to some embodiments, the document imaging device has a user interface that permits an operator of the currency processing device to enter other relevant data such as the total value and/or denominational breakdown of coins to be deposited and/or the total value and/or individual breakdown of checks to be deposited. See e.g., deposit slips shown in FIGS. 10D and 10E. According to some embodiments, the document imaging device is communicatively coupled to other devices such as coin sorters or check processing devices and electronically receives relevant information about the coins and/or checks to be included in a deposit from such other devices and populates the appropriate fields in an electronic deposit slip. According to some embodiments, customer ID information, routing information, and account information may be extracted from a physical deposit slip, header card, or trailer card included with the stack of documents being processed such as in a deposit mode. Likewise, transactional ID information, customer ID information, routing information, and account information may be entered via the document imaging device interface and/or received electronically from another electronic device communicatively coupled to the document imaging device. According to some embodiment, some data may be stored in a memory of the document imaging device and used repeatedly to populate relevant fields in electronic deposit slips for multiple deposit transactions. For example, if a document imaging device is located in a store such as ABC STORE #63, the relevant customer ID, e.g., "ABC Store #63" (see field 1010c of FIG. 10C), routing ID, e.g., "789471967" (see field 1040c of FIG. 10C), and account ID, e.g., "1237300" (see field 1030c of FIG. 10C) may be stored in a memory in the document imaging device (or some other computer communicatively coupled to the document imaging device) and used repeatedly to populate appropriate fields an electronic deposit slips (and/or in the creation of data records and/or data files) each time the document imaging device is operated in a particular mode such as a deposit mode.

XII. Depositor Location_System Components
(Figure Of Typical Remote Location) [FIG. 11]

Figure 11:
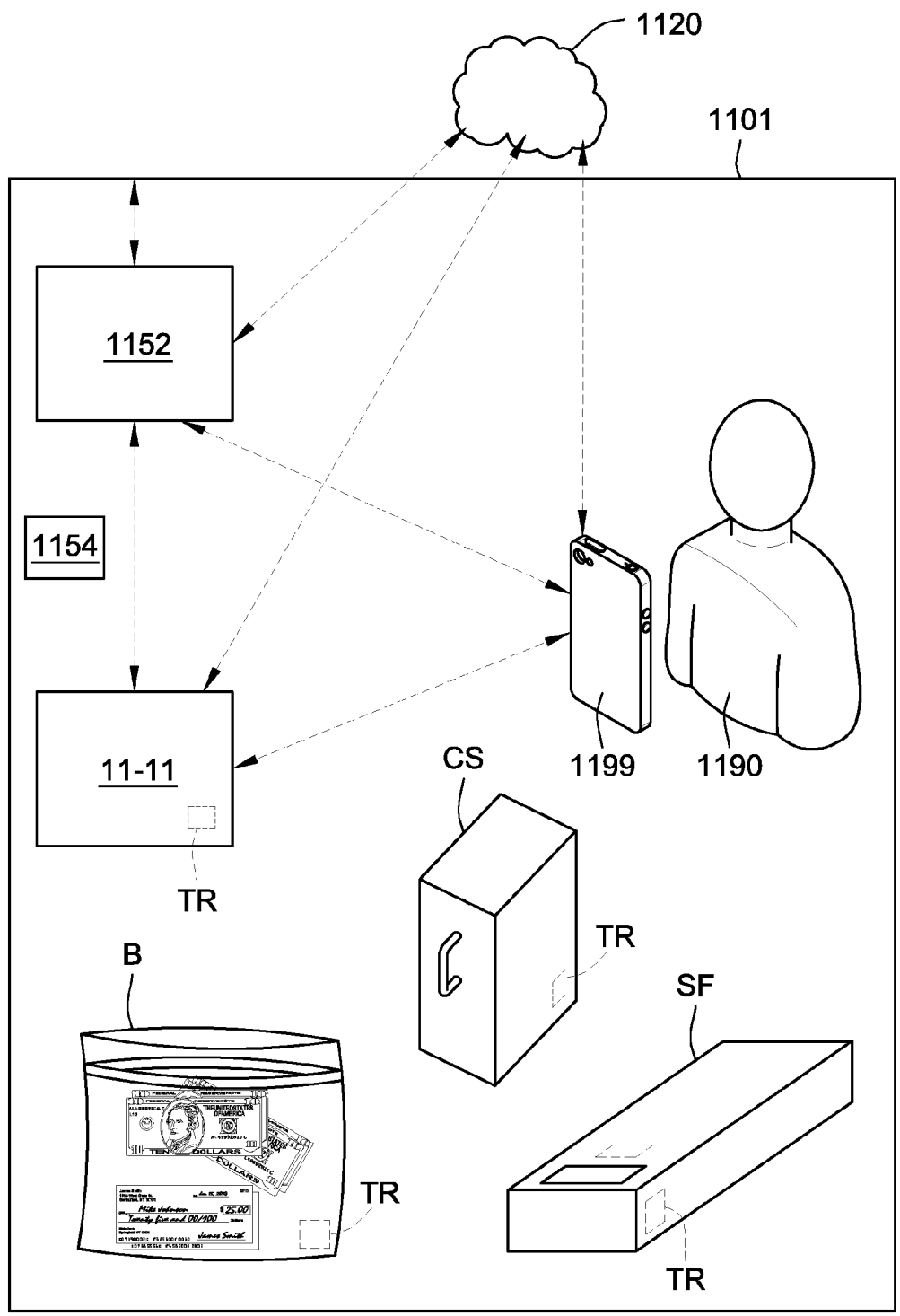
FIG. 11 is a representation of a financial institution customer location according to some embodiments of the present disclosure.

FIG. 11 illustrates an exemplary bank customer location 1101 such as, for example, a retail store location such as store R1 shown in FIG. 7 or location R1 shown in FIG. 9A. A person 1190 such as a store manager is preparing documents to be transferred to a bank and/or as part of a remote electronic deposit transaction as discussed above in connection with FIG. 9A. According in some embodiments, the person 1190 uses a document processing device 11-11 to count and otherwise process documents to be deposited in a deposit transaction as described above. For example, if the device 11-11 is a currency bill denominating device 33, a stack of currency bills of a single denomination or of mixed denominations to be deposited is placed into the input receptacle of the device 11-11 and the device processes the bills determines the total value of the currency bills and/or a breakdown of the bills by denomination. If the device 11-11 is a document imaging device 44, the device may be used to process checks and/or deposit slips and/or header and/or trailer cards in addition to currency bills. For example, according to some embodiments a stack of documents to be deposited in a deposit transaction comprises a physical deposit slip, one or more checks and one or more currency bills. The stack of documents to be deposited is placed into the input receptacle of the device 11-11 and the device processes the documents and determines the total value of the currency bills and/or a breakdown of the bills by denomination, the total value of checks and/or a breakdown of the value of each check. The device 11-11 obtains an image of the checks and deposit slip and/or the currency bills as discussed above.

According to some embodiments, the device 11-11 then prepares an electronic deposit slip as described above. According to some embodiments, the device then sends the electronic deposit slip to the bank such as via a network 920 as discussed above in connection with FIG. 9A. According to some embodiments, the device 11-11 sends the electronic deposit slip to a computer 1152 communicatively coupled to device 11-11 and the computer 1152 then sends the EDS to the bank via network 920, 1120.

According to some embodiments, the person 1190 has a WD 1199 such as a PDA such as a smart phone (e.g., an iPhone) or tablet (such as, e.g., an iPad). According to some embodiments, the device 11-11 and or the computer 1152 sends the EDS to the PDA 1199 in addition to or instead of sending the EDS to the bank. According to some embodiments, the person prepares an EDS using the PDA and the EDS is then sent to the device 11-11, the local computer 1152, and/or to the network 920, 1120, and/or on to the bank's computer system.

The person 1190 then prepares the physical documents for transfer to the bank (such as for pick up by armored carrier personnel) by for example, placing the documents in a container such as a bag B, a lockable tray T, a cassette CS, and/or a mini-safe SF. According to some embodiments, the EDS is stored in a memory of a smart document container such as a smart cassette CS and/or smart mini-safe SF. For example, the EDS could be transferred to the memory of a smart document container such as a smart cassette or smart mini-safe from the PDA 1199, the device 11-11, the computer 1152, and/or the network 920, 1120. According to some embodiments, the device 11-11 is configured to receive one or more cassettes and/or mini-safes and transfer documents processed by the device directly into the cassettes and/or mini-safes as discussed above.

A. Printer—Physical Deposit Slip/Header/Trailer Card Generation

According to some embodiments, a printer 1154 is communicatively coupled to device 11-11, computer 1152, network 1120, and/or WD 1199. According to some embodiments, the deposit transaction data generated by device 11-11 and/or entered by the operator 1190 is sent to the printer 1154 and used to prepare a physical deposit slip and/or a card (e.g., header or trailer card, or container ID card) to be included with the deposit transaction documents (such as by being placed in the document container holding the deposit transaction documents, e.g., a bag B, tray T, cassette CS, safe SF, etc.). According to some embodiments, the printed deposit slip is a machine readable deposit slip (or header card or trailer card). According to some embodiments, the deposit slip is "formatted" to a standard that a bank uses such as standards related to processing checks under Check 21 regulations and/or standards designed to assist a document processing device 11 in automatically reading the deposit slip. According to some embodiments, the deposit slip form aids in the customer entering information into a known format with known/predefined areas aiding in the efficient processing of documents. Alternatively or additionally, in some embodiments, a machine readable deposit slip can include a barcode printed on a deposit slip and/or a MICR line printed thereon. According to some embodiments, the printer 1154 prints the physical deposit slip (or header or trailer or container ID card) on standard paper (e.g., standard letter size paper). According to some embodiments, the printer 1154 prints the physical deposit slip (or header or trailer or container ID card) on specially-size paper or cards (e.g., paper or cards having the size and shape of U.S. currency bills, standard personal sized checks, or standard header or trailer cards). According to some embodiments, deposit slips can be of various sizes, such as, for example, commercial check size, standard check size, etc. According to some embodiments, deposit slips range in size from the size of a personal check up to the size of a commercial check. According to such embodiments employing printer 1154, the depositor can avoid hand writing a deposit slip and/or avoid having to entry data or prepare a physical deposit slip once at the bank.

According to some embodiments, the WD 1199 (e.g., a wireless tablet or phone device) could serve as an intermediary between the device 11-11 and the printer 1154. For example, according to some embodiments, the WD 1199 (e.g., tablet computer) can be used as an interface to add additional information to an electronically generated deposit slip prior to the deposit slip being printed.

According to some embodiments, the device 11-11 (e.g., document imaging device 44), processes the documents in a deposit transaction and determines the value of each document. The device 11-11 then communicates with the printer 1154 which according to some embodiments may be located in a back office of the customer location 1101. The printer 1154 prints a physical deposit slip on standard letter size paper (e.g., 8½"×11" paper), and the paper is manually torn or cut to a smaller size (e.g., the size and shape of U.S. currency bills, standard personal sized checks, or standard header or trailer cards).

According to some embodiments, the printer 1154 prints one or more bar codes on the deposit slip or header or trailer or container cards. The bar code(s) can encode and/or be associated with any data pertinent to the deposit transaction, such as, for example, a customer ID, an account number, an amount of deposit, a customer name, a customer address, a declared amount, totals of currency deposited, totals of currency being deposited by denomination, total checks being deposited, etc. According to some embodiments, the printer 1154 prints one or more bar codes on stickers which are then affixed to outside of transit container (e.g., bag B). According to some embodiments, the bar coded data is sent to the bank electronically (such as via network 1120, 920) and is associated with deposit transaction (e.g., a database stores data linking or associating the bar coded data to the deposit transaction ID). Upon receipt of physical deposit by the bank, the bar code is scanned (e.g., via a bar code gun or by running the barcoded document through a device 11). A bank device (e.g., a computer 1352, 1552 running vault software) coupled to the bar code reader (e.g., via a network 1320, 1520), then pulls up declared deposit information or electronic deposit slip data previously received. For example, according to some embodiments, a bar code has been affixed to the outside of the transit container (e.g., bag B) and it may be scanned even before the container has been opened.

According to some embodiments, as part of the depositor's agreement, a depositor (e.g., retail employee 1190) uses a bank's web-based banking interface to provide deposit transaction information (e.g., to provide a grand total amount, currency bill total amount, check total amount, breakdown amount information) for a particular deposit transaction for which the corresponding physical deposit documents are to be presented to the bank at a later time (e.g., later that same day). According to some embodiments, the bank's web-based banking interface provides a unique deposit transaction ID (e.g., number) back to the depositor and the depositor prints a physical deposit slip containing the deposit transaction ID (and/or prints a header or trailer or container card or barcode sticker containing the deposit transaction ID. According to some such embodiments, the customer is assigned provisional credit such as described above and in U.S. Pat. No. 8,162,125, which is hereby incorporated by reference herein in its entirety.

According to some embodiments, once a physical shipment of the documents for a deposit transaction arrives at a bank or bank vault, a machine readable deposit slip, as described above, is scanned (e.g., with a bar code gun) by a person at the bank (e.g., 1390*a,b*; 1590*a,b*) such as an operator of a document processing device. The person then scans an arbitrary trailer card which associates the numbers together and reconciles the provisional credit. By "arbitrary trailer card," it is meant to refer to one of a plurality of reusable trailer cards used by banks to organize and/or separate deposits during processing of the same. When a deposit slip is scanned, an arbitrary trailer card can be scanned thereafter and associated with the deposit of the deposit slip. The deposit slip is then not needed as a header card to separate deposits being processed as the trailer card takes its place for that purpose. According to some embodiments, the trailer card is physically thicker than the deposit slip and in some implementations is preferred over the deposit slip as the relatively thicker trailer card can further aid in the processing of multiple related and/or unrelated deposits and the automatic detection of the end of one batch of documents associated with one deposit transaction and the beginning of another batch of documents associated with a different deposit transaction.

According to some embodiments, once a physical shipment of the documents for a deposit transaction arrives at a bank or bank vault, a machine readable deposit slip as described above could be fed into a document processing device 11 along with the other documents in a deposit transaction and read by the device. Such embodiments can lead to improvement in the processing of deposit transaction batches.

XIII. Armored Carrier Vehicle—System Components

Figure 12:
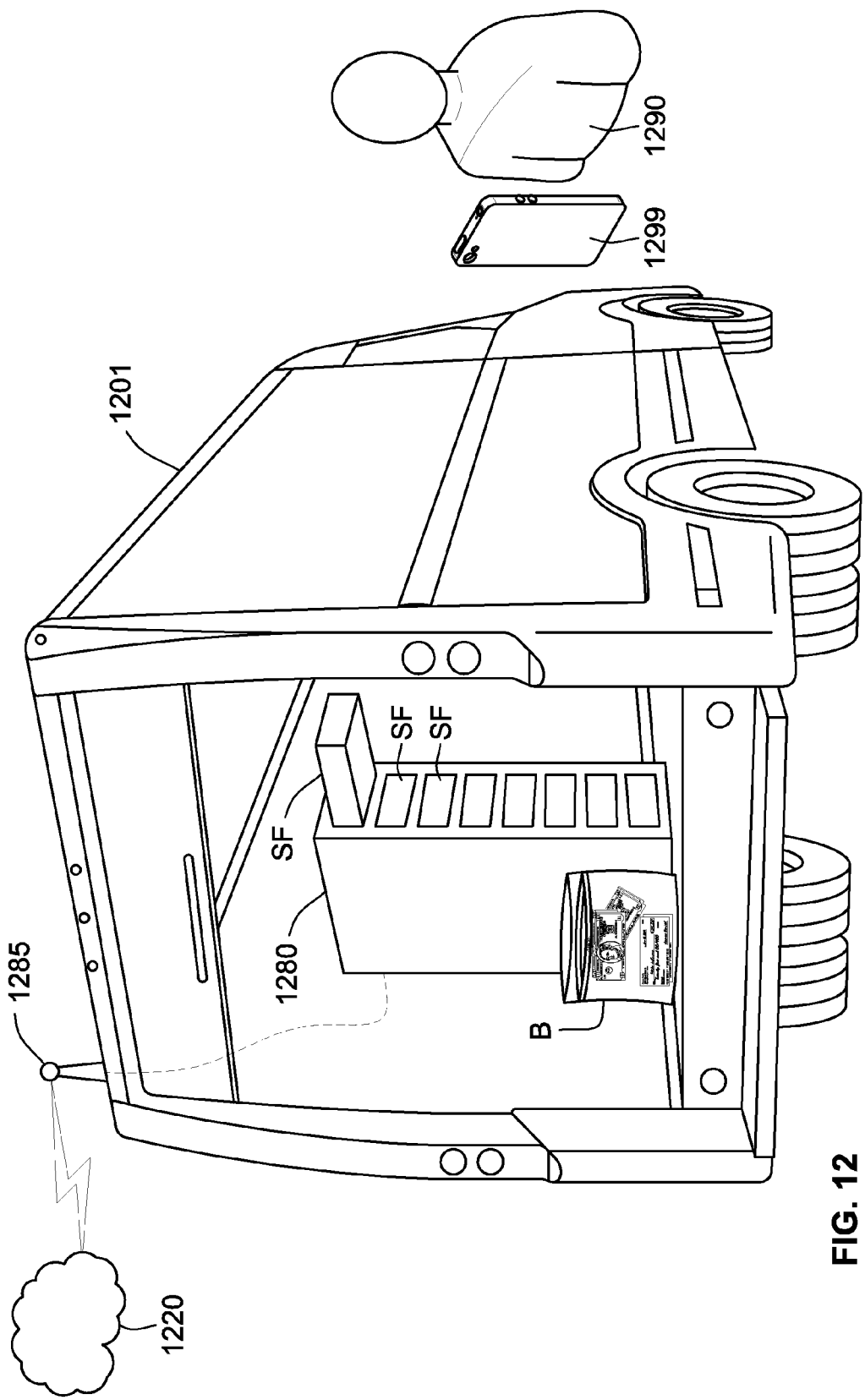
FIG. 12 is a representation of an armored carrier system according to some embodiments of the present disclosure.

FIG. 12 illustrates an armored carrier vehicle 1201 according to some embodiments of the present disclosure. The vehicle 1201 according to some embodiments comprises a mini-safe (and/or cassette) storage unit 1280 configured to receive one or more mini-safes SF therein. According to some embodiments, the mini-safes are smart mini-safes and have on-board one or more processors and/or memories. Each mini-safe has a unique safe/container identifier associated therewith. Likewise, each armored carrier vehicle 1201 has a unique vehicle ID associated therewith. According to some embodiments, the processors on the smart mini-safes SF communicate with a safe tracking network 1220 (such as network 920) such as via antenna 1285 and send a signal to the safe tracking network to inform the network of the location of each safe. For example, when a mini-safe is coupled to the mini-safe storage unit 1280, a processor associated with the mini-safe storage unit recognizes that a mini-safe has been inserted into the storage unit 1280, determines the safe ID of the safe, and transmits the safe ID and the vehicle ID to the safe tracking network. According to some embodiments, the mini-safes may have an RFID chip coupled to each safe with the RFID of each mini-safe being configured to send a safe ID to an RFID reader. According to some embodiments, the vehicle 1201 and/or storage unit 1280 has a RFID reader and the safe ID of each safe is transmitted to the safe tracking network such as via the antenna 1285.

In a similar manner, each bag B (or tray T) may contain an RFID chip configured to transmit a unique bag ID (or tray ID)

and the ID of each bag (or tray) placed in the vehicle 1201 is detected and transmitted to the tracking network. Alternatively, processors on smart cassettes or smart mini-safes may communicate EDS information to a processor associated with the vehicle 1201 which may in turn transmit some or all of that information to a tracking network. The armored carrier vehicle may also have a GPS or other location system associated therewith and may be configured to communicate the current location of the vehicle 1201 to the tracking network. Accordingly, in some embodiments, an armored carrier service is able to monitor in real-time when particular bags, trays, mini-safes, and/or cassettes are loaded onto or removed from a particular armored vehicle 1201 and the location of the vehicle 1201 and its contents.

Accordingly to some embodiments, one or more armored carrier personnel 1290 have a PDA 1299. According to some embodiments, the PDA 1299 has a GPS or other location system associated therewith and the PDA 1299 is configured to be communicatively coupled to the tracking network 1220. According to some embodiment, an armored carrier service is able to monitor in real-time the location of the 1299 PDA (and thus the location of the armored carrier personnel 1290 carrying the PDA 1299.

According to some embodiments, when the armored carrier personnel 1290 (and the associated armored carrier PDA 1299) picks up funds for transfer from a location, such as the remote location 1101 discussed in connection with FIG. 11, the device 11-11, the computer 1152, the PDA 1199, the network 1120, and/or a processor associated with a smart container (such as a smart CS or smart SF) is/are communicatively coupled to the armored carrier PDA 1299 and information about the funds to be picked up is transferred to the armored carrier PDA 1299. For example, a container ID, a transaction ID, customer ID, customer account ID, customer bank ID, grand total, check total, currency bill total, coin total, and/or funds breakdown by check and/or denomination of bill and/or coin may be transferred to the armored carrier PDA 1299. According to some embodiments, one or more of such fields (e.g., deposit amount) is blocked from view by the armored carrier (e.g., on the armored carrier's PDA 1299) based on, for example, policies of the bank (e.g., customer of the armored carrier) and/or the armored carrier itself.

Furthermore, according to some embodiments, data about a funds shipment is transmitted to a network associated with an armored carrier service such as tracking network 1220 when a customer prepares a shipment for pick up. For example, when a customer such as person 1190 of FIG. 11 prepares a deposit transaction for shipment, a communication may be sent to an armored carrier network such as via network 1120 to notify the armored carrier service that the location 1101 has a shipment ready for pick up by the armored carrier company. That communication can also include information about the identity of shipment (e.g., a transaction ID), a destination for the shipment (e.g., a bank routing ID), the contents of the shipment (e.g., a grand total value, a breakdown in values by bills, coin, and/or checks, and/or denomination breakdown), and/or container ID(s) (e.g., unique identifiers for bags B, cassettes CS, mini-safes SF, and/or other containers. Accordingly, according to some embodiments, some or all of the data contained in an EDS may be transmitted to the armored carrier network. According to such embodiments, some or all of the data provided to the armored carrier network is transmitted to a computer associated with the armored carrier vehicle 1201 and/or armored carrier personnel 1290 that will pick up the shipment. For example, some or all of the information may be transmitted to PDA 1299 of armored carrier personnel 1290 who will pick up the shipment at the customer location 1101. Accordingly, when the armored carrier personnel arrives at the customer location 1101, the armored carrier personnel will know details about what he or she should expect to pick up from that location, e.g., how much money, how many bags, cassettes, mini-safes or other containers and/or the identity of each specific bag, tray, cassette, mini-safe, etc. Thus, according to some embodiments, the armored carrier personnel 1290 and/or the armored carrier PDA 1299 can verify that the shipment being offered for pick-up matches what was expected to be picked up based on the details communicated from the location 1101 to the armored carrier network and to the armored carrier computer 1299.

According to some embodiments, the customer computer 1152, the device 11-11, the customer PDA 1199, and/or the containers to be picked up (e.g., via the containers comprises means of communication such as RFID transmitters, wireless transmitters, etc.) communicate with the armored carrier personnel PDA 1299 to send details about the contents of a shipment being picked up (e.g., EDS data). For example, according to some embodiments, the PDA 1299 is configured to establish a Bluetooth communication with the customer computer 1152, the device 11-11, the customer PDA 1199, and/or the containers to be picked up when the PDA 1299 is brought into proximity of such devices/containers. According to such embodiments, the customer computer 1152, the device 11-11, the customer PDA 1199, and/or the containers to be picked up comprise any necessary hardware and software to establish such a Bluetooth communication, e.g., a transmitter. According to some embodiments, the PDA 1299 is configured to compare the data received via the communication to verify that the contents of the shipment to be picked up matches the expected contents. For example, according to some embodiments, each container (e.g., bag B, cassette CS, mini-safe SF) has a unique container ID (e.g., Bag #XXY12II, Cassette #100238, mini-safe #SF250661). When a pick-up order is placed, the unique container ID(s) are sent to the armored carrier network and then to the armored carrier personnel PDA 1299. When the armored carrier personnel 1290 arrives at the customer location 1101, the unique container ID(s) are inputted to and/or received by the armored carrier personnel PDA 1299 and the PDA 1299 verifies they match what has previously been received by the PDA 1299. According to some embodiments, the unique container ID(s) are manually entered into the PDA 1299. According to some embodiments, the unique container ID(s) are electronically transferred to the PDA 1299 such as via a Bluetooth connection, other wireless connection, and/or a wired connection (e.g., by physical coupling the PDA 1299 to the computer 1152, device 11-11, PDA 1199, bag B, cassette CS, and/or mini-safe SF). According to some embodiments, the PDA comprises or is communicatively coupled to an RFID reader and the computer 1152, device 11-11, PDA 1199, bag B, cassette CS, and/or mini-safe SF have an RFID transmitter configured to transmit the unique container ID(s) to the PDA 1299.

XIV. Armored Carrier Vault And/Or Bank Vault

A. System Components

Figure 13A:
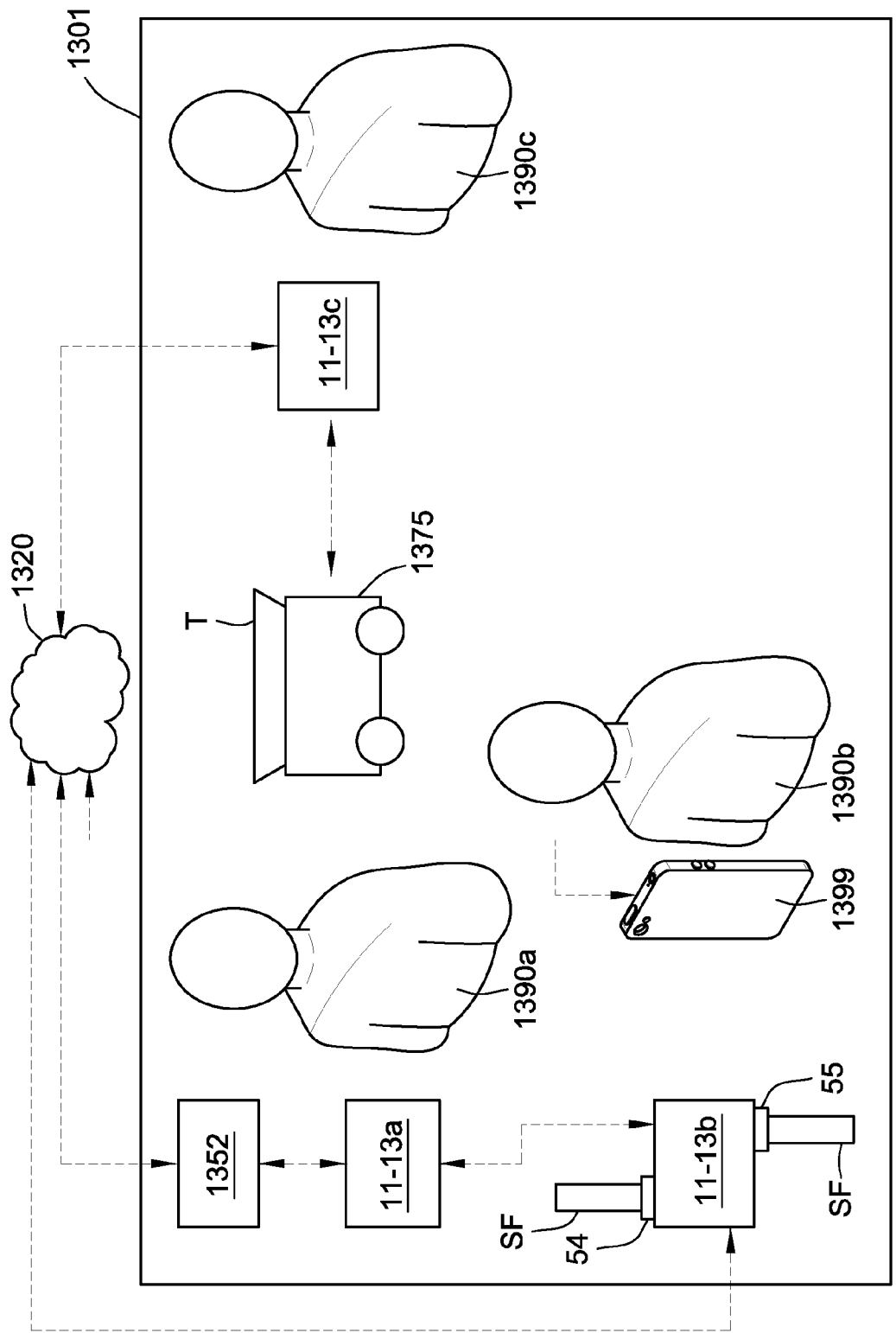
FIG. 13A is a representation of a vault location according to some embodiments of the present disclosure.
Figure 14:
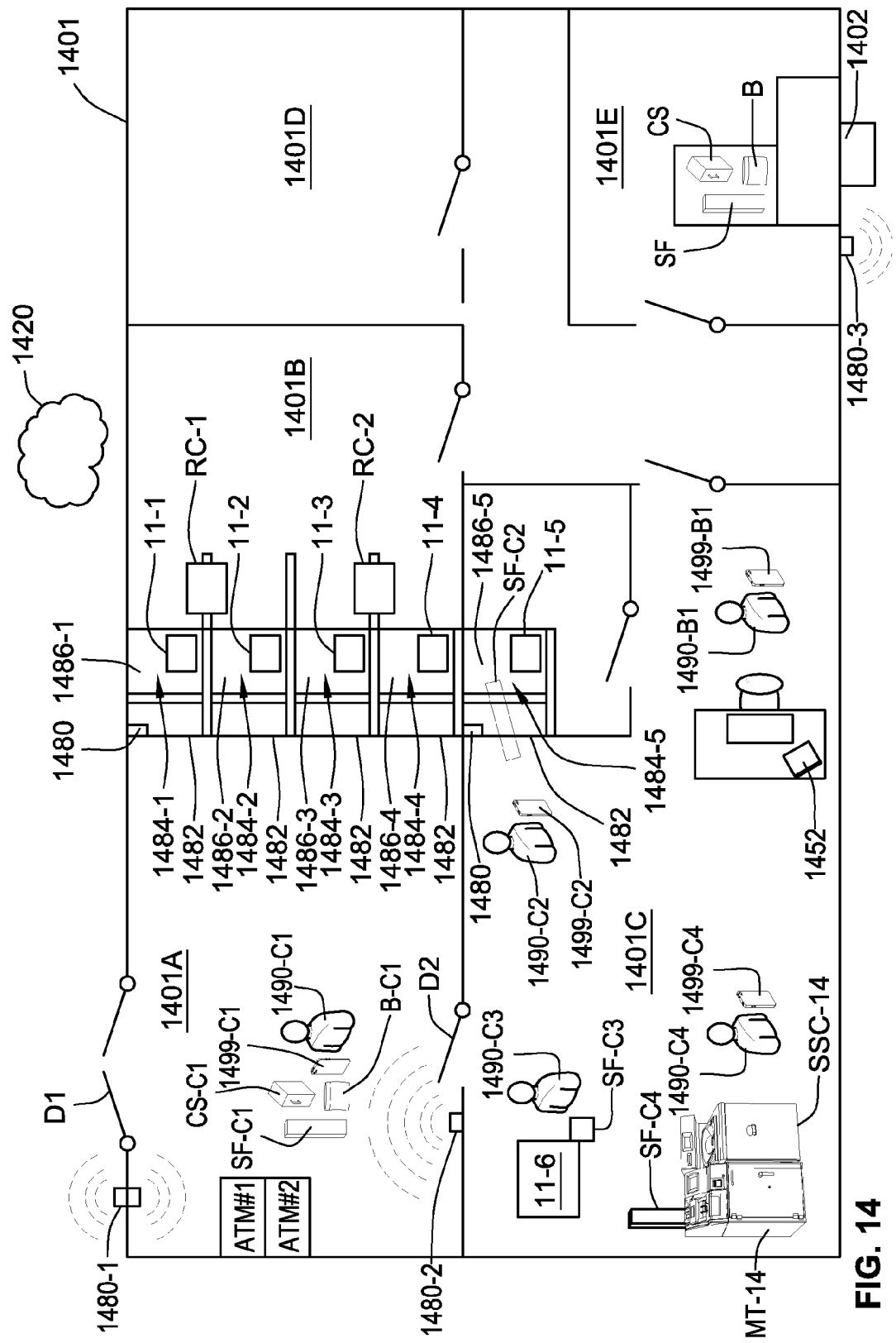
FIG. 14 is a representation of a bank branch location according to some embodiments of the present disclosure.

FIG. 13A illustrates a vault 1301 such as an armored carrier vault A1 or bank central vault BV shown in FIG. 7 or a bank branch vault such as vault 1401D shown in FIG. 14. After documents in a deposit transaction arrive at the vault 1301, they are processed by one of a plurality of first stage devices 11-13*a,b*. After being processed by a first stage device 11-13*a,b*, the documents in a deposit transaction are loaded into a container such as a tray T, cassette CS, or mini-safe SF. Several deposit transactions can be processed and/or reconciled on a first stage device 11-13a,b and the processed documents from those deposit transactions can be loaded into the tray T and/or mini-safe SF. At some point, the tray T and/or mini-safe SF is physically moved to an area in which one or more second stage devices 11-13c are located and the documents in the tray T and/or mini-safe SF are processed by the second stage device 11-13c. According to some embodiments, deposit transaction deposit slips, header cards and/or trailer cards are positioned between documents associated with different deposit transactions so as to separate the documents associated with one deposit transaction from another deposit transaction. According to some embodiments, the first and/or the second stage devices 11-13a-c are designed to detect and/or derive information from deposit slips, header cards, and/or trailer cards. For example, according to some embodiments, the device 11-13c is configured to detect a deposit slip, header card, and/or trailer card and determine or extract a transaction ID from the deposit slip, header card, and/or trailer card (e.g., the transaction ID may be recognized via OCR from an image of the document and/or the transaction ID may be read by a barcode reader associated with device 11-13c). For example, the device 11-13c may be a document imaging device 44 which is configured to scan an image of each document and optically recognize deposit slips, header cards, and/or trailer cards and extract a transaction ID from the images of such documents.

According to some embodiments, the Stage I devices 11-13a,b are smaller, table-top devices such as those illustrated in FIGS. 1A-1CB and have one, two, or three output receptacles and furthermore the Stage II devices 11-13c are larger, floor-standing devices such as illustrated in FIGS. 1G-1H. For example, according to some embodiments, the Stage I devices 11-13a,b are used to determine a value of documents associated with a deposit transaction and to verify the determined value matches an expected or declared value of the documents associated with a deposited transaction. According to some embodiments, the expected or declared value is manually read from a document or container associated with the deposit transaction (e.g., a physical deposit slip) and entered by an operator 1390a into a memory of the device 11-13a,b such as via an interface of the device 11-13a,b. According to some embodiments, the expected or declared value is electronically communicated to the device 11-13a,b such as via a network 1320, a vault computer 1352, a vault PDA 1399, and/or a document container such as a smart cassette CS or smart mini-safe SF.

According to some embodiments, one or more of the first stage devices 11-13b are configured to releasably couple with an automated document container such as a cassette and/or mini-safe. According to some embodiments, a cassette and/or mini-safe is releasably coupled to an input receptacle and/or input region such as via an input dock 54 of the device 11-13b. According to such embodiments, the device 11-13b is then configured to extract the documents contained in the cassette or mini-safe and feed the documents to a transport mechanism of the device 11-13b, one-at-a-time, as described above.

According to some embodiments, one or more an automated document containers such as cassettes and/or mini-safes are releasably coupled to an output receptacle and/or output region such as via an output dock 55 of the device 11-13b. The device 11-13b then stacks the documents processed by the device 11-13b into the one or more output containers such as cassettes and/or mini-safes. According to some embodiments, EDS data is transferred to the device 11-13b when a smart automated document container such as a smart cassette or smart mini-safe is coupled to the input receptacle or input region of the device 11-13b (e.g., transaction IDs, customer information, value information etc. may be transferred into a memory of the device 11-13b) and used to verify the received documents match expectations based on the EDS data transferred to the device 11-13b. According to some embodiments, the device 11-13b determines information about the documents processed (e.g., total value and/or breakdown values) and transfers that information into a memory of a smart cassette or mini-safe coupled to an output receptacle such that the memory of the smart cassette or mini-safe stores the value (total and/or breakdown values) of the documents stored inside the smart cassette or smart mini-safe.

According to some embodiments, the devices 11-13c are configured to separate documents into output receptacles and/or into cassettes and/or mini-safes by denomination (e.g., a first receptacle/container only receives $1 bills, a second receptacle/container only receives $5 bills, etc. According to some embodiments, such as shown in FIG. 1H, the device 11-13c comprises one or more strapping units and stacks of a predetermined number of bills (e.g., 100 bills) of a single denomination (e.g., a stack of 100 $20 bills) are strapped with banding or strapping material.

According to some embodiments, the first stage devices 11-13a,b and the second stage devices 11-13c are all document imaging devices 44. According to some embodiments, the first stage devices 11-13a,b and second stage devices 11-13c are not document imaging devices but are currency bill denominating devices 33. According to some embodiments, the first stage devices 11-13a,b and second stage devices 11-13c comprise one or more document imaging devices 44 and one or more currency bill denominating devices 33.

B. Vault Process Flow

Figure 13B:
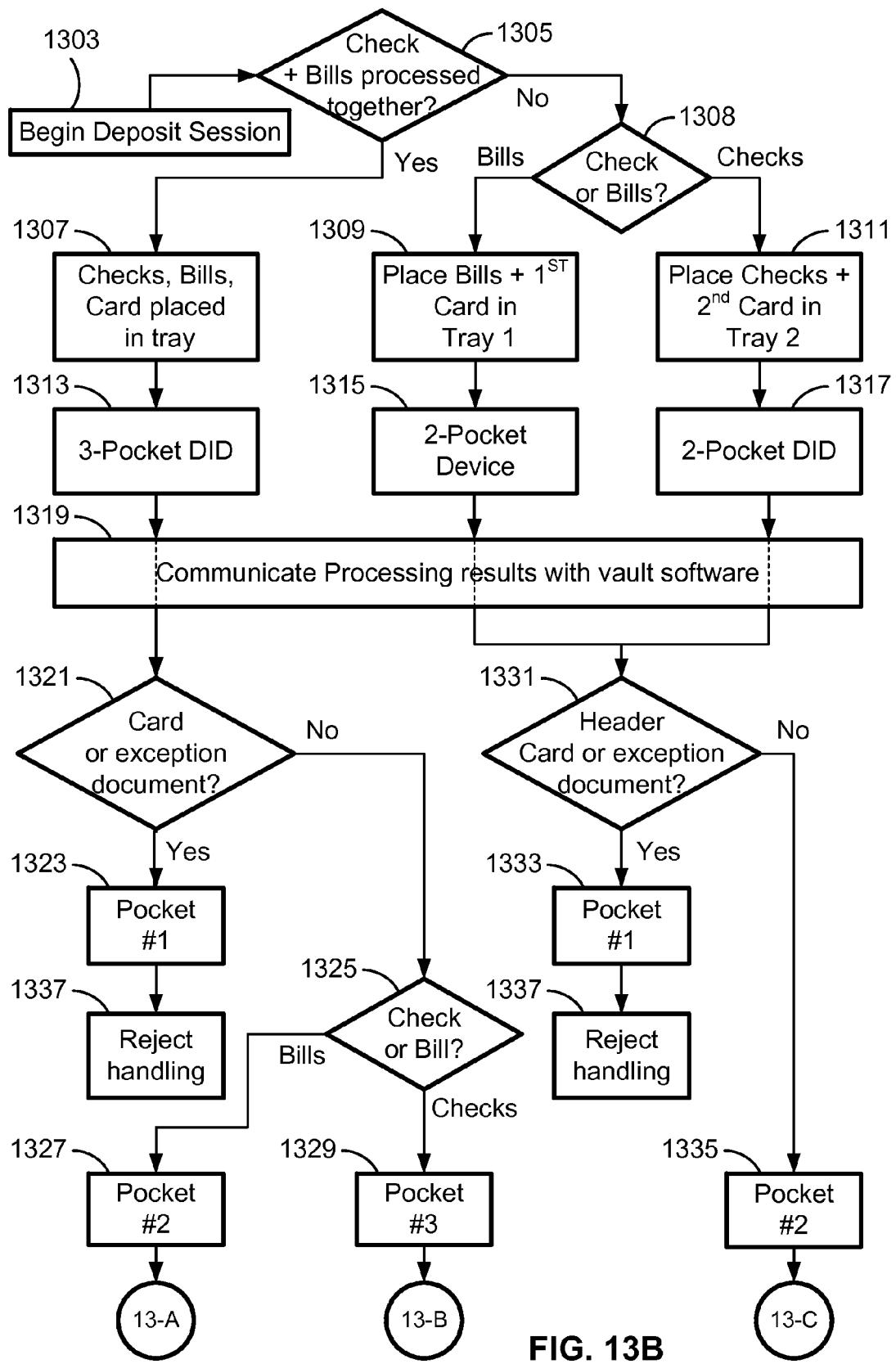
FIGS. 13B-13C is a flowchart describing the operation of a vault system according to some embodiments of the present disclosure.
Figure 13C:
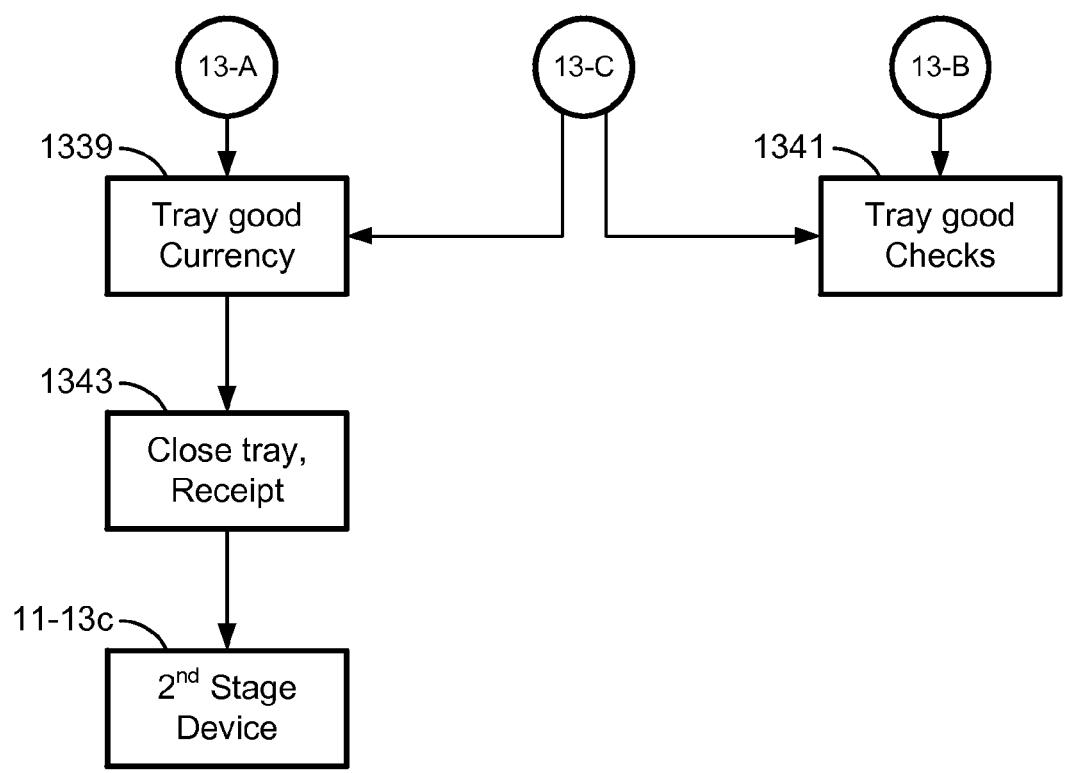

FIGS. 13B-13C are a flowchart illustrating an exemplary method of processing deposit transactions such as at vault 1301 or 1501. With reference to FIG. 13A, according to some embodiments, the first stage devices (e.g., devices 11-13a,b) and the second stage devices (e.g. devices 11-13c) are all document imaging devices 44. The vault computer 1352 is networked (communicatively coupled) with the first stage devices 11-13a,b and the second stage devices 11-13c. According to some embodiments, each first stage device 11-13a,b is located in a first stage workstation (e.g., a cubicle or area similar to teller stations 1484-1-1484-5 shown in FIG. 14). According to some embodiments, the first stage devices 11-13a,b have one, two, or three output receptacles and/or output docks 55. For example, according to some embodiments, if currency bills and checks in deposit transactions are to be processed together on a first stage device 11-13a,b, the first stage device 11-13a,b may have three output receptacles and/or output docks 55; while if currency bills and checks in deposit transactions are to be processed separately on a first stage device 11-13a,b, the first stage device 11-13a,b may have two output receptacles and/or two output docks 55. For another example, according to some embodiments, if currency bills and checks in deposit transactions are to be processed separately on a first stage device (e.g., devices 11-13a, b), the first stage device may have only one output receptacle and/or only one output dock 55.

The vault computer 1352 runs a deposit software program such as, for example, Deposit Management Software (DMS). Examples of DMS include Glory VAS software, Compass software, etc., which manage and keep track of deposit transactions and deposit transaction documents as they proceed through processing at, for example, the vault 1301.

At the initiation of the processing of a batch of documents associated with a deposit transaction ("transaction batch"), vault personnel opens a deposit bag B containing the transaction batch and opens a "Deposit session" in the vault software program (1303) which creates a Deposit Session Record for the transaction batch. According to some embodiments, the Deposit Session Record includes a transaction ID read from the bag and/or a deposit slip and entered into the vault program using, for example, OCR, MICR reading, etc.

The process differs depending on whether checks and currency bills are to be processed together in a first-stage device (1305). Once the appropriate information is entered into the vault software program to create a Deposit Session Record for a transaction batch, one or two unique bar-coded cards are created (e.g., printed by a printer communicatively coupled to the vault computer 1352).

If checks and currency bills are to be processed together in a first-stage device, a single unique bar-coded card (e.g., header card) is generated and placed in a container such as a tray with the currency bills and checks making up the deposit batch (1307).

If checks and currency bills are to be processed separately in one or more first-stage devices, two (2) bar-coded cards are generated and the currency bills in the deposit batch and a first unique bar-coded card are placed in a first container such as tray (e.g., currency tray) (1309) and the checks in the deposit batch and a second unique bar-coded card are placed in a second container such as tray (e.g., check tray) (1311).

The currency bill and check deposit in the tray is taken to one of the first stage devices 11-13a,b having three output receptacles and/or output docks (1313). Where checks and bills are located in separate trays (e.g., one tray for currency bills and a second distinct tray for checks), the currency tray is taken to one of the one of the first stage devices 11-13a,b having two output receptacles and/or output docks (1315) and the check tray is taken to one of the one of the first stage devices 11-13a,b having two output receptacles and/or output docks (1317). According to some embodiments, the first stage devices have an input dock configured to accept the automated document containers such as a tray; and, the currency and check tray, the currency tray, and/or the check tray are coupled to the respective first stage devices. According to some embodiments, one or more of the first stage devices are not configured to be coupled to an input container in which case an operator manual removes the documents from the container and places them in an input hopper of one of the first stage devices.

The respective first stage document imaging devices 11-13a,b read the unique bar-code card (e.g., header card) for each deposit batch or sub-batch (e.g., where bills and checks are positioned in separate trays) and communicates with the deposit management software (DMS) to associate the current deposit batch or sub-batch being processed with the corresponding Deposit Session Record created previously (1319). The respective first stage document imaging devices 11-13a,b proceed to generate images of all three media items (header card, currency bills and checks), to denominate the currency bills, and to extract the value of checks.

For check and bill trays, one of the first stage document imaging devices 11-13a,b sorts the header card (and any rejected currency/checks) into pocket #1 (1321, 1323), sorts the "good" currency into pocket #2 (1325, 1327) and sorts the "good" checks into pocket #3 (1325, 1329).

For separate check and bill trays, the respective first stage document imaging devices 11-13a,b sort the header card (and any rejected documents) into pocket #1 (1331, 1333), sorts the "good" documents into pocket #2 (1331, 1335).

If there are any rejects (1337), the operator could then either: (a) rerun the rejects (with the header card) on the same first stage document imaging device 11-13a,b; (b) manually make entries/corrections (e.g., via an interface of the first stage document imaging device 11-13a,b or via an interface on a WD 1399 communicatively coupled to the first stage document imaging device 11-13a,b and/or vault computer 1352; or (c) place all rejects back in a tray (with the header card). Under last option (c) responsibility for handling of exception documents could pass to another person or department such as a Proof Department and exception trays could be transferred to another area such as a Proof Department (which according to some embodiments could be located in another room of the vault 1301 separate from the room or rooms housing the first stage devices 11-13a,b. The last option (c) would allow a first stage device operator to focus solely on running deposit batches and not be slowed down by having to handle exception document data entry or correction issues.

Good currency is removed from pocket #2 of the first stage device (e.g., devices 11-13a,b), it is placed in a container such as a tray T for further processing by a second stage device (e.g., devices 11-13c) such as a high-speed currency bill sorter/strapper as shown in FIGS. 1G-1H able to sort currency being processed by denomination.

The number/value of currency bills being placed into a particular tray T can be tracked by the deposit management software (DMS) for security purposes. According to some embodiments, for example, multiple customers of a bank make deposits with a teller at a teller terminal throughout a period of time (e.g., a teller shift). Each time a teller receives a deposit of, for example, currency bills, the teller processes the currency bills and places them in a tray T assigned to the teller. At some point in time, for example, when the tray T is full and/or when a teller's shift is over, the tray T (that belongs to the teller at the bank) is sold (including the multiple deposits received by the teller) to the vault and/or to another teller station within the bank. All the while, the DMS keeps track of the deposits processed and placed into the tray T by the teller. Thus, the DMS knows how much currency is expected to be in the tray T at any point in time including when the tray T is sold to the vault. When the tray is sold by the teller to the vault, the vault opens the tray T (e.g., if the tray is locked). The vault knows what to expect in the tray T because the vault has access to the DMS. Additionally, or in lieu thereof, when the teller is ready to sell the tray T to the vault, the teller can cause the DMS to print out a receipt of the total(s) of documents expected to be in the tray T and place the receipt in the tray T. The DMS is configured to credit the deposits received by the teller to respective customer accounts associated with customers that made the deposits. After the DMS credits the customer accounts, the teller is considered the owner of the currency then placed in the tray T and not the customer. In a like manner, when the teller sells the currency to the vault, the vault is considered the owner of the currency and not the teller. According to some embodiments, the DMS is told, for example, by the teller, when a new tray T is used and when the teller's tray T is full. According to some embodiments, the DMS can be run on a PDA or a PC/laptop. According to some embodiments, when the DMS determines that no more currency bills should be added to a particular tray, the tray would be "closed," (1343) and the DMS would cause a receipt to be printed (such as on a printer coupled to and adjacent to a first stage device 11-13a,b). According to some embodiments, the receipt would include a unique tray number for each tray closed and the operator would place the receipt in the corresponding tray with the currency bills.

As good checks are received in either pocket #3 in three-pocket embodiments or pocket #2 in two-pocket embodiments, they are removed by the operator of the first stage device 11-13*a,b* and placed in a container such as a check tray (1341). The processed and checks in the tray(s) could then be transferred to storage or to a destruction device.

Completed or closed currency bill trays would be sent to a second stage device 11-13*c* which may be located in a Currency Bill Sorting/Strapping Department. An operator 1390*c* in this department would enter or scan the unique tray number off of the receipt in the tray, then commence with processing the documents in the tray. The vault software would keep track of the currency value (and/or breakdown details) contained in the closed tray from the first stage device 11-13*a,b*, and then balance the value (and/or breakdown details) of currency in the tray as determined by the second stage device 11-13*c* against the value (and/or breakdown details) indicated to be in the tray from the first stage device 11-13*a,b*, in order to track any shortages and ensure security of the cash.

XV. Bank Location—System Components (Figure of Typical Bank Location)

FIG. 14 illustrates an exemplary bank branch location 1401 such as, for example, bank branch B1, B2, B3, etc. shown in FIG. 7 according to some embodiments. The bank branch 1401 comprises a number of area or rooms such as a customer lobby 1401A, a main teller area 1401B, a secured commercial customer area 1401C, a vault 1401D, and/or other rooms such as room 1401E. According to some embodiments, the bank branch 1401 has one or more proximity detectors 1480 (1480-1, 1480-2, 1480-3) such as RFID sensors, Bluetooth sensors, etc.

According to some embodiments, the bank branch 1401 has one or more unattended devices or areas for accepting deposits of funds. For example, according to some embodiments, the bank branch 1401 has a night deposit box 1402. According to various embodiments, the night deposit box 1402 may be configured to accept different containers such as bags B, cassettes CS, and/or mini-safes SF. According to some embodiments, the bank branch has one or more unattended ATMs such as ATM #1 and ATM #2. According to some embodiments, the bank branch 1401 may have one or more merchant teller machines MT.

A. Semi-Attended Devices/Area

1. Teller/Attendant Station (Display/Interface—Devices and Central Server)

According to some embodiments, the bank branch 1401 may have one or more semi-attended devices, such as document processing device 11-6 having one or more secured receptacles and/or containers for storing funds deposited by customers such as secured output receptacles, cassettes CS and/or mini-safes SF. According some embodiments, device 11-6 is a document imaging device 44. According to some embodiments, device 11-6 is a currency bill denominating device 33. Device 11-6 is configured to be operated by a bank customer desiring to deposit funds. A stack of documents to be deposited is inserted into an input hopper of the device 11-6 such as input hoppers 610 (FIG. 6) and 110 (FIG. 2). The documents are processed by the device 11-6, deposit information (such as a grand total, bill total, check total, breakdown information) is presented to the customers such as via an interface having a display. If the deposit information such as the total of funds counted by the device 11-6 is acceptable to the customer, the customer indicates acceptance of the deposit (e.g., via a device 11-6 interface), and the device 11-6 stores the funds securely so that they may not be retrieved by a bank customer. According to some embodiments, the bank branch 1401 has one or more semi-attended devices 11-6 that are Group A devices and/or one or more semi-attended devices that are Group B devices. According to some embodiments, the device 11-6 has one or more output ports or docks to which one or more output containers (e.g., cassettes, mini-safes) are releasably coupled. According to some embodiments, the output containers are housed within a safe thereby permitting the documents processed by the device 11-6 to be securely stored therein (such as in a manner similar to which document containers to housed within an ATM and/or similar to vaults 607*a-c* of FIG. 6C).

According to some embodiments, the bank branch 1401 has one or more merchant teller machines MT configured to be operated by customers and configured to securely store deposited funds inside the merchant teller machines MT. According to some embodiments, the bank branch 1401 has one or more coin counters SSC configured to be operated by customers and configured to securely store deposited coins.

B. Attended Areas

1. Main Teller Stations

The main teller area 1401B comprises a counter 1482 up to which customers may walk when they wish to make a deposit with the assistance of a teller. As depicted in FIG. 14, the main teller area 1401B comprises four teller stations 1484-1, 1484-2, 1484-3, 1484-4. Each teller station has a teller counter or desktop 1486-1, 1486-2, 1486-3, 1486-4 upon which a desktop document processing device 11-1, 11-2, 11-3, 11-4 rests. According to some embodiments the document processing devices 11-1 to 11-4 are document imaging devices 44 (such as the single output receptacle document imaging device 11*b* (FIG. 11B), currency bill denominating devices 33 (such as the single output receptacle currency bill denominating device 11*a* (FIG. 11A), note counters 22, or some combination thereof. None, some, or all of the devices 11-1 to 11-4 may have a container (e.g., mini-safe) input dock and/or output dock. According to some embodiments, the main teller area 1401B may comprise one or more currency bill recyclers RC-1, RC-2. According to some embodiments currency bill recyclers RC are shared by tellers in adjacent teller stations. According to some embodiments, the recyclers RC are positioned between adjacent teller stations such as resting on the floor under or adjacent the teller counters 1486-1 to 1486-4.

2. Commercial Teller Stations

According to some embodiments, a secured commercial customer area 1401C comprises one or more commercial teller stations 1484-5. A counter 1482 up to which customers may walk when they wish to make a deposit with the assistance of a commercial teller is positioned in front of each commercial teller station 1485-5. Each teller station 1484-5 has a teller counter or desktop 1486-5 upon which a desktop document processing device 11-5 rests according to some embodiments. Alternatively or additionally, the commercial teller station 1485-5 may have a floor-standing document processing device 11-5 such as document sorter 11*g* shown in FIG. 1G. According to some embodiments the document processing device 11-5 are document imaging devices 44 (such as the single output receptacle document imaging device 11*b* (FIG. 11B), currency bill denominating devices 33 (such as the single output receptacle currency bill denominating device 11*a* (FIG. 11A), note counters 22, or some combination thereof. None, some, or all of the devices 11-5 may have a container (e.g., mini-safe) input dock and/or output dock. According to some embodiments, the teller station 1484-5 may comprise one or more currency bill recyclers RC (not shown). According to some embodiments currency bill recyclers RC are shared by tellers in adjacent teller stations. According to some embodiments, the recyclers RC are positioned between adjacent teller stations such as resting on the floor under or adjacent the teller counters 1486-5.

According to some embodiments, the commercial teller stations 1485-5 are equipped with devices to facilitate the acceptance of deposits in different types of containers such as in bags B, cassettes CS, mini-safes SF, trays T, and/or loose currency bills, coin, and/or checks. For example, currency bills and/or checks that are loose can be processed by document processing device 11-5 having an input receptacle configured to receive stacks of documents such as devices 11a-11h (FIGS. 1A-1H). Likewise, deposit transaction documents provided to a commercial teller in a container can be manually removed from the container and processed in the same manner. Additionally, if some or all of the devices 11-5 have a container input dock, the container can be coupled to the input dock and documents therein can be automatically feed into the device 11-5. For example, if the device 11-5 has a container input dock configured to accept mini-safes, a mini-safe SF-C2 containing documents to be deposited by customer 1490-C2 can be inserted into a mini-safe input dock of device 11-5 and documents therein can be automatically feed into the device 11-5.

C. Communication/Network Interface

According to some embodiments, a WD 1499-C1 of bank customer 1490-C1 such as a cell phone could communicate with a document processing device 11-1-11-6, MT, ATM#1, ATM#2, and/or integrated devices 1710a'-1710c described in connection with FIG. 17B. The customer may first need to register the WD 1499 with the bank or other financial institutions to be able to communicate with a bank device such as document processing device 11-1-11-6, MT, ATM#1, ATM#2. Such communication may or may not be encrypted.

D. Exemplary Bank Branch Deposit Transaction(s)

For example, using a WD 1499 such as a cell phone a customer can text or email a declared deposit amount(s), including, for example, the amount of currency bills, coins, checks and other documents in the deposit transaction to a bank device, computer, or network. According to some such embodiments, the data may serve as an electronic deposit slip.

Once this data (e.g., the electronic deposit slip) has been transmitted to the device 11-1-11-6, MT, ATM#1, ATM#2; the device 11-1-11-6, MT, ATM#1, ATM#2 could update the teller system, bank accounting system, or other. For example, according to some embodiments, the teller system/bank accounting system is informed about the details and/or data included on the deposit slip (e.g., what is in the deposit) and what should be expected to be received (e.g., at the bank) when the physical document are received. Additional details on updating systems can be found in, for example, the Physical Portion of Deposit Transaction Section of U.S. Pat. No. 8,162,125, which is hereby incorporated by reference herein in its entirety. Next the physical documents could be run through the device 11-1-11-6, MT, ATM#1, ATM#2. According to some embodiments, currency bills could be inserted into and processed by such as device (e.g., 11-1) before checks are inserted and processed by the device or vice versa. According to some embodiments, checks and currency bills are inserted into the device (e.g., 11-1) in a sorted batch of documents or an intermingled or commingled batch of documents and processed in a sorted-group mode, an ordered-batch mode, an intermingled-batch mode. The device (e.g., 11-1) then determines information about the documents such as a grand total, a currency bill total, a check total, etc. and this information is balanced against the transmitted data such as the transmitted electronic declared amount(s) for the deposit. Any variances or differences would be documented.

According to some embodiments, at the completion of the transaction, the device (e.g., 11-1) sends a text message and/or email results to a bank customer phone number associated with the WD 1499 and/or other customer phone number. This communication may serve as an electronic deposit receipt. The customer's phone number also might be tied to a bank account number for the customer at the given bank or financial institution. According to some embodiments, associating the customer's phone with the customer's bank account provides an added level of security to the deposit transaction. The customer's account number can be matched with a phone number of the customer's cell phone, with an email address accessible via the customer's cell phone, etc. A customer can associate the customer's cell phone with the customer's bank account number by, for example, pairing the customer's phone with a WD (e.g., a Bluetooth enabled device) located at a bank branch, by registering the phone number of the customer's cell phone with the bank (e.g., via the bank's website), by registering the customer's email address with the bank (e.g., via the bank's website), by joining a Wi-Fi network of the bank, etc.

According to some embodiments, at about the same time the device 11 (e.g., 11-1) provides an electronic deposit receipt to the customer's WD 1499 (such as via a test message or email), the device (e.g., 11-1) may also update and/or transmit data to the bank teller's system, accounting system, an ISP system, a DBM system, or other software system, as required (such as in system 1700b in which the device is integrated device 1710a') and/or send a communication to such systems to initiate the appropriate updating of each such system.

According to some embodiments, if the device 11 (e.g., 11-1) sends a text message to WD 1499 and/or other customer phone number, the text message includes totals only, e.g., a grand total, a currency bill total, a check total). However, according to some embodiments, if the device 11 (e.g., 11-1) sends an email to an email account associated with the customer such as via the WD 1499, then the email message may contain additional information such as complete images of the deposited documents such as captured currency bill and/or check images and/or snippets or portions thereof (e.g., the MICR line of checks may be omitted on the images of checks sent to the customer).

According to some embodiments, an entirely automated deposit system is provided via a customer's use of a WD 1499 which is configured to automatically communicate with a document processing device 11 (e.g., devices 11-1-11-6, MT, ATM#1, ATM#2, 1710a'-1710c'). According to some embodiments, a document processing device 11 such as a merchant teller MT or ATM is configured to accept bulk deposits such as bulk deposits comprising currency bills and checks (and in some embodiments, bulk coin where the device 11 also comprises a coin sorter and/or is communicatively coupled to a separate coin sorter, see, e.g., SSC in FIG. 14). According to some such embodiments, a customer (e.g., 1490-C1) sends deposit information such as an electronic deposit slip EDS associated with a deposit transaction to a document processing device 11 (e.g., devices 11-1-11-6, MT, ATM#1, ATM#2, 1710a'-1710c'). According to some embodiments, the customer sends the deposit information via a text message or email via a WD 1499 such as a cell phone or smart phone. The EDS or deposit information may include the amount(s) associated with the deposit transaction.

According to some embodiments, the document processing device 11 detects or determines the originating phone numbers or otherwise recognizes the particular WD 1499 such as where the WD 1499 has a WD ID associated therewith and the device detects or determines the WD ID. According to some embodiments, the transmitted deposit information includes a deposit account number. According to some embodiments, the device 11 is coupled (directly or indirectly such as via a computer network) to a database having data stored therein which associates phone numbers and/or WD IDs. According to some embodiments, the device 11 (or a computer system communicatively coupled thereto), verifies the transmitted deposit account number matches the deposit account number on record for the originating phone number and/or the WD ID for the transmitting WD 1499. Once account verification has been achieved, the customer could then proceed with the deposit transaction by inserting the bulk currency bills, checks, and/or coins to be deposited into the device 11. According to some embodiments, the device 11 would then transmit the results of the transaction (e.g., an electronic deposit receipt) to the WD 1499 and/or the customer's email address (such as via a text message or email).

According to some embodiments, a customer/user transmits the deposit transaction information (such as via a text message via WD 1499 (e.g., phone) or email to the document processing device 11 (e.g., devices 11-1-11-6, MT, ATM#1, ATM#2, 1710a'-1710c') when they are in proximity to the device 11 or a teller station (e.g., stations 1484-1-1484-5) and are ready to make the deposit. However, according to some embodiments, a customer could transmit the deposit transaction information (such as via a test message or email) in advance of arriving at the bank branch 1401 or other location having an automated teller device (e.g. an ATM such as ATM#1, ATM#2 located at a location remote from a bank branch such as at a gas station, shopping mall, or store). Then when the customer actually arrives the bank branch 1401 or other location having a document deposit device 11 such as an unattended deposit device (e.g., ATM#1, ATM#2) or semi-attended device (e.g., MT), the device 11 would recognize the customer's WD 1499 and prepare to run that particular deposit transaction against the declared deposit amount(s) sent (such as via transmitted electronic deposit slip) previously (e.g., earlier in the day).

XVI. Bank Vault

Figure 15:
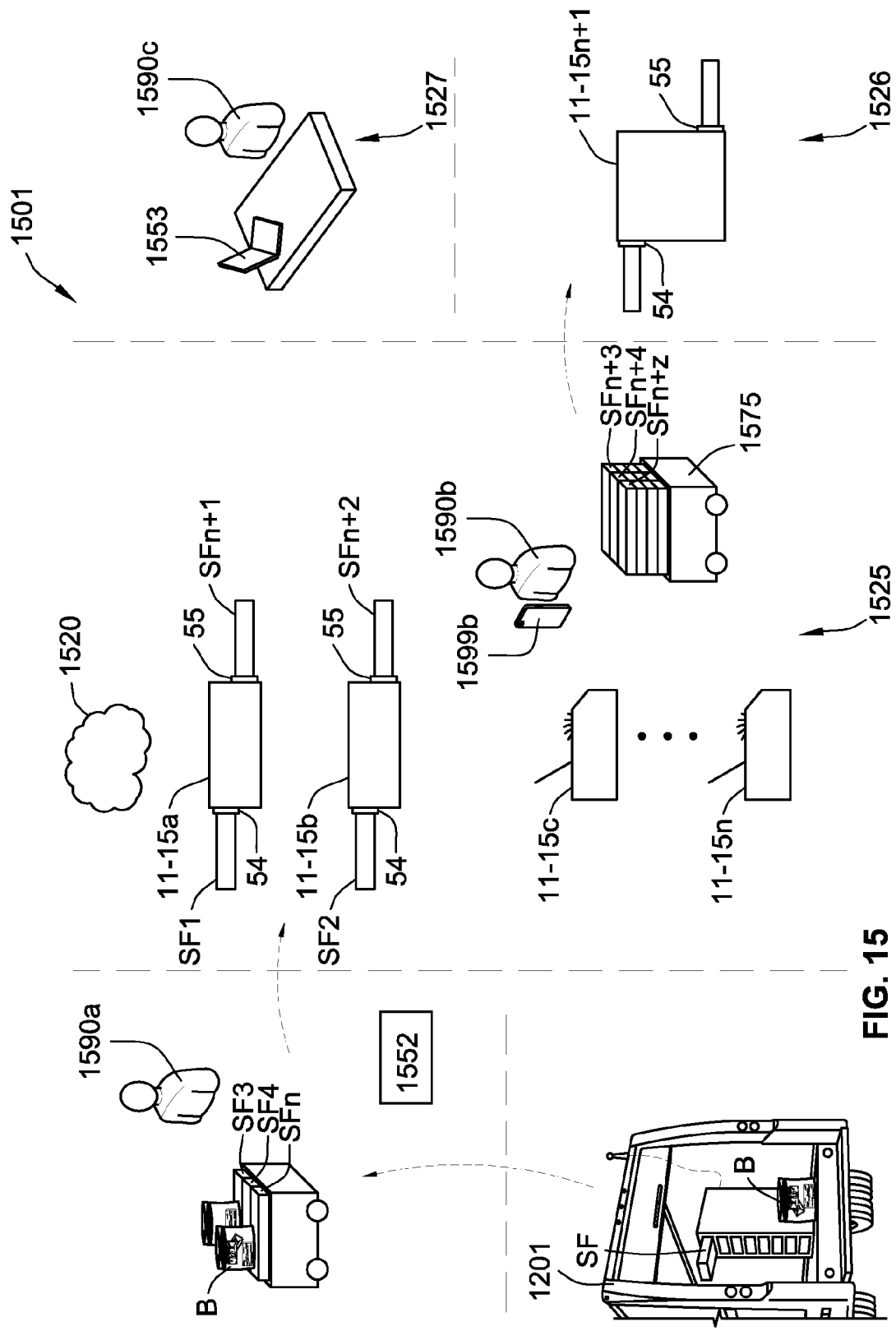
FIG. 15 is a representation of a vault location according to some embodiments of the present disclosure.

FIG. 15 illustrates another example of a vault 1501 such as an armored carrier vault A1 or bank central vault BV shown in FIG. 7.

A. Stage 1 and Stage 2 Areas

After documents in a deposit transaction arrive at the vault 1501 (such as via armored carrier vehicle 1201), they are processed on one of a plurality of first stage devices 11-15a-11-15n. After being processed by a first stage device 11-15a-11-15n, the documents in a deposit transaction are loaded a cart 1575 (such as in one or more mini-safes SFn+3-SFn+z and/or in one or more trays (not shown)). Several deposit transactions can be performed on a first stage device 11-15a-11-15n and the processed documents from those deposit transactions can be loaded into a tray T and/or a mini-safe SF.

At some point, a tray T and/or mini-safe SF is physically moved to an area in which one or more second stage devices 11-15n+1 are located and the documents in the tray(s) T and/or mini-safe(s) are processed by a second stage device 11-15n+1.

According to some embodiment, first stage devices 11-15a-11-15n are located in a Stage 1 area 1525 of the vault 1501 and second stage devices 11-15n+1 are located in a separate Stage 2 area 1526. According to some embodiments, the Stage 1 area 1525 and the Stage 2 area 1526 are in separate rooms of the vault 1501.

B. Exemplary Use of Separator Cards

According to some embodiments, deposit transaction deposit slips, header cards and/or trailer cards are positioned between documents associated with different deposit transactions so as to separate the documents associated with one deposit transaction from another deposit transaction. According to some embodiments, the Stage I and/or the Stage II devices (e.g., device 11-15n+1) are designed to detect and/or derive information from deposit slips, header cards, and/or trailer cards. For example, according to some embodiments, the device 11-15n+1 is configured to detect a deposit slip, header card, and/or trailer card and determine or extract a transaction ID from the deposit slip, header card, and/or trailer card (e.g., the transaction ID may be recognized via OCR from an image of the document and/or the transaction ID may be read by a barcode reader associated with device 11-15n+1). For example, the device 11-15n+1 may be a document imaging device 44 which is configured to scan an image of each document and optically recognize deposit slips, header cards, and/or trailer cards and extract a transaction ID from the images of such documents.

C. Exemplary Stage I and Stage II Devices

As mentioned above, according to some embodiments, Stage I devices are incapable of sorting by six or more denominations of currency, whereas Stage II devices are capable of sorting by six or more denominations of currency. Thus, in some such embodiments, all Stage II devices can be used as a Stage I device, but no Stage I device can be used as a Stage II device. According to some embodiments, the Stage I devices (e.g., devices 11-15a-11-15n) with or without input container docks 54 and/or output container docks 55, consist of those illustrated in FIGS. 1A-1CB and the Stage II devices (e.g., devices 11-15n+1) with or without input container docks 54 and/or output container docks 55, consist of those illustrated in FIGS. 1G-1H.

According to some embodiments, the Stage I devices (e.g., devices 11-15a-11-15n) are smaller, compact-table-top devices such as those illustrated in FIGS. 1A-1CB and have one, two, or three output receptacles; and/or are midrange-sized table-top devices such as those illustrated in FIGS. 1D-1F and have more than three output receptacles; and furthermore the Stage II devices (e.g., devices 11-15n+1) are large, floor-standing devices, such as, for example, those illustrated in FIGS. 1G-1H. For example, according to some embodiments, the Stage I devices 11-15a-11-15n are used to determine a value of documents associated with a deposit transaction and to verify the determined value matches an expected or declared value of the documents associated with a deposited transaction. According to some embodiments, the expected or declared value is manually read from a document or container associated with the deposit transaction (e.g., a physical deposit slip) and entered by an operator 1590b into a memory of the device 11-15a-11-15n via an interface of the device 11-15a-11-15n. According to some embodiments, the expected or declared value is electronically communicated to the device 11-15a-11-15n such as via a network 1520, a vault computer 1552, a vault PDA 1599b, and/or a document container such as a smart cassette CS or smart mini-safe SF.

According to some embodiments, one or more of the Stage I devices 11-15a-11-15b are configured to releasably couple with a cassette CS and/or mini-safe SF. According to some embodiments, a cassette and/or mini-safe SF1, SF2 is releasably coupled to an input receptacle and/or input region and/or input container dock 54 of the device 11-15a-11-15b. According to such embodiments, the device 11-15a-11-15b is then configured to extract the documents contained in the cassette or mini-safe and feed the documents to a transport mechanism of the device 11-15a-11-15b, one-at-a-time, as described above.

According to some embodiments, one or more cassettes and/or mini-safes are releasably coupled to an output receptacle and/or output region and/or output container dock 55 of the device 11-15a-11-15b. The device 11-15a-11-15b then stacks the documents processed by the device 11-15a-11-15b into the one or more cassettes and/or mini-safes SFn+1, SFn+2. According to some embodiments, EDS data is transferred to the device 11-15a-11-15b when a smart cassette or smart mini-safe is coupled to the input receptacle or input region or input container dock 54 of the device 11-15a-11-15b (e.g., transaction IDs, customer information, value information etc. may be transferred into a memory of the device 11-15a-11-15b) and used to verify the received documents match expectations based on the EDS data transferred to the device 11-15a-11-15b. According to some embodiments, the device 11-15a-11-15b determines information about the documents processed (e.g., total value and/or breakdown values) and transferred that information into a memory of a smart cassette or mini-safe coupled to an output receptacle such that the memory of the smart cassette or mini-safe stores the value (either total or breakdown values) of the documents stored inside the smart cassette or smart mini-safe.

According to some embodiments, the devices 11-15n+1 are configured to separate documents into output receptacles and/or into document containers (e.g., cassettes and/or mini-safes) by denomination (e.g., a first receptacle/container only receives $1 bills, a second receptacle/container only receives $5 bills, etc. According to some embodiments, such as shown in FIG. 1H, the device 11-15n+1 comprises one or more strapping units and stacks of a predetermined number of bills (e.g., 100 bills) of a single denomination (e.g., a stack of 100 $20 bills) are strapped with some kind of banding or strapping material.

According to some embodiments, the first stage devices 11-15a-11-15n and the second stage devices 11-15n+1 are all document imaging devices 44. According to some embodiments, the first stage devices 11-15a-11-15n and second stage devices 11-15n+1 are not document imaging devices but are currency bill denominating devices 33. According to some embodiments, the first stage devices 11-15a-11-15n and second stage devices 11-15n+1 comprise one or more document imaging devices 44 and one or more currency bill denominating devices 33.

According to some embodiments, deposit transaction documents may be accepted by the vault 1501 in loose form, in straps, in bags B, trays T, smart or dumb cassettes CS, and/or smart or dumb mini-safes SF. According to some embodiments, documents processed in the vault 1501 are prepared for exit from the vault 1501 in loose form, in straps, in bags B, in trays T, in smart or dumb cassettes CS, and/or in smart or dumb mini-safes SF. According to some embodiments, there is a preference to avoid leaving documents in loose form and thus there is a preference the documents processed in the vault 1501 are strapped and/or stored in a document container such as a smart or dumb cassette CS and/or smart or dumb mini-safe SF. Likewise, according to some embodiments there is a preference that before documents are transferred from Stage 1 devices 11-15a-11-15n to Stage 2 devices 11-15n+1 documents processed in the vault 1501 are strapped and/or stored in a document container such as a tray T, a smart or dumb cassette CS and/or smart or dumb mini-safe SF.

D. Other Area—Image/Data Correction Monitoring Employees

According to some embodiments, the vault 1501 comprises an area 1527 in which a person 1590c such as another bank or vault employee monitors image data and/or addresses data extraction errors or issues resulting from the processing of documents on first 11-15a-11-15n and/or second 11-15n+1 stage devices which are document imaging devices 44. For example, if data is not able to be satisfactorily extracted from one or more images of a document processed by a document imaging device in the vault 1501, a document record associated with the document in question and/or image(s) of the document may be displayed on a display of a computer 1553 and/or a WD such as a PDA (e.g., iPad®, iPhone®, etc.) being monitored by person 1590c. Likewise, according to some embodiments, any partially extracted data from the image may also be displayed on the display of the computer 1553. The image(s) may include full images of the front and/or back of a document and/or snippet images of portions of the documents such as, for example, a snippet image of a serial number area, a MICR line area, a CAR area, a LAR area, transaction ID, account number, etc. The operator may then review the displayed image(s) and enter any missing data into a record associated with the document. For example, if one or more digits of a serial number of a bill could not automatically be extracted from a snippet image of the serial number, the snippet image of the serial number of the bill would be displayed on the computer 1553 and the operator 1590c would enter any missing digits. According to some embodiments, the area 1527 may be located in another building other than vault 1501 and/or may comprise multiple areas 1527 located in multiple locations and/or buildings.

E. Vault Communication/Network Interface

Records, data files, images, and/or data may be communicated among different devices 11-15a-11-15n+1, 1552, 1599b, 1553 via one or more networks such as network 1520.

F. DID Exception Handling Description

According to some embodiments, document imaging devices 44 have significantly reduced the "no call" rates as compared to currency bill denominating devices 33 which do not capture visually readable images of currency bills. Furthermore, according to some embodiments, document imaging devices 44 enable bank customers, retailers, etc., to capture the full, visually-readable images of documents including currency and checks. According to some embodiments, visually readable images of exception items can be presented on a display screen for a reviewing operator to review at the document imaging device 44 or at a remote location (e.g., 1527, 1553) from the document imaging device 44 and for the operator to make corrections to the data for a document record as required. According to some embodiments, a person, such as, a document imaging device operator and/or a remote reviewing operator does not have to inspect the actual physical document to make a correction. Rather, the displayed visually readable image of an exception document is adequate to enable an operator to make a correction to the document record associated with the exception document. As a result, according to some embodiment, when a document imaging device 44 encounters an exception document, a visually readable image of the exception document and/or a document record including a visually readable image of the exception document is queued in an exception queue and the document imaging device 44 continues processing subsequent documents such as currency bills or checks in a stack or batch of documents being processed without stopping.

According to some embodiments, an exception document is flagged by displaying a visually readable image of the exception document and/or a document record including a visually readable image of the exception document and the document imaging device 44 halts (e.g., stops transporting and processing other ones of documents) such that the exception document is delivered to an output receptacle of the document imaging device 44 as the last document in the stack (e.g., on top of the output stack of documents). After a correction is made (e.g., entering the missing denomination of the exception document, entering the missing serial number character information of the exception document, etc.), the device continues to process the other ones of the documents. According to such embodiments, if it is necessary for an operator to review the actual exception document (e.g., as opposed to an image of the exception document), the operator can then look at the exception document in the output receptacle and/or remove the exception document therefrom for a closer examination. According to some embodiments, a single operator can review visually readable images of exception documents from multiple devices (e.g., multiple document imaging devices 44). According to some such embodiments, if necessary for the single operator to review the actual exception document(s) (e.g., as opposed to an image of the exception document) at any one of the multiple document imaging devices 44, the operator can approach the appropriate one of the document imaging devices 44 with the exception document at issue and then look at that exception document in the output receptacle of that document imaging device 44 as described above.

According to some embodiments, a single operator (e.g., operator 1590b (FIG. 15) simultaneously operates a plurality of document imaging devices 44 such as devices 11-15a-11-15n wherein the devices 11-15a-11-15n are document images devices 44. According to some such embodiments, document imaging devices 11-15a-11-15n each have a single input tray or hopper. Documents loaded into each input tray or hopper are run from each input tray through the respective document imaging device 11-15a-11-15n and to a respective single output tray or receptacle. According to some alternate embodiments, one or more of the document imaging devices 11-15a-11-15n may have a plurality of output receptacles and such devices may be configured to offsort exception documents to one or more offsort receptacles. Examples of exception documents include, for example, suspect documents, documents having a no call error (e.g., documents having a no read error), etc.

G. DID Processing Multiple Batches

According to some embodiments, an operator 1590a and/or 1590b (e.g., a first teller at a bank) loads a tray T (e.g., a Stage I teller tray) associated with one or more of the document imaging devices 11-15a-11-15n with customer deposit batches. Each of the customer deposit batches is associated with a deposit transaction of a customer of the bank. Each of the customer deposit batches includes a plurality of documents. According to some embodiments, each customer deposit batch starts with a physical deposit slip. In operation, a Stage I document imaging device 11-15a-11-15n automatically recognizes each deposit slip and extracts declared deposit amounts of currency bills and checks and a deposit account number for the associated customer deposit batch. The Stage I document imaging device 11-15a-11-15n processes the documents associated with a deposit slip and determines corresponding determined values of currency bills and checks and determines whether the declared deposit values and the determined deposits values for the customer deposit batch match. When the Stage I document imaging device 11-15a-11-15n detects a subsequent deposit slip, the Stage I document imaging device 11-15a-11-15n recognizes the beginning of a next customer deposit batch. The Stage I document imaging device 11-15a-11-15n extracts declared deposit values of currency bills and checks and a deposit account number for the next customer deposit batch. Alternately or additionally, in other embodiments, a header and/or trailer card exists in each customer deposit batch of documents associated with a deposit transaction and the header and/or trailer cards separate adjacent customer deposit batches.

After a customer deposit batch has been processed by a Stage I document imaging device 11-15a-11-15n, the customer deposit batch becomes processed documents in the first teller's inventory and are stacked in a Stage I teller tray T as a Stage I teller tray batch. According to some such embodiments, some (e.g., only currency and not checks and not deposit slips) or all of the processed documents (e.g., all currency, all checks, all deposit slips) in the first teller's inventory are placed in the Stage I teller tray T. According to some alternative embodiments, instead of placing the processed documents in a Stage I teller tray T, the processed documents are placed and/or received in a Stage I output container (e.g., a Stage I cassette CS or a Stage 1 mini-safe SF). The processed documents in the first teller's inventory (e.g., the Stage I teller tray batch) are transported to a Stage II processing area including one or more Stage II devices 11-15n+1, which may be located in the same room and/or another room, such as, for example, a backroom of the bank processing the documents. Each of the Stage I teller tray batches is then processed by the Stage II devices 11-15n+1, which according to some embodiments is also a document imaging device 44. After a Stage I teller tray batch has been processed by the Stage II document imaging device 11-15n+1, the Stage I teller tray batch becomes processed documents in teller inventory of a second teller and are stacked in a Stage II teller tray T as a Stage II teller tray batch. According to some embodiments, a difference between a Stage I teller tray batch and a Stage II teller tray batch is that the Stage I teller tray batch is not sorted down by denomination of currency bills, whereas the Stage II teller tray batch is sorted down by denomination of currency bills. According to some other embodiments, a difference between a Stage I teller tray batch and a Stage II teller tray batch is that the Stage I teller tray batch is not sorted down (e.g., denominations of currency bills are not sorted, checks are not sorted from currency bills, deposit slips are not sorted from currency bills and/or checks, etc.), whereas the Stage II teller tray batch is sorted down (e.g., denominations of currency bills are sorted from one another, checks are sorted from currency bills, deposit slips are sorted from currency bills and/or checks, etc.).

According to some embodiments, conditional custody or custody subject to verification of the documents transfers from the customer to the first teller. The first teller then processes the documents in Stage I. Custody, then changes again from the first teller to the second teller when the first teller sells the Stage I teller tray T to the second teller. Custody changes to the second teller even if the second teller does not check the Stage I teller tray T as the custody is conditional, such that the second teller can check the Stage I teller tray T when the second teller has time. According to some embodiments, the second teller is also protected from errors associated with the Stage I teller tray T (e.g., missing documents in the Stage I teller tray T) as the Stage I teller tray T can be locked (e.g., includes a locking lid).

According to some embodiments, the stage II document imaging device 11-15n+1 is a large multiple pocket sorting (MPS) device (such as devices 11g and system 100h of FIGS. 1G-1H) and the documents which are currency bills are physically sorted into output receptacles or containers by denomination and documents which are checks are sorted to one or more separate output receptacles or containers (e.g., the device 11-15n+1 is configured to off-sort checks to a single output pocket). According to some embodiments, checks which have been processed by Stage II device 11-15n+1 may be destroyed. According to some embodiments, the Stage II device includes or is coupled to a document destruction device (e.g., a shredding device) and the device 11-15n+1 is configured to route checks to the document destruction device.

XVII. Multi-Input Container/Multi-Output Container Embodiments

Turning on to FIG. 16A, according to some embodiments, a device 11-16a such as a document imaging device 44 may be configured to permit a plurality of input containers C1-Cn (such as cassettes CS or mini-safes SF) to be coupled thereto such as via a plurality of input docks 54. According to such embodiments, the device 11-16a could process documents from a first input container C1 until the container C1 is empty and then begin processing documents form a second input container C2 until container C2 is empty, etc. Once an input container is empty, an operator could replace it with another input container. Alternatively or additionally, according to some embodiments, the device 11-16a can process documents from an input receptacle 1610 (the same as, or similar to, the input receptacle 110 described above) until the input receptacle 1610 is empty.

Similarly, the device 11-16a such as a document imaging device 44 may be configured to permit a plurality of output containers Cn+1-Cn+z (such as cassettes CS or mini-safes SF) to be coupled thereto such as via a plurality of output docks 55. According to such embodiments, the device 11-16a could process documents into a first output container Cn+1 until the container Cn+1 is full and then begin processing documents into a second output container Cn+2 until container Cn+2 is full, etc. Once an output container is full, an operator could replace it with another empty container. According to such embodiments, the device 11-16a could be operated continuously as along as a non-empty input container is coupled to one of its input docks 54 and a non-full output container is coupled to one of its output docks 55. Alternatively or additionally, according to some embodiments, the device 11-16a can process and/or transport documents into an output receptacle 1630 (the same as, or similar to, the output receptacle 130 described above) until the output receptacle 1630 is full, when the containers Cn+1-Cn+z are full, when the document being processed is an exception document (e.g., suspect document), etc. That is, according to some embodiments, documents (e.g., suspect documents, no-call document, etc.) can be transported to the output receptacle 1630 such that an operator can manually remove the documents therefrom without having to open a container (e.g., an automated document container).

Turning to FIGS. 16B-16C, according to some embodiments, a document processing system 1601b, 1601c comprises a document processing device 11-16b, 11-16c and an input container transfer system 1678b, 1678c configured to sequentially couple and uncouple document containers to an input dock 54 of the document processing device 11-16b, 11-16c. For example with respect to FIG. 16B, according to some embodiments, input container transfer system 1678b moves containers vertically and/or horizontally so as to position a container (e.g., container C2) adjacent to input dock 54 and then push the adjacent container into the input dock 54. The device 11-16b then draws documents out of the container C2 until it is empty. Once the container C2 is empty, the input container transfer system 1678b removes the container C2 from the input dock 54 and/or the device 11-16b ejects the container C2 from the input dock 54. The input container transfer system 1678b then moves container C2 away from being adjacent to the opening of the input dock 54 such as to a position near container C1 and moves a next container (e.g., container C3) adjacent to input dock 54 and then pushes the adjacent container into the input dock 54.

With reference to FIG. 16C, the system 1601c operates in a similar fashion with input container transfer system 1678c rotating (e.g. like a Lazy-Susan) to move containers adjacent to and away from input dock 54. For example with respect to FIG. 16C, according to some embodiments, input container transfer system 1678c rotates (e.g., like a Lazy-Susan) containers so as to position a container (e.g., container C3) adjacent to input dock 54 and then push the adjacent container into the input dock 54.

As with device 11-16a, with respect to FIGS. 16B-16C, once an input container is empty, an operator could replace it with another container. According to such embodiments, the device 11-16b,c could be operated continuously as along as a non-empty container is present in the input container transfer system 1678b, 1678c.

Thus according to some embodiments, such as those described above in connection with FIGS. 16A-16C, an operator could load a plurality of containers (e.g., 4 or 5) with deposit batches to be processed and/or verified. The machine 11-16a or system 1601b, 1601c then automatically sequences one input container after another until all containers have been emptied.

According to some embodiments, in a like manner, multiple output containers could receive processed work such as via the device 11-16a having multiple output docks 55 with multiple output containers docked therein and/or a system 1601b, 1601c comprising an output container transfer system 1679b,c similar to input container transfer systems 1678b,c. When a first output container fills (or does not have sufficient space to accommodate the next deposit batch, the device 11-16a would route documents to a next container and/or the device 11-16b,c would pause until the existing container could be decoupled from the output dock 55 and a next empty output container could be coupled to the output dock 55.

According to some embodiments, movement of containers from a first document processing device 11 (such as, for example, a first stage device 11) to another document processing device 11 (such as, for example, a second stage device) is automated. For example, in FIG. 16C, system 1601c may comprise a second document processing device 11-16c2. According to some embodiments, output container transfer system 1679c also acts as an input container transfer system relative to the second document processing device 11-16c2. The container transfer system 1979c may transfer containers Cn+1-Cn+z removed from being coupled to the document processing device 11-16c and then couple one or more of the containers Cn+1-Cn+z to an input port 54 of the second document processing device 11-16c2. In some embodiments, the containers Cn+1-Cn+z are recycle-type containers. Accordingly, the document processing device 11-16c can fill containers Cn+1-Cn+z with documents and then the second document processing device 11-16c2 can then further process those documents. According to some embodiments, the document processing devices 11-16c, 11-16c2 are both document imaging devices 44. According to some embodiments, the document processing device 11-16c is a document imaging device and the second document processing device 11-16c2 is a currency denominating device 33 and the system 1601c is configured and programmed to only transfer containers containing only currency bills to the second document processing device 11-16c2. According to some embodiments, the second document processing device 11-16c2 is a Group B device or system such as devices 11g,h and/or system 100h configured to sort and separate currency bills by denomination such as into containers 118g1-118g6 wherein each container receives only a single denomination of currency bill (e.g., 118g1 receives $1 bills, 118g2 receives $5 bills) and/or into strapping units 300', 300" wherein only bills of the same denomination are bound by strapping material into a single strap (e.g., wherein strapping unit 300' straps $20 bills, and 300" straps $100 bills).

According to some embodiments, the containers are recycle-type containers and input containers emptied by a device 11 are then used as output containers for the device 11. According to some embodiments, the device 11 is used in a system having a container transfer system configured to move empty containers from one or more input docks 54 to one or more output docks 55 of a device 11. For example, according to some embodiments, the transfer systems 1678b and 1679b are integrated such that the integrated system can transfer empty containers from one or more input docks 54 to one or more output docks 55 of a device 11-16b. Alternatively, according to some embodiments, an additional transfer system couples the transfer systems 1678b and 1679b (or 1678c and 1679c) such that the additional transfer system transfers empty containers from a first transfer system 1678b,c to a second transfer system 1679b,c such that empty containers from one or more input docks 54 can be subsequently and automatically coupled to one or more output docks 55 of the device 11-16b,c.

Figure 16D:
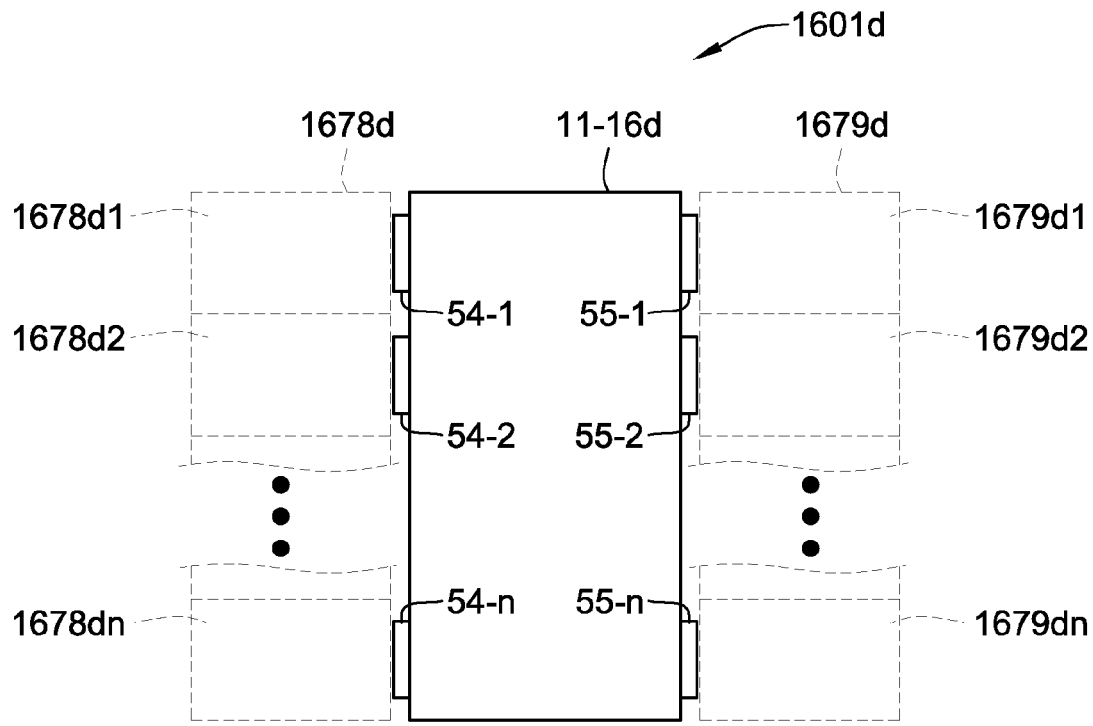

Turning to FIG. 16D, according to some embodiments, a document processing system 1601d comprises a document processing device 11-16d. The document processing device 11-16d comprises one or more input receptacles or input docks 54-1-54-n and one or more output receptacles or output docks 55-1-55-n. In embodiments wherein one or more input docks 54-1-54-n and/or one or more output docks 55-1-55-n are present, each such dock may have a dedicated input container transfer system 1678d1-1678n or output container transfer system 1679d1-1679dn. According to some embodiments, the transfer systems 1678d1-1678dn, 1679d1-1679dn are the same or similar to and operated in the same of similar manner as transfer systems 1678b,c, 1679b,c described above.

For example, wherein the device 11-16d is a document imaging device 44 configured to process both currency bills and checks, the device 11-16d could have one input dock 54-1 and an associated input container transfer system 1678d1 configured to receive containers each containing currency bills, checks, and/or both currency bills and check. Such a device 11-16d could have two output docks 55-1-55-2 with each dock having a dedicated output container transfer system 1679d1-1679d2. The device 11-16d may be configured to distinguish checks from currency bills and route all currency bills to containers coupled to output dock 55-1 and all checks to containers coupled to output dock 55-2.

According to another example, the device 11-16d is a document imaging device 44 configured to process both currency bills and checks and has one input dock 54-1 and an associated input container transfer system 1678d1 configured to receive containers each containing currency bills, checks, and/or both currency bills and check. Such a device 11-16d could have three output docks 55-1-55-3 with each dock having a dedicated output container transfer system 1679d1-1679d3. The device 11-16d may be configured to distinguish checks from currency bills and route currency bills of a first denomination (e.g., $20 bills) to containers coupled to a first output dock 55-1, currency bills of all other denominations to containers coupled to a second output dock 55-2 and all checks to containers coupled to a third output dock 55-3.

According to yet another example, the device 11-16d is a document imaging device 44 configured to process both currency bills and checks and has one input dock 54-1 and an associated input container transfer system 1678d1 configured to receive containers each containing currency bills, checks, and/or both currency bills and check. Such a device 11-16d could have a plurality of output docks 55-1-55-n with each dock having a dedicated output container transfer system 1679d1-1679dn. The device 11-16d may have an output dock associated with each denomination the device is configured to process (e.g., $1, $5, $10, $20, $50, $100) and an output dock associated with checks. The device 11-16d may be configured to route currency bills of a first denomination (e.g., $1 bills) to containers coupled to a first output dock 55-1, currency bills of a second denomination (e.g., $5) to containers coupled to a second output dock 55-2, currency bills of a third denomination (e.g., $10) to containers coupled to a third output dock 55-3, currency bills of a fourth denomination (e.g., $20) to containers coupled to a fourth output dock 55-4, currency bills of a fifth denomination (e.g., $50) to containers coupled to a fifth output dock 55-5, currency bills of a sixth denomination (e.g., $100) to containers coupled to a sixth output dock 55-6, and all checks to containers coupled to a seventh output dock 55-7.

Accordingly, according to some embodiments, with this degree of automation one operator may be able to control or operate a plurality of devices 11-16a or systems 1601b,c,d (e.g., 3, 4, 5 devices or systems) that are simultaneously processing deposit batches. According to some embodiments, an operator 1690 can control each of the devices 11-16a or systems 1601b,c,d such as via a wireless device WD 1699 (e.g., an Apple® iPad® tablet, a smartphone such as an Apple® iPhone® or other device). According to some embodiments, such WDs 1699 utilized by an operator or employee 1690 are owned by the financial institution associated with (e.g., owning and/or operating) the devices 11-16a or systems 1601b,c,d and are synchronized or configured to work in the particular environment with the particular devices 11-16a or systems 1601b,c,d. According to some embodiments, such an improvement in the processing of currency bills and/or checks at this automated level would significantly reduce the number of operators or employees 1690 required in a cash vault to verify deposits. According to some embodiments, such devices 11-16a and systems 1601b,c,d also have the advantage of being able to handle all of the documents in deposit transactions on an automated basis, including deposit slips, currency bills, checks and other documents.

According to some embodiments, devices such as 11-16a and/or systems 1601b,c,d are document imaging devices 44 and have one or more output receptacles or output containers which collect both currency and checks. According to alternative embodiments, devices such as 11-16a and/or systems 1601b,c,d are document imaging devices 44 and have one or more output receptacles and/or containers and/or docks 55 dedicated to collecting only currency bills and one or more other output receptacles and/or containers and/or docks 55 dedicated to collecting only checks (e.g., a device may have one output receptacle or container or dock 55 to collect currency bills and a second output receptacle or container or dock 55 to collect checks). According to some embodiments, devices such as 11-16a and/or systems 1601b,c,d are document imaging devices 44 and have one or more output receptacles and/or containers and/or docks 55 dedicated to collecting only currency bills and one or more other output receptacles and/or containers and/or docks 55 dedicated to collecting non-currency bill documents such as checks, deposit slips, and/or other documents (e.g., a device may have one output receptacle or container or dock 55 to collect currency bills and a second output receptacle or container or dock to collect checks, deposit slips, header and/or trailer cards, other documents). Such embodiments might be preferable where only currency bills must be sent to a second stage device for the physical sorting down by denomination.

According to some embodiments, document imaging devices 44 run checks at a lower speed than currency bills are run. According to some embodiments, the speed of the transport mechanism is adjusted automatically when the device receives an input specifying the type of documents to be processed at a given time (e.g., when checks and currency bills are processed in separate sub-batches). According to some embodiments, the device is configured to detect the type of each document before it reaches an image scanner and in response to the detection of the type of each document, a controller automatically adjusts the speed of the transport mechanism (such as in the vicinity of the image scanner), for example, adjusting the transport mechanism to a high speed when a document is detected to be a currency bill and adjusting the transport mechanism to a low speed when a document is detected to be a check.

A. Handling of Exception Documents

As described elsewhere in this disclosure and in U.S. Pat. No. 8,162,125, which is hereby incorporated by reference herein in its entirety, there are a number of types of exception documents that may be encountered when a document processing device 11 such as currency denominating device 33 and/or document imaging device 44 is processing documents in a deposit transaction (a deposit batch). Examples include, for example, "denomination no call" documents, "serial number no call" documents, "check data no call" documents, suspect documents, etc.

According to some embodiments, devices such as 11-16a and/or systems 1601b,c do not stop upon detection of a "no call" document (e.g., devices 11-16a-11-16d keep processing and transporting subsequent documents. According to some embodiments, images of "no call" documents and/or associated document records are queued in an exception queue. According to some embodiments, images and/or document records in the exception queue are displayed on the WD 1699 (e.g., an Apple iPad) or other device held by or positioned near the operator (e.g., bank employee) 1690. The operator 1690 simply looks at the image of the exception document in question (e.g., an image of a denomination no call currency bill) and then enters the appropriate information via an interface with the WD 1699 or other device (e.g., the denomination of a denomination no call currency bill, a missing digit of a serial number for a serial number no call currency bill (e.g., after displaying a snippet image of the serial number and any extracted serial number digits, etc.), missing check information (e.g., a check amount after displaying a snippet CAR and/or LAR image)).

According to some embodiments, data (e.g., documents images or records) in the exception queue and reviewed and handled by one or more persons (e.g., bank employees) in a central control room. For example, several persons (e.g., bank employees) may work in a central control room and these persons may deal only with handing exception documents. For example, the central control room may have a work station for each person with each work station having a display and interface enabling images and/or records associated with exception documents from one or more exception queues to be displayed on the display. Each person at a work station then reviews the displayed images and/or records and makes the appropriate correction to a record associated with a corresponding exception document, and then handles the next exception document in one or more exception queues. The one or more exception queues can be populated from data generated by devices (e.g., 11-16a and/or systems 1601b,c,d [FIGS. 16A-16D], 11-15a-11-15n+1 [FIG. 15], 11-1-11-6 [FIG. 14]) located in one or more locations (e.g., bank branches B1-B4, BV [FIG. 7]).

According to some embodiments, when a device (e.g., 11-16a-11-16d) detects an exception document, it stops transporting subsequent (upstream) documents. According to some such embodiments, a detected exception document is routed to an output receptacle and the transport mechanism of the device stops, for example, such that the exception document (e.g., denomination no call currency bill) is the last document transported to an output receptacle. According to some such embodiments, the output receptacle is configured to make the last document transported to an output receptacle easily viewable by an operator without the operator having to remove the last document from the output receptacle. The operator then reviews the physical exception document (either while it remains in the output receptacle or after removing the exception document from the output receptacle). The device has an interface (e.g., 170) to communicate the nature of the exception (e.g., denomination no call, serial number no call, MICR data extraction error) and any necessary additional information (e.g., an extracted serial number with any missing digits indicated, such as by a blank underlined space, an asterisk, a question mark, etc.). The operator then takes corrective action such as by entering any needed data (e.g., entering the denomination of a denomination no call bill, missing digits for serial number or MICR extraction errors, etc.) According to some embodiments, the operator enters the necessary missing data via the device interface (e.g., 170) or via an interface on a WD (e.g., 1699. Once corrective action has been taken, the device (e.g., 11-16a-11-16c) starts again and the transport mechanism resumes operation.

According to some embodiments, a device (e.g., 11-16a-11-16d) is a document imaging device 44 and has a suspect off sort receptacle and when the device (e.g., 11-16a-11-16c) detects suspect exception documents, the device off-sorts the suspect exception documents to the off-sort receptacle. An operator (e.g., 1690) then collects suspect exception documents in the off-sort receptacle(s) of one or more devices (e.g., 11-16a-11-16c) from time to time. Because a document record has been created for each suspect document (e.g., containing one or more images or snippet images of the suspect documents and other transaction information (see e.g., records and data files shown in FIGS. 8A-8E), each suspect document can be tied back to a specific deposit transaction (e.g., via using a document or snippet image, a transaction ID, an account number, etc.) and appropriate action may be taken (e.g., a charge back may be made to an corresponding account).

According to some embodiments, a device (e.g., 11-16a-11-16d) is a document imaging device 44 and when the device (e.g., 11-16a-11-16c) detects suspect exception documents, the device does not off-sort the suspect exception documents or stop operation. Instead, the corresponding document records for suspect exception documents are simply flagged (e.g., by setting suspect flags 333', 363'—see FIGS. 8A, 8B). Then during processing on a second device (e.g., a second stage device 11-15n+1 [FIG. 15], 11-13c [FIG. 13], the second stage device off-sorts the suspect exception documents as described above. According to some embodiments, when a deposit batch containing one or more suspect exception documents is being processed on the second stage device (e.g., as determined by the detection of a deposit slip or header card and determination a corresponding transaction ID or the manual entering of the transaction ID into the second stage device), the second stage device 11 determines that a suspect flag has been set for one or more documents in the corresponding data file and looks for the corresponding documents (e.g., looks for certain notes with certain serial numbers and/or checks having certain identifying information) and off-sorts the suspect exception documents to one or more suspect receptacles. Subsequently, an operator may collect one or more suspects documents which have been off-sorted to a suspect receptacle.

XVIII. Processing Of Deposit Transaction Documents At A Cash Vault
Verification—Deposit/Batch Verification According to some embodiments, deposit and/or batch verification can be performed using a device 44 or system (e.g., 1601b-1601d) comprising a single input receptacle or dock 54 and one or two output receptacles or docks 55. According to some such embodiments, a tray T, cassette CS, or mini-safe SF full of currency bills and/or checks (or loose currency bills and/or checks) would be input into the device 44 and the output receptacles or containers would receive the processed and verified currency and/or checks. As described above, multiple devices 44 or systems could be controlled by one operator.

In other embodiments, the currency bills and/or checks (either loose or in containers) are processed by a larger device such as device 11g and/or system 100h on a fully automated basis where the currency is denominated and subsequently sorted down by denomination and delivered either to cassettes (or other containers) or to strapping units. The checks are imaged, the value of each check is determined e.g., by extracting the check amount from CAR and/or LAR snippet images, and the checks off sorted to a receptacle or container separate from the receptacle(s) or container(s) receiving currency bills.

According to some embodiments, currency bills and checks associated with a deposit transaction arrive in a deposit bag at a vault (such as 1301, 1501). The currency bills and checks are removed from the bag and placed into one or more trays for processing. The trays are then delivered to a verification denominating and authentication device or system such as those described above. According to some embodiments, the bags are opened and the documents therein are manually removed and placed directly in an input hopper of a document processing device 11.

According to some embodiments, currency bills and checks associated with a deposit transaction arrive in one or more containers such as cassettes CS or mini-safes SF at a vault (such as 1301, 1501. If the containers received are not automated input or recycle-type containers, the containers are opened (such as using a key to unlock the containers) and the currency bills and checks are removed from the containers and placed into one or more trays for processing. The trays are then delivered to a verification denominating and authentication device or system such as those described above. According to some embodiments, the containers are opened and the documents therein are manually removed and placed directly in an input hopper of a document processing device 11.

According to some embodiments, the containers are dispense only containers or recycle-type containers. In such cases, the dispense only or recycle-type containers may be delivered directly to a verification denominating and authentication device or system such as those described above without having to first open them and manually removed the documents contained therein.

For example, from time to time when automated document containers (such as, for example, cassettes) become full in a document processing device such as in, for example, an ATM, a recycling machine, or in the safes in stores (e.g., 1101, R1-Rn), an armored carrier or bank or store employee removes the containers from the corresponding devices. These containers are then prepared for deposit at the bank. Alternatively, as described above, one or more containers may be manually filled for transport to a bank or armored carrier cash vault. The containers may be delivered to an armored carrier cash vault (e.g., A1, 1301, 1501) or bank cash vault (e.g., BV, 1301, 1501) for verification processing. According to some embodiments, these containers immediately go to a document processing machine (e.g., 11-13b, 11-15a, 11-15b, 11-16a-11-16d. According to some embodiments, the document processing device 11 has an input dock 54 configured to receive a container (e.g., a cassette CS, mini-safe SF, etc.) and extract the documents therein and feed the documents into the device 11 comprising one, two or three output receptacles and/or docks 55 (such as a device similar to, for example, device 11a, 11b, 11ca, 11cb). Alternatively, according to some embodiments, the device 11 has more than three output receptacles or docks 55 such as devices similar to devices 11d, 11e, 11f, 11g, 11h, 11-16a-11-16d and/or corresponding systems.

According to some embodiments, if the container is a smart container (e.g., a smart cassette), the device 11 is configured to be communicatively coupled to and accept data from a processor and/or memory in the smart container such as, for example, data such as EDS data or other data representing a declared the value of currency bills and/or checks in the cassette. According to some such embodiments, the documents in the smart container are automatically extracted from the smart container and processed by the device 11 and the device balances the extracted documents against the declared balance, e.g., determines that the total value of currency bills and checks extracted from the container matches the total declared value of currency bills and check received from the processor and/or memory in the smart container.

Alternately, the smart container may contain a plurality of sub-batches of documents, each sub-batch being associated with, e.g., a different customer and the smart container storing data (e.g., EDS data) associated with each sub-batch such as, e.g., a declared value for each sub-batch. According to such embodiments, the device 11 balances the individual sub-batches of documents extracted or removed from the smart container against the corresponding data (e.g., declared value) received from the smart container.

According to some embodiments, the containers may or may not be smart containers. Instead, when such containers (especially dumb containers) become full in a document processing device such as in, for example, an ATM, a recycling machine, or in the safes in stores, they are removed from the corresponding devices. According to some embodiments, such devices are equipped and configured to print out the value of documents in the container (and/or other EDS data). Alternatively, one or more containers can be manually filled and a printout including a declared value or other EDS data may be generated on a printer (e.g., printer 1154). According to some embodiments, the printout may also have a bar code printed thereon representing, for example, a deposit transaction ID, container ID, declared amount(s), other EDS data, etc. According to some embodiments, a hand-written receipt or deposit slip may be used instead of a printout. According to some embodiments, the printout or handwritten deposit slip is affixed to the container (e.g., the printout may be a sticker affixed to the container) and/or shipped with the container. Then when the container arrives at the vault (e.g., 1301, 1501) a vault employee (e.g., 1390*a,b*, 1590*a*) scans the bar code to determine the encoded information such as, for example, a declared value. Additionally or alternatively, a vault employee may read information printed on the printout and/or handwritten deposit slip and enter such information (e.g., a declared amount) into a document processing device (e.g., 11-13*a*-11-13*c*, 11-15*a*-11-15*n*+1, a PDA 1399, 1599*b*, or on some other interface or computer associated with the vault.

In some embodiments, when a container such as a the cassette is removed from a corresponding device such as, e.g., an ATM, recycler, or safe, the device electronically sends data (e.g., declared total(s) of documents in the container and/or other EDS data) to the bank or armored carrier (such as to a bank or vault accounting system or network (e.g., 1320, 1520, 960, 903) such as, for example, via the Internet, Wi-Fi, cellular communication, hard wire connection, and/or other communication methods. When the container arrives at the bank or vault, it is identified and matched to the declared balance which was received electronically in advance of receiving the container. For example, the declared amount and a container ID, customer ID, transaction ID, and/or other data is electronically sent to the bank and/or vault prior to the container arriving at the bank or the vault and this data is matched to the container when it arrives such as via entering (e.g., manually and/or via a bar code reader, RFID, etc.) data associated with the received container (e.g., a container ID, transaction ID, etc. present on a hand written or printed document such as a deposit slip, receipt, label, etc. and/or electronic data stored in a memory of a smart container).

According to some embodiments, each smart container (e.g., smart safe, smart cassette, etc.) can be tracked back to the specific safe, ATM, recycler, store, bank, and/or customer depositing or transmitting the container at any point in time during a deposit transaction (e.g., during the physical portion of the deposit transaction as opposed to the electronic portion). Thus, for example, the bank can operate on a fully automated basis to keep track of the location of the smart container. That is, according to some embodiments, a bank can track the location of the smart container and who (e.g., customer, armored carrier, bank vault, etc.) has custody of the smart container at any point in time during a deposit transaction (e.g., from the moment a customer puts documents into a smart container for deposit at the bank to the moment the bank processes the smart container.).

In some embodiments, an operator of a document processing device 11 such as a document imaging device 44 (e.g., operator 1390*a*, 1390*b*, 1590*a*, 1590*b*) would place or couple one container into or to an input dock 55 of the device 11 (e.g., device 11-13*b*, 11-15*a*, 11-15*b*, 11-16*a*, 11-16*d*). The container containing currency bills and/or checks would then be emptied by the device 11 and the currency bills and/or checks are delivered to an output receptacle or container coupled to an output dock such as where the device 11 is a single output device. If the device 11 is a multiple output device, mixed currency might be delivered to a first output receptacle or a first container coupled to a first output dock 55 and checks to the second output receptacle or a second container couple to a second output dock 55. According to some embodiments, the device 11 has three output receptacles and/or docks 55.

The device 11 is configured to route all currency bills except one denomination such as $20s to a first output receptacle or container. The device 11 is configured to route $20 currency bills (or another denomination might be designated) to a second output receptacle or container. According to some such embodiments, a bank or a vault operating device 11 in such a manner could receive bills of a particular denomination (such as $20 bills) in containers such as cassettes CS to be used in ATMs or other currency dispensing device. Containers such as cassettes CS containing bills of a desired particular denomination could then be returned or sent to a bank for use in restocking their ATMs. According to some such embodiments, the device 11 is configured to route checks to a third output receptacle or container.

According to some embodiments, an advantage of using smart containers (e.g., smart cassettes and/or smart safes) for transporting documents (e.g., currency bills, checks, deposit slips, etc.) as described herein is that the smart containers contain information in memory of the smart container, such as, for example, the customer name, customer account, amount of currency within, checks within, etc. Such information in the memory of the smart container is useful when processing the smart containers at the bank, especially when the bank receives a multitude of smart containers from multiple armored carriers delivering smart containers from many different customers of the bank.

According to some embodiments, another benefit or feature of smart containers is the ability of the bank, the bank's customer, and/or the armored carrier to track the physical location of each smart container at various times during a deposit transaction. That is, according to some embodiments, after a smart container is filled with documents of a deposit transaction and secured (e.g., locked) at the depositor's location (e.g., the store location), a tracking system (e.g., a GPS based system or other) is utilized to monitor/track the smart container's geographic location. For example, a supermarket (e.g., a bank customer) may store a smart container, with documents (e.g., currency bills, checks, deposit slip, etc.) therein, in the safe of the supermarket overnight. According to some such embodiments, the supermarket's safe includes a docking station which can automatically recognize that the smart container (e.g., cassette #32) is in the supermarket's safe at a particular store location (e.g., store #51) of the supermarket and inform the tracking system of the same (e.g., via an internet connection). According to some such embodiments, when an armored carrier picks up the smart container from that store location (e.g., store #51 of the supermarket) the following business day, the tracking system can automatically update records associated with the smart container (e.g., cassette #32) to reflect the transfer of custody of the smart container (e.g., cassette #32) from store #51 to the armored carrier.

Further, according to some embodiments, the armored carrier company, the truck number of the armored carrier, the driver of the truck, etc. can also be identified in the updated record(s) associated with the smart container (e.g., in the memory of the smart container). According to some such embodiments, docking stations are located inside of the armored carrier truck, which when the smart cassette is coupled thereto, aid in automatically identifying the exact location of the smart container (e.g., via a GPS based system associated with the physical location of the armored truck).

According to some embodiments, after the smart container is delivered to the bank (e.g., the bank's cash vault or an armored carrier's cash vault), the tracking system can automatically update the records associated with the smart container (e.g., cassette #32) to reflect the transfer of custody of the smart container from the armored carrier to the cash vault. The smart container can then be processed by the cash vault (e.g., coupled with one or more document processing devices) and is located and assigned to a specific teller in the cash vault for completion of the processing of the deposit transaction(s) within the smart container.

According to some embodiments, the device 11 employs one or more input container transfer systems 1678*b*, 1678*c* and/or one or more output container transfer system 1679*b*, 1679*c* such as those described above. According to various of some such embodiments, the system 1601*b,c* is configured to permit loading of one, two, five, six, ten or twelve containers. One container after another would unload into the device 11-16*b,c*. When the first container is empty, the device 11-16*b,c* verifies/balances it contents and the input container transfer system 1678*b*, 1678*c* would rotate and a second container would then be coupled to the device 11-16*b,c* and emptied and its contents verified/balanced. On the output side, the device 11 could be configured to be coupled to one container at a time and either have or not have an output container transfer system 1679*b*, 1679*c*. The output container transfer system 1679*b*, 1679*c* could rotate through a series of containers (e.g., trays T, cassettes CS, and/or mini-safes SF) before operator/manual intervention is required again. According to some such embodiments, these containers receive mixed currency bills which are then moved to a MPS device for sorting such as device 11*g*, 11*h*.

Under some embodiments, the device 11 is configured to cause a second output dock 55 to fill containers with a particular denomination, say $20 notes. In some embodiments, the device 11 has an interface permitting an operator to change the denomination to be sent to the second output port 55, e.g., the operator could later choose $10s, $5s, or $100 to be sent to containers coupled to the second output port 55. As each container fills in the second output area, an output container transfer system 1679*b,c* rotates or otherwise permits another container to become coupled to the second port 55 and become filled and so on so that a plurality of containers (e.g., six, twelve, etc.) can be filled at the second output port 55 before operator intervention is required. According to some such embodiments, checks are delivered to a third output receptacle or container(s) coupled to a third output port 55.

Thus, according to some embodiments wherein the device 11 comprises one or more input ports 54 and/or output ports 55 and/or is used with one or more input container transfer systems 1678*b,c* and/or one or more output container transfer systems 1679*b,c* using automated document containers (smart and/or dumb; receive only, dispense only, and/or recycle-type) the amount of manpower required in a vault can be significantly reduced. Less manual preparation of currency bills and/or checks is thereby required in the vault. According to some such embodiments, stacks of containers can arrive at a vault and immediately be moved to an automated container processing and verification system such as a system comprising devices 11-16*a*-16*d* and/or container transfer systems 1678*b,c*; 1679*b,c*. Documents can be automatically removed from the containers by devices 11-16*a*-11-16*d*, verified/balanced, and repackaged into containers for subsequent processing such as by another device 11-16*a*-11-16*d* and/or for transport out of the vault. For example, verified mixed currency bills received in a container from a first stage device such as device 11-16*a*-11-16*d*, 11-15*a*, 11-15*b*, 11-13*b* can moved (in some embodiments automatically) to a second stage device such as device 11-16*a*-11-16*d*, 11-15*n*+1, 11-13*c*, 100*g*, 110*h* for sorting by denomination and delivery to containers, each containing single denomination of currency, and/or strappers. According to some such embodiments, currency bills are processed by the second stage device such as device 11-16*a*-11-16*d*, 11-15*n*+1, 11-13*c*, 100*g*, 110*h*, the processing including verifying the contents of a container and/or sub-batch, facing the currency (arranging the currency so that same side of each bill faces the same direction, e.g., either face-up or face-down) and sorting the currency bills by denomination into a) an output receptacle, b) a container (e.g. a cassette), or c) a strapping unit.

In some embodiments, documents arriving in automated containers could bypass any Stage I devices (e.g., devices 11-13*a*, 11-13*b*, 11-15*a*-11-15*n*, 11-16*a-b*) and be moved directly to a Stage II device (e.g., 11-13*c*, 11-15*n*+1) having one or more input ports 54 and/or input container transfer systems 1678*b,c*.

According to some embodiments, declared balances could be electronically sent to a vault (such as to a network within or associated with a vault and/or to one more devices within a vault such as devices 11 (e.g., 11-13*a*-11-13*c*, 11-15*a*-11-15*n*+1, 11-16*a*-11-16*d*, 970, 44-9*b*). As one example, a recycling device (or ATM) at Bank of America Branch #20 could fully fill a deposit cassette with currency and/or checks. The cassette would be removed at the branch and sent to the central cash vault. When the cassette is removed the device (ATM/recycler/safe) could electronically send a declared balance to the cash vault. Therefore, when the cassette from Bank of America Branch #20 arrives at the cash vault (e.g., the San Francisco cash vault), the vault (the vault's computer system and/or devices within the cash vault) will already know what should be in that specific cassette. The cassette is then processed by a document processing device (e.g., 11-13*a*-11-13*c*, 11-15*a*-11-15*n*+1, 11-16*a*-11-16*d*, 44-9*b*) and the contents of the cassette are balanced down to the declared balance that was sent electronically.

A container (e.g., cassette) arriving for verification may consist of only one denomination of currency bills for verification. Alternately, a container (e.g., cassette) could contain mixed denominations of currency bills. Alternately, a container (e.g., cassette) may contain mixed denominations of currency bills plus checks. Alternately, a container (e.g., cassette) could contain just checks. Alternately, a container (e.g., cassette) could contain a single denomination of currency bills plus checks. According to some embodiments, the document imaging devices 11/44 discussed above (e.g., devices 11-13*a*-11-13*c*, 11-15*a*-11-15*n*+1, 11-16*a*-11-16*d*) are configured to handle any combination of these mediums plus other items that might be in the cassettes including deposit slips (particularly if a container is broken down by sub-batches to receive deposits by specific customers). According to some such embodiments, verification of such a variety of medium in containers can be handled and verified in an unattended or semi-attended manner is described herein (e.g., where no exception documents were encountered, a container could be processed in an unattended manner without an operator of a device 11 processing a container having to enter any data about the container or its contents). According to some embodiments, some type of an I.D. (such as on a header or trailer card) is placed between each sub-batch or customer's deposit within a container; and accordingly, the contents of a container may be automatically verified/balanced down to each sub-batch or deposit transaction within each container.

In some embodiments, the verification device (e.g., document processing device 11 such as a document imaging device 44) does not have to be located in the central cash vault. Instead, the device can be located at a bank branch, e.g., branch 1401. According to some embodiments, the verification device has only one input and only has one, two or three output receptacles and/or ports 55. However, in some embodiments, the device is a larger MPS scanner/sorter such as device 11g, 11h. Some bank branches service ATMs (e.g., ATM#1, ATM#2) at their location because of the high volume. Branches could also service their recycling machines (e.g., RC-1, RC-2). When a container (e.g., cassette) in such ATMs/recyclers is full of currency bills, such containers are removed. The person removing a full container could replace it with another empty container at the same time and then walk away. The container(s) are then taken to the on-site verification device 11 found in the branch. According to some embodiments, the verification device 11 is located behind the teller line (e.g., in room 1401B) or in a back room or vault (1401D/1401E). The same person or another person such as a teller supervisor could couple a full container to an input port 54 of the verification device and then perform other functions while the verification device is verifying the contents of the container.

According to some embodiments, the verification device 11 (e.g., 11-16b,c,d) at the bank branch 1401 has one or more container transfer systems (e.g., 1678b,c,d; 1679b,c,d) associated therewith. With such systems (e.g., systems 1601b,c,d), an operator (such as, e.g., a branch manager or teller supervisor) may load multiple containers on an input container transfer system (e.g., 1678b,c,d) for verification/balancing/processing. According to some embodiments, the input container transfer system accommodates one or more containers (e.g., 1, 2, 5, 12, etc.). According to some embodiments, a system operator can load up the input container transfer system and then walk away while the system automatically cycles through the containers and processes/verifies/balances the documents contained in each container. In a like manner, the verification device/system may comprises one or more locations to receive processed documents such as one or more output receptacles (e.g., 130g1-130g8, 130d1-130d8, 130e1-130e8, 130f1-130f9), containers (e.g., 118g1-118g6), document receiving units 300', 300", and/or output ports 55. For example, in some embodiments, the verification device has a single output receptacle or container wherein all medium are placed into the same receptacle or container (e.g., output tray or cassette). In some embodiments, the verification device has two output receptacles or containers with the mixed currency bills going to one receptacle, tray, or cassette and checks going into a second receptacle, tray, or cassette after imaging and Check 21 processing on the imaged checks.

According to some embodiments, an operator or other person such as a head teller or branch manager can monitor the progress of the system remotely such as via a PDA 1499-B1 or computer 1452. According to some embodiments, if any exception document is encountered (such as a no call or other item), an image(s) and/or snippet image(s) of the exception document is displayed on their PDA screen and/or computer screen which is communicatively coupled to and controls or interacts with the system (e.g., 1601b,c,d). A remote person such as a bank employee can then enter the value of a no call currency bill or missing data on a check and the verification device and/or system will continue (if it has halted which may not be required such as where exception documents are sent to an exception queue as described elsewhere herein). Therefore, according to some embodiments, an operator such as a teller, branch manager or other bank employee can be performing other work such as servicing a customer or performing bank balancing or other functions while the device/system is operating.

In a like manner, at large retail stores where containers such as cassettes are utilized in POS check out devices, in a back-room on a cash recycler and/or in a deposit device (such as a Wincor Nixdorf CINEO C4040), a verification device or system could be utilized. The verification device or system would enable stores to capture the images all the checks at the store location and off sort them (and electronically send images of the checks to a bank for Check 21 processing) such as described in connection with FIGS. 9A and 9B and in U.S. Pat. No. 8,162,125, which is hereby incorporated by reference herein in its entirety. Mixed currency bills could then be delivered back into one or more containers such as cassettes, verified, and sent on to a bank or vault for further verification. According to some embodiments, the checks would not need to be physically transferred to a bank or could be transported in a non-secure manner such as without employing an armored car. According to some embodiments, the images of checks can be sent to the bank without the physical checks themselves being sent to the bank. In some of such embodiments, the physical checks can be destroyed by the customer based on the bank's policy after the check images are verified (e.g., several days later) by the bank.

A. Multiple Batch Containing Smart Containers

According to some embodiments, smart containers such as smart cassettes CS and/or mini-safes SF are employed to track multiple customers and totals within a single smart container. According to some such embodiments, verification/document processing devices 11 utilize the data stored in a smart container to electronically and by arrangement of the medium within the container to track subtotals within the container by sub-batch (e.g., customer) and then add the subtotals to a total declared balance within a container delivered to a bank or armored carrier cash vault for verification. According to some embodiments, a smart container is employed to track multiple sub-batches for different store shifts and/or by cash register/employee. According to some embodiments, a smart container is employed to track sub-batches by different customers, e.g. different stores or different branches of a chain store. For example, an armored carrier could use a single smart container at multiple locations as long as the container has capacity. For example, if a smart container has capacity of 500 documents, at Store #1, an armored carrier employee inserts smart Container #1 into a deposit dispensing device 11 which dispenses 130 documents (bills, checks, and/or deposit slip) for deposit at bank. The armored carrier then transports Container #1 to Store #2. A deposit dispensing device 11 at Store #2 then dispenses 170 documents for deposit at bank into Container #1. Then the armored carrier travels to Store #3 and couples Container #1 to a deposit dispensing device 11 in Store #3 and receives 150 documents. Finally, the armored carrier delivers Container #1 to a bank or armored carrier vault having one of the reconciliation devices 11 systems described herein. Such a method allows multiple customers to share a container which reduces need of armored carriers to use partially full containers (three partially filled containers in the prior example) which in turn saves precious space in armored vehicles (e.g. vehicle 1201). Such methods could lead to lower transport charges to armored carrier customers and/or greater profits for armored carriers.

In some embodiments, containers (e.g., cassettes CS or mini-safes SF) containing currency bills are removed directly from self-service check out devices 11, 33, 44 at stores, such as, for example, supermarkets. In other words, as an inventory of $5s, $10s and $20 builds beyond what it needed for recirculation in a POS device to make change, excess cash goes into a separate kiosk (e.g., a mini-safe, a cassette, etc.) for deposit at a bank. For example, a self-checkout POS device located at a grocery store can act as a currency recycler device that includes and/or is coupled to a mini-safe. As excess currency is accumulated in the POS device, the excess currency can be moved (e.g., automatically by the POS) from the recycler portion of the POS to the mini-safe portion of the POS throughout the day. When such a container is full of mixed currency, or alternately sorted down by denomination into separate containers, these containers are removed by the store or the armored carrier. The container(s) would not have to be verified at the store location as amount in each container would be known. According to some embodiments, the containers are smart containers and the totals and/or other data (e.g., an EDS) would be stored in a smart chip on the smart container itself or such information could be transmitted electronically (such as through a POS system) to or made available to a network associated with the bank (e.g., posted on a website and made available for download to a bank network). The bank would then know what amount to expect in each POS cassette removed from the self-service POS check out machines when they arrive at a cash vault. The electronically transmitted data could be sent to or otherwise may made available to (e.g., downloaded by) one or more verification devices/systems at the cash vault. Once received at the cash vault, the container can be verified using the verification device/system, as described above.

The capacity of containers varies greatly. According to some embodiments, the verification devices/systems described herein are configured to handle a plurality of sizes of such containers (e.g., cassettes CS, mini-safes SF). For example, according to some embodiments, the verification devices/systems described herein are configured to handle containers having a capacity of 20 documents, 100 documents, 500 documents, 1000 documents, and/or 3000 documents. As provided in the exemplary description above, there are various methods for delivering multiple containers to and from the above described verification devices. For example, one container transfer system is a carousal type device (e.g., like a lazy Susan) that rotates containers to a feeding mechanism or input port 54 and/or output port 55 (see e.g., FIG. 16C). Another could be a stacking type kiosk device where the device rotates the next cassette into place for verification (see e.g., FIG. 16B). According to some embodiments, the cassettes can vary in size (e.g., document capacity) depending on the volume of the currency bills (and/or checks) that the store receives on a daily basis.

XIX. Deposit Transaction—Bluetooth

According to some embodiment, a deposit transaction is initiated at a remote location from a bank such as store 1101 (FIG. 11) and consummated at a bank such as bank branch 1401 without data (or only limited data) being transmitted outside either location such as over the Internet (e.g., without sending data over network 1120 or 1420). For example, a customer 1190 initiates a deposit transaction using a document processing device 11 such as a currency denominating device 33 or a document imaging device 44. For example, the document processing device may be run in a deposit mode. A stack of documents to be deposited in the deposit transaction (such as currency bills for a device 33 or currency bills, checks, and/or a deposit slip for a DID 44) are placed into an input hopper of the device 11 and processed by the device 11. The device 11 determines information about the documents processed such as the total values of bills, checks, and/or breakdown details and/or generates an electronic deposit slip (EDS) containing information about the documents to be deposits such as that described above in connection with FIGS. 8A-8E, 10B-10E. The determined information and/or the EDS is sent to the customer's WD 1199 (e.g., a Smartphone) via a Bluetooth connection. If the device 11 did not generate an EDS, the WD 1199 may do so using, for example, some or all of the information received from the device 11 and/or information stored in WD 1199 and/or entered into WD 1199 and/or received from another device (e.g., computer 1154) communicatively coupled thereto. If the device has not already done so, the customer 1190 may place the documents to be deposited in a container (e.g., bag B, tray T, cassette CS, mini-safe, shoebox, plastic bag, etc.).

The customer 1190 then takes the documents in the deposit transaction to be deposited to the bank branch 1401. As the customer 1190 approaches or enters the bank branch 1401 and/or approaches a Bluetooth enabled document processing device 11 such as a self-service machine (e.g., ATM #1), a semi-attended machine (e.g., device 11-6 or MT), and/or approaches a teller station 1484-1-1484-5, the customer's WD 1190 pairs with one or more Bluetooth-enabled devices 11 (11-1-11-6, ATM, MT, SSC) and/or sensors 1480 and the customer's WD 1190 is recognized and the deposit information such as an EDS stored on the WD 1190 may be automatically transferred to one or more of the devices (11-1-11-6, ATM, MT, SSC).

Accordingly, one or more of the devices may automatically know what documents to expect to receive and into which account received funds should be deposited. Some of the received deposit information may be used as and constitute a declared deposit amount or amounts (e.g., a declared grand total value, a declared currency bill total value, a declared check total value, and/or breakdown information e.g., 305 $20 bills, 87 $10 bills, a first check having a value of $50.67, a second check having a value of $100.34). The received deposit information may also include images of one or more of the documents and/or snippet images of the same, and/or extracted information from one or more of the documents such as, for example, bill serial numbers, check MICR data, deposit account number).

The deposit documents are then processed by one of the document processing devices 11 (either operated by the customer or a bank teller) and the document processing device determines whether the documents deposited match what is expected based on the data sent from the customer's WD 1199. If so, the deposit transaction is consummated and the funds are deposited into the designated account. The device and/or the teller using a separate printer may then print out a receipt from the customer 1190 and provide the receipt to the customer 1190. Additionally or alternatively, the device and/or a sensor 1480 may wirelessly send an electronic receipt to the customer's WD 1199.

As is evident from the above discussion, according to some embodiments a deposit transaction can be consummated without the customer having to manually complete a deposit slip while at the bank branch 1401 and/or beforehand such as while in the customer location 1101. Furthermore, according to some embodiments, a deposit transaction can be consummated without the customer 1190 having to communicate with a bank teller either orally or in writing and/or without the customer and/or bank teller having to manually enter declared deposit amounts into a document processing device and/or other electronic device coupled thereto (such as a teller station computer terminal), and/or without having to manually enter account information into a document processing device and/or other electronic device coupled thereto (such as a teller station computer terminal).

XX. Deposit Transaction—Customer Site

Similar to the systems and methods described above in connection with FIGS. 9A and 9B above and in U.S. Pat. No.

8,162,125, which is hereby incorporated by reference herein in its entirety, according to some embodiments, systems and methods are provided where a bank customer (e.g., a retail merchant such as operator 1190 shown in FIG. 11) can send data regarding a deposit transaction to a bank network (e.g., a central computing center of a bank such as banking system 960 shown in FIG. 9) prior to making the actual physical deposit of the documents in the deposit transaction. According to some embodiments, communication of deposit transaction data (e.g., data records and/or a data file) from the bank customer or bank customer device (e.g., device 44-9a shown in FIG. 9A, device 11-11, computer 1152, PDA 1199 shown in FIG. 11) is sent via cell phone to the bank 103. According to some embodiments, communication of the deposit transaction data is sent over the Internet via the customer's WD (e.g., the customer's cell phone, the customer's tablet computer, etc.) using a Wi-Fi connection (e.g., the customer's cell phone is on a Wi-Fi network at the customer's site) and/or a cellular data connection (e.g., the customer's cell phone is on a cellular network connected to a cellular tower proximate to the customer's site). For example, according to some embodiments, a document processing device 11 (44-9a of FIG. 9 or 11-11 of FIG. 11) is communicatively coupled to a customer computer (e.g., computer 1152 shown in FIG. 11) via a Wi-Fi connection and/or a cellular data connection, the computer 1152 is communicatively coupled at least in part via a hard-wired connection to network 1120 or network 920 (shown in FIG. 9) which in turn is communicatively coupled to a banking system (e.g., system 960 shown in FIG. 9). According to some embodiments, the banking system (e.g., system 960 shown in FIG. 9) generates and sends a transaction ID (such as a transaction number) back to the bank customer location (e.g., R1 shown in FIG. 9, 1101 shown in FIG. 11) and more specifically to device at such location (e.g., device 44-9a shown in FIG. 9A, device 11-11, computer 1152, PDA 1199 shown in FIG. 11). The transaction ID is associated with the deposit transaction (e.g., stored as part of a record or data file or EDS and/or associated with a customer bank account number, a declared deposit amount for the transaction, etc.).

Then, according to some embodiments, the customer would actually travel to a bank location (e.g., 903 shown in FIG. 9, 1401 shown in FIG. 14) such as, for example, within 24 hours or so following the electronic transmission of the deposit transaction data and make a physical deposit of the deposit transaction documents into an automated teller deposit device (e.g., ATM #1) or at a teller window (e.g., teller station 1484-1-1484-5 having a document processing device 11-1-11-5) as shown in FIG. 14 or device 44b shown in FIG. 9B.

According to some embodiments, a phone is used as a type of modem.

According to some embodiments, a remote deposit transaction may vary depending on whether a deposit transaction comprises the deposit of a low volume of documents or a high volume of documents.

A. Low Volume Check Deposits

Referring generally to FIG. 19, according to some embodiments, such as in a low volume application, a document processing device comprises or is communicatively coupled to a magnetic sensor configured to magnetically read the MICR line of a check. According to some embodiments, the device has a small housing and is lightweight and may be a handheld device. One example of such a device is illustrated in FIG. 19 wherein the device is a PDA such as a smartphone 1999. A MICR reader 1904 and/or 1906 may be detachably coupled to the device such as, for example, via an earphone or headphone jack 1904a or a dock interface or USB receptacle 1906a. For example, the MICR reader may be positioned on a side of the device and a bottom edge of a check is manually moved past the magnetic sensor so that the MICR line on the check passes the magnetic sensor. The data encoded by the MICR line is extracted by a processor in the device 1999 and/or 1904/1906. The extracted data includes a bank routing number, a bank account number, etc. The device also has a user interface 1970 (such as for example, a keyboard, touchscreen, voice interface) and a user of the device enters the amount of the check. For example, the device may be a cell phone or smartphone and the user enters the check amount via a keyboard or touchscreen on the phone or via a voice interface such as Siri on an Apple® iPhone®.

The extracted MICR data and the manually entered amount is then sent to a bank for settlement via ACH, or other method. Some such embodiments could be an attractive application for merchants such as livery drivers, dry cleaners, etc., to capture the data of a check and process it quickly. According to some such embodiments, a check may be processed at a very low cost (in a similar fashion in some ways to how a credit card is verified over the phone line).

B. High Volume—DID

According to some embodiments, such as in a low volume application, a document processing device 11 is a document imaging device 44 configured to receive a stack of deposit transaction documents such as checks and/or currency bills in an input hopper and process them at high speeds as discussed above such as in connection with FIG. 2 and elsewhere. The document imaging device 44 captures the image of all the currency bills and all the checks processed. According to some embodiments, an operator of the document imaging device 44 can enter or correct check amount data via an interface on the device 44 (e.g., by the device displaying CAR and/or LAR snippet images) for documents for which a check amount extraction error occurred and/or for all check documents for embodiments in which the document imaging device 44 is not configured to extract CAR/LAR data. As discussed elsewhere herein, the images or records of exception documents could be added to an exception queue and an operator of the device could sequentially review each queued image or record and enter any missing data and/or correct extracted data.

As discussed above in connection with FIG. 9A, the images of the deposit transaction documents and/or the records for each deposit transaction document and/or the data file for the deposit transaction may be sent to a bank network for settlement. According to some embodiments, the data is transmitted to the bank wirelessly, such as, for example, using a Wi-Fi connection, a cellular data connection, and/or a hard-wired connection (e.g., a computer coupled directly to the Internet). According to some embodiments, the device 44 is communicatively coupled to a cell phone or smartphone via a wired connection to the phone such as via a wired connection to an earphone jack of the phone. According to some embodiments, the document imaging device 44 itself comprises a wireless communication device such as a cellular communication device and the device 44 sends the deposit transaction data to a banking network for settlement such as via a cell phone network.

C. Encryption

According to various embodiments, deposit transaction data (e.g., document images/records/data files/EDS) is encrypted prior to transmission to a banking network to protect the confidentiality and/or integrity of the data. Encryption may be used in connection with any communication method including any of those described herein including cellular communication, Wi-Fi connections, Bluetooth connections, hardwire connections. Furthermore, encryption may be employed in connection with communication between any two devices described in this disclosure such as between and among document processing devices 11, separate computers (e.g., 1152), WDs (e.g., 1199, 1499), networks such as the Internet (e.g., network 1120, 920), etc.

XXI. Teller Terminals Integrated With Document Processing Devices

A. Terminals Separate from DPSs 11

1. Components of System 1700a

Figure 17A:
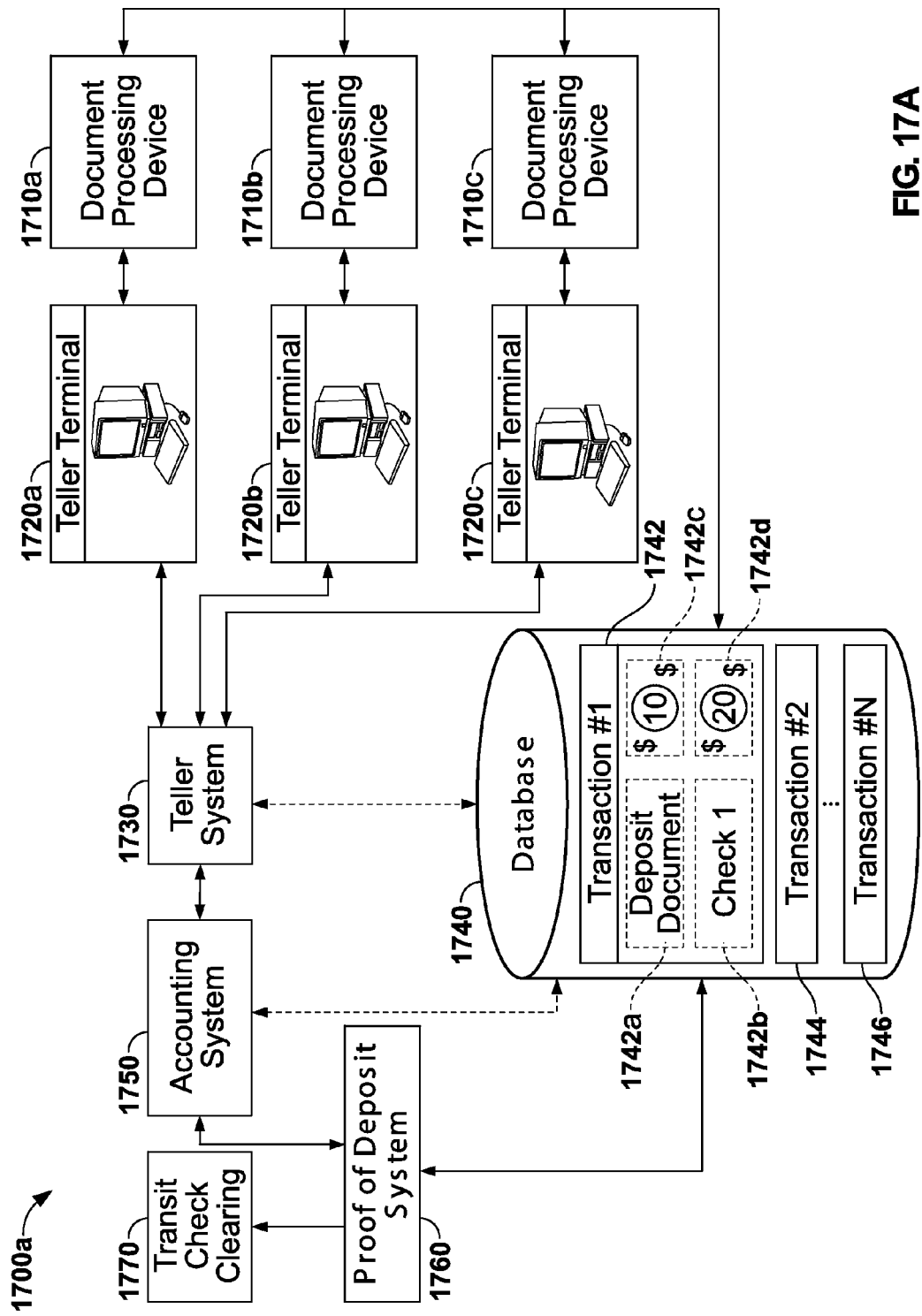
FIGS. 17A-17B are block diagrams illustrating banking-related systems including one or more document processing devices according to some embodiments.

Referring to FIG. 17A, according to some embodiments, multiple document processing devices 1710a,b,c are communicatively connected or coupled to respective teller terminals 1720a,b,c. The teller terminals 1720a,b,c are in turn communicatively connected with a teller system 1730. As illustrated, a first document processing device 1710a, such as, for example, the document processing device 101, 101' described above in connection with FIG. 2 and as described in the Document Processing Device and System Section of U.S. Pat. No. 8,162,125, which is hereby incorporated by reference herein in its entirety, and in other sections of the present disclosure, is communicatively connected to a first teller terminal 1720a, which in turn is communicatively connected to the teller system 1730. Other document processing devices, such as, for example, document processing devices 1710b and 1710c, can be similarly communicatively connected or coupled to other respective teller terminals, such as, for example, teller terminals 1720b and 1720c, all within the same financial institution system 1700a.

According to some embodiments, each document processing device 1710a,b,c is communicatively connected or coupled to a database 1740 within the financial institution system 1700a that stores information and/or data.

According to some embodiments, the document processing devices 1710a,b,c are each configured to process batches of documents to generate respective data files, as described, for example, in the Document Processing Device and System Section of U.S. Pat. No. 8,162,125, which is hereby incorporated by reference herein in its entirety, in the Optical Character Recognition Section of the present disclosure and of U.S. Pat. No. 8,162,125, which is hereby incorporated by reference herein in its entirety, and in other sections of the present disclosure—each data file being associated with a single transaction. According to some embodiments, each data file includes a record for each document included in the respective batch of documents. Each record can include a variety of information and/or images such as described above in the Document Records and Data Files Section and in connection with FIGS. 3A-3E, and in other sections of the present disclosure and in U.S. Pat. No. 8,162,125, which is hereby incorporated by reference herein in its entirety.

According to some embodiments, the database 1740 can be communicatively connected or coupled in a bi-directional manner with each of the document processing devices 1710a, b,c, a proof of deposit system 1760, an accounting system 1750, and/or teller system 1730. Such an architecture allows any of the devices/systems connected to the database 1740 to electronically access and review the data files and/or records contained therein. Additional unidirectional or bidirectional communication can occur through connections between the teller system 1730 and the accounting system 1750, and between the accounting system 1750 and the proof of deposit system 1760.

According to some embodiments, the system 1700a includes a transit check clearing system 1770 that is configured to receive clearing information, such as, for example, check records and/or image data associated with checks, from the proof of deposit system 1760, to clear checks drawn on outside financial institutions. According to some embodiments, the proof of deposit system 1760 is part of an item processing system, such as the item processing system described in the Electronic Portion of Deposit Transaction Section and in connection with FIGS. 9A and 9B, and in other sections of the present disclosure.

2. Details of Database 1740

According to some embodiments, the database 1740 stores a plurality of data files and/or records associated with a plurality of transactions. The data files and/or records are the same as, or similar to the data files and the records described above in the Document Records and Data Files Section and in connection with FIGS. 3A-3E, and in other sections of the present disclosure.

According to some embodiments, the data files and/or records are stored in and retrievable from the database 1740. As illustrated in the exemplary embodiment of FIG. 17A, the 1740 database includes a plurality of data files 1742, 1744, 1746, where each data file is associated with a respective transaction, such as, for example, transaction #1, #2, . . . #N, respectively. Additionally, as shown, according to some embodiments, each data file 1742, 1744, 1746 includes a visually readable image of each document included in the batch of documents associated with the respective transaction. According to some embodiments, each visually readable image is contained in a record included in the respective data file. It is contemplated that according to some embodiments, each record further includes deposit and/or transaction information (not shown) along with the image of the respective document such as described in the Document Records and Data Files Section and in connection with FIGS. 3A-3E, and in other sections of the present disclosure. According to some embodiments, the deposit and/or transaction information is extracted from one or more of the documents in the batch of documents in the same, or similar, manner as described in the Optical Character Recognition Section of the present disclosure and in U.S. Pat. No. 8,162,125, which is hereby incorporated by reference herein in its entirety, and in other sections of the both disclosures. The first data file 1742, that is associated with the first transaction, includes a deposit document record 1742a (e.g., a deposit slip), a check record 1742b, and two currency bill records 1742c,d. Although not illustrated, each of the records 1742a-d can further include deposit and/or transaction information. According to some embodiments, the records 1742a-d also include information obtained from the processed documents, such as, for example, determined denominations of currency bills, extracted serial numbers of currency bills, etc. According to some embodiments, the records 1542a-d include information obtained from the processed documents and/or deposit information and/or transactional information but do not include image data and/or images of the processed documents.

Referring generally to FIG. 17A, according to some embodiments, the document processing devices illustrated in FIG. 17A can be stand-alone units for each teller terminal, a single device associated with several or all of the teller terminals, or as an all-in-one combined device including teller terminal elements and document processing device components. According to some embodiments, teller systems and associated teller terminals can include a teller window, a vault system, an automatic teller machine (ATM) system, a home banking system, a depositor cash management system, a night teller, and/or a lock box.

B. Terminals Integrated with DPSs

Figure 17B:
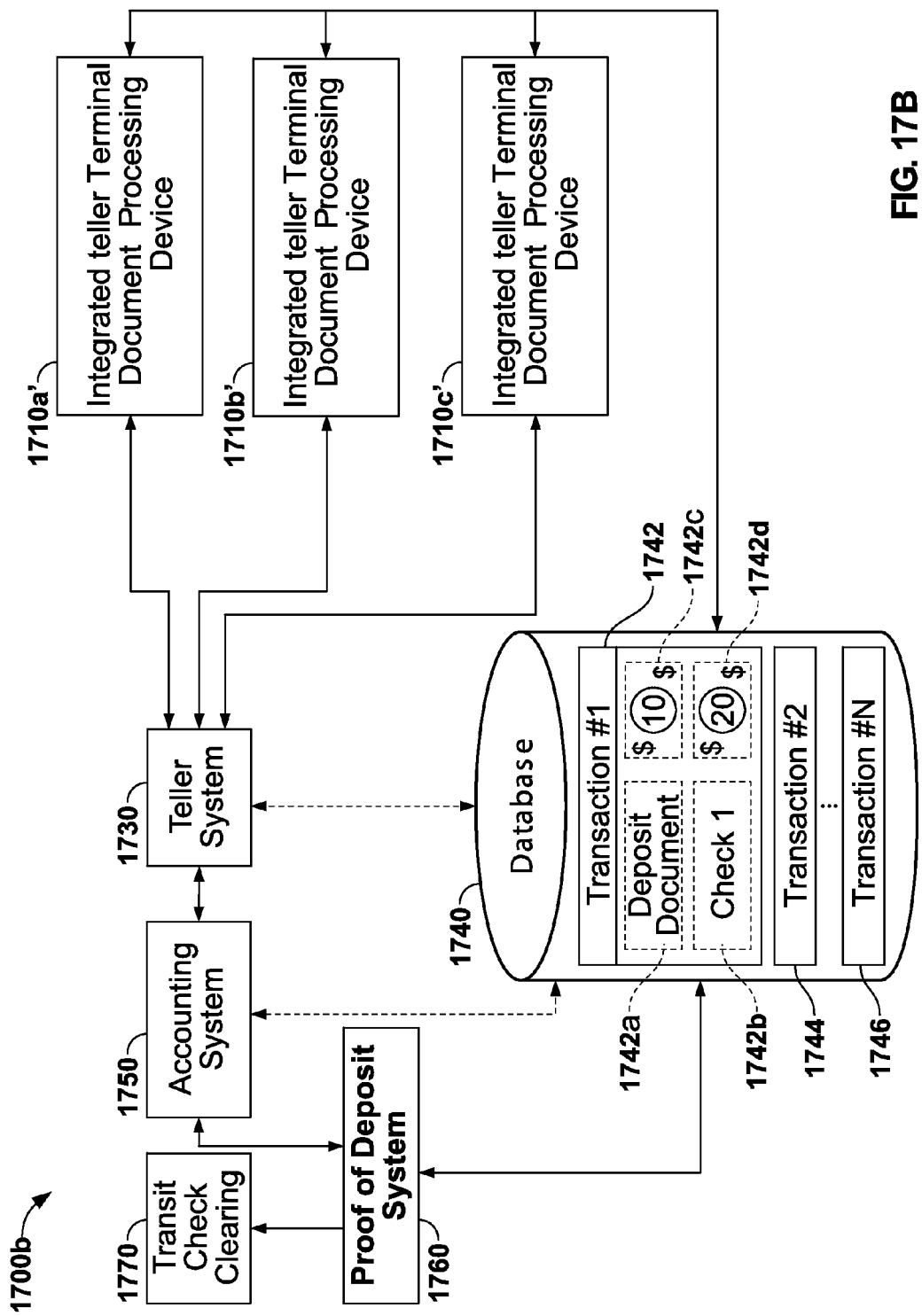

FIG. 17B illustrates a financial institution system 1700b similar to or the same as financial institution system 1700a except that the hardware and software associated with the teller terminals 1720a-1720c of FIG. 17A are integrated with and/or form part of the document processing devices 1710a'-1710c'. For example, the devices 1710a'-1710c' include more memory and/or computing capacity (such as by including different processors) such that the devices 1710a'-1710c' have enough memory and computing capacity to also enable teller software, bank accounting software, ISP, or imaging processing software to be downloaded onto devices 1710a'-1710c'. According to some embodiments, the devices 1710a'-1710c' include other software that might otherwise reside on a teller PC terminal 1720a-1720c at a bank teller window or station and/or teller system 1730. Therefore, according to some embodiments, a device 1710a'-1710c' would handle an entire deposit, image all documents, update accounting records, update teller software as required, and send images (e.g., images of checks) through the ISP software, so as, for example, to perform a CAR/LAR function. According to some such embodiments, such as where the devices 1710a'-1710c' is a table-top device such as devices 11b-11f, such devices 1710a'-1710c' would provide a simple integrated compact, very flexible, and reliable hardware and software system device.

Software, other than that developed by manufacturers of the integrated teller terminal document processing devices (e.g., devices 1710a'-1710c') could be downloaded on to the device(s) including teller software, bank accounting system software, etc. The device(s) would have a flat screen display such as an iPad®, but would also be wireless and cell phone compatible. Accessories such as a tactile keyboard could also be added to the device. The tactile keyboard, printer, and other accessories could be hardwired to the device or alternately via a wireless interface.

Additionally, according to some embodiments, the communication connections illustrated in FIGS. 17A-17B may be local area networks (LAN), metropolitan area networks (MAN), or wide area network (WAN) or other networks including wired and/or wireless networks such as those known in the art.

In certain embodiments, the document processing devices and systems illustrated in FIGS. 17A-17B are part of a vault system. The vault system can include hardware and software which processes the amount and type of currency and/or documents entering or leaving a bank vault. As illustrated in FIGS. 17A-17B, the document processing devices can also be a part of a teller system which is used to process documents, coin, and currency at a teller window(s) and maintains a record of all types of documents, currency, and coin transactions at the teller window. It is understood that additional or fewer document processing devices and/or teller terminals may be present in any of the systems 1700a, 1700b.

According to some embodiments, the teller systems can be bank branch systems in a bank branch, or a cash vault system in a bank vault. The cash vault system can include a cash management feature that tracks each denomination of currency in the vault, which allows the vault to track how much total currency is present in the vault by denomination. Such a cash management system can be used by the vault to determine a quantity of each denomination of currency bills that can be deposited with, for example, the Federal Reserve Bank, while maintaining enough cash in the vault for servicing the immediate needs of the vault's customers. According to some embodiments, the cash management feature can be used to track currency at an ATM, sometimes called a virtual teller, at a bank vault, at a bank branch, at the Federal Reserve, etc. According to some embodiments, a virtual teller is an ATM that includes imaging capabilities.

1. Description of Deposit Transaction

Referring back to FIGS. 17A and 17B, according to some embodiments, a bank customer makes a deposit of documents into a bank account maintained or held at the financial institution associated with system 1700a, 1700b. According to some embodiments, the accounting system 1750 maintains detailed physical and/or electronic records of all customer accounts at the financial institution, including, for example, account balances, customer identification information, etc. Additionally, according to some embodiments, records in the accounting system 1750 can be automatically and/or manually updated following clearance of related transactions through the proof of deposit system 1760.

According to some embodiments, a deposit transaction is conducted between a customer and a bank. For example, the customer deposits a check, a $10 bill and a $20 bill. The customer may also give a teller a deposit document, such as a deposit slip, or the teller may create one or more deposit documents for the customer. According to some embodiments, a deposit slip can include information such as a customer account number, a total declared deposit amount, a total number of documents being deposited, a check deposit amount, a number of checks being deposited, a currency bill deposit amount, a number of each denomination of currency bill being deposited, a breakdown of each check and its amount, a cashout amount, or any combination thereof. Thus, a batch of documents is formed that is associated with the deposit transaction and includes a deposit document, a check, a $10 bill, and a $20 bill.

According to some embodiments, the batch of documents is processed by document processing device 1710a, 1710a' and a record for each of the documents 1742a,b,c,d in the batch of documents that is associated with the transaction between the bank and the customer is generated. According to some such embodiments, each one of the records includes image data that is reproducible as at least a portion of a visually readable image of one of the documents 1742a,b,c,d. According to some embodiments, the records are transmitted and stored in the database 1740 as data file 1742 (transaction #1). It is contemplated that according to some embodiments, the data file 1742 includes other deposit and/or transaction information, such as, for example, a date/time of the transaction, the customer's account number, teller information (e.g., a teller identifier of the teller processing the batch of documents with the device 1710a, 1710a'), a transaction identifier, etc.

According to some embodiments, customer account numbers of customers transacting financial business (e.g., withdrawing money, depositing currency bills and/or checks) with the financial institution are needed such that the financial institution can track and/or maintain a running record of each customer's account balance in, for example, the accounting system 1750. Customer account numbers can be entered into the systems 1700a, 1700b, in a variety of manners and at a variety of locations using various devices and/or systems contained in the respective systems 1700a, 1700b.

For example, according to some embodiments, a teller operating one of the teller terminals 1720a,b,c can enter a customer's account number via an input device (e.g., keyboard, touch screen) at the teller terminal 1720a,b,c. According to some embodiments, for example, in response to a teller entering a customer account number at teller terminal 1720a, the customer account number is automatically transmitted to document processing device 1710a, 1710a'. According to some such embodiments, in response to receiving the customer account number, the device 1710*a*, 1710*a*' is configured to automatically display a prompt to the teller indicating that the device 1710*a*, 1710*a*' is initiated and ready to process documents associated with the inputted customer account number. That is, the device indicated that the teller can insert a batch of documents to be deposited and/or withdrawn from the customer's account.

In response to receiving the batch of documents, the device 1710*a*, 1710*a*' generates image data and/or other information as described herein in the Document Processing Device Operations in a Financial Institution System Section of U.S. Pat. No. 8,162,125, which is hereby incorporated by reference herein in its entirety, and in other sections of the present disclosure. According to some embodiments, in response to document processing being completed, the customer account number, generated image data, extracted data, and/or other information is transmitted to the database as a data file 1742*a* containing records 1742*a-d* for storage therein.

According to some embodiments, a teller operating one of the devices 1710*a,b,c*, 1710*a*',b',c' inserts a batch of documents into the device and the device, for example, the device 1710*a* automatically extracts account information (e.g., customer account number) from an image of a deposit slip, (and in system 1700*a* automatically transmits the account information to the teller terminal, e.g., 1720*a*), and populates a customer-account-number field associated with the teller terminal 1720*a* (or integrated document processing device/teller terminal 1710*a*') with the account information. According to some such embodiments, an account number on a deposit slip is MICR encoded, barcoded, or otherwise machine readable encoded and the device 1710*a* comprises an appropriate sensor(s) to read the account number on the deposit slip such as a MICR reader, a barcode reader etc. According to some such embodiments, the appropriate sensor(s) are positioned adjacent to a document transport path of device 1710*a*, 1710*a*' and the device reads the account number from the deposit slip as the deposit slip is being transported through the device. According to some embodiments, the device 1710*a*, 1710*a*' is configured to read the account number from the deposit slip using one or more of the OCR algorithms and/or techniques, such as those described in the Optical Character Recognition Section, and in other sections of the present disclosure and in U.S. Pat. No. 8,162,125, which is hereby incorporated by reference herein in its entirety.

According to some embodiments, a teller operating one of the devices 1710*a,b,c*; 1710*a*',b',c' enters a customer's account number at one of the devices 1710*a,b,c*; 1710*a*',b',c' via an input device, such as, for example, a keyboard, a touch screen, a barcode reader/scanner, a magnetic scanner, and/or a MICR reader. According to some embodiments, in response to the customer account number being entered into the document processing device, the account number is automatically associated with documents inputted into an input receptacle of the device for processing. That is, all records generated after receiving the customer account number are tagged with the customer account number until another customer account number is entered. According to some embodiments, such as in system 1700*a* the entered customer account number is automatically transmitted to a teller terminal, such as teller terminal 1720*a*, and populated into a customer-account-number field on the teller terminal 1720*a*. According to some such embodiments, deposit information, such as a total deposit amount and/or withdrawal amount, is transmitted along with the customer account number to the teller terminal to be forwarded onto the accounting system 1750 to update the customer's account to reflect the transaction either from the teller terminal 1720*a,b,c*, or the integrated teller terminal, document processing device 1710*a*',b',c'.

According to some embodiments, a customer account number and/or customer identifier is received through one or more devices communicatively connected with a teller terminal and/or a document processing device. For example, a biometric reader, a card reader (e.g., ATM card reader), and/or a personal identification number (PIN) input device (e.g., keypad) can be communicatively connected to the teller terminal and/or the device such that in response to a customer, for example, entering a PIN into the PIN input device, the customer's account number is transmitted and/or otherwise communicated to the teller terminal and/or the document processing device. For another example, in response to a customer, for example, placing his/her finger on the biometric reader, the customer's account number is transmitted and/or otherwise communicated to the teller terminal and or device. According to some embodiments, the customer account number can then be associated with one or more data files in the same, or similar, manner described above.

According to some embodiments, a feature of the systems 1700*a*, 1700*b* described herein includes an account number and/or a transaction identifier associated with a transaction that is only entered once by a teller, whether such entry occurs manually, such as, for example, by typing the account number, or automatically, such as, for example, by extracting the account number from a deposit slip or other document associated with the account number or transaction identifier inputted into the document processing device. According to some alternative embodiments, an account number may be entered more than once, for example, a teller may enter an account number via teller terminal 1720*a-c* as well as device 1710*a-c*.

According to some embodiments, a teller manually enters deposit information into the teller terminal. In other embodiments, the deposit information is extracted from image data associated with one or more deposit documents and automatically populated into respective fields on the teller terminal. For example, the deposit documents may be placed by the teller into the document processing device which is configured to image and extract deposit information from the documents such as, for example, a total declared check amount and/or a total cash-in amount in the same, or similar, manner as described in the Optical Character Recognition Section, and in other sections of the present disclosure and in U.S. Pat. No. 8,162,125, which is hereby incorporated by reference herein in its entirety. According to some embodiments, the teller system is configured to send a memo posting or a provisional credit to the accounting system based on the inputted or automatically extracted deposit information.

According to some embodiments, the database 1740 is accessed by an optical character recognition system (OCR system), such as, for example, a CAR/LAR system, that is configured to OCR courtesy amounts (CAR) and/or a legal amounts (LAR) from each check record in the database 1740. It is contemplated that the OCR system is part of a proof of deposit system (POD) that automatically attempts to balance/reconcile data files/transactions stored in the database 1740. According to some embodiments, extracted CAR/LAR information is transmitted to the database 1740 and stored in the appropriate document record.

According to some embodiments, a teller enters an account number via teller terminal 1720*a-c* (or device 1710*a*'-c') and the device 1710*a-c*/1710*a*'-c' determines the account number from a document (e.g., deposit slip) it processes such as by reading machine readable code via an appropriate sensor (e.g., MICR reader, barcode reader) and/or reading extracting the account number from the image of the document such as via OCR. According to such embodiments, the account number determined by the device 1710*a-c*/1710*a'*-c' is included with the data obtained by processing the remainder of the processed documents (e.g., bills and checks). For example, the record for each document processed can be tagged with the account number determined by the device 1710*a-c*/ 1710*a'*-c' (e.g., each record and/or the transaction data file can have an account number field that is populated with the determined account number). According to some embodiments, the teller terminal 1720*a-c* and/or the device 1710*a-c*/1710*a'*-c' compare the account number entered by the teller and the account number determined by the device to verify that the account numbers are the same and generate an error signal when they are not.

According to some embodiments, in processing a deposit transaction, a teller enters the appropriate customer account number into a teller terminal 1720*a-c* or device 1710*a'*-c'. The teller then processes the documents associated with the deposit transaction using one of the document processing devices 1710*a-c*/1710*a'*-c' and the device 1710*a-c*/1710*a'*-c' images the documents, extracts information from the images such as currency bill serial numbers, and generates corresponding records. The device 1710*a-c*/1710*a'*-c' also generates and/or associates a unique ID number, such as a transaction identifier, for the deposit transaction and sends the unique ID number to the teller terminal 1720*a-c*/teller system 1730. The teller system 1730 and/or accounting system 1750 then associates the unique ID number with the customer account number entered into the teller terminal 1720*a-c*/device 1710*a'*-c' and stores this association in a memory in or communicatively coupled to the teller system 1730 and/or accounting system 1750. The device 1710*a-c*/1710*a'*-c' associates the generated images and records with the unique ID number and stores them where they can be accessed by the teller system 1730 and/or accounting system 1750 such as in database 1740. In such an embodiment, the customer account number need not be entered into the device 1710*a-c*/1710*a'*-c' and/or shared with the device 1710*a-c*/1710*a'*-c' and/or the computer systems (e.g., databases) which can be accessed by or through the devices 1710*a-c*/1710*a'*-c'. Nonetheless, a deposited document can still be traced back to a particular account at a later time.

For example, if it is later discovered that a bill that is in or was in the bank's possession is a counterfeit bill, a search based on the serial number of such a counterfeit bill could be performed as described above. If the search is performed via the teller system 1730 or accounting system 1750, such system could access the appropriate database such as database 1740, find the record having the matching serial number, retrieve the unique ID number associated with that record, and then determine the appropriate customer account number by accessing the memory which stores the associations between unique ID numbers and customer account numbers. If the search is performed via one of the devices 1710*a-c*/ 1710*a'*-c', such a device 1710*a-c*/1710*a'*-c' could access the appropriate database such as database 1740, find the record having the matching serial number, retrieve the unique ID number associated with that record, and then provide or report the unique ID number such as by displaying the unique ID number via interface 170/170' and/or providing the unique ID number electronically to the system (e.g., teller terminal 1720*a-c*) initiating the search. A search for the corresponding customer account number could then be performed via the teller system 1730 or accounting system 1750 by inputting the unique ID number into such a system, accessing the memory which stores the associations between unique ID numbers and customer account numbers, and retrieving the corresponding customer account number. The corresponding customer account could then be debited for the amount of the counterfeit bill and/or a charge-back signal or instruction could be generated.

According to some embodiments, a teller inserts a batch of documents associated with a deposit transaction into the input receptacle of one of the document processing devices 1710*a-c*/1710*a'*-c'. The batch of documents comprises a deposit slip, a plurality of checks, and a plurality of currency bills. The device 1710*a-c*/1710*a'*-c' processes the documents and generates an electronic cash-in ticket reflecting information relating to the plurality of currency bills deposited such as a total cash-in amount and/or a breakdown by denomination of the number of each denomination of bill deposited. According to some embodiments, the electronic cash-in ticket is then printed by a printer communicatively coupled to the device 1710*a-c*/1710*a'*-c'. According to some embodiments, the printed cash-in ticket is then stored in the teller's drawer along with the deposited currency bills. According to some embodiments, the electronic cash-in ticket is not printed. According to some embodiments, the electronic cash-in ticket is associated with the electronic record(s) of the deposit transaction such as being included as a cash-in record in the data file associated with the deposit transaction.

C. Integrated Teller Terminals in a Financial Institution System

FIG. 18 illustrates a financial institution system 1801 according to some embodiments. As discussed above in connection with FIG. 17B, the system comprises a plurality of integrated teller terminal-document processing devices 1810*a'*,b',c' communicatively coupled to a teller alert station 1830 and communicatively coupled to a network 1851 such as the Internet. The network 1851 is also communicatively coupled to a remote transaction processing server or central server 1853 and a document processing device 11-18. According to some embodiments, document records, deposit transaction data files, and/or other deposit information is stored on the remote central server 1853 and may be retrieved by other devices (such as integrated teller terminal-document processing devices 1810*a'*,b',c') communicatively coupled thereto. According to some embodiments, the integrated teller terminal-document processing devices 1810*a'*,b',c' and the document processing device 11-18 are document imaging devices 44.

According to some embodiments, the integrated teller terminal-document processing devices 1810*a'*,b',c' look similar to an ATM or a merchant teller machine such as merchant teller MT-14 illustrated in FIG. 14.

According to some embodiments, one or more integrated teller terminal-document processing devices 1810*a'*,b',c' in located in a vault (e.g., BV shown in FIG. 7, vault 1301 shown in FIG. 13A, vault 1401D shown in FIG. 14, vault 1501 shown on FIG. 15) and a single operator (e.g., 1590*b*) operates multiple devices. According to some such embodiments, the integrated teller terminal-document processing devices 1810*a'*,b',c' each have one or more input container docks 54 configured to receive one or more containers of deposit documents wherein each container contains a plurality of deposit transaction separated by physical deposits slips (and/or header or trailer cards). Document records associated with exception documents are queued for review in an exception queue as discussed above. According to some embodiments, the exception queue is maintained on a central server 1853 for correction and reconciliation. According to some embodiments, the central server 1853 is located remotely from the integrated teller terminal-document processing devices 1810*a'*,b',c'. According to some embodiments, integrated teller terminal-document processing devices 1810*a*',b',c' may be communicatively coupled to a remote central server 1853 via the Internet 1851.

According to some embodiments, each integrated teller terminal-document processing devices 1810*a*',b',c' is configured to transport, image, and denominate currency bills and extract data (e.g. serial numbers) from images of currency bills all at a rate of at least 1600 currency bills per minute. According to some embodiments, each integrated teller terminal-document processing devices 1810*a*',b',c' is configured to transport and image checks, and extract data (e.g. MICR data, CAR/LAR data) from images of checks all at a rate of at least 600 checks per minute. According to some embodiments, each integrated teller terminal-document processing devices 1810*a*',b',c' has an input receptacle configured to accommodate at least 200 documents or an input dock 54 configured to accommodate automated document containers having a capacity of at least 200 documents. According to some embodiments, each integrated teller terminal-document processing devices 1810*a*',b',c' comprises a communication device supporting Bluetooth communication with other devices such as displays, printers, Self Service Coin Sorters (e.g., SSC-18; SSC-14 shown in FIG. 14, etc.) and wireless devices (WDs) 1899*a* such as, e.g., cell phones, laptops, PDAs. According to some embodiments, a communication device supporting Bluetooth communication is a minimum class 2 device with a 10m range.

According to some embodiments, each integrated teller terminal-document processing devices 1810*a*',b',c' are coupled to or comprise a Windows based computing device such as a PC that can host various off-the-shelf commercial applications such as, e.g., vault software, teller software, accounting software.

According to some embodiments, the integrated teller terminal-document processing devices 1810*a*',b',c' store deposited documents in a safe located in the devices. For example, according to some embodiments, the integrated teller terminal-document processing devices 1810*a*',b',c' are configured as device 11-6 shown in FIGS. 6A-6C wherein accepted sheet documents are stored in outer vault of safe 625 and/or inner vault 631. When the integrated teller terminal-document processing devices 1810*a*',b',c' are operating in a deposit mode, the outer vault 625 remains locked and the documents stored therein a secure within the walls of the outer vault 625. According to some embodiments, the integrated teller terminal-document processing devices 1810*a*',b',c' made by operated in an attendant or service mode wherein a door to the outer vault 625 may be unlocked and opened such that an attendant may gain access to the inside of the outer vault 625 and/or the documents stored therein.

According to some embodiments, one or more of the integrated teller terminal-document processing devices 1810*a*', b',c' are employed in an unattended mode (e.g., ATM#1 [FIG. 14]) and/or in a semi-attended mode (e.g., MT-14 [FIG. 14]). In the unattended mode or environment, an integrated teller terminal-document processing devices 1810*a*',b',c', a bank customer may utilize the device in a similar manner that a customer would utilize an ATM and insert a batch of documents associated with a deposit transaction into the device and run the device without the assistance of a bank employee or teller. For example, after inserting a deposit transaction batch into the device, the device processes the documents and displays a grand total value, a currency bill total value, a check total value, and/or breakdown value information on a display associated with the device and the customer may indicate acceptance of the determined values via a device interface (e.g., touchscreen). Once accepted, the device issues a receipt to the customer and stores the deposited documents inside the device.

According to some embodiments, the integrated teller terminal-document processing devices 1810*a*',b',c' may be located in a secured area (e.g., room 1401C of bank branch 1401 shown in FIG. 14). According to some embodiments, a bank customer brings in his or her deposit to the bank and enters the secured area (1401C). Once inside the secure area (1401C), the customer may use any of a plurality of integrated teller terminal-document processing devices 1810*a*',b',c' and/or document processing devices 11-6, MT-14. According to some embodiments, the plurality of integrated teller terminal-document processing devices 1810*a*',b',c' and/or document processing devices 11-6, MT-14 are managed by a single teller (1490-B1). A selected device 11-6, MT-14 processes the document transaction documents and generates corresponding document records for each document. According to some embodiments, where deposit transaction information has been provided to a banking system in advance of the physical deposit of the documents (e.g., as described above in connection with FIGS. 9A and 9B), the newly generated deposit transaction information is reconciled against the previously submitted deposit transaction information. According to some embodiments, once reconciliation is achieved, the generated deposit transaction information (e.g., document records and/or deposit transaction data file) is sent to the central server 1853. According to some embodiments, the newly generated deposit transaction information is sent from the selected device 11-6, MT-14 to the central server 1853 and the central server reconciles the deposit against deposit transaction information provided to the bank in advance of the physical deposit. Once the deposit has been reconciled and/or the customer accepts the deposit, the device 11-6, MT-14 locks the deposited documents inside the device 11-6, MT-14. The deposited documents may be later retrieved by an attendant (e.g., 1490-B1) who is able to cause the device to operate in an attendant mode and the documents may be removed from the device for transport to a bank vault (e.g., 1401D shown in FIG. 14 or BV shown in FIG. 7).

According to some embodiments, where deposit transaction information has been provided to a banking system in advance of the physical deposit of the documents (e.g., as described above in connection with FIGS. 9A and 9B), a bank customer may receive a provisional credit for the deposit transaction. During the advance transaction, one more devices (e.g., 11-11, 1152, 1199) at the customer location (e.g., 1101) communicate with the central server 1853 which returns a confirmation number or transaction ID to one or more of the customer devices (e.g., 11-11, 1152, 1199). In the meantime, the central server 1853 stores the deposit transaction information (e.g., documents records and/or deposit transaction data file). According to some embodiments, the transaction ID is stored in the customer wireless device WD 1199 (e.g., PDA such as a cell phone, smartphone, tablet). According to some embodiments, when the customer physical brings the deposit documents to the bank, the customer WD 1199 communicates with one or more of the sensors 1480-1, 1480-2 and transmits the transaction ID or other data to the sensors 1480-1, 1480-2 and thereby authenticates the identity of the customer. Once the customer's ID (the wireless device's ID) has been authenticated, a control or security system (not shown) for the bank branch coupled to locking devices for one or more doors D1, D2 unlocks and/or opens appropriate doors D1, D2 and permits the customer to enter the bank branch 1401 and/or secured room 1401C.

According to some embodiments, the device 1810a',b',c', 11-6, MT-14, ATM#1 is configured to alternate between a deposit mode and an attendant mode using effortless authentication methods (e.g., finger print, RFID, ibutton, etc.). Machine processing status or deposit reconciliation status are relayed to a centralized computer and/or display 1830 (e.g., computer 1452, WD 1499-B1 shown in FIG. 14) either via wireless or wired connection so that the attendant 1490-B1 may assist customers as needed. According to some embodiments, the attendant 1490-B1 may assist or provide guidance to a customer 1490-C3, 1490-C4 regarding how to handle various operating errors such as feed errors. According to some embodiments, when the device 1810a',b',c', 11-6, MT-14 encounters one or more exception documents (e.g., denomination no call; serial number no call; MICR/CAR/LAR error), the attendant 1490-B1 (e.g., operating the device in an attendant mode) addresses the exception document(s) in the presence of the customer 1490-C3, 1490-C4 such as by entering appropriate correction information into the device (e.g., operating the device in an attendant mode) or using the attendant WD 1499-B1.

According to some embodiments, one or more of the devices 1810a',b',c', MT-14 are communicatively coupled (e.g., via wireless and/or wired connection) to one or more coin sorters SSC-14, SSC-18 which process a coin portion of a customer's deposit transaction and share the coin count data with the devices 1810a',b',c', MT-14 and/or central server 1853.

According to some of the above embodiments, customer friendly high-productivity deposit processing operations in a bank branch are provided with minimal teller assistance and/or intervention. According to some of the above embodiments, tellers (e.g., 1490-B1) can assist customers (e.g., 1490-C2-1490-C4) on an as-needed basis while otherwise attending to other tasks. According to some of the above embodiments, a secure deposit processing architecture is provided using state of the art wireless technologies for authentication, status reporting, etc. According to some of the above embodiments, customers get provisional credit for currency and instant credit for checks (e.g., if an ICL is created and submitted at the remote site) included in a remote deposit transaction as shown in FIG. 9A. According to some of the above embodiments, entry or correction of CAR/LAR data for checks in a deposit transaction can be eliminated at the bank branch 1401 and/or at a central location (e.g., armored carrier location) if customers perform a pre-deposit at their site (e.g., 1101). According to some of the above embodiments, direct connectivity from a wireless device WD (e.g., mobile device) to an integrated teller terminal-document processing device 1810a', 1810b', 1810c' will increase the complexity of connectivity (modems, modem banks, configuration etc.).

According to some embodiments, applications running on devices 1810a', 1810b', 1810c' can talk to a server 1853 (using an http address) using the internet 1851 avoiding direct connectivity with either dial up or texting.

XXII. Automated Document Containers—Systems, Devices, And Methods Employing Automated Document Containers

A. Definitions

As described above, "deposit transaction documents" consist of currency bills, checks, deposit slips, deposit transaction separator cards such as header cards or trailer cards.

As used herein, "ordered document containers" are containers configured to neatly hold one or more batches of one or more types of documents in an ordered fashion and to permit documents contained therein to be conveniently moved from location to location. As used herein, "deposit transaction containers" are ordered document containers configured to neatly hold one or more batches of one or more types of deposit transaction documents. As used herein, "currency bill containers" are ordered document containers configured to neatly hold one or more batches of currency bills. As used herein, "check containers" are ordered document containers configured to neatly hold one or more batches of checks. Examples of document containers, deposit transaction containers, currency bills containers, and check containers include, for example, cassettes (CS), mini-safes (SF), and trays (T).

"Automated document containers" are document containers configured to be coupled to a document processing device 11 and permit one or more types of documents to be automatically withdrawn or dispensed from (i.e., dispensing containers) or inserted or received into (i.e., dispensing containers) or both (re-cycle type containers). "Automated deposit transaction containers" are "deposit transaction containers" configured to be coupled to a document processing device 11 and permit one or more types of deposit transaction documents to be automatically withdrawn or dispensed from or inserted or received into or both (re-cycle type containers). "Automated currency bill containers" are "currency bill containers" configured to be coupled to a document processing device 11 and permit currency bills to be automatically withdrawn or dispensed from or inserted or received into or both (re-cycle type containers). "Automated check containers" are "check containers" configured to be coupled to a document processing device 11 and permit checks to be automatically withdrawn or dispensed from or inserted or received into or both (re-cycle type containers). Examples of automated document containers, automated deposit transaction containers, automated currency bills containers, and automated check containers include, for example, cassettes (CS) and mini-safes (SF) configured to be coupled to document processing devices 11 and permit one or more types of documents to be automatically withdrawn or dispensed from or inserted or received into or both (re-cycle type containers) such as via an input port or dock 54 or output port or dock 55. See, e.g., FIGS. 1G, 5A-5C, 6B, 13A, 14, 15, 16A-16D.

"Secure containers" are document container that may be locked. Once a secure container is locked, the currency bills and other documents within the secure container would be secure in a type of small, mini, or micro vault whereby access to and/or the ability to remove and/or insert documents into the container is prevented or inhibited (e.g., the container may need to be destroyed and/or damaged to overcome the container lock). According to some embodiments, secure containers may be locked on command such as by an operator, handler, and/or document processing device 11 (e.g., secure containers and devices 11 may be configured to cause secure containers to lock upon the removal of a secure container from an output region or output dock 55 of a device 11). According to some embodiments, once locked only a supervisor and/or other authorized personnel or device 11 with a special password or key would be able to open a secure container. According to some embodiments, such as smart secure containers, a secure container has the ability to note that the container has been reopened after an initial locking and/or record or transmit a log of various details about each time a secure container is locked, unlocked, opened, closed, receives documents, dispenses documents, devices 11 to which it is coupled, operators, handlers, passwords entered, times of such events, etc. (such as by recording such information in an internal memory in a secure smart container and/or by transmitting such information to another device (e.g., PDA, tablet, network, other computer device) such as, for example, via a wireless communication (e.g., Bluetooth, Wi-Fi, etc.).

B. Automating Deposit Verification Process Using Automated Containers

According to some embodiments, automated containers (such as trays, cassettes, or mini-safes) are sequentially placed into or coupled to a input receptacle or input area of a document processing device 11, 33, 44 such as a semi-attended device (see, e.g., devices 11-15a-11-15b of FIGS. 15 and 11-16a-11-16d of FIG. 16) for currency and/or check verification/authentication. Such devices may be located at a central cash vault (e.g., A1/BV of FIG. 7, 1301 of FIG. 13A, 1501 of FIG. 15) and/or other processing locations (e.g., bank branch B1-Bn of FIG. 7, 1401 of FIG. 14, store R1-Rn of FIG. 7, 1101 of FIG. 11). According to some embodiments, automation is implemented further upstream by incorporating devices 11/22/33/44 that automatically store documents into automated containers or by manually storing documents in automated containers prior to the containers reaching a vault, e.g., at a store or other customer/depositor location, a bank branch, etc.). According to some embodiments, such automation further enhances the use of the semi-attended machines at central cash vaults or other locations.

For example, currently, bank customers such as supermarkets, other retailers, amusement parks, etc. create their deposits each day to be sent to a bank. The cash, checks, and other documents are typically placed in a cloth bag or a plastic bag B. This bag might be sealed. An armored carrier picks up the bag from the store and transports the bag to a central cash vault. Labor must be utilized in the cash vault to open the bags, place the currency bills into a tray for processing, scan or enter data such as account number, declared balance, etc. Then the currency bills are manually transferred from the tray T and put it into an input hopper of a document processing device such as a note counter 22 or currency bill denominating devices 33.

By using automated document containers such as automated currency bill, check, and/or deposit transaction document containers, currency bills and/or checks will arrive at a vault already organized and ready for processing in such automated document containers. The automated document containers can then immediately be moved to an attended, unattended or semi-attended device 11 for verification. No manual preparation of the currency bills and/or checks would be required at the vault or other location receiving the automated document containers.

C. Document Containers

1. Construction of Containers

According to some embodiments, document containers and automated document containers are configured to contain currency bills only (currency bill containers), checks only (check containers) or currency bills and checks (deposit transaction containers). According to some embodiments, the containers are small and lightweight. Containers such as cassettes and mini-safe may be constructed of, for example, a molded material such as plastic to reduce the cost of such cassettes. According to some embodiments, containers such as cassettes and mini-safe may be constructed of, for example, metal and/or have a metal exterior for added security and/or durability.

2. Capacity of Containers/Use of Plurality of Containers

As described above, the capacity of automated and/or ordered document containers may vary. For example, smaller retailers may need an automated and/or ordered document container that is only able to accept 100-400 documents. Larger retailers may require automated and/or ordered document containers that can handle 1,000-3,000 documents. With a very large deposit a plurality of automated and/or ordered document containers may be employed for a single deposit transaction from one store.

3. Reuse of Automated/Ordered Document Containers

According to some embodiments, the automated and/or ordered document containers are recyclable or re-usable. For example, a store could fill up an automated and/or ordered document container with the current day's deposit. An armored carrier would pick up this automated and/or ordered document container and transport it to a cash vault of a bank or armored carrier processing center. After automated and/or ordered document containers have been emptied, they can be re-circulated to any customer with the capability to utilize such automated and/or ordered document containers. Or, automated and/or ordered document containers could be inventoried to specific customers if required and returned to the corresponding designated customers and/or locations for re-use.

4. Smart Document Containers

As mentioned above, smart document containers comprise memory(ies) and/or processor(s). According to some embodiments, a smart container is configured to store information relating to the totals of currency bills, checks or other documents in the container in the container memory. According to some embodiments, a smart container is configured to store information relating to a customer's account number, the bank to which the customer is sending the documents, the customer's address, the bank's routing number, or other important information to track relative to customer's commercial account and other data in the container memory.

5. Example of Store to Vault Use of Smart Container

According to some embodiments, a smart automated container is configured to store in the container memory images provided from a document imaging device 44 which processed the documents placed or fed into the container. For example, after documents being prepared by a store (e.g., 1101) for deposit have been run through a document processing device 11 (e.g., 11 of FIG. 11) such as a document imaging device 44 and the currency bills and/or checks placed into a smart automated document container (such as, for example, a smart mini-safe SF), some or all of the following data could be stored in the memory of the smart document container: image data including some or all of the images of one or both sides of the documents and/or snippet images of the documents, extracted information such as, for example, serial numbers of the currency bills, CAR/LAR data, etc. According to some embodiments, such information remains in the memory of the document container until it is transported to a central cash vault for deposit processing. Once the smart automated document container is at the central cash vault, the smart document container is loaded and/or coupled to an attended, unattended, or semi-attended document processing device 11. According to some embodiments, when the smart container is coupled to the device 11, the data from the smart container is downloaded, transferred, or shared from the smart container memory to the document processing device 11. As a result, the device 11 in the vault, according to some embodiments, has a declared deposit for the amount of the currency and/or checks. If the device 11 is a document imaging device 44, the device 44 would also receive, according to some embodiments, a record of all of the images captured for each currency bill and/or check found in the smart container. The currency bills and other documents in the smart container can then be extracted from the smart container, according to some embodiments, verified against the declared balance(s)/amount(s), and/or if images data is transferred and the device 11 is a document imaging device 44, the received images and/or received extracted data can be compared against the images/extracted data generated by the device 44 in the vault processing the documents removed from the smart container. According to some embodiments, images generated by the device 44 in the vault processing the documents removed from the smart container (at reconciliation time) are compared to the images provided by the smart container memory if any variance is detected by the reconciliation device 44 (e.g., a calculated total does not match a declared total obtained from the smart container memory and/or a declared total received otherwise such as via a communication sent from a network such as a declared total sent during a remote deposit transaction as described in connection with FIGS. 9A-9B). According to some embodiments, any variance or deviation is tagged to a data file (e.g., data file 301) associated with a corresponding deposit transaction and/or tagged to a customer file or account and/or sent to a bank accounting system (e.g., system 960 of FIG. 9A). According to some embodiments, an adjustment can then be made to the customer's account (either automatically or after human review) and, in some embodiments, the images justifying the adjustment are provided to the corresponding customer associated with the deposit transaction. According to some embodiments, such images justifying the adjustment (e.g., images of checks with different amounts than entered on the customer's deposit slip, images of extra currency bills than listed on the customer's deposit slip, etc.) might be provided to the customer by, for example, (i) a website accessible to the customer using a log in and password, (ii) an e-mail sent to the customer from the bank with the images of the checks or other documents, etc.

D. Use of Automated Document Containers with Wide-Edge Leading Devices

According to some embodiments, wide-edge leading document processing devices 11 (e.g., 101, 11-13b, ATM#1, MT-14, 11-15a-11-15b, 11-15n+1, 11-16a-11-16d) are configured to permit automated documents containers to be coupled thereto thereby permitting the bulk acceptance of documents (such as checks and/or currency bills) and the transporting and processing of the documents therein in a wide-edge leading manner. According to some such embodiments, the device 11 has a single output location such as a single output receptacle (e.g., devices 11a-11b), exactly two output locations such as output receptacles (e.g., device 11ca, 11cb), or three or more output locations such as output receptacles (e.g., devices 11d-11g).

According to some such embodiments, the device 11 is a document imaging device 44 having a single output location such as a single output receptacle (e.g., devices 11b), exactly two output locations such as output receptacles (e.g., device 11ea, 11cb), or three or more output locations such as output receptacles (e.g., devices 11d-11g), wherein the device 44 is configured to permit automated check containers to be coupled thereto thereby permitting the bulk acceptance of checks by the device 44 and the transporting and processing of the checks by the device 44 in a wide-edge leading manner. The device 44 captures the image of one or both sides of each check received from the automated check container such that the images may be employed in a Check 21 clearance process. According to some such embodiments, the device 44 is configured to extract data from the captured images of the checks (e.g., MICR line data, check amounts obtained from CAR and/or LAR processing. According to some such embodiments, the device 44 processes bulk received checks at a rate of at least 100 checks per minute, at least 400 checks per minute, or at least 600 checks, or other check processing rates as discussed in the Document Processing Speeds section of U.S. Pat. No. 8,162,125, which is hereby incorporated by reference herein in its entirety.

According to some such embodiments, the device 11 is an ATM document imaging device 44 configured to accept bulk check deposits (a stack of a plurality of checks and/or an automated document container containing a plurality of checks) and configured to transport and process the checks in a wide-edge leading manner. According to some such embodiments, the ATM is configured to accept more than 50 checks at a time, e.g., the ATM will be configured to receive at least 100 checks at a time or at least 200 checks at a time. According to some such embodiments, the ATM is configured to be coupled to a document container having the capacity to store at least 1000 checks. According to some embodiments, such ATMs are configured to accept, transport, denominate, and otherwise process currency bills in a wide-edge leading manner using a shared transport path for both checks and currency bills. According to some embodiments, the ATM is configured to accept and process currency bills, checks, and/or both such as from an automated document container containing currency bills, checks, and/or both.

According to some such embodiments, the ATM comprises and is configured to deliver processed documents to one or more automated containers such as cassettes CS or mini-safes. According to some embodiments, the ATM is configured to deliver checks and currency bills to separate automated output containers (e.g., one output container for checks and one output container for currency bills). According to some embodiments, the ATM comprises two or more currency bills automated output containers and the ATM is configured to deliver currency bills of one denomination to one of the containers (i.e., the container receives only a single denomination of bills) and bills of all other denominations to one or more additional containers. Alternatively, the ATM may comprises a plurality of individual denomination containers and the ATM is configured bills to the bill containers such that each container only receives a single denomination of bills, e.g., a first container from receiving $20 bills, a second container for receiving $10 bills, etc. According to some embodiments, the ATM comprises one or more single denomination containers and one or more multi-denomination containers and the ATM is configured to deliver bills having a same denomination to each single denomination container (e.g., $1 bills only to a $1 bill container, $20 bills only to a $20 bill container) while delivering bills of a plurality of denominations to a multi-denomination container (e.g., one container receiving $2 bills, $5 bills, and $10 bills. According to some embodiments, the ATM may be configured to deliver checks to a separate output container from the container(s) receiving bills. According to some embodiments, the wide-edge leading ATM is configured to deliver both checks and bills to one or more of the same automated container using a shared transport path, that is, each of the one or more containers receives both bills and checks. According to some embodiments, the use of containers to receive both checks and bills may minimize the amount of space required within the ATM to house containers configured to receive processed documents and maximize the amount of time that the ATM can continue accepting mixed deposits of bills (e.g., deposits including one or more denominations of currency bills) and checks before an ATM provider must service the device and unload containers which are full—thus, according to some embodiments, enhancing the efficiency of the operation of the device. According to some embodiments, the automated output containers above are recycle-type containers.

According to some embodiments, a wide-edge lead ATM comprises a wide-edge lead transport mechanism having a transport path which is simplified and shorter (as compared to narrow-edge leading transports). According to some embodiments, the use a wide-edge lead transport mechanism enables the ATM to be smaller as the transport path can be shorter. According to some embodiments, the use a wide-edge lead transport mechanism enables the ATM to transport and process checks at a higher speed as described elsewhere in the present disclosure and in U.S. Pat. No. 8,162,125, which is hereby incorporated by reference herein in its entirety.

E. Smart Containers can be Used by Retailers/Other Bank Customers on a Stand-Alone Basis According to some embodiments, a user such as a depositor such as, e.g., a small retailer, may use smart containers without employing a document processing device 11 (e.g., a currency denominating device 33 or a document imaging device 44. For example, such a depositor and/or merchant can place all of the currency, checks and other documents for a deposit transaction in a secure smart container. The operator could then lock the smart container, such as, by entering a password via a smart container interface (e.g., interface 420—see FIGS. 4A, 4C), pressing or selecting a "lock" button or selection element, etc. The operator could also manually enter any desired or required data such as, for example, the total(s) for the deposit transaction such as via a smart container interface, and/or transmit any desired or required data by electronic means such as discussed herein.

F. Smart Containers can be Used by Retailers/Other Bank Customers with a Currency Denominating Device 33

According to some embodiments, a user such as a depositor may use smart containers in conjunction with a document processing device 11 that is a currency denominating device 33. For example, currency bills to be inserted in a smart container (such as bills to be deposited in a deposit transaction) can be processed by a currency denominating device 33 and the currency denominating device 33 communicatively coupled to the smart container may be configured to send data determined about the processed bills to the memory of the smart container such as, for example, grand totals, totals by denomination, etc. According to some embodiments, such data may be communicated to the smart container memory via a wireless technique and/or by use of a portable memory device such as a flash memory stick and/or by direct wired connection between the currency denominating device 33 and the smart container. Any of these methods, plus other electronic communication techniques could be utilized to transmit data between the currency denominating device and the smart container memory. Note, totals stored in the memory of the smart container at the remote deposit location (e.g., R1-Rn, B1-Bn, 1101) may be referred to as declared totals to be verified when the documents in the smart container are processed by a second document processing device (acting as a verification device) at another location, e.g., a cash vault (A1, BV, 1301, 1501). In addition to loading the data determined about the processed bills in the memory of the smart container, the data and/or information associated therewith can be transmitted to a PDA and/or computer communicatively linked with smart container such that the data determined about the processed bills can be sent forward to the bank (e.g., in advance of the smart container's arrival at the bank).

Once arriving at a cash vault, information in the memory in the smart container may be transmitted to or communicated with a reconciliation device 11 such as an attended or semi-attended device 11 in, for example, a central cash vault (and/or to a vault cash settlement system and/or a bank accounting system, e.g., system 960, 1750). Such information may include a customer name, customer bank account number, grand totals, totals by denomination. As above, this transmission could be made wirelessly, through a hard wired connection, using a portable memory device such as a flash memory stick, or via some other technique. According to some embodiments, the reconciliation device 11 would then extract the currency bills from the smart container, denominate the currency bills, generate one or more totals (e.g., a grand total, totals and/or counts by denomination) and compare the generated total(s) against the declared totals provided by the memory in the smart container.

G. Smart Containers can be Used by Retailers/Other Bank Customers with a Document Imaging Device 44

According to some embodiments, a user such as a depositor may use smart containers in conjunction with a document processing device 11 that is a document imaging device 44, e.g., a store retailer or bank branch employing device 11-11 at a location (e.g., R1-Rn, 1101, B1-Bn, 1401) remote from a cash vault (e.g., A1, BV, 1301, 1501).

According to some such embodiments, currency bills in a deposit transaction are processed first by the document imaging device 44 and then checks in the deposit transaction are processed by the document imaging device 44. For example, all the currency bills in a deposit transaction are first run (in one or more batches) through a document imaging device 44 at, e.g., a retail store location, and then the processed currency bills are deposited (either automatically or manually) into a smart container. The document imaging device 44 generates information about the processed bills, such as, for example, a grand total amount, breakdown information by denomination (in terms of count and/or value), sub-batch information, etc. and such generated information is communicated from the document imaging device 44 directly or indirectly to the memory in the smart container. The image(s) of each note can also be captured by the document imaging device 44 and stored in smart container memory. Likewise, information can be extracted from the captured images such as serial numbers and stored in smart container memory. Additionally, other information may be stored in the smart container memory such as, for example, a customer name, customer bank account number, and/or other data as described above, for example, in connection with document records, data files, and/or electronic deposit slips in connection with FIGS. 8A-8E, 10A-10E as such data may be entered via a smart container interface and/or received from another source such as the document imaging device 44. As above, the transmission of data (e.g., totals, images, serial numbers, etc.) from the document imaging device 44 directly or indirectly to the smart container memory could be made wirelessly, through a hard wired connection, using a portable memory device such as a flash memory stick, or via some other technique. Next, checks could then be run (in one or more batches) through the document imaging device 44 and the device 44 captures the images of the checks. According to some embodiments, the processed checks are deposited (either automatically or manually) into a smart container. According to some embodiment, the images of the checks and/or any extracted data are transmitted to and stored in the smart container memory as described above. According to some embodiments, the images of the checks are stored in the memory of the smart container for transport to the central vault without storing the physical checks therein. That is, the checks can be sent to the bank or they can be kept at the retailer's location and the images of the checks can be sent in the smart container memory without the physical checks being sent in the smart container. The images of the checks will be processed and after the checks are cleared, the customer can be notified that the checks can be destroyed. Alternatively, the physical checks can be sent to the bank and the images of the checks can be processed and the physical checks will be held in case they are needed later for additional verification. Note, totals stored in the memory of the smart container at the remote deposit location (e.g., R1-Rn, B1-Bn, 1101) may be referred to as declared totals to be verified when the documents in the smart container are processed by a second document processing device (acting as a verification device) at another location, e.g., a cash vault (A1, BV, 1301, 1501). In addition to loading the information about the processed bills (e.g., images of the processed bills, a grand total amount, breakdown information by denomination (in terms of count and/or value), sub-batch information, etc.) in the memory of the smart container, the information can be transmitted to a PDA and/or computer communicatively linked with smart container such that the information can be sent forward to the bank (e.g., in advance of the smart container's arrival at the bank).

Upon arrival at the central vault the smart container is coupled to an attended or a semi-attended verification device 11 which is a document imaging device 44. Some or all of data (e.g., totals, images of documents, serial numbers, etc.) in the smart container memory is transmitted to a memory in the document imaging device 44 and/or made available to a processor in the document imaging device 44 being used as a verification device to process the documents in the smart container. For example, according to some embodiments, declared total(s) stored in the smart container memory would be communicated to the document imaging device 44 and/or another device communicatively coupled to the document imaging device 44. The documents in the smart container are processed by the vault document imaging device 44. For example, according to some embodiments, the reconciliation device 11 would then extract the documents from the smart container, denominate the currency bills, image any checks and/or currency bills, extract any data from captured images (e.g., determine the amount of each check via CAR and/or LAR extraction), generate one or more totals (e.g., a grand total, totals and/or counts by denomination), and/or compare the generated total(s) against the declared totals provided by the memory in the smart container. For example, according to some embodiments, the captured images of checks could immediately be processed and made available for use of CAR/LAR determination and/or Check 21 processing. As described above, the CAR/LAR determination and/or Check 21 processing/transmission could be performed by the document imaging device 44 and/or a processor communicatively coupled to the device 44. The verification device 44 could then balance the currency bills down against the declared currency bill balance(s) and/or compare captured currency bills images (or extracted data such as serial numbers) with corresponding images and/or data obtained from the smart container memory. According to some embodiments, the device 44 may capture images of checks extracted from the smart container and compare the captured checks images and/or data extracted from the captured check images with corresponding images and/or data obtained from the smart container memory. According to some embodiments, the device 44 may not image checks and/or extract data from captured images of checks, but rather, the institution (e.g., bank) operating the device 44 and/or vault receiving a smart container may choose to just accept the images in the memory of the smart container without running the checks again on the vault device 44. In addition to loading the data and/or information in the memory of the smart container being transferred to the document imaging device 44, the data and/or information can be transmitted to a PDA and/or computer communicatively linked with smart container such that the information can be sent forward to the bank (e.g., in advance of the smart container's arrival at the bank) from central vault location, which is distinct from the bank location in some embodiments.

According to some embodiments, when preparing a deposit, the retailer or other depositor would not insert checks in a deposit transaction into a smart container at all. Instead, the images of checks in the deposit transaction are captured by the remote document imaging device (e.g., 11-11, 44-9*a*) and the captured check images could be formatted to be Check 21 compliant and transmitted to a bank (e.g., the depositor's bank) for further processing and/or the remote device (e.g., 11-11, 44-9*a*) and/or a remote processor communicatively coupled thereto (e.g., computer 1152) could perform CAR/LAR and/or initiate Check 21 processing/clearance at the store location (e.g., 902, 1101).

According to some embodiments, such as described above in connection with FIGS. 9A-9B, the images (and/or other associated data, e.g., total(s), extracted data) of the checks and the currency bills in a deposit transaction might be transmitted to the bank in advance of the smart container containing the currency bills and/or checks actually arriving at a cash vault (e.g., A1, BV, 1301, 1501). Thus, according to some such embodiments, the images and/or totals for the deposit transaction are transmitted by wired/wireless communication from the retailer to the bank even before the smart containers arrive at the bank or vault location. According to some such embodiments, CAR/LAR processing and/or Check 21 processing of the deposited checks could begin immediately upon arrival of the check images (and/or check data) at the bank or vault location.

H. Methods to Process and Confirm Contents of the Smart Containers

According to various embodiments, the contents of smart containers containing documents associated with a deposit transaction are verified and final credit is given to a customer (a customer's financial account, e.g., bank account) for the deposit transaction.

For example, as discussed above, such as in connection with FIGS. 9A, 9B, 11, 14 and 18, according to some embodiments, a retailer sends an advance notice or communication to a bank (see, e.g., FIGS. 9A-9B) of a deposit transaction. According to some embodiments, the communication comprises declared amount(s), document images, data extracted from document images, document records 300, a data file 301, and/or an EDS, etc. The communication and/or the transmission of the communication may indicate when physical documents associated with the deposit transaction will arrive at the bank branch, bank vault, armored carrier vault, etc. For example, the communication may indicate that the depositor expects to deliver the documents associated with the deposit transaction to the customer's bank in the next 12 to 24 hours.

According to some such embodiments, a person associated with the depositor, e.g., the retailer may transport the documents to the bank herself or himself. According to some embodiments, the documents are loaded in and transported to the bank in a smart container(s) as discussed above. For example, according to some such embodiments, a retailer would arrive at a bank branch 1401 and insert the smart container into and/or otherwise couple the smart container to a document processing device 11 located at the bank branch 1401 such as a commercial ATM (e.g., ATM #1 comprising an input dock 54) or merchant teller (e.g., MT-14). Some or all of the data in the smart container memory is transmitted to or made available to the document processing device 11 such as, for example, by storing such data in a memory in the document processing device 11. According to some embodiments, the transmitted data comprises a customer/depositor name, account number for an account into which funds in the deposit transaction are to be credited, some or all of the document image, and/or total(s), etc. for currency bills and/or checks in the deposit transaction. The document processing device 11 (e.g., ATM#1, MT-14) would then extract the documents from the smart container. The document processing device 11 would process the document and generate total(s) for the processed documents. The generated total(s) are compared and matched to declared total(s), e.g., total(s) obtained from the smart container memory. If any discrepancies are detected (e.g., a difference in a grand total, currency bill total, check value total, and/or individual document values, etc.), a discrepancy signal would be generated and/or information about the discrepancy(ies) may be displayed on a display of the document processing device 11 (e.g., ATM#1, MT-14) for the customer and/or a bank personnel to reconcile at that time. Additionally and/or alternately, information (e.g., document images) about the discrepancy(ies) may be transmitted to another device (e.g., computer 1452, PDA 1499-B1, etc. for bank personnel and/or customer review and reconciliation at that time or at a later time. According to some embodiments, information (e.g., document images) about the discrepancy(ies) may be used to create a data file and the customer and the bank personnel could access the data file to review differences and reconcile the deposit transaction at that time or at a later date. According to some embodiments, when the document processing device (e.g., ATM#1, MT-14) verifies the received documents matched the declared documents (e.g. the declared value(s) of currency bills and/or checks, such as received from the memory of the smart container, matches the generated value(s) of currency bills and/or checks as determined by the device), credit for the deposit is given to the retailer, e.g., the document processing device communicates deposit information (e.g., total value of deposited currency bills and/or checks, breakdown information, images, and/or other information) to a bank network (e.g., network 960 of FIG. 9A-9B, accounting system 1750 of FIGS. 17A-17B, and/or teller system (e.g., 1730 of FIGS. 17A-17B), and the bank network credits the financial account into which the funds of the deposit transaction are deposited. According to some embodiments, when the deposit transaction is completed, the smart container is returned to the retailer.

According to some embodiments, a smart container(s) associated with the deposit transaction are collected from the remote location (e.g., retail store) by an armored carrier. The smart container is transported to a cash vault. The smart container is then coupled to an attended or semi-attended document processing device 11 (e.g., device 11-13b, 11-15a-11-15b, 11-16a-11-16d) such as a document imaging device 44. According to some embodiments, the device 11 could be a document imaging device 44 that accepts mixed currency bills and/or checks (e.g., in a "sorted batch of documents" comprising currency bills and checks and/or in an "intermingled or commingled batch of documents" comprising currency bills and checks). According to some embodiments, the device 11 would simply extract contents from the smart container, confirm the totals (and/or otherwise data by comparing totals and/or other data generated by the device 11 to data obtained from the smart container memory) and then dispense contents into one output tray or one, two, or three such output trays as described above. According to some embodiments, the device 11 to which a smart container arriving at a vault is initially coupled is a multi-pocket scanner/sorter (MPS), such as a Cummins MPS device (such as, for example, devices 11d-11h, system 100h), which is configured to sort currency bills by denomination into 1) output receptacles or 2) containers (e.g., cassettes such as, cassettes 118g1-118g6 [FIG. 1G] or 3) directly to a strapping device (e.g., strappers 300', 300" [FIG. 1H]) where currency bills of the same denomination are strapped. Cummins Model 4200 (see, e.g., FIG. 1D) or Model 4100 (with strapper optional) (see, e.g., FIGS. 1G-1H) devices would be examples of such devices.

I. Specific Examples and Degrees of Complexity Regarding Utilization of Smart Containers 1. Financial Institution Charges Reduce Fee When Automated Document Container Used According to some embodiments, financial institutions such as banks utilize a fee structure that encourages depositors (e.g., retailers and other bank customers (commercial, retail, consumers)) to utilize automated document containers such as smart containers (such as smart cassettes CS and mini-safes SF). For example, if currency, checks, and/or other documents arrive at a bank's cash vault within an automated document container and/or a smart container(s), then the bank reduces document processing fees charged to the bank customer(s) making deposits using the smart container(s). The reduced fees reflect the automation advantages the automated document containers/smart containers provide for the preparation handling of currency prior to currency and/or checks arrival at a bank's central cash vault and/or for efficient processing provided by the above described document processing devices 11 and systems. For example, when deposits arrive at a cash vault in an automated document container including a smart container, labor in the cash vault is no longer required to prepare the deposit documents (e.g., currency bills and/or other documents) in order to run the documents (e.g., currency bills and/or other documents) through a document processing device 11, e.g., currency denominating devices 33 and document imaging devices 44.

2. Automated Document Container Deposits Made without Using a Document Processing Device at the Front End According to some embodiments, a depositor such as a smaller retailer may not have the volume of currency and/or checks to justify the purchase of a document processing device 11 such as a currency denominating device 33 or document imaging device 44 for use in their store location. Smaller retailers such as Ace Hardware may only have several hundred checks a day to deposit and may only have several hundred notes. Nonetheless, an automated document container (e.g., cassette CS or min-safe SF) including a smart container could still be utilized. The retailer or other commercial account would manually count their currency bills to be deposited in a deposit transaction and place currency into the automated document container. The retailer would then manually total their checks and/or other items to be deposited in the deposit transaction. According to some embodiments, the retailer could then enter all of the required data into the memory of the smart container as described herein. The data to be entered might include the customer name, customer bank account number, bank name, amount of currency bills to be deposited, amount of checks to be deposited, and any other information or data which the bank may require to process the deposit. According to some embodiments, the retailer may enter this information through an interface such as, for example, a keyboard or touchscreen located on the smart container. According to some embodiments, a retailer may enter this information on a PDA, tablet, computer, etc. (e.g., smart phone running an appropriate APP) and the information then transmitted to the memory of the smart containing (e.g., via a wired or wireless connection, portable flash drive). According to some embodiments a password might be required for the smart container to accept the data (e.g., data from the on-board keyboard, touchscreen, etc. or from a separate device such as a smart phone, tablet, PC, etc.

Alternatively, or additionally to storing deposit transaction information in the memory of the smart container, according to some embodiments, the retailer may have the option of also sending some or all of the information such as the declared balance amounts to the bank accounting system such as via a wireless or landline communication channel (e.g., via a smart phone into which the information is entered and/or which is communicatively coupled to the smart container memory or other device into which the information has been entered) (see, e.g., FIGS. 9A, 18}. Under this technique the bank accounting system will know certain information about the smart container it expects to receive such as, e.g., the declared amounts of currency bills and/or checks, an expected arrival time, an expected destination (e.g., to which particular cash vault the container will be delivered), other transit information (e.g., whether the retailer will be bringing the smart container herself or himself or the particular armored carrier and/or armored carrier route that will be used). When the retailer is done filling the smart container, the retailer could press a button on the smart container or enter a password which would lock the smart container and secure the contents within it. According to some embodiments, the armored carrier would then arrive to pick up the smart container and transport the smart container to a central cash vault.

Under an alternative, the small retailer may choose to deliver the smart container directly to the bank's closest branch bank (e.g., B1-Bn, 1401) at a commercial teller window (e.g., 1484-5). That commercial teller window might be equipped with a document processing device 11 (e.g., 11-5) such as a currency bill denominating device 33 and/or a document imaging device 44 which can accept such smart containers and immediately extract the contents and verify the content for the benefit of the retailer. Alternately, according to some embodiments, a document container received from a customer at a bank branch location (e.g., 1401, B1-Bn) is sent to a central cash vault for verification (e.g., BV, 1301, 1501) as described elsewhere in the present disclosure.

In another scenario, the smart container is delivered to a central cash vault (e.g., A1, BV, 1301, 1501). As discussed above, smart containers could vary in size from a smaller container that might only hold 100-500 docs to large containers that might hold as many as 2,000-3,000 docs. In any event, once the smart container arrives in the central cash vault, the smart container can be put into a container queue with many other smart containers. According to some embodiments, the smart container might be placed on a rotating kiosk such as input container transfer system 1678c [FIG. 16C]. The input container transfer system 1678c would rotate the next smart container to one of the semi-attended currency verification devices (e.g., 11-16c) in the vault. According to some embodiments, when the smart container is coupled to this device (e.g., 11-16c), data would be transmitted from the smart container memory to the verification device memory. According to some embodiments in which a document imaging device 44 is not employed when loading the smart container (e.g., at the small retailer location), there would not be document images included in the transmitted data but only totals against which to balance extracted documents. According to some embodiments, any discrepancies detected by the verification device 11 and discrepancy information would be sent to the bank cash settlement system and/or bank accounting system and, according to some embodiments, the customer's account associated with the deposit transaction/smart container would be updated with a debit or credit adjustment accordingly.

3. Automated Document Container Deposits Made Using a Document Processing Device 11 at the Front End a. Automated Document Container Deposits Made Using a Currency Bill Denominating Device 33 at the Front End According to some embodiments such as some of those described above, a deposit transaction is initiated at site remote from a bank branch or vault such as at a retailer location using a document processing device 11 that is a currency bill denominating device 33. According to some such embodiments, currency bills in the deposit transaction are processed on the remote currency bill denominating device 33 (e.g., at a retail location, e.g., R1-Rn, 1101) while checks in the deposit transaction are not processed by the currency bill denominating device 33. Rather, information about checks, e.g., a total declared value of checks to be deposited, is determined either manually or by some device other than the currency bill denominating device 33. Nonetheless, the information about the checks, e.g., the declared total value of checks) could be entered into memory of the smart container such as using one of the manners discussed above (e.g., directly on the smart container via a smart container interface or indirectly via use of a PDA, tablet, PC, etc. which in turn communicates the entered check data to the smart container memory.

The remote currency bill denominating device 33 (e.g., 11-11), however, would be utilized by the retailer (or other bank customer) to denominate the value of currency bills for deposit and to be placed into the smart container. The currency bill denominating device 33 is configured to determine the total of the currency bills processed, and, if desired, a breakdown by denomination and send this data to the smart container memory via one or more of the various methods described above (e.g., via a wired connection, portable flash/USB drive, wirelessly between the currency bill denominating device 33 and the smart container, and/or via an indirect communication such as via an intermediary PDA, tablet, computer, etc.). According to some embodiments, a wireless connection is established between document processing devices 11 such as currency bill denominating devices 33 (and/or document imaging devices 44) and smart containers configured for use with such devices 11 at a specific frequency. Additionally or alternately, a portable flash drive such as a USB drive or memory stick or thumb drive could be placed into the currency bill denominating device 33 to obtain the information about the deposit transaction, e.g., information about the processed currency bills such as total(s) and/or other information, e.g., currency bill denominating device 33 ID, customer name, customer address, customer account into which the deposit transaction funds are to be deposited, etc. The portable flash drive could then be coupled to the smart container (e.g., via a USB port) and the total(s) and/or other information transmitted from the flash drive to the smart container memory and stored therein. Under another method to a wire connection could be established between the smart container and the currency bill denominating device 33 to permit the information to be transmitted from the currency bill denominating device 33 to the smart container memory. According to some embodiments, other information to be stored in the smart container memory, e.g., customer name, account number, etc., it could be entered into the currency bill denominating device 33 via a currency bill denominating device interface at the time of each transaction or be stored in a memory of the currency bill denominating device 33 and/or other device at the remote location (e.g., 1101) such as PDA 1199, computer 1152, etc. on a long term basis and used repeatedly for multiple deposit transactions until the data is changed or removed from the currency bill denominating device memory. Such other information could be transmitted to a smart container every time at deposit transaction is performed by the currency bill denominating device 33 and/or at the remote location (e.g., 1101).

According to some embodiments, when a retailer wishes to initiate a deposit transaction, the currency bill denominating device 33 is operated in a "deposit mode" such as by the retailer using an interface on the currency bill denominating device 33 to change the mode of operation of the device 33. Then bills to be deposited are simply run through the currency bill denominating device 33. According to some embodiments, the currency bill denominating device 33 has a single output receptacle or dual output receptacles. As an output receptacle fills, the retailer operator/personnel would manually remove the currency bills from the currency bill denominating device 33 output receptacle and place the currency bills into the smart container. The currency bill denominating device 33 would calculate a cumulative total of all currency bills denominated while the device 33 is operating in the "deposit mode." The operator would continue to run currency bills and fill the smart container(s) by removing currency bills from the output receptacle(s) and placing them into the smart container(s) until the smart container was full. At that time the retailer would lock the smart container and, according to some embodiments, the smart container would communicate to the currency bill denominating device 33 that it is full. If this is the only smart container for the deposit transaction, the operator may end the deposit mode (e.g., via operator entry at the currency bill denominating device 33 interface such as a keyboard or touchscreen). However, if more currency bills must be run, a second smart container would be started and total(s) and/or other transaction information associated with currency bills to be placed into the container #2 would be calculated by the currency bill denominating device 33 (e.g., total(s)) and such information and/or other transaction data would be stored into the memory of smart container #2. This sequence would continue until all currency bills to be deposited in the deposit transaction have been processed by the currency bill denominating device 33 and placed into a smart container. According to some embodiments, each smart container is locked when no more currency bills are to be placed therein. According to some embodiments, the information in the memory of each of a plurality of smart containers associated with the same deposit transaction is coordinated. For example, if there were three smart containers associated with a single deposit transaction originating from Safeway Store #22 on a given day, each smart container may have a date, a time (e.g., a time the bills in the container were processed by the device 33, a time the container was locked, and/or a time associated with the deposit transaction such as when the deposit transaction was initiated), a store number or ID, a container number and/or ID, the value of the currency bills contained therein, a bank account number in which funds in the deposit transaction are to be deposited, a store location, etc. According to some embodiments, the information in the memory in the plurality of smart containers for a single deposit transaction may be sequenced relative to each other, e.g., the container numbers in the preceding example may be, for example, "#1," "#2," and "#3"; "1 of 3", "2 of 3", and "3 of 3" or "Safeway Store #22-1," "Safeway Store #22-2," "Safeway Store #22-3." In addition to the above, the data stored in the memory of the smart container can be sent forward (e.g., transmitted) to the bank prior to the smart container arriving at the bank.

According to some embodiments, the device 11 at the remote location (e.g., 1101) is a currency bill denominating device 33 having one, two or more output ports 55 configured to receive smart container(s) and the device 33 is configured to feed processed bills into a smart container coupled to one of its output ports. According to some embodiments, the device 33 may also have one, two, three or more output receptacles. The currency bill denominating device 33 may have a variety of modes of operation that may be selected by an operator (e.g., via a device 33 interface). For example, the device may have a "deposit" mode as described above, a "count" mode (for piece counting documents), and a "batch" mode (for, e.g., totaling the value currency bills in a batch of bills and/or determining other information such as denomination breakdown information). During the day, an operator may operate the device 33 in the "batch" mode, for example, to balance down each of 14 or 20 tills in a store. At a certain time each day the retailer may be ready to initiate a deposit transaction and change the mode of the device 33 to the "deposit" mode. According to some embodiments, the operator couples one or more smart containers to the device 33. Operating in the "deposit" mode, the currency bill denominating device 33 processes currency bills in a deposit transaction (e.g., denominates each bill, calculates one or more total(s) such as a grand total, generates denomination-by-denomination breakdown information such as totals/counts) and sends the processed currency bills directly into one or more smart containers coupled thereto. According to such embodiments, the operator would not have to manually remove the processed currency bills from an output receptacle and then manually put the bills into a smart container. According to some embodiments such as when the device 33 only has a single smart container coupled thereto, when a smart container became full, the currency bill denominating device 33 would stop its document transport mechanism. An interface such as a display on the currency bill denominating device 33 could inform the operator that the smart container is full and prompt the operator to remove the full smart container and place another (empty) smart container in place. Once a second smart container was coupled to the device 33, the currency bill denominating device 33 would then continue processing currency bills in the deposit transaction (e.g., the transport mechanism of the device 33 would resume transporting bills through the device 33) and send processed bills to the second container until that smart container was full. When the currency bill denominating device 33 is directly filling smart containers under this mode, totals (and/or other deposit transaction information) again would be communicated to the memory in the smart containers as discussed above. According to some embodiments, when a smart container is locked down, final totals are recorded in the memory of the smart container. Thereafter, the contents of the smart container could not be tampered with. According to some embodiments, if a locked smart container was opened or tampered with, the memory in the smart container would make a record of such event(s) and report that it was tampered with (such as when the container was subsequently coupled to another document processing device 11. According to some embodiments, when a smart container becomes full, the currency bill denominating device 33 automatically send a signal to the smart container to cause the smart container to lock itself. According to some embodiments, the smart container may detect when it becomes full (e.g., using a count sensor communicatively coupled to a container processor to count the number of documents inserted into the container and until a capacity count is achieved and/or using a full sensor coupled to the container processor to detect when a document holding platform is advanced to a capacity location) and transmit a full signal to a processor or controller in the currency bill denominating device 33 which in turn stops the operation of the transport mechanism of the currency bill denominating device 33.

According to some embodiments, the output port 55 is configured with a releasable latch which prohibits a container coupled thereto from being removed unless the container is locked. Thus, while the currency bill denominating device 33 is feeding bills into the smart container, the smart container may not be removed from the currency bill denominating device 33. Once the container becomes full, a full signal generated by the currency bill denominating device 33 or the smart container causing the container to lock. When the container is locked, the currency bill denominating device 33 and/or the output port detects the locked status of the container and disengages the latch allowing the container to be removed from the output port 55. In a similar manner, when all of the currency bills in a deposit transaction have been stored in a smart container, the currency bill denominating device 33 may end the deposit transaction and send a lock signal to the container even though the container may not be full; thus allowing a non-full container to be removed from the output dock. According to some embodiments, the output port latch is not released until all desired data has been transmitted from the device 33 and stored in the memory of the smart container.

According to some embodiments, checks associated with the deposition transaction are manually loaded into one or more other automated document containers. According to some embodiments, the currency bill denominating device 33 may be operated in a "document container load" mode. In such a mode, checks (and other documents) may be placed into the input hopper of the currency bill denominating device 33 and the currency bill denominating device 33 feeds the documents through the device and into one or more automated document containers coupled thereto. According to some embodiments, the currency bill denominating device 33 does not analyze the documents other than perhaps counting the number of such documents (i.e., generating a piece count). The coupling/decoupling of output containers to the device and switching between containers when they become full can be handled in the same manner as discussed above with respective to processing currency bills. When the automated document container is a smart container, document data (such as a piece counter) and/or other data (e.g., customer name, account number, etc.) may be transferred from the currency bill denominating device 33 into the memory of the smart container as described above with respect to the processing of currency bills. According to some embodiments, a declared check total may be manually entered into the currency bill denominating device 33, smart container, or other device (e.g., PDA 1199) and stored in the memory of the smart container.

In any event, under the above scenarios the currency bill denominating device 33 automatically fills the smart container(s) and transmits appropriate data to the memory of the smart container(s). The smart containers are locked down and are ready for transport. According to some embodiments, such as described above in connection with FIGS. 9A-9B, the associated deposit transaction information could also be transmitted (e.g., by wire or wireless) from the retail store (e.g., 1101 such as from store's accounting system) to the bank's accounting system. Because the bills are safe and secure and in a smart container such as a mini-safe SF, according the some embodiments, the bank provides provisional credit to the depositor (e.g., retailer) for the currency bills secured within the automated document container, even while the automated document container remains off the bank's premises.

Once these automated document containers are secured/locked, they are ready for pick up by the armored carrier. After completion of processing the documents associated with the deposit transaction, the store operator may disengage the 'deposit mode' on the currency bill denominating device 33 and return the currency bill denominating device 33 to normal operating modes.

The automated document container(s) would then be picked up by an armored carrier and delivered to a central cash vault of an armored carrier (e.g., A1) or to a bank central vault (e.g., BV). The automated document container(s) would then be attached to an attended or a semi-attended document processing device 11 such as a currency bill denominating device 33 or a document imaging device 44 to reconcile the deposit transaction. As described above, when a retailer uses a currency bill denominating device 33 for deposit preparation, the currency bill denominating device 33 does not capture images of the bills, checks, or other documents in the deposit transaction and store such images in the memory of the smart container. According to some such embodiments, only a total declared balance of the checks and/or a piece count is stored in the smart container memory. Therefore, checks and other non-currency bill documents (e.g., a deposit slip) will have to be run through an attended or semi-attended document imaging device 44 at the central vault and the images of such documents captured at that time. The calculated check total generated using the captured check images by running the checks through the central vault document imaging device 44 can be compared to the declared check total provided by the memory in the smart container. Any discrepancies can be handled as described above and/or any differences can then be charged or credited to the corresponding customer account at the bank.

According to some embodiments, a depositor such as a retailer may take the smart containers for his or her deposit transaction to a commercial ATM (e.g., ATM#1) or other device (e.g., MT-14) such as at bank branch (e.g., 1401). The retailer may have already transmitted data associated with the deposit transaction (e.g., the expected deposit amount) to the bank (e.g., hours or even a day before bringing the containers to the bank). The smart container is coupled to/placed in the commercial ATM or merchant teller. The memory in the smart container would then transmit data contained therein (e.g., currency total(s) and/or a declared check total) to the receiving device 11 (e.g., currency denominating device 33 or document imaging device 44. The receiving device 11 would then extract the documents in the container, denominate the currency bills and confirm the currency bill total(s). Where the receiving device 11 is a document imaging device 44, the currency bills could be optionally imaged and/or data may be extracted from the currency bill images, e.g., serial numbers. According to some embodiments, the receiving document imaging device 44 could run and image checks for CAR/LAR extraction and calculate a check total and compare it to a declared check total received from the memory of a smart container. As described above with respect to the operation of the document processing devices 11 reconciling deposits, the receiving device 11 may take appropriate action upon detecting any discrepancies between declared/expected documents/value and the information determined (e.g., totals) by the receiving device 11, e.g., communicating discrepancies to a banking system. According to some embodiments, such as where the receiving device 11 is a currency bill denominating device, checks could simply be extracted from the container and stored within the device 11 for later processing on a separate document imaging device 44 such as a device 44 in a cash vault.

According to some embodiments, a bank may place kiosks such as document processing devices 11 similar to ATM#1 and/or MT-14 at strategic and/or convenient locations such as large shopping centers where there are many retailers which may find it convenient to use such machines. For example, according to some embodiments, at any time during the day a retailer could take a smart container from their store over to such a kiosk/document processing device 11 to make a deposit and receive credit.

b. Automated Document Container Deposits Made Using a Document Imaging Device 44 at the Front End According to some embodiments such as some of those described above, a deposit transaction is initiated at site remote from a bank branch or vault such as at a retailer location using a document processing device 11 that is a document imaging device 44. According to some such embodiments, currency bills and checks in the deposit transaction are processed on the remote document imaging device 44 (e.g., at a retail location, e.g., R1-Rn, 1101). Such embodiments, take advantage of the benefits described above associated with imaging deposit documents and loading the related data/images into the memory of a smart container(s). When a smart container processed by a document imaging device 44 at a remote location such as at a retailer location is subsequently reconciled using a document imaging device in the cash vault (or alternately at the commercial teller window of a branch or at a commercial ATM (e.g., ATM#1) or merchant teller machine (e.g., MT-14)), the reconciliation device may have a large amount of data available to more accurately confirm the deposit and/or to correctly reconcile any differences.

According to some embodiments, an advantage of a remote depositor (e.g., retailer) using a document imaging device 44 at the front end of a deposit transaction is the greater amount of data a document imaging device 44 can collect. According to some embodiments, a document imaging device 44 can detect, capture, or extract a variety of information about processed documents in a deposit transaction, such as, for example, the image of each currency bill and/or check processed, the denomination of each currency bill, the total of all currency bills, the value or number of each denomination of currency bills, the serial number of each currency bill, the amount/value of each check, the value of all checks, and/or a grand total of the value of all currency bills and checks. Some or all of this information may be transmitted to and stored in a memory of a smart container into which documents associated with the deposit transaction are stored and/or electronically transmitted to a network associated with an entity that will be receiving such containers, e.g., an armored carrier network or banking network. The use of a document imaging device 44 at the remote location may provide the ability to determine the value of each check (e.g., via CAR/LAR extraction) immediately on the document imaging device 44 and/or using another device (e.g., computer 1152) in the store, or to simply send the check images to a smart container for subsequent check image processing at a bank location (e.g., cash vault 1501). Furthermore, according to some embodiments, a smart container and a document imaging device 44 are configurable as to what data, which images, and for which documents data is stored in a smart container memory. That is, according to some embodiments, a user can configure (e.g., using an input device of the DID 44) what information is transferred from the DID 44 to the memory of the smart container for storage therein.

According to some embodiments, since a document imaging device 44 provides an image of each currency bill and/or each check and/or extracts the serial number of each currency bill and/or extracts MICR data from each check, a smart container memory may store details of exactly which documents are physically in each smart container. Therefore, because an image of each check or currency and a tracking number such as account number for the check, or serial number for each bill, a depositor and/or a bank receiving a deposit has an exact inventory of what is in each smart container. A smart container can still be at a depositor location, e.g., retail store location R1-Rn. The depositor/retailer can (e.g., by wired or wireless connection) transmit data files relating to all currency and/or checks held in one or more smart containers at the store to a bank network, e.g., a bank's imaging and accounting system. According to some embodiments, a bank provides commercial depositors (e.g., retailers such as Safeway) provisional immediate credit for currency bills that have been imaged and stored in a locked smart container and/or whose serial numbers have recorded into the memory of the smart container and/or electronically sent to the banking network that day even before the smart container(s) leave the store. According to some embodiments, a retailer might even run several deposit transactions associated with several smart containers over a plurality of days (e.g., 2 or 3 days) and retain the associated smart containers at their store while at the same time receiving provisional credit for the value of the currency bills contained in those smart containers. According to some embodiments, such a procedure reduces the number of times in a given period (e.g., week) that the store must pay for an armored car service to come and pick up deposits of smart containers and thus in turn reduces the armored car service charges the store incurs as a store may elect to have the armored carrier come and retrieve smart container deposits every second or third day, instead of each day. According to some embodiments, the smart containers are secure and tamper-free thereby preventing store personnel to from extracting currency bills stored therein once a smart container has been locked.

According to such embodiments, the retailer would place a document imaging device 44 at a store location into the "deposit mode." According to some embodiments, the device 44 is configured to process currency bills, checks, deposit slips, etc.

According to some embodiments, the deposit slip may be run through the device 44 first and the device will image the deposit slip, extract declared bill and/or check amounts and balance the deposit transaction against the declared amounts extracted from the deposit slip. According to some embodiments, physical deposit slip is not processed by the device 44 but rather the device 44 generates an electronic deposit slip and/or a physical deposit slip after processing all currency bills and checks in a deposit transaction.

(i) Manual Movement of Documents from the Device 44 into a Smart Container

According to some embodiments, the document imaging device 44 has one, two (or more) output receptacles. According to some embodiments, the retailer would run mixed batches of currency bills and checks through the document imaging device 44. The currency bills would be delivered to a first set of one or more output pockets and checks would be delivered to one or more output pockets. According to some embodiments, the retailer would run currency bills and checks through the document imaging device 44 in separate batches, for example, the operator may run one or more batches of the currency bills through the document imaging device 44 and the currency bills would be delivered to one or more output pockets. Then the operator may run one or more batches of checks through the document imaging device 44 and the checks would be delivered to one or more output pockets, in some embodiments, the same one or more output receptacles that previously received bills. According to some embodiments, the document imaging device 44 has different deposit modes depending on the type of documents to be processed, e.g., a currency bill deposit mode for processing currency bills, a check deposit mode for processing checks, and/or an mixed currency bill and check deposit mode configured to process batches containing both currency bills and checks. According to some embodiments, the document imaging device 44 operates at different speeds depending on the deposit mode selected, for example, in the currency bill deposit mode the document imaging device 44 and its transport mechanism may operate at a higher speed (e.g., at least 1000 bills per minute, at least 1200 bills per minute, at least 1500 bills per minute) than when the device 44 is operating in a check deposit mode or mixed bill and check deposit mode which may operate at a slower speed (e.g., less than or equal to 600 documents per minute).

As described above, when operating in the 'deposit mode,' the document imaging device 44 accumulates totals of currency bills and/or checks and captures images and/or extracts data from the captured images of checks and/or bills. These totals, images, and/or extracted data would then be stored in the smart container memory. As described above, such information could be transmitted to the smart container memory in different ways, e.g., wirelessly, via flash memory stick, via hard wire connection, from the device 44 to a PC, PDA, or other device and from the PC, PDA, or other device to the memory of the smart container. Once processing for a deposit transaction has been completed, the device 44 may change the operating mode of the device from a deposit mode to some other mode so that the device 44 may be used for other processes.

According to some embodiments, currency bills (and/or checks) would be manually moved from one or more output pockets into a smart container until the container was full (or no more documents were to be placed in the smart container, e.g., when all bills, checks, and/or all documents in the deposit transaction have been inserted into the smart container).

As described above (e.g., in connection with FIGS. 9A-9B), according to some embodiments, images of checks captured at the retail site by device 44 could be sent (e.g., by wired connection and/or wirelessly) to another device (e.g., computer) for CAR/LAR processing right at the retail location or at another location such as at a bank branch B1-Bn, armored carrier vault A1, or bank vault BV. According to some embodiments, the physical checks do not necessarily need to be sent forward in a document container or otherwise to the bank. However, according to some embodiments, perhaps depending upon bank policy, checks in a deposit transaction are placed in a smart container and images (and/or other information about the checks) may be transferred from a memory in the document imaging device 44 to the memory in a smart container into which the checks are placed. According to some embodiments, the checks in a deposit transaction might be retained at the retailer (not placed in a smart container that is forwarded to a vault) but the images of the checks (and/or other information about the checks) are transferred from a memory in the document imaging device 44 to the memory in a smart container (e.g., a smart container containing bills that are part of the deposit transaction and that will be delivered to a bank vault or armored carrier vault for reconciliation).

As described above, once a smart container is full, it would be locked down and all documents and their images and declared totals would be stored in the memory of the smart container. Also as described above, other deposit transaction information e.g., customer name, account number, etc., may also be stored in smart container memory. If more than one smart container is to be filled, then the deposit processing would continue. According to some embodiments, once a smart container is locked, the smart container is configured to retain all totals, images, and/or other information in the smart container memory until the smart container is received at a cash vault (e.g., A1, BV, 1201, 1501), is coupled to a deposit reconciliation document processing device 11, e.g., a document imaging device 44, at the cash vault or other location (e.g., a commercial ATM, e.g., ATM#1 or a merchant teller, e.g., MT-14), and/or all the documents in the smart container have been extracted and/or removed from the smart container, and/or an erase button is selected on the smart container (e.g., via a smart container interface) and/or the smart container receives an erase signal from another device such as a device 11 to which it is coupled.

(ii) Automatic Movement of Documents from the Device 44 into a Smart Container According to some embodiments, the document imaging device 44 (e.g., 11-11) at the remote, e.g., retail, location has one or more output ports 55, each configured to receive an automated document container. Under such embodiments, the document imaging device 44 is configured to feed processed documents directly into automated document container(s) coupled thereto.

As described above, the document imaging device 44 continues to process currency (and/or checks) and place the documents into a smart container until the smart container is full (or there are no more documents in the deposit transaction to be processed and the deposit mode is exited). According to some embodiments, when a smart container becomes full, the document imaging device 44 automatically stops (e.g., the transport mechanism of the document imaging device 44 stops). The smart container memory would receive a transmittal of some or all of the data gathered and/or generated by the document imaging device 44, e.g., total(s), captured images, extracted data, and/or other important (such as customer name, account number, etc.). According to some embodiments, this data is transmitted to the memory of the smart container prior to removal of the container from the output port of the document imaging device 44. The operator is then notified by document imaging device 44 or smart container that the smart container was full and is prompted to remove the full container from the document imaging device 44. Prior to, during, or after removal, the smart container would be locked and the data stored in the smart container memory is retained the memory of the container.

If more documents in the deposit transaction remain to be processed, a second smart container is then coupled to the document imaging device 44 and the operator could continue processing currency (and other documents) until the entire deposit has been processed and delivered into one or more smart containers. Upon completion of the last smart container, the document imaging device 44 can transmit information about the entire deposit transaction e.g., a grand total of all the documents in the entire deposit transaction including the documents in all the smart containers associated with the deposit transaction to the memory in the last smart container (or alternately to a memory in another one of the smart containers and/or the memories in all smart containers associated with the deposit transaction such as, for example, via a wireless such as a Bluetooth connection between the document imaging device 44 and the smart container(s)).

Some or all of the information about the entire deposit transaction, e.g., total(s) may also be transmitted, e.g., by wired connection or wireless connection from the retailer (e.g., device 11-11, computer 1152, PDA 1199) directly to the bank accounting system so that the bank has visibility of the smart container(s) that will be arriving, e.g., later in the day. When the deposit transaction is complete the store operator would disengage "deposit mode" on the document imaging device 44.

According to some embodiments, an armored carrier picks up the smart container(s) at the store and delivers them to a bank's central vault (e.g., BV) and/or an armored carrier vault (e.g., A1). If data regarding the contents of the smart container(s) has been sent in advance to the bank, the bank will have a record ready for a specific smart container (e.g., a schedule arrival date/time and/or will have knowledge of what documents should be in a specific smart container) against which the documents in the smart container may be reconciled (e.g., using an attended or a semi-attended document processing device 11 (e.g., 11-13*a*-11-13*c*; 11-15*a*-11-15*n*+1) at the cash vault (e.g., 1301, 1501)). According to some embodiments, as described herein, the physical location of the smart containers can be tracked throughout the deposit transaction life cycle.

According to some embodiments, when a smart container is coupled to an input dock of an attended or semi-attended document processing verification device 44 (e.g., 11-13*b*; 11-15*a*, 11-15*b*, 11-15*n*+1, 11-16*a*-11-16*d*), some or all of the information in the memory in the smart container is transferred to a memory in the document processing verification device 44 and/or a memory communicatively coupled thereto. Such information may include the images of the documents in the container (e.g., currency bill and/or check images), currency bill serial numbers, declared totals and/or sub-totals by denomination, check totals, customer name, account number, store location other data, etc.). According to some embodiments, the documents in the smart container are then automatically extracted and reconciled against the data received from the smart container memory and/or received electronically in advance of receipt of the smart container (e.g., data electronically sent from a retail location at the initiating of a deposit transaction).

According to some embodiments, the data provided in the smart container memory is used to help reconcile any differences/discrepancies between what is expected to be in a container and the actual physical documents found in the cassette. Any differences or discrepancies can then be reconciled to the customer's account and/or images of any documents subject to the discrepancy can be provided to the associated customer/depositor/retailer (e.g., the imaging of any no-show or unexpected documents could be provided to a customer) such as by providing the depositor a print out of the subject document images (e.g., in a bank statement) and/or sending the images electronically to a customer network, email address, a bank website/database available to the customer, etc.

According to some embodiments, the retailer takes the smart container(s) associated with his or her deposit transaction(s) to a bank branch (e.g., 1401) and couples the smart container(s) to a document imaging device 44 (e.g., ATM#1, MT-14, 11-18) located at the bank branch or provides the smart container(s) to a bank employee, e.g., commercial teller, who couples the smart container(s) to a document imaging device 44 (e.g., 11-5). According to some embodiments, data about the deposit transaction (e.g., a declared value of documents expected to be in each smart container) has been previously transmitted to the bank. Additionally or alternatively, data about the deposit transaction is transmitted from the memory in the smart container to the document imaging device 44 to which the container has been coupled such as, for example, when the smart container is docked to the device 44. According to some embodiments, the device 44 would then balance/reconcile the documents extracted from the smart container against the data provided from the smart container memory and/or the data sent in advance.

Any detected differences or discrepancies could be handled as discussed above. For example, when document imaging device 44 (e.g., 11-5) is being operated by a bank employee (e.g., commercial teller) information including totals and/or document images regarding any detected discrepancy may be display on a screen of the document imaging device 44 and/or teller terminal (e.g., 1810*a*') and the bank employee and/or depositor may immediately address and handle the discrepancy, e.g., adjusting the customer's account appropriately. Alternately, information about any detected differences or discrepancies could be collected in records and/or a data file associated with the reconciliation process (e.g., a record of each document such as records 300*a*-300*d* and/or a data file similar to data file 301 which may include document images) and sent to a customer (e.g., via hard copy or electronically such as via an email or sending data to a customer network) and/or bank employee (e.g., a reconciliation queue) for reconciliation at a later time.

c. Error Handling

One of the challenges in automatically filling smart containers is the fact that from time to time the device 11 such as currency bill denominating device 33 or document imaging device 44 could detect a feeding error (such as a chain or double feed error) or a document error (such as a no call, suspect) or other situation where the device 11 must stop, and where documents must be rerun.

According to some embodiments, the device 11 is a currency bill denominating device 33 or document imaging device 44 having at least a two output locations, e.g., output receptacles and/or ports or at least one output receptacle and one output port and the device is configured to deliver any error bills (e.g., no call currency bills) to one of the output locations, e.g., an output receptacle, used as an off-sort location or reject location. For example, where an automated document container is coupled to an output port of the device 11, 33, 44, all of the documents being processed at a given time in connection with a deposit transaction (e.g., bills, checks or both) will begin to be placed into the container. However, if an error condition is detected by the device 11,33, 44, the documents subject to the error are off-sorted to a different output location such as a separate output receptacle that does not contain the container. The operator could then inspect the document(s) that was (were) off-sorted. The off-sorted documents can then be placed back into the input hopper of the device 11,33,44 and rerun until all of the documents have been transferred into the container. According to some embodiments, suspect documents are manually removed and are not rerun by the device 11,33,44 and thus are not transferred into the container. Alternatively, according to some embodiments, suspect documents could be tagged as counterfeit, transferred into the smart container and the suspect status of the document(s), e.g., bill(s), is recorded in the memory in the smart container (e.g., the document record (e.g., 300*a*) associated with a suspect document may have the suspect field (333') flagged or set (See FIG. 8A). According to some embodiments, the currency bill denominating device 33 or the document imaging device 44 having at least a two output locations can include denomination keys for manually entering the value of no call currency bills.

According to some embodiments, the device 11, 33, 44 has three output locations including two output ports to which automated document containers are coupled and an output receptacle. Non-error documents could be transported into the documents containers (e.g., one receiving bills and one receiving checks) and the device is configured to deliver any documents subject to an error into the output receptacle which serves as an off-sort or reject receptacle.

Under some embodiments, such as a single output port document processing device 11 (such as a currency bill denominating device 33 or document imaging device 44) having a container coupled to the single output port 55 (or even a dual (or multi-) output port device 11,33,44 having a smart container coupled to each of the output ports 55), the device 11,33,44 comprises at least an additional output receptacle such as a small capacity off-sort receptacle, e.g., a reject pocket. Documents associated with the error condition are routed to the off-sort receptacle and re-run and/or handled as described above.

Under some embodiments, such as a single output port document processing device 11 (such as a currency bill denominating device 33 or document imaging device 44) having a container (e.g., a smart container) coupled to the single output port 55 (or even a dual (or multi-) output port device 11,33,44) having a container coupled to each of the output ports 55), the device 11,33,44 includes an escrow area and/or receptacle configured to accommodate bills until the bills are transferred into a corresponding container. For example, with reference to FIG. 1G (and as described in more detail in U.S. Pat. No. 6,398,000, CUMM246), which is hereby incorporated by reference herein in its entirety), the device 11,33,44 comprises a plurality of escrow receptacles 130g3-130g8 positioned over a corresponding plurality of cassettes 118g1-118g6. In such embodiments, documents such as bills (and/or checks) are first transferred into one of the escrow receptacles 130g3-130g8. From time to time, documents in one or more of the escrow receptacles are transferred into corresponding one or more of the cassettes 118g1-118g6. According to some embodiments, the escrow receptacles may be configured to hold a significant number (e.g., ten, twenty, one hundred, five hundred, etc.) of bills and/or checks. If an error document is detected, the error documents may be routed to one or more of the escrow receptacles and documents in the escrow receptacle(s) receiving the problem documents (or documents in some or all of the escrow receptacles) may be rerun.

According to some embodiments, an automated document container comprises a small escrow area at the very front of the automated document container. The most recent documents (e.g., the most recent 10 to 15 documents) transferred into the container remain in the escrow area of the container. If one or more error documents are encountered, the device 11,33,44 would stop transporting documents after delivering the error document(s) into the escrow area of a container such as the last document(s) transferred into the escrow area. The container and/or output port is/are configured to allow the documents in the escrow area to be removed while keeping the rest of the documents in the container secured. For example, when an error condition is encountered, the container is locked and removed from the output port. The documents in the escrow area remain retrievable from the escrow area of the container and an operator manually removes such documents and then re-couples the automated document container to the output port 55. According to such embodiments, only the documents in the escrow area would have to be removed from the container and rerun through the device 11,33,44. The rest of the documents would remain secure in the automated document container.

According to some other embodiments, an automated document container and/or a document processing device 11 (such as a currency bill denominating device 33 or document imaging device 44) having a container (e.g., a smart container) coupled thereto includes an escrow area. That is, the escrow area can be built into the container, the document processing device (e.g., the output port 55 of the document processing device), or a combination of both thereof. According to some such embodiments, a lid and/or door of the escrow area can be opened providing operator access to documents contained therein without removing the container from the output port of the document processing device. According to some embodiments, the lid and/or door is automatically opened when an exception document is delivered to the escrow area. Additionally, or alternatively, an operator can be notified when an exception document is delivered to the escrow area, such as, for example, by the device making a noise, flashing a light, sending a communication to the operator (e.g., a text message or e-mail to the operator, etc.), displaying an image of the exception document on a display of the document processing device 11, etc. In some such embodiments, if an image of the exception document is displayed on the display of the document processing device 11, the exception document may not need to be removed and/or accessed in the escrow area. In some such embodiments, the door does not need to open (manually or automatically). Further, according to some embodiments, opening of the lid can automatically lock the container in place and/or limit access to the other documents stored in the container (e.g., documents not in the escrow area). According to some such embodiments, an exception document is sent to the escrow area that is accessible to the operator to view therein without removing the exception document and/or to remove the exception document therefrom and view the document closer. According to some such embodiments, document processing can be halted to give the operator time to retrieve the exception document in the escrow area, enter the appropriate missing information into the system (e.g., missing denomination, missing serial number character information) and then replace the exception document into the escrow area (then processing can resume automatically or upon input from the operator). Alternatively, according to some embodiments, document processing can be halted to give the operator time to retrieve the exception document in the escrow area, enter the appropriate missing information into the system (e.g., missing denomination, missing serial number character information) and then replace the exception document into an input receptacle of the document processing device to be reprocessed. Alternatively, document processing can continue with documents being processed and delivered to other containers not associated with the escrow area including the exception document. Further, in some embodiments, an image of the exception document can be displayed to the operator and/or another operator for the operator to review and enter the missing information while the exception document is in the escrow area. In some such embodiments, the documents can be continuously processed and/or halted to wait for the appropriate entering of information by the operator(s). After entering of the appropriate information, the document may be transferred to the container from the escrow area as further documents are processed. Alternatively, according to some embodiments, the exception document can be removed from the escrow area without entering information and set aside and a continuation key can be activated to restart processing of the rest of the documents.

According to some other embodiments, instead of having an escrow area built into the automated document container and/or the document processing device (e.g., device 11-16a shown in FIG. 16A), in addition to including the input ports 54 and the output ports 55, the document processing device can include an offsort receptacle (like the output receptacle 130b of device 11b shown in FIG. 1B) for receiving exception documents (e.g., no call currency bills) and an input receptacle (like the input receptacle 110b of device 11b shown in FIG. 1B) for receiving the exception bills to reprocess the exception bills. According to some embodiments, by including the input and output receptacles in addition to the input and output ports, escrow areas are not needed in the device/system. According to some such embodiments, an exception document is sent to the output receptacle that is readily accessible to the operator instead of being sent to a container coupled to the document processing device that is not readily accessible to the operator. The operator can retrieve the exception document, enter the appropriate missing information into the system (e.g., missing denomination, missing serial number character information) and then reprocess the exception document by placing in the input receptacle. Then the reprocessed document will be sent to the appropriate container instead of the output receptacle.

J. Device 11, 33, 44 Operating Speeds

According to some embodiments, the device 11, 33, 44 may be configured to run at different speeds. For example, according to some embodiments, the device 11, 33, 44 operates at 1,200 bills per minute or higher when processing currency bills and at 400-500 checks per minute when processing checks. By "the device 11, 33, 44 operates" it is meant that the device is configured to transport, scan and/or image, and otherwise process the currency bills and/or checks at the stated speeds from the time after the document (e.g., currency bill, check, etc.) enters the transport mechanism of the device from the input receptacle and/or input automated document container (e.g., smart cassette, smart safe, etc.) to the time the document (e.g., currency bill, check, etc.) reaches an output receptacle or exits the transport mechanism of the device to an output automated document container (e.g., smart cassette, smart safe, etc.), such as, for example, at the speeds described in the Document Processing Speed Section of U.S. Pat. No. 8,162,125, which is hereby incorporated by reference herein in its entirety.

According to some embodiments, an input automated document container (e.g., smart cassette, smart safe, etc.) is configured to permit documents (e.g., currency bill, check, etc.) contained therein to be transported from the input automated document container into the device 11, 33, 44, at different speeds (e.g., at least about 200 documents per minute, at least about 300 documents per minute, at least about 400 documents per minute, at least about 500 documents per minute, at least about 600 documents per minute, at least about 700 documents per minute, at least about 800 documents per minute, at least about 900 documents per minute, at least about 1000 documents per minute, at least about 1100 documents per minute, at least about 1200 documents per minute, at least about 1300 documents per minute, at least about 1400 documents per minute, at least about 1500 documents per minute, at least about 1600 documents per minute, about 500 documents per minute, about 600 documents per minute, etc.) than the device 11, 33, 44 processes the documents. Further, according to some embodiments, an output automated document container (e.g., smart cassette, smart safe, etc.) is configured to permit documents (e.g., currency bills, checks, etc.) processed by the device to be transported from the device 11, 33, 44 to the output automated document container at different speeds (e.g., at least about 200 documents per minute, at least about 300 documents per minute, at least about 400 documents per minute, at least about 500 documents per minute, at least about 600 documents per minute, at least about 700 documents per minute, at least about 800 documents per minute, at least about 900 documents per minute, at least about 1000 documents per minute, at least about 1100 documents per minute, at least about 1200 documents per minute, at least about 1300 documents per minute, at least about 1400 documents per minute, at least about 1500 documents per minute, at least about 1600 documents per minute, about 500 documents per minute, about 600 documents per minute, etc.) than the device 11, 33, 44 processes the documents. According to some embodiments wherein input and/or output automated document containers are employed, the input and/or output automated document containers and the devices 11, 33, 44 are configured to operate at: at least about 200 documents per minute, at least about 300 documents per minute, at least about 400 documents per minute, at least about 500 documents per minute, at least about 600 documents per minute, at least about 700 documents per minute, at least about 800 documents per minute, at least about 900 documents per minute, at least about 1000 documents per minute, at least about 1100 documents per minute, at least about 1200 documents per minute, at least about 1300 documents per minute, at least about 1400 documents per minute, at least about 1500 documents per minute, at least about 1600 documents per minute, about 500 documents per minute, about 600 documents per minute, etc.

According to some embodiments, wherein input automated document containers are employed and output automated document containers are employed, the input automated document containers and the output automated document containers are configured to operate at different speeds. That is, according to some embodiments, the devices 11, 33, 44 can be configured to receive documents from an input automated document container at a first speed and to deposit and/or deliver documents to an output automated document container at a second speed that is different than the first speed. For example, according to some embodiments, the devices 11, 33, 44 are configured to receive documents from one or more input automated document containers at a speed of at least about 1000 documents per minute and to deposit and/or deliver documents to one or more output automated document containers at a speed of at least about 600 documents per minute. For another example, according to some embodiments, the devices 11, 33, 44 are configured to receive documents from one input automated document container at a speed of at least about 1000 documents per minute and to deposit and/or deliver documents to two output automated document containers at a speed of at least about 500 documents per minute. For yet another example, according to some embodiments, the devices 11, 33, 44 are configured to receive documents from one input automated document container at a speed of at least about 1200 documents per minute and to deposit and/or deliver documents to two output automated document containers at a speed of at least about 600 documents per minute.

According to some embodiments, when a device 11, 33, 44 is placed in "deposit mode," the device collects totals regarding the bills and/or checks to be placed into a smart container. According to some embodiments, when processed documents are delivered to an output receptacle and then manually removed and placed into a smart container, the device 11, 33, 44 may operate at higher speeds (e.g., at least 1200 bills per minute, at least 600 checks per minute) than when the device 11, 33, 44 is automatically loading documents into automated document container(s) in which case the device may load documents into a smart container at a rate of at least about 200, 300, 400, 500, or 600 documents per minute.

K. Control of Coupling of Automated Document Container to Device 11

According to some embodiments, the device 11, 33, 44 is configured to permit a smart container(s) to be coupled to an output dock only while the device 11, 33, 44 is set to a deposit mode. For example, when the device 11, 33, 44 is in a deposit mode, the device may be configured to send a signal (e.g. unlock signal) to one or more of its output ports which cause a latch or flange to move to an unlock position. When in an unlock position, an automated document container may be coupled to the output port 55; however, when in a locked position, an automated document container may be physically blocked or impeded from be coupled to the output port 55.

According to some embodiments, the ability to insert or couple an automated document container onto the device 11, 33, 44 only during deposit preparation may be important. According to some embodiments, during normal business hours, the device 11, 33, 44 is run with no output document containers coupled thereto. In such a configuration, from time to time, the retailer might want to balance out cashier tills at the end of a shift using the device 11, 33, 44. According to some embodiments, the device 11, 33, 44 may process documents in a non-deposit mode at a high speed (e.g., at a rate of at least 1200, 1500 bills per minute) such as when smaller numbers of currency bills from each till need to be verified when balancing out tills and/or when the device 11, 33, 44 is used to prepare (e.g., count, denominate) currency bills to be placed into tills (such as in preparation for the beginning of a shift).

L. Use of Automated Document Containers by Other Entities

While discussed above in connection with the use of the device 11, 33, 44 by retailers, in other embodiments, devices 11, 33, 44 may be used by other entities. For example, according to some embodiments, any commercial account with currency bills and/or checks could use device 11, 33, 44 including, for example, banks, savings and loans, and credit unions having multiple branch locations. From time to time branches accumulate currency bills either through deposits at the teller window or when branches empty ATMs at the branch location, etc. The currency bills are counted and verified at the branch. The branch then sells excess bills to the central cash vault of a bank. Under this scenario instead of placing currency bills in a bag and transporting the bills from the branch to a central vault, the bills could be placed into automated document container(s) including smart containers in the manners described above. These automated document containers can then be delivered from the branches to central cash vaults. According to some embodiments, when a smart automated document container arrives at the cash vault, it will have a cassette number, branch number, branch address, declared amount of currency, document images, bill serial numbers, etc. stored in the smart container memory. Thus, as described above in connection with retailers use of smart containers, the use of smart containers may enhance the automation and rapid verification of currency bills (and/or checks) being received at the central vault locations from the various branches of the bank (savings and loan, credit union) network.

In a like manner, casinos could prepare their deposits into automated document containers such as smart cassettes for delivery to banks Other users of currency bills such as amusement parks, hotels, bars and restaurants could utilize such automated document containers for delivery of their deposits.

M. Use of Automated and/or Ordered Document Containers to Hold Multiple Batches of Documents According to some embodiments, an automated and/or ordered document container such as a smart document container may be used to store more than one batch or sub-batch or documents associated with more than one deposit transactions from one or more depositors (e.g., multiple retailers and/or multiple locations of a retailer, e.g., Safeway Store #22 and Safeway Store #23). According to some embodiments, an automated and/or ordered document container such as a smart document container may contain a number of different customer deposits, or other types of sub-batches.

According to some embodiments in which a document imaging device(s) 44 is(are) used, the document imaging device(s) handle multiple sub-batches by capturing the images of the documents found within an entire batch and track the individual documents by sub-batch. For example, according to one such embodiment, a smart automated container is coupled to a document imaging device 44. The operator loads a first sub-batch of documents into the input hopper of the device 44 and the device processing the first sub-batch of documents, capturing the image of each document and optionally determining the value of each document (e.g., the denomination of each bill) and/or generating a total value for the sub-batch. The images (and optionally, the total value of the sub-batch (and/or additional information) is transmitted to and stored in the memory of smart container. Furthermore, the documents will be in the smart container at that time.

According to some such embodiments, a separator card(s) such as a sub-batch header card, trailer card, and/or physical deposit slip is then inserted into the smart container, either in front of or behind the documents in the sub-batch. The separator card(s) may just be a simple piece of paper without data on it. Alternately, the separator card(s) could have deposit information printed on it. According to some such embodiments, an operator manually inserts the separator card(s) into the smart container. According to some such embodiments, the separator card(s) is automatically inserted into the smart container. For example, a separator card(s) may comprise one of the documents placed into the input hopper with the rest of the sub-batch documents and that separator card(s) is automatically delivered into the smart container along with the rest of the documents in the sub-batch. According to some embodiments, the device 11 prints data (e.g., a batch number, a batch total, etc.) onto the separator card (e.g., text and/or bar-coded data) before delivering the separator card(s) to the smart container. According to some embodiments, the device 11 has a separator card dispenser and inserts one or more separator cards into the stream of the sub-batch documents at appropriate times, e.g., in front of and/or behind each sub-batch of documents.

Once the processing a first sub-batch of documents is complete, a second sub-batch documents may be loaded into the input hopper and processed by the device 11 and delivered into the smart container. One or more separator cards would be used with the second sub-batch as described above in connection with the first sub-batch.

According to some embodiments, separator cards are not employed. Rather, the device 11 captures an image document in a sub-batch and associates a corresponding record (e.g., 300a-300d) for each document with the corresponding sub-batch (e.g., the record, e.g., 300a-300d may have a sub-batch ID field (e.g., field 388 in FIGS. 8C-8D) and the device 11 adds the appropriate sub-batch ID into the sub-batch ID field. The sub-batch ID may be included in the data transmitted to and stored in the memory of a smart container and/or electronically transmitted to a banking network prior to shipment of the smart container. When such a multi-batch containing smart container arrives at a cash vault for reconciliation, the document imaging device 44 at the cash vault captures the image of each document in the container and determines the sub-batch of each document by comparing the image of the document and/or extracted data (e.g., serial number or serial number and denomination combination of each currency bill, MICR data of check) record of each piece of currency (or other documents like checks). According to some such embodiments, the document imaging device 44 reconciling the content of the smart container at the cash vault is thus able to recognize the end of one sub-batch and the beginning of a next sub-batch. According to some embodiments, the device 44 recognizes the end of one sub-batch in real time and thus is configured to pause the processing/transporting of documents in a subsequently sub-batch until the processing of the documents in a current sub-batch is completed.

According to some embodiments, the device is configured to recognize separator cards and the device is configured to recognize that a new sub-batch is beginning or ending when a separator card is detected. According to such embodiments, multiple sub-batches may be loaded into an input hopper of the device 11 and the device 11 recognizes separator cards and recognizes when one sub-batch of documents ends and a next sub-batch of documents begins. According to some such embodiments, when the device detects a separator card, the device 11 pausing the operation of the transport mechanism in a manner that all documents associated with a first sub-batch continue to be delivered to and loaded in a smart container while transportation of documents upstream of the separator card is suspended until the device 11 confirms that the processing of the first sub-batch of documents has been successfully completed.

N. Use of Automated and/or Ordered Document Containers for Transfer of Documents to a Bank Customer Above, the use of automated and/or ordered document containers such as smart containers for delivery of deposits from a bank customer (such as a retailer) or a branch bank to a central cash vault. In a like manner, according to some embodiments, automated and/or ordered document containers such as smart containers are utilized in the reverse direction.

From time to time retailers, branches of banks, or other commercial accounts require an inventory of additional currency bills at their store location or place of business. Therefore, a retailer orders a certain quantity of $5s, 10s, 20s, 50s or 100s for delivery from the bank (or armored carrier) to their place of business. Currently, such currency may be delivered in a strapped condition and/or with additional loose notes. Typically, this delivery of currency bills is sealed in a bag and delivered to the location of the retailer or other commercial account customer.

According to some embodiments, currency bills are delivered from a central vault to a retailer or other location in a secure automated and/or ordered document container such as a secure smart container (e.g., cassette CS or mini-safe SF). The memory of the smart container stores information about the documents expected to be contained in the smart container such as a total, and/or denomination-by-denomination breakdown data such as totals and/or piece counts and/or images of each of the documents expected to be in the container.

According to some embodiments, a bank customer (e.g., retailer 1101) receiving a shipment of documents in an automated document container uses a document processing device 11, 33, 44 (e.g., 11-11) to process the documents in the automated document container to verify/reconcile the contents of the container. The device 11, 33, 44 may have an input port 54 and the automated container may be coupled to the device 11, 33, 44 and the device 11, 33, 44 may automatically extract the documents from the container. Alternatively, an authorized person (e.g., store manager) may unlock the container (e.g., via a physical key and/or the entry of an unlock code into a smart container such as via a container interface) and manually transfer the documents in the container into an input hopper of the device 11, 33, 44. The documents in the container are then processed by the device 11, 33, 44 at the store location to verify the expected documents (e.g., currency bills) have been delivered. According to some embodiments, information about the contents of a smart container (e.g., currency bill total(s) and/or denomination breakdown data) is stored in a memory of the smart container and is transmitted to the device 11, 33, 44 during the reconciliation/verification process and/or such information is sent electronically in advance of receipt of the container by the store. During the verification process, the device 11, 33, 44 compares the information (e.g., total(s), denomination-by-denomination count(s)) it generates by processing the documents against the data obtained from the smart container memory and/or obtain in advance of delivery of the container.

According to some embodiments, currency bills are stored in the automated document container sequenced by denomination, e.g., first all of the $1s, then all the $5s, 10s, 20s, or 100s, etc. Thus when the device 11, 33, 44 processes the contents of the container, the documents may be processed in the same order, for example, such as when the container is coupled to the device 11, 33, 44 and sequentially extracts or receives the documents from the container. According to some embodiments, the device 11, 33, 44 immediately detects any variation, shortage, or overage and takes appropriate action (e.g., sending an alert and/or relevant information (e.g., details about a discrepancy, e.g., images of any no show or unexpected documents, serial numbers and/or denominations of the same, etc.) to appropriate locations (e.g., a device 11, 33, 44 interface, local computer 1152, local PDA 1199, a banking network 1851, 960, etc.).

1. Automated Document Container Preparation Device

Figure 16E:
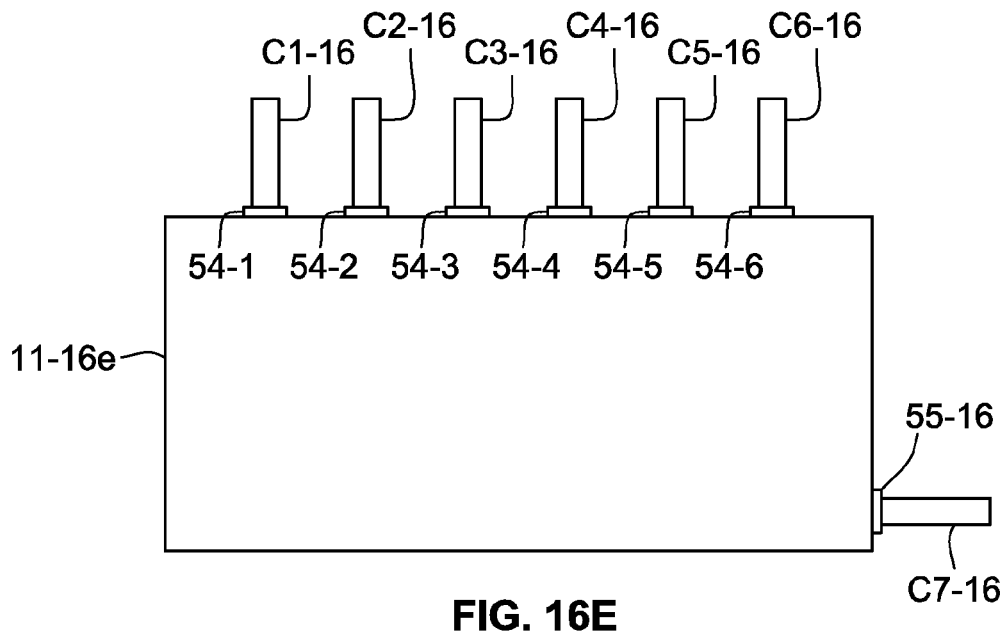
FIG. 16E is a block representation of a preparation device that may be employed to load automated document containers according to some embodiments of the present disclosure.

Referring to FIG. 16E, according to some embodiments, a preparation device 11-16e such as a device 11, 33, 44 is employed to load automated document containers. According to some embodiments, the preparation device 11-16e is located in a central cash vault (e.g., A1, BV, 1301, 1501). According to some embodiments, the device 11-16e has a plurality of input docks 54-1-54-6 for receiving automated document containers, each having a single denomination of currency bills contained therein, e.g., container C1-16 could contain only $1 bills, C2-16 could contain only $5 bills, C3-16 could contain only $10 bills, C4-16 could contain only $20 bills, C5-16 could contain only $50 bills, and C6-16 could contain only $100 bills. Alternatively, the device 11-16e may comprise a plurality of input hoppers instead of the plurality of input docks 54-1-54-6 and stacks of bills of different denominations could be placed in the respective input receptacles, e.g., $1 bills placed in a first input receptacle, $5 bills placed in a second input receptacle, etc. Alternatively, the device 11-16e could comprise a plurality of internal compartments, each configured to hold an automated document container of a single denomination and/or to hold stacks of loose currency of a single denomination. According to some embodiments, the input containers C1-16-C6-16, the input hoppers, or the internal compartments are configured to hold a large number of currency bills, e.g., 1000 bills, 2000 bills. The device 11-16e also comprises one or more output docks, e.g., 55-16, each configured to be coupled to an automated document container. Alternatively, the device 11-16e may comprise one or more compartments for housing one or more document containers internally, e.g., similar to how cassettes 118g1-118g6 are positioned within device 11g shown in FIG. 1G. The device 11-16e is configured to selectively draw bills from one or more input sources and deliver bills to one or more out-going automated document containers.

According to some embodiments, customer orders for currency bills may be sequentially be filled by device 11-16e. For example, customer #1 may order 100-$1s, 100-$20s, 200-50s, etc. The preparation device 11-16e would extract the appropriate number of $1s, 20s, 50s, etc. from each of the input receptacles/containers, optionally denominate each bill to confirm a bill is of the expected denomination (e.g., a bill extract from container 61-16 is in fact a $1 bill, optionally imaging each bill, and then deliver these bills into an appropriate out-going container that is to be sent to customer #1. According to some embodiments, denominations are extracted from input receptacles/containers sequentially by denomination and then delivered into the appropriate outgoing container in the same sequence by denomination, e.g., first the ordered number of $1 bills are inserted in the outgoing container, then the ordered number of $5 bills are inserted into the container, etc. Once the automated document container receives all the bills needed to complete an order, the automated document container would be locked. When the out-going container is a smart container, any desired data may be stored in the smart container memory, e.g., a grand total of bills in the container, the number and/or value of each denomination of bills contained in the container, the name and/or address and/or account number or ID of the customer associated with the order, etc. The out-going container may then be removed from the device 11-16e and sent to the appropriate customer. According to some embodiments, an armored carrier would pick up the automated document containers at the cash vault that are to be delivered to customers on a particular driver's route and deliver to container to the appropriate customers.

According to some embodiments, banks and/or vaults employing document preparation device 11-16e could avoid strapping and/or banding currency bills for inventory purposes. Instead, currency bills could be stored in automated and/or ordered document containers (e.g., secure containers) by denomination and accessed as desired to service customer needs and internal bank requirements. The advantage of inventorying currency bills by denomination in secure document containers is added security as such containers are resistant to being tampered with and/or opened by unauthorized personnel/devices 11 (e.g., a physical key and/or password may be required to open or use such containers with a document processing device 11. According to some embodiments, the security provided by the secure document containers is better than that provided by strapped currency as the integrity of a strap of currency may be more easily violated (e.g., by the removal of the strapping material and/or the removal of one or more bills from a strapped set of bills. Such embodiments also facilitate greater automation in the handling/processing of currency bills as automated document containers may be coupled to devices 11 and automatically extracted and processed by the devices 11. According to some embodiments, automated, ordered, and/or secure document containers are configured to be stackable and/or interlockably stackable to facilitate more efficient storage of large volumes of currency in a bank or other cash vault, e.g., more currency bills may be stored in less space in the vault.

According to some embodiments, automated document containers and currency bill denominating devices 33 or document imaging devices 44 such as those similar to devices 11d-11g are configured to permit the automated document containers to be coupled to the input receptacle 110d-110g and/or input docks for such devices. According to some embodiments, a central cash vault has one or more of such devices and an automated document container such as a smart container is coupled to such a device. Currency bills are then extracted from the automated container and sorted by denomination into the appropriate output receptacles, e.g., for a device similar to device 11f, the device may be configured to deliver $1 bills to output receptacle 130f1, $5 bills to output receptacle 130f2, etc.

According to some embodiments, cassettes CS and/or mini-safes SF are collapsible. According to some such embodiments, when such cassettes or mini-safes are not in use, they are able to be folded flat. Such collapsible containers reduce storage space required in a vault, armored truck, or at a customer location for empty cassettes and/or mini-safes.

XXIII. Convertible Document Processing Systems

According to some embodiments, any of the document processing devices 11 of the present disclosure can be a convertible document processing device. By "convertible document processing device" it is meant that the document processing device can be converted between at least a first configuration and a second configuration. For example, according to some embodiments, a document processing device (e.g., convertible document processing device 11i of FIGS. 20, 21A, and 21B) includes a convertible input area and/or a convertible output area, each of which can be selectively coupled with two or more different input assemblies and/or output assemblies, respectively.

According to some embodiments, a convertible document processing device is useful for processing various types of documents received in a variety of different forms (e.g., loose documents, documents preloaded in one or more containers, e.g., smart cassettes, etc.). According to some embodiments, a convertible document processing device is convertible between one which can process documents as shown and described in reference to device 11b (FIG. 1B) and one which can process documents as shown and described in reference to devices 11 (FIGS. 5A-5D), and various combinations thereof.

One example of an output assembly is a modular stacker-wheel output assembly which when attached to a convertible output area of the document processing device converts the document processing device into one with an output receptacle that is the same as, or similar to, the output receptacle 130b of the device 11b shown in FIG. 1B. Another example of an output assembly is a modular output port assembly which is configured to be selectively coupled and decoupled to the convertible output area of the document processing device and which when attached to the convertible output area of the document processing device converts the document processing device into one with an output port that is the same as, or similar to, the output port 55 of the device 11 shown in FIGS. 5A-5B.

One example of an input assembly is a modular input receptacle assembly which when attached to a convertible input area of the document processing device converts the document processing device into one with an input receptacle that is the same as, or similar to, the input receptacle 110b of the device 11b shown in FIG. 1B. Another example of an input assembly is a modular input port assembly which is configured to be selectively coupled and decoupled to the convertible input area of the document processing device and which when coupled to the convertible input area of the document processing device converts the document processing device into one with an input port that is the same as, or similar to, the input port 54 of the device 11 shown in FIG. 5C.

Figure 20:
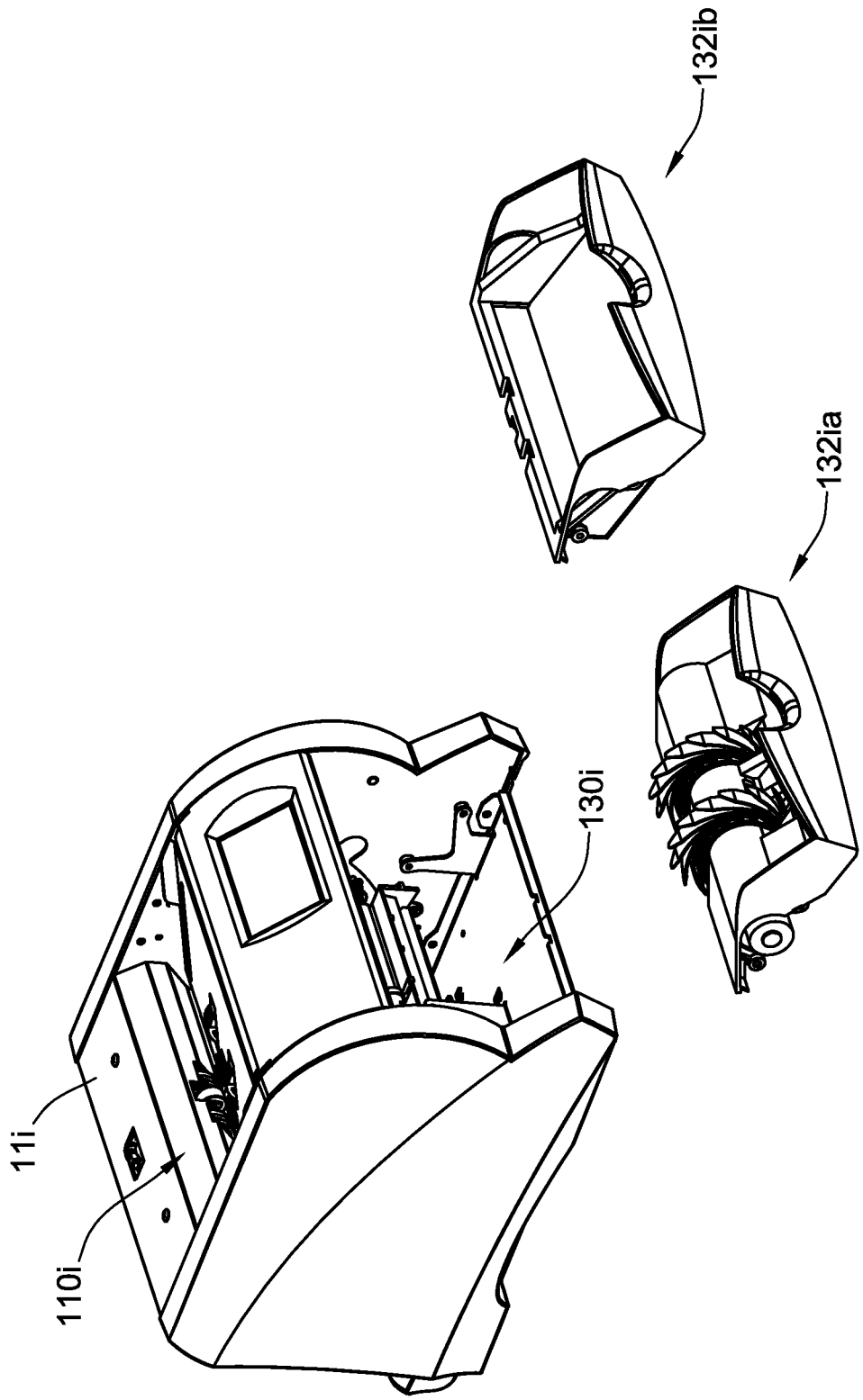
FIG. 20 is a partially exploded perspective view of a convertible document processing device according to some embodiments of the present disclosure.
Figure 21A:
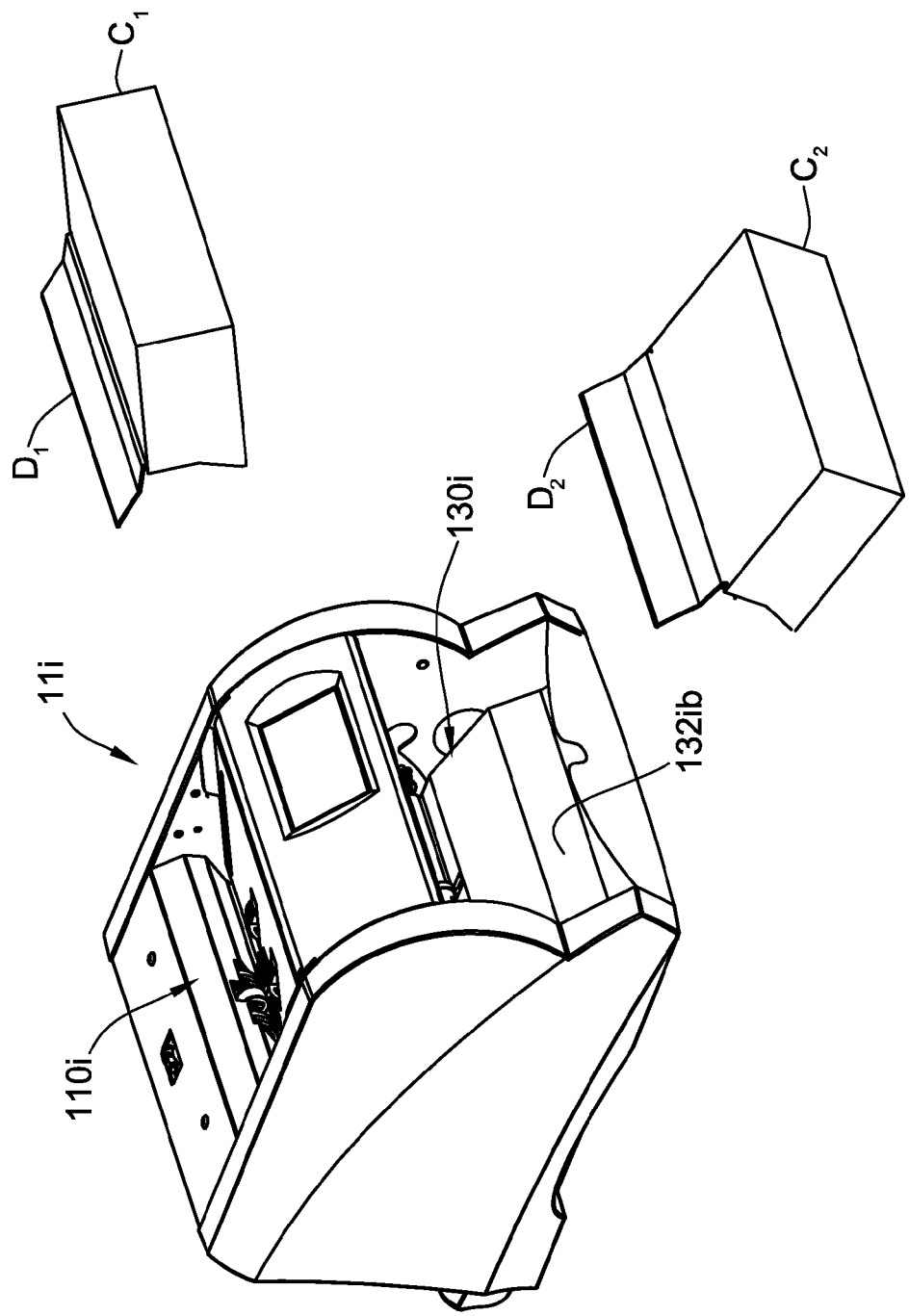
FIG. 21A is an assembled perspective view of the convertible document processing device of FIG. 20 according to some embodiments of the present disclosure.
Figure 21B:
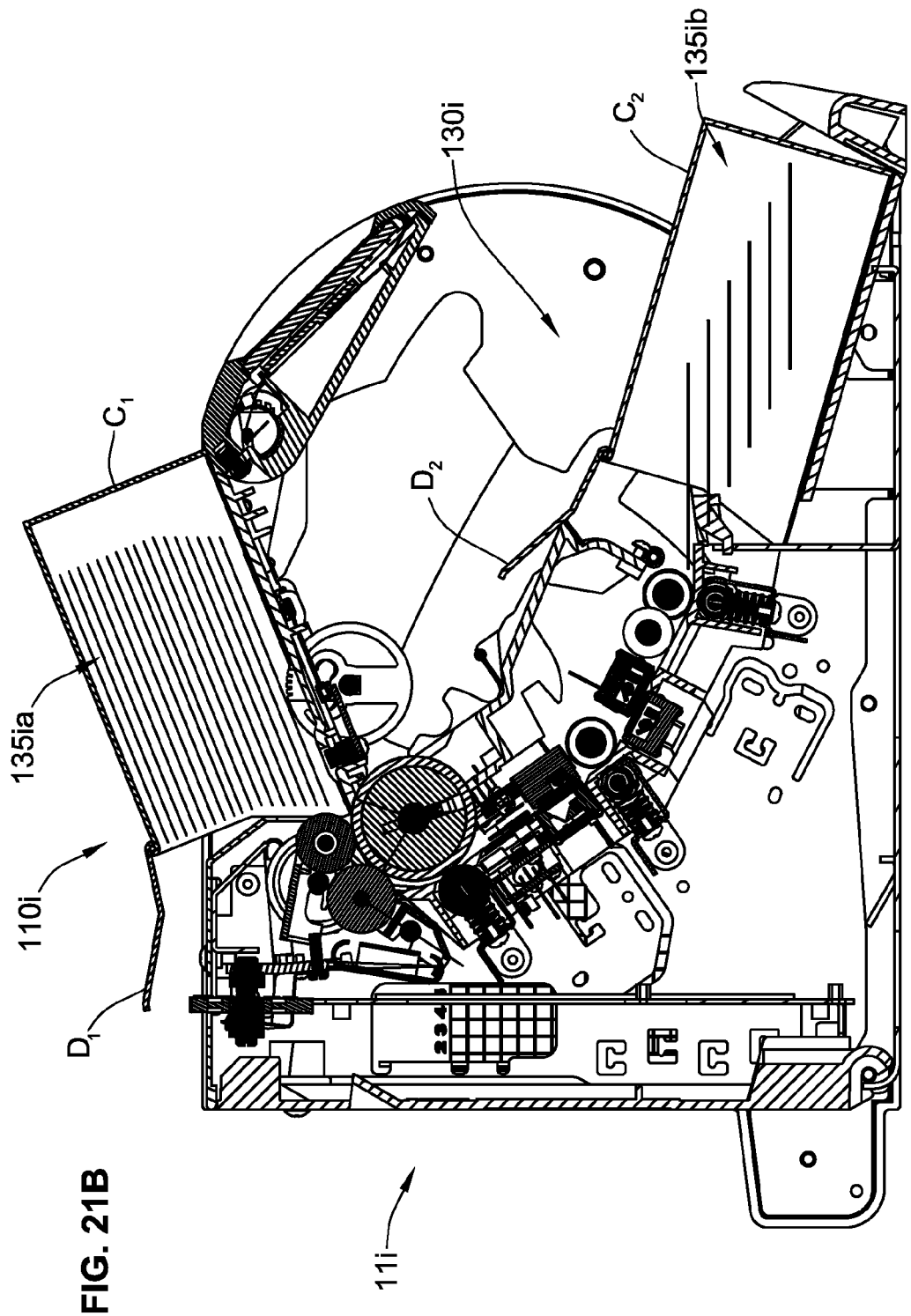
FIG. 21B is a cross-sectional view of the convertible document processing device of FIG. 21A according to some embodiments of the present disclosure.

Referring to FIG. 20, a convertible document processing device 11i is a document imaging device 44 which obtains a visually readable image of one or both surfaces of processed documents and/or portions of one or both surfaces of processed documents. The convertible document processing device 11i is the same as, or similar to, the device 11b shown in FIG. 1B and described above, except that the convertible document processing device 111 includes an input receptacle 110i and a convertible output area 130i, which are different than the input receptacle 110b and the output receptacle 130b of the device 11b. According to some embodiments, documents are placed directly in an input receptacle 110i and loaded into the device 11i for processing. According to other embodiments, as shown in FIGS. 21A and 21B, an input container $C_1$ (e.g., an automated document container, such as, for example, a mini-safe SF) containing documents 135ia (FIG. 21B) is coupled with the input receptacle 110i for loading the documents 135ia into the device 11i for processing. According to some embodiments, the input receptacle 110i is an input area for receiving documents therein.

Referring back to FIG. 20, the convertible output area 130i is configured to receive and/or couple with one or more modular assemblies. For example, a modular stacker-wheel output assembly 132ia and/or a modular output port assembly 132ib can be coupled to the convertible output area 130i. When the modular stacker-wheel output assembly 132ia is coupled to the convertible output area 130i of the device 11i, the device 11i is converted into a device (not shown) with an output receptacle that is the same as, or similar to, the output receptacle 130b of the device 11b shown in FIG. 1B. When the modular output port assembly 132ib is coupled to the convertible output area 130i of the device 11i, the device 11i is converted into a device with an output port that is configured to receive and/or couple with an output container (e.g., an automated document container, such as, for example, a mini-safe SF) for receiving processed documents. As shown in FIG. 21B, as documents are processed (e.g., transported, imaged, etc.) by the device 11i, the processed documents 135ib are deposited in an output container $C_2$ (e.g., an automated document container, such as, for example, a mini-safe SF). According to some embodiments, the input container $C_1$ and the output container $C_2$ are substantially identical. According to some embodiments, both the input container $C_1$ and the output container $C_2$ include spring loaded doors D1 and D2, respectively, that are configured to automatically close when the input container $C_1$ and/or the output container $C_2$ are decoupled from the device 11i, thereby securing the documents (if any) contained therein.

What is claimed is:

1. A method of processing documents in a document processing device, the method comprising:
receiving a first container within a first input port of the document processing device such that the first container is coupled to the first input port, the first container is a mini-safe configured to be locked, thereby securely storing a plurality of documents therein, a housing of the first container extending from the document processing device such that a portion of the housing of the first container protrudes outside of a housing of the document processing device;
transporting, using a transport mechanism of the document processing device, at least a portion of the plurality of documents from the first container along a transport path past a sensor;
scanning at least a portion of each of the documents transported past the sensor to produce data; and
delivering a first portion of scanned ones of the plurality of documents to a second container coupled to a first output port of the document processing device, the second container is a mini-safe configured to be locked, thereby securely storing the first portion of the scanned ones of the plurality of documents therein, a housing of the second container extending from the document processing device such that a portion of the housing of the second container protrudes outside of the housing of the document processing device,
wherein the portion of the housing of the first container and the portion of the housing of the second container protrude outside of the housing of the document processing device during the transporting and during the scanning.

2. The method of claim 1, wherein the first container and the second container are substantially identical automated document containers.

3. The method of claim 1, wherein the first container and the second container are each configured to store at least one thousand documents therein.

4. The method of claim 1, wherein the first container and the second container are each smart containers such that each includes a memory device configured to store information associated with documents stored therein.

5. The method of claim 1, wherein the plurality of documents included in the first container includes U.S. currency bills.

6. The method of claim 1, wherein the plurality of documents included in the first container includes currency bills associated with multiple countries including two or more of the following currencies: U.S. dollar, euro, Australian dollar, Canadian dollar, Japanese yen, and pound sterling.

7. The method of claim 1, wherein the plurality of documents included in the first container includes U.S. currency bills of a plurality of denominations.

8. The method of claim 7, wherein the delivering the first portion of scanned ones of the plurality of documents includes delivering U.S. currency bills of a plurality of denominations to the second container.

9. The method of claim 1, wherein the plurality of documents included in the first container includes U.S. currency bills and checks.

10. The method of claim 9, wherein the delivering the first portion of scanned ones of the plurality of documents includes delivering U.S. currency bills and checks to the second container.

11. The method of claim 1, wherein the plurality of documents included in the first container includes U.S. currency bills, checks, and one or more deposit slips.

12. The method of claim 11, wherein the delivering the first portion of scanned ones of the plurality of documents includes delivering U.S. currency bills, checks, and one or more deposit slips to the second container.

13. The method of claim 1, wherein the sensor is an image sensor and wherein the scanning includes imaging at least a portion of each of the documents transported past the image sensor to produce image data.

14. The method of claim 1, further comprising delivering a second portion of scanned ones of the plurality of documents to an output receptacle of the document processing device, the output receptacle being configured to contain the second portion of the scanned ones of the plurality of documents therein in an unsecure manner.

15. The method of claim 14, wherein the delivering the second portion of scanned ones of the plurality of documents includes delivering exception documents to the output receptacle.

16. The method of claim 14, wherein the delivering the second portion of scanned ones of the plurality of documents includes delivering deposit slips to the output receptacle.

17. The method of claim 14, wherein the delivering the second portion of scanned ones of the plurality of documents includes delivering checks to the output receptacle.

18. The method of claim 1, further comprising delivering a third portion of scanned ones of the plurality of documents to a third container coupled to a second output port of the document processing device, the third container is a mini-safe configured to be locked, thereby securely storing the third portion of the scanned ones of the plurality of documents therein, a housing of the third container extending from the document processing device such that a portion of the housing of the third container protrudes outside of the housing of the document processing device during the transporting and during the scanning.

19. The method of claim 18, wherein the delivering the first portion of scanned ones of the plurality of documents includes delivering only U.S. currency bills to the second container, and wherein the delivering the third portion of scanned ones of the plurality of documents includes delivering only checks to the third container.

20. The method of claim 1, further comprising subsequent to all of the plurality of documents included in the first container being transported along the transport path and delivered to the second container, decoupling the first container from the first input port.

21. The method of claim 1, further comprising:
subsequent to all of the plurality of documents included in the first container being transported along the transport path and delivered to the second container, decoupling the first container from the first input port and decoupling the second container from the first output port;
receiving a third container within the first input port of the document processing device such that the third container is coupled to the first input port, the third container is a mini-safe configured to be locked, thereby securely storing a second plurality of documents therein, a housing of the third container extending from the document processing device such that a portion of the housing of the third container protrudes outside of the housing of the document processing device;
receiving the first container within the first output port of the document processing device;
transporting, using the transport mechanism of the document processing device, at least a portion of the second plurality of documents from the third container along the transport path past the sensor; and
delivering a first portion of the second plurality of documents to the first container, the first container being configured to be locked, thereby securely storing the first portion of the second plurality of documents therein.

22. The method of claim 1, wherein the document processing device has a footprint of less than about two square feet and a weight of less than about thirty pounds.

23. The method of claim 1, wherein each of the plurality of documents has a wide edge, and wherein the act of transporting comprises transporting the at least a portion of the plurality of documents in a wide-edge leading manner.

24. The method of claim 1, wherein at least about twenty percent of the housing of the first container protrudes outside of the housing of the document processing device.

25. The method of claim 1, wherein a majority of the housing of the first container protrudes outside of the housing of the document processing device.

26. The method of claim 1, wherein at least about eighty percent of the housing of the first container protrudes outside of the housing of the document processing device.

27. A method of processing documents in a document processing device, the method comprising:
receiving a plurality of documents in an input receptacle of the document processing device in an unsecure manner;
transporting, using a transport mechanism of the document processing device, the plurality of documents, one at a time in a serial fashion, from the input receptacle past an image scanner;
imaging, using the image scanner, at least a portion of each of the plurality of documents transported past the image scanner to generate image data that is reproducible as a visually readable image of at least a portion of each of the plurality of documents; and
delivering a first portion of imaged ones of the plurality of documents to an automated document container coupled to an output port of the document processing device, the automated document container is a mini-safe configured to be locked, thereby securely storing the first portion of the scanned ones of the plurality of documents therein, a housing of the automated document container extending from the document processing device such that a portion of the housing of the automated document container protrudes outside of a housing of the document processing device during the transporting and during the imaging.

28. The method of claim 27, wherein the automated document container is a smart container such that the automated document container includes a memory device configured to store information associated with the image data generated by the act of imaging.

29. The method of claim 28, further comprising storing data in the memory device of the automated document container.

30. The method of claim 29, wherein the stored data includes image data that is reproducible as a visually readable image of at least a portion of each of the documents contained within the automated document container.

31. The method of claim 29, wherein the stored data is associated with a total value of the documents contained within the automated document container.

32. The method of claim 27, wherein the delivering the first portion of imaged ones of the plurality of documents includes delivering U.S. currency bills of a plurality of denominations to the automated document container.

33. The method of claim 27, wherein the delivering the first portion of imaged ones of the plurality of documents includes delivering U.S. currency bills of four or more denominations to the automated document container.

34. The method of claim 27, wherein the delivering the first portion of imaged ones of the plurality of documents includes delivering U.S. currency bills, checks, and one or more deposit slips to the automated document container.

35. The method of claim 27, further comprising delivering a second portion of imaged ones of the plurality of documents to an output receptacle of the document processing device, the output receptacle being configured to contain the second portion of the imaged ones of the plurality of documents therein in an unsecure manner.

36. The method of claim 35, wherein the delivering the second portion of imaged ones of the plurality of documents includes delivering exception documents to the output receptacle.

37. The method of claim 35, wherein the delivering the second portion of scanned ones of the plurality of documents includes delivering checks to the output receptacle.

38. The method of claim 27, wherein the output port is the only output port of the document processing device.

39. The method of claim 27, wherein the automated document container is coupled to the output port of the document processing device in a removable fashion.

40. The method of claim 27, further comprising:
   determining that one of the plurality of documents is an exception document based on the act of imaging; and
   delivering the exception document to an escrow area of the document processing device.

41. The method of claim 40, wherein the escrow area is included in a first portion of the automated document container coupled to the output port of the document processing device.

42. The method of claim 40, wherein the escrow area is included in the output port of the document processing device.

43. The method of claim 40, wherein the escrow area is included in the housing of the document processing device.

44. The method of claim 40, wherein the escrow area includes a door for providing operator access to exception documents such that the operator can remove, inspect, or both, the exception documents stored within the escrow area.

45. The method of claim 44, further comprising automatically opening the door in response to an exception document being delivered to the escrow area.

46. The method of claim 27, wherein a majority of the housing of the automated document container protrudes outside of the housing of the document processing device.

47. A method of processing documents in a document processing system, the method comprising:
   receiving a first plurality of documents in an input receptacle of a first document processing device in an unsecure manner;
   transporting the first plurality of documents, one at a time in a serial fashion, from the input receptacle past a scanner;
   scanning each of the first plurality of documents transported past the scanner to generate a first set of data;
   determining a value associated with each of the first plurality of documents transported past the scanner based on the generated first set of data;
   delivering the first plurality of documents to an automated document container coupled to an output port of the first document processing device, the automated document container is a mini-safe configured to be locked, thereby securely storing the scanned ones of the plurality of documents therein, a housing of the automated document container extending from the first document processing device such that a portion of the housing of the automated document container protrudes outside of a housing of the first document processing device during the transporting of the first plurality of documents and during the scanning of each of the first plurality of documents;
   storing the determined values of the delivered ones of the plurality of documents in a memory device of the automated document container;
   decoupling the automated document container from the output port of the first document processing device;
   physically transporting the automated document container to a new location including a second document processing device;
   receiving the automated document container within an input port of the second document processing device such that the automated document container is coupled to the input port of the second document processing device, the automated document container being configured to be locked, thereby securely storing a second plurality of documents therein, the housing of the automated document container extending from the second document processing device such that a portion of the housing of the automated document container protrudes outside of a housing of the second document processing device;
   transporting the second plurality of documents, one at a time in a serial fashion, from the automated document container past a scanner of the second document processing device;
   scanning each of the second plurality of documents transported past the scanner of the second document processing device to generate a second set of data;
   determining a value associated with each of the second plurality of documents transported past the scanner of the second document processing device based on the generated second set of data; and
   comparing the determined values of the second plurality of documents with the determined values of the first plurality of documents stored on the memory device of the automated document container,
   wherein the portion of the housing of the automated document container protrudes outside of the housing of the second document processing device during the transporting of the second plurality of documents and during the scanning of each of the second plurality of documents.

48. The method of claim 47, wherein the receiving the first plurality of documents includes receiving U.S. currency bills of four or more denominations in the input receptacle.

49. The method of claim 47, wherein the receiving the first plurality of documents includes receiving U.S. currency bills, checks, and one or more deposit slips in the input receptacle.

* * * * *